US011531512B2

(12) United States Patent
Lee et al.

(10) Patent No.: US 11,531,512 B2
(45) Date of Patent: Dec. 20, 2022

(54) DISPLAY APPARATUS

(71) Applicant: LG Display Co., Ltd., Seoul (KR)

(72) Inventors: Sungtae Lee, Paju-si (KR); KwanHo Park, Paju-si (KR); YeongRak Choi, Paju-si (KR); Kwangho Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 16/838,655

(22) Filed: Apr. 2, 2020

(65) Prior Publication Data

US 2020/0319842 A1 Oct. 8, 2020

(30) Foreign Application Priority Data

Apr. 3, 2019 (KR) ........................ 10-2019-0039261

(51) Int. Cl.

| | |
|---|---|
| ***G06F 3/16*** | (2006.01) |
| ***G06F 1/16*** | (2006.01) |
| ***G10K 9/122*** | (2006.01) |
| ***G10K 9/13*** | (2006.01) |

(52) U.S. Cl.

CPC .............. *G06F 3/16* (2013.01); *G06F 1/1605* (2013.01); *G10K 9/122* (2013.01); *G10K 9/13* (2013.01)

(58) Field of Classification Search

CPC ......... G06F 3/16; G06F 1/1605; G10K 9/122; G10K 9/13; H04R 2440/07; H04R 2499/15; H04R 7/045; H04R 1/2803; H04R 1/2826; H04R 9/025; H04R 9/043; H04R 9/06;

(Continued)

(56) References Cited

U.S. PATENT DOCUMENTS

| | | | |
|---|---|---|---|
| 8,279,712 | B2 | 10/2012 | Korbler et al. |
| 2015/0358706 | A1 | 12/2015 | Hirayama et al. |
| 2017/0026768 | A1 | 1/2017 | Kron |

(Continued)

FOREIGN PATENT DOCUMENTS

| | | | |
|---|---|---|---|
| CN | 104604258 | A | 5/2015 |
| CN | 108877597 | A | 11/2018 |

(Continued)

OTHER PUBLICATIONS

Extended European Search Report dated Aug. 7, 2020, issued in corresponding European Patent Application No. 20167876.0.

(Continued)

*Primary Examiner* — Matthew A Eason

(74) *Attorney, Agent, or Firm* — Morgan, Lewis & Bockius LLP

(57) ABSTRACT

A display apparatus includes a display panel configured to display an image and including a first to a fifth regions, at least one first and fourth sound generating devices in a left region of a rear surface of the display panel and in the first and fourth regions, at least one second and fifth sound generating device in a right region of the rear surface and in the second and fifth regions, and at least one third sound generating device in a center region of the rear surface and in the third region. The at least one first to third sound generating devices is configured to vibrate the display panel to generate sound, and the at least one fourth and fifth sound generating devices is configured to vibrate the display panel to generate sound in a direction upwards from the display panel.

19 Claims, 78 Drawing Sheets

(58) Field of Classification Search
CPC ....... H04R 17/00; H04R 2400/11; G09F 9/00; G09F 27/00; H04S 3/00
See application file for complete search history.

(56) References Cited

U.S. PATENT DOCUMENTS

| | | | | |
|---|---|---|---|---|
| 2017/0289694 | A1 | 10/2017 | Choi et al. | |
| 2018/0332376 | A1* | 11/2018 | Lee | H04R 9/022 |
| 2019/0098411 | A1 | 3/2019 | Ham et al. | |
| 2020/0260169 | A1 | 8/2020 | Lee et al. | |

FOREIGN PATENT DOCUMENTS

| | | | |
|---|---|---|---|
| CN | 109561374 | A | 4/2019 |
| EP | 3 285 504 | A1 | 2/2018 |
| EP | 3 330 780 | A1 | 6/2018 |
| EP | 3 343 272 | A1 | 7/2018 |
| JP | 2013-207311 | A | 10/2013 |
| JP | 2018-093469 | A | 6/2018 |
| JP | 2018-110369 | A | 7/2018 |
| KR | 10-2017-0115124 | A | 10/2017 |
| KR | 10-2018-0131248 | A | 12/2018 |
| WO | 2018/195652 | A1 | 11/2018 |

OTHER PUBLICATIONS

Office Action dated Nov. 3, 2021, issued in corresponding Chinese Patent Application No. 202010258726.0.

Office Action dated May 12, 2021, issued in corresponding Taiwanese Patent Application No. 109111331.

Office Action dated Jul. 12, 2021, issued in corresponding Japanese Patent Application No. 2020-067878.

Office Action dated Aug. 26, 2022, issued in corresponding Chinese Patent Application No. 109111331.

* cited by examiner

DISPLAY APPARATUS

CROSS-REFERENCE TO RELATED APPLICATIONS

This application claims the benefit of and priority to Korean Patent Application No. 10-2019-0039261 filed on Apr. 3, 2019, the entirety of which is hereby incorporated by reference.

BACKGROUND

Technical Field

The present disclosure relates to a display apparatus.

Discussion of the Related Art

Recently, as society advances to the information-oriented society, the field of display apparatuses for visually displaying an electrical information signal has rapidly advanced. Various display apparatuses having excellent performances such as thinness, lightness, and low power consumption, are being developed correspondingly.

For example, display apparatuses may be classified into liquid crystal display (LCD) apparatuses, field emission display (FED) apparatuses, organic light emitting display apparatuses, etc.

Among the display apparatuses, the LCD apparatus may include an array substrate including a thin film transistor, an upper substrate including a color filter and/or black matrix, and a liquid crystal layer interposed between the array substrate and the upper substrate. An alignment state of the liquid crystal layer is adjusted with an electric field generated between two electrodes in a pixel region, whereby a transmittance of light is adjusted based on the alignment state of the liquid crystal layer, thereby displaying an image.

The organic light emitting display apparatuses, which are self-emitting devices, have low power consumption, a fast response time, high emission efficiency, excellent luminance, and a wide viewing angle.

A display apparatus displays an image on a display panel, and an additional speaker should be installed for providing sound. When a speaker is installed in a display apparatus, a travelling direction of sound output through the speaker is a direction toward a lower or rear portion of the display panel, instead of a front portion of the display panel. Thus, the sound does not travel in a direction toward a viewer who is watching an image in front of the display panel, whereby an immersion experience of the viewer watching the image is reduced.

Moreover, the sound output through a speaker travels to a lower or rear portion of the display panel, so sound quality is deteriorated due to interference of sound reflected from a wall or a floor.

Moreover, when a speaker in a set apparatus, such as a television (TV), a notebook computer, a desktop personal computer (PC), or a computer monitor is provided, the speaker occupies a certain space, so, the design and space disposition of the set apparatus may be limited.

Therefore, the inventors have recognized the above-described problems and have performed various experiments so that when watching an image in front of a display panel, a traveling direction of a sound becomes a direction toward a front surface of the display panel, and thus, sound quality is enhanced. Through the various experiments, the inventors have invented a display apparatus having a new structure, which may output sound so that a traveling direction of the sound becomes a direction toward a front surface of a display panel, thereby enhancing sound quality.

SUMMARY

Accordingly, embodiments of the present disclosure are directed to a display apparatus that substantially obviates one or more of the issues due to limitations and disadvantages of the related art.

An aspect of the present disclosure is to provide a display apparatus including a sound generating device capable of outputting sound to a forward region in front of a display panel.

Another aspect of the present disclosure is directed to provide a display apparatus including a sound generating device having a new structure for realizing a stereo sound.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other aspects of the inventive concepts as embodied and broadly described, a display apparatus comprises a display panel configured to display an image and including a first region, a second region, a third region, a fourth region, and a fifth region, at least one first sound generating device and at least one fourth sound generating device in a left region of a rear surface of the display panel and in the first region and the fourth region, at least one second sound generating device and at least one fifth sound generating device in a right region of the rear surface of the display panel and in the second region and the fifth region, and at least one third sound generating device in a center region of the rear surface of the display panel and in the third region, wherein the at least one first sound generating device, the at least one second sound generating device, and the at least one third sound generating device is configured to vibrate the display panel to generate sound, and the at least one fourth sound generating device and the at least one fifth sound generating device is configured to vibrate the display panel to generate sound in a direction upwards from the display panel.

In another aspect, a display apparatus comprises a display panel configured to display an image and including a first region, a second region, a third region, a fourth region, and a fifth region, at least one first sound generating device and at least one fourth sound generating device in a left region of a rear surface of the display panel and in the first region and the fourth region, at least one second sound generating device and at least one fifth sound generating device in a right region of the rear surface of the display panel and in the second region and the fifth region, at least one third sound generating device in a center region of the rear surface of the display panel and in the third region, and a first partition separating sounds of the at least one first sound generating device, the at least one second sound generating device, and the at least one third sound generating device from sounds of the at least one fourth sound generating device and the at least one fifth sound generating device.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings that may be included to provide a further understanding of the disclosure and are incorporated in and constitute a part of this application, illustrate embodiments of the disclosure and together with the description serve to explain various principles.

FIGS. 26A to 261 illustrate an embodiment of the sound generating device and a partition according to an embodiment of the present disclosure.

Figure 1A:
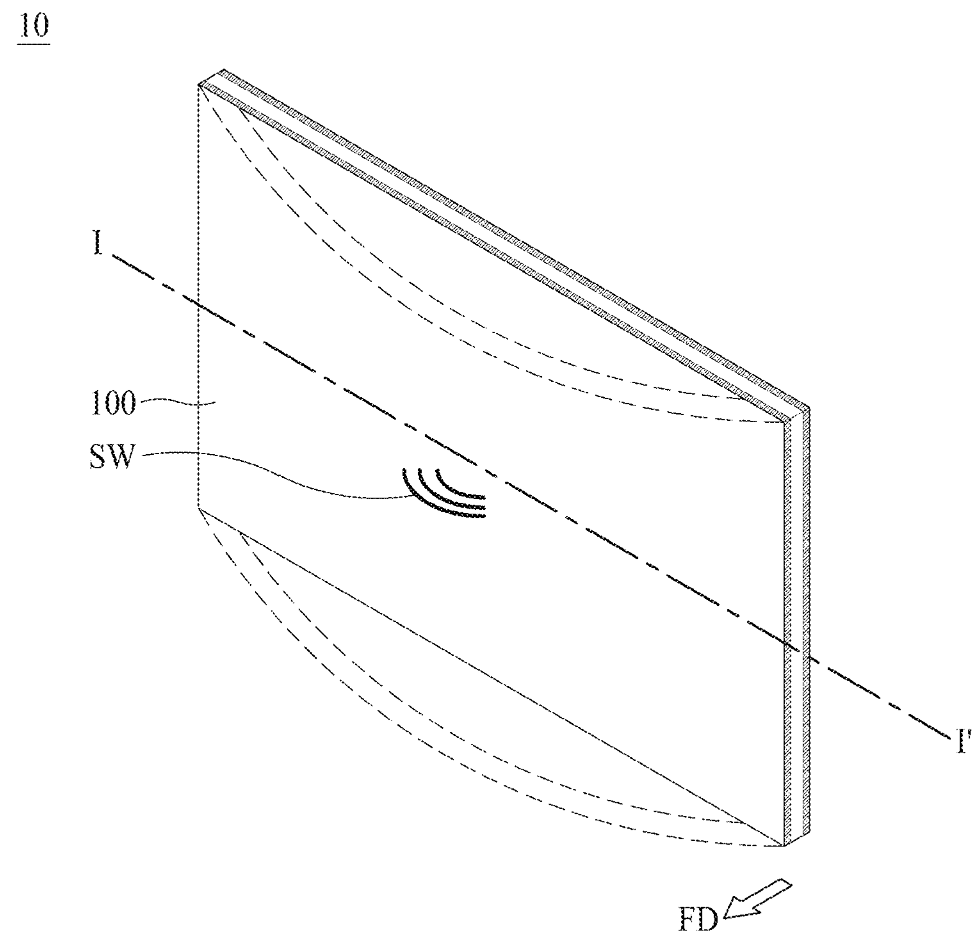
FIG. 1A illustrates a display apparatus including a sound generating device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range. In describing a position relationship, for example, when a position relation between two parts is described as, for example, "on," "over," "under," and "next," one or more other parts may be disposed between the two parts unless a more limiting term, such as "just" or "direct(ly)" is used. In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type of equipment display apparatus for vehicles, or a mobile electronic apparatus such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set apparatus that is a final consumer apparatus or an application product including the LCM or the OLED module.

In some embodiments, an LCM or an OLED module including a display panel and a driver may be referred to as a narrow-sense display apparatus, and an electronic apparatus that is a final product including an LCM or an OLED module may be referred to as a set apparatus. For example, the narrow-sense display apparatus may include a display panel, such as an LCD or an OLED, and a source printed circuit board (PCB), which is a controller for driving the display panel. The set apparatus may further include a set PCB, which is a set controller electrically connected to the source PCB to overall control the set apparatus.

A display panel applied to the present embodiment may use any type of display panel, such as a liquid crystal display panel, an organic light emitting diode (OLED) display panel, and an electroluminescent display panel, but is not limited to any particular display panel that may be vibrated by a sound generation device according to an embodiment of the present disclosure to output sound. Also, a shape or a size of a display panel applied to a display apparatus according to the present embodiment is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached to a rear surface of the display panel, but is not limited to the metal plate, and the display apparatus may include other structure.

Hereinafter, embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

FIG. 1A illustrates a display apparatus including a sound generating device according to an embodiment of the present disclosure. FIG. 1A illustrates a front surface of the display apparatus.

With reference to FIG. 1A, the display apparatus 10 may include a display panel 100 for displaying an image and a sound generating device 200. The sound generating device 200 may vibrate the display panel 100 to generate a sound SW in a forward direction (or a front-surface region) FD with respect to the display panel 100. The sound generating device 200 may be disposed on a rear surface of the display panel 100. The rear surface of the display panel 100 may be referred to as one surface, a first surface, a rear surface, or a bottom or lower surface, but the term is not limited thereto.

The display panel 100 may display an image (for example, an electronic image or a digital image) and may be implemented as any type of display panel such as a liquid crystal display panel, an organic light emitting diode (OLED) display panel, an electroluminescent display panel, etc. The display panel 100 may vibrate based on a vibration of the sound generating device 200 to output the sound SW in the forward direction FD with respect to the display panel 100. For example, the display panel 100 may vibrate based on a vibration of the sound generating device 200 to output the sound SW in the forward direction FD while displaying an image. Alternatively, the display panel 100 may vibrate based on a vibration of the sound generating device 200 to output the sound SW in the forward direction FD in a state without displaying an image. Therefore, the display panel 100 according to an embodiment of the present disclosure may display an image and may output the sound SW.

For example, according to an embodiment of the present disclosure, the display panel 100 may display an image according to a particular emission type, such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed. In the bottom emission type, the visible light emitted from the pixel array layer may be irradiated onto a rearward region behind the base substrate to allow an image to be displayed.

The sound generating device 200 may generate sound using the display panel 100 as a vibration plate. The sound generating device 200 may be referred to as an "actuator," an "exciter," or a "transducer," but is not limited thereto. For example, the sound generating device 200 may be a sound device for outputting sound according to an electrical signal.

Figure 1B:
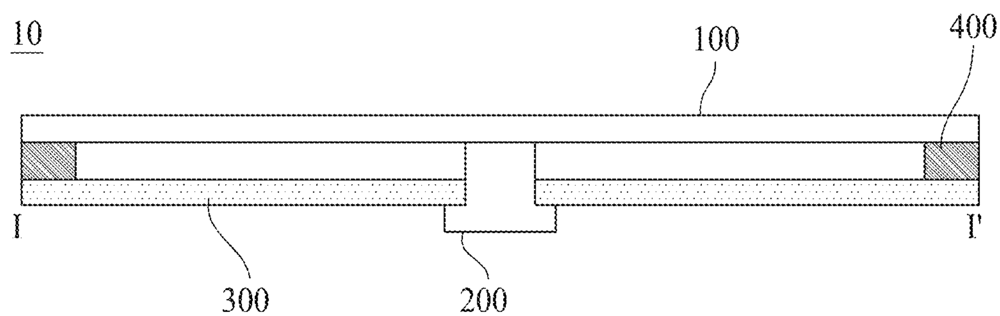
FIG. 1B is a cross-sectional view taken along line I-I' of FIG. 1A.

FIG. 1B is a cross-sectional view taken along line I-I' of FIG. 1A.

With reference to FIG. 1B, the display apparatus 10 may include the sound generating device 200 and a supporting member 300.

The supporting member 300 may support one or more of a rear surface and a side surface (or a lateral surface) of the display panel 100. Also, the sound generating device 200 may be fixed to the supporting member 300.

The supporting member 300 may be, for example, a cover bottom. For example, the supporting member 300 may include a middle cabinet, which may be coupled or connected to a cover bottom to surround the side surface (or a lateral surface) of the display panel 100 and accommodate one edge or periphery of the display panel 100 to support the display panel 100. For example, the middle cabinet may include "⊣"-shaped cross-sectional surface. The supporting member 300 may include the cover bottom, or may include the cover bottom and the middle cabinet, but a structure thereof is not limited thereto. The supporting member 300 may include an arbitrary structure that supports the rear surface and/or the side surface of the display panel 100.

The supporting member 300 may be a plate member that may be provided on the rear surface of the display panel 100 or over (e.g., over an entirety of) the display panel 100. For example, the supporting member 300 may cover the display panel 100. Also, the supporting member 300 may have a plate shape formed of a glass material, a metal material, or a plastic material. For example, an edge or a sharp corner of the supporting member 300 may have a tetragonal (e.g., quadrilateral) shape or a curved shape through a chamfer process or a corner rounding process. For example, the supporting member 300 of the glass material may include sapphire glass. For example, the supporting member 300 including the metal material may be formed of one or more of aluminum (Al), an Al alloy, a magnesium (Mg) alloy, and an iron (Fe)-nickel (Ni) alloy. As another example, the supporting member 300 may have a stacked structure including a metal plate and a glass plate, the metal plate may have a thickness relatively thinner than the glass plate, and the glass plate may face the rear surface of the display panel 100. A rear surface of the display apparatus 10 may be used as a mirror surface due to the metal plate. However, embodiments are not limited to the above materials or shape.

And, the supporting member 300 may include a hole into which the sound generating device 200 may be inserted or accommodated. For example, the hole may be bored in a certain partial region of the supporting member 300 along a thickness direction of the supporting member 300 to have a circular shape or a polygonal shape, for the sound generating device 200 to be inserted or accommodated into the hole.

In the present disclosure, the supporting member 300 may be referred to as a "cover bottom," a "plate bottom," a "back cover," a "base frame," a "metal frame," a "metal chassis," a "chassis base," or an "m-chassis." The supporting member 300 may be a supporter for supporting the display panel 100 and may be implemented as any type of frame or plate structure disposed on the rear surface of the display apparatus 10.

An adhesive member 400 may be in an edge or periphery of the display panel 100 and the supporting member 300. For example, the adhesive member 400 may be disposed between the rear surface of the display panel 100 and a front surface of the supporting member 300. The adhesive member 400 may attach the display panel 100 and the supporting member 300. The adhesive member 400 may include a double-sided tape, a single-sided tape, an adhesive, a bond, and/or the like, but is not limited thereto.

Figure 2A:
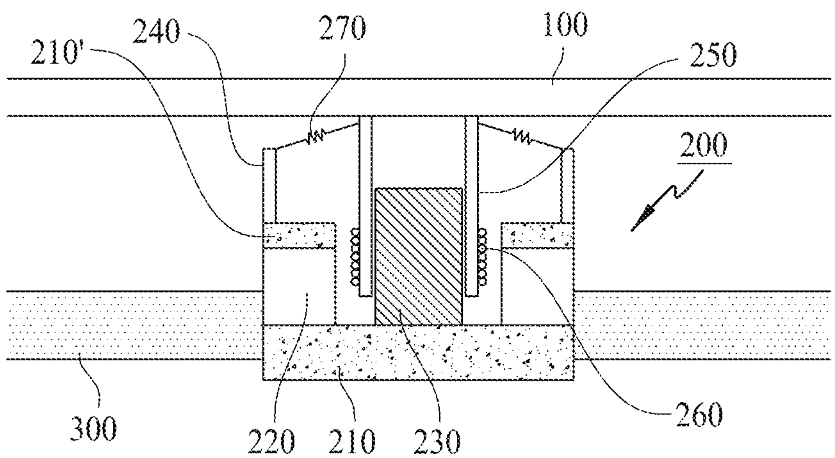
FIGS. 2A and 2B are cross-sectional views illustrating the sound generating device according to an embodiment of the present disclosure.
Figure 2B:
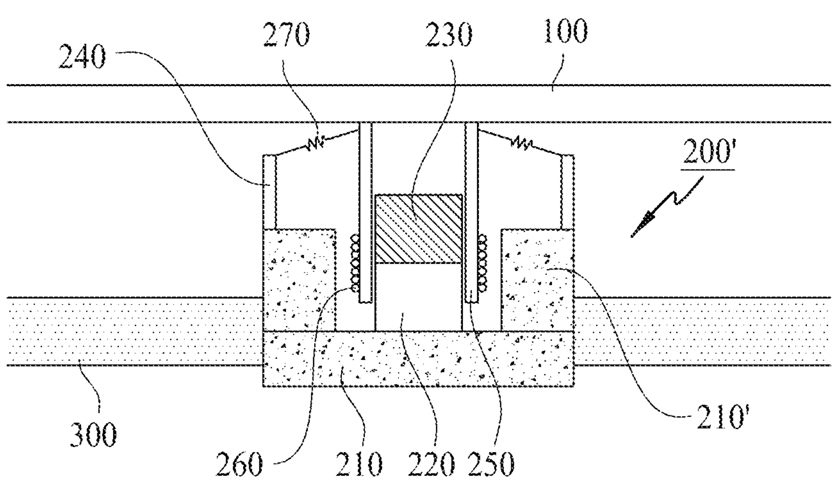

FIGS. 2A and 2B are cross-sectional views illustrating the sound generating device according to an embodiment of the present disclosure.

The sound generating device may be categorized into a first structure corresponding to an external magnetic type where a magnet may be outside a coil, and a second structure corresponding to an internal magnetic type where a magnet may be inside a coil. The first structure may be referred to as a dynamic type or external magnetic type, and the second structure may be referred to as a micro type or internal magnetic type.

FIG. 2A illustrates the first structure, and FIG. 2B illustrates the second structure.

With reference to FIG. 2A, the sound generating device 200 may include plates 210 and 210', a magnet 220 on the plate 210, a center pole 230 on the plate 210, a bobbin 250 disposed around the center pole 230, and a coil 260 wound on an outer surface of the bobbin 250.

For example, the magnet 220 may be disposed on the first plate 210, and the second plate 210' may be disposed on the magnet 220. The first plate 210 and the second plate 210' may support the magnet 220 and fix the sound generating device 200 to the supporting member 300. Accordingly, the first plate 210 may be fixed to a supporting hole in the supporting member 300, and the magnet 220 may be fixedly supported between the first plate 210 and the second plate 210'.

At least one of the first plate 210 and the second plate 210' may be formed of a magnetic material such as iron (Fe). The first plate 210 and the second plate 210' are not limited to these terms, and they may be referred to as yokes.

The magnet 220 may use a sintered magnet of barium ferrite, and the magnet 220 may be formed of iron (III) oxide ($Fe_2O3$), barium carbonate ($BaCO_3$; "witherite"), neodymium (Nd) magnet, strontium ferrite ($Fe_{12}O_{19}Sr$) with improved magnetic component, an alloy cast magnet including aluminum (Al), nickel (Ni), and cobalt (Co), and/or the like. As another example, the neodymium magnet may be neodymium-iron-boron (Nd—Fe—B). However, embodiments are not limited to these materials or examples.

A frame 240 may be disposed on the second plate 210' along the periphery of the first plate 210. A center pole 230 may be disposed on a center area of the first plate 210. The center pole 230 and the first plate 210 may be formed as one body or a single structure body. The center pole 230 may be referred to as pole pieces. As another example, pole pieces may be further on the center pole 230.

A bobbin 250 may surround a periphery of a center pole 230. A coil 260 may be wound around a certain lower region (for example, a lower region of the bobbin 250) of the bobbin 250. For example, the coil 260 may be wound around a lower outer surface of the bobbin 250, and a current or a voice signal for generating a sound may be applied to the coil 260.

The bobbin 250 may be implemented as a ring (or cylindrical) structure including a material obtained by processing pulp or paper, aluminum or magnesium or an alloy thereof, synthetic resin such as polypropylene, or a polyamide-based fiber, but is not limited thereto. The bobbin 250 and the coil 260 may be referred to as a voice coil.

And, the damper 270 may be disposed or connected between some area of an upper portion of the bobbin 250 and the frame 240. The damper 270 may be referred to as an edge, a spider, a suspension, and/or the like, but the term is not limited thereto.

FIG. 2B illustrates the second structure where a magnet may be disposed inside a coil.

With reference to FIG. 2B, the sound generating device 200' of the second structure includes a magnet 220 on a first plate 210, a center pole 230 on the magnet 220, a bobbin 250 disposed around the magnet 220 and the center pole 230, and a coil 260 wound on an outer surface of the bobbin 250.

For example, the first plate 210 may be fixed to a supporting hole in the supporting member 300. The magnet 220 may be disposed on the first plate 210, and the center pole 230 may be disposed on the magnet 220. The center pole 230 may be referred to as pole pieces. As an example, pole pieces may be further provided on the center pole 230.

The bobbin 250 may surround the magnet 220 and the center pole 230, and the coil 260 may be wound around the outer surface of the bobbin 250.

A second plate 210' may be disposed at the outer periphery of the first plate 210, and a frame 240 may be disposed at the periphery of the second plate 210'. For example, a damper 270 may be disposed between the frame 240 and the bobbin 250.

In comparison to the first structure where the magnet may be disposed outside the coil, the second structure has advantages of small in leakage magnetic flux and may reduce an entire size of the sound generating device.

The sound generating device applied to the display apparatus according to an embodiment of the present disclosure is not limited to the structures of FIGS. 2A and 2B. It may be possible to apply another kind of sound generating device, which may directly vibrate a display panel to generate sound.

Figure 3A:
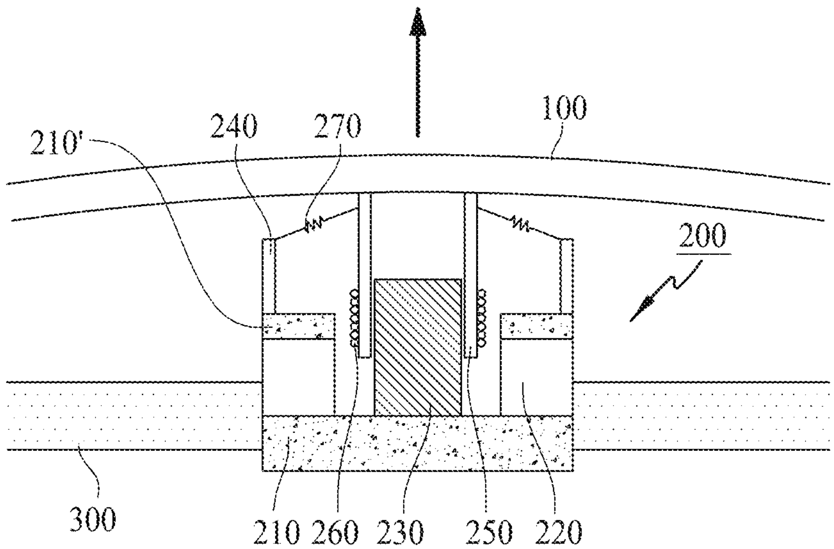
FIGS. 3A and 3B illustrate a sound generating method of the sound generating device with a first structure according to an embodiment of the present disclosure.
Figure 3B:
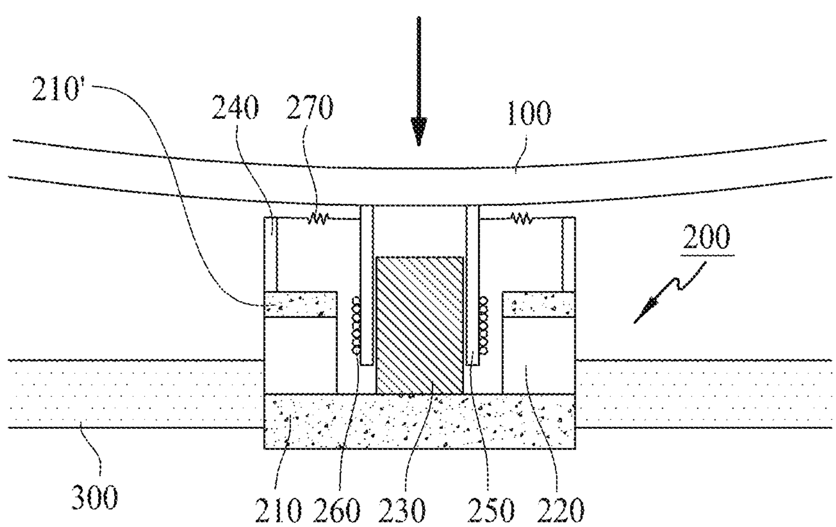

FIGS. 3A and 3B illustrate a sound generating method of the sound generating device with the first structure according to an embodiment of the present disclosure.

FIG. 3A show a state in which a current may be applied. The center pole 230 connected with a lower surface of the magnet 220 may be a north (N)-pole, and the second plate 210' connected with an upper surface of the magnet 220 may be a south (S)-pole, whereby an external magnetic field is generated around the coil 260. In this state, when a current for generating sound is applied to the coil 260, an application magnetic field may be generated around the coil 260, whereby a force for moving the bobbin 250 to an upper portion may be generated by the application magnetic field and an external magnetic field. For example, when a current is applied to the coil 260, an application magnetic field is generated around the coil 260. Thus, the entire bobbin 250 may be guided by the center pole 230, and may move to upper portion according to Fleming's Left-Hand Rule for Motors based on the application magnetic field and the external magnetic field generated by the magnet 220.

Accordingly, one surface of the bobbin 250 may be contact a rear surface of the display panel 100. Thus, the bobbin 250 may vibrate the display panel 100 in an upward direction (illustrated by an arrow) according to whether a current is applied to the coil 260 or not, and a sound wave (or sound) may be generated by the vibration of the display panel 100. In this state, when the application of the current stops or a reverse current is applied, as illustrated in FIG. 3B, a force for moving the bobbin 250 to a lower side may be generated based on the principle similar to description given above with reference to FIG. 3A, and the display panel 100 may vibrate in a downward direction (illustrated by an arrow).

The damper 270 is disposed between the frame 240 and a portion of an upper portion of the bobbin 250. The damper 270 may be provided in a wrinkled or creased structure having elasticity and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270.

Accordingly, the display panel 100 may vertically vibrate based on an application direction and level of a current applied to the coil 260, to thereby generate the sound wave by the vibration.

Figure 4A:
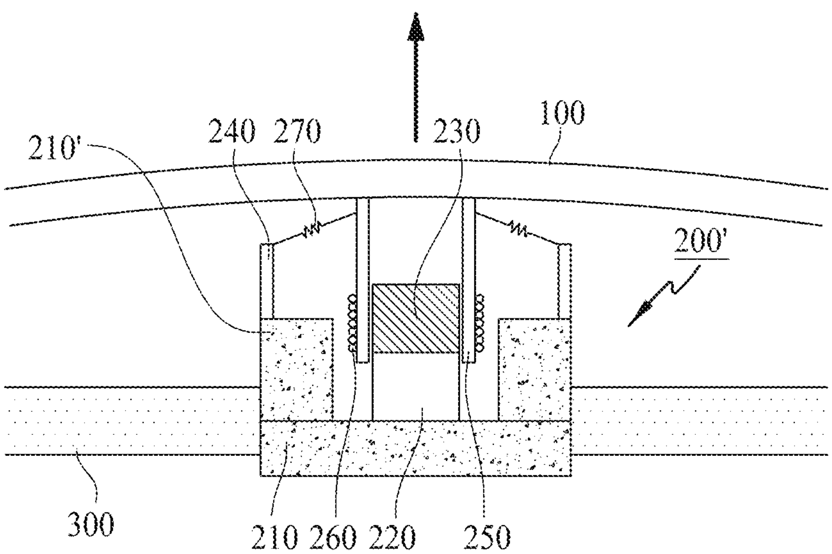
FIGS. 4A and 4B illustrate a sound generating method of the sound generating device with a second structure according to an embodiment of the present disclosure.
Figure 4B:
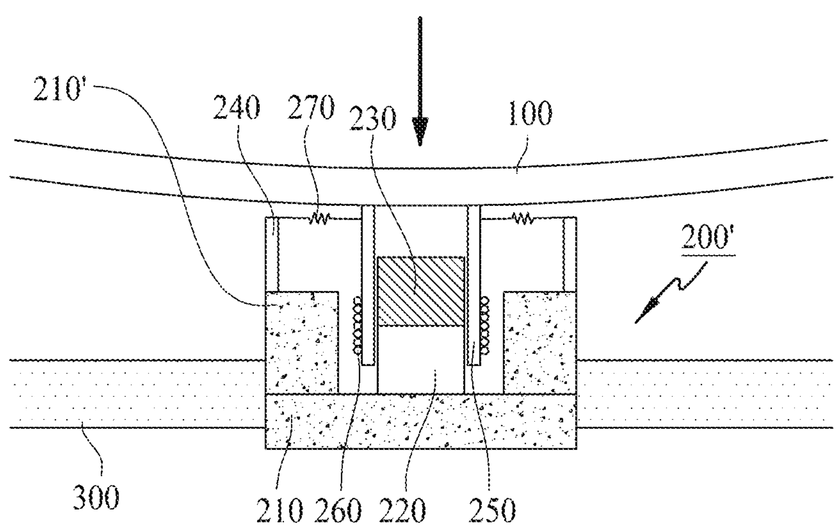

FIGS. 4A and 4B illustrate a sound generating method of the sound generating device with the second structure according to an embodiment of the present disclosure.

FIG. 4A illustrates a state in which a current may be applied. The second plate 210' may be an S pole, and the center pole 230 connected to an upper surface of the magnet 220 may be an N pole, whereby an external magnetic field may be generated around the coil 260. The S-pole and the N-pole may switch therebetween, and if the S-pole and the N-pole switches therebetween, the sound generating device may identically operate by correcting a winding direction of the coil 260. In this state, when a current for generating sound is applied to the coil 260, an application magnetic field may be generated around the coil 260, and a force for moving the bobbin 250 to an upper side may be generated by the application magnetic field and an external magnetic field. For example, when a current is applied to the coil 260, an application magnetic field may be generated around the coil 260. Thus, the entire bobbin 250 may be guided by the center pole 230 and may move to the upper side according to Fleming's Left-Hand Rule for Motors based on the application magnetic field and the external magnetic field generated by the magnet 220.

Accordingly, one surface of the bobbin 250 may contact a rear surface of the display panel 100. Thus, the bobbin 250 may vibrate the display panel 100 in an upward direction (illustrates by an arrow) according to whether a current is applied to the coil 260 or not, and a sound wave (or sound) may be generated by the vibration of the display panel 100. In this state, when the application of the current stops or a reverse current is applied, as illustrated in FIG. 4B, a force for moving the bobbin 250 to a lower side may be generated according to the principle similar to description given above with reference to FIG. 4A, and the display panel 100 may vibrate in a downward direction (illustrated by an arrow).

The damper 270 may be disposed between the frame 240 and a partial portion of an upper portion of the bobbin 250. The damper 270 may be provided in a wrinkled or creased structure having elasticity and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270.

Accordingly, the display panel 100 may vertically vibrate based on an application direction and level of a current applied to the coil 260, to thereby generate the sound wave by the vibration.

Figure 5:
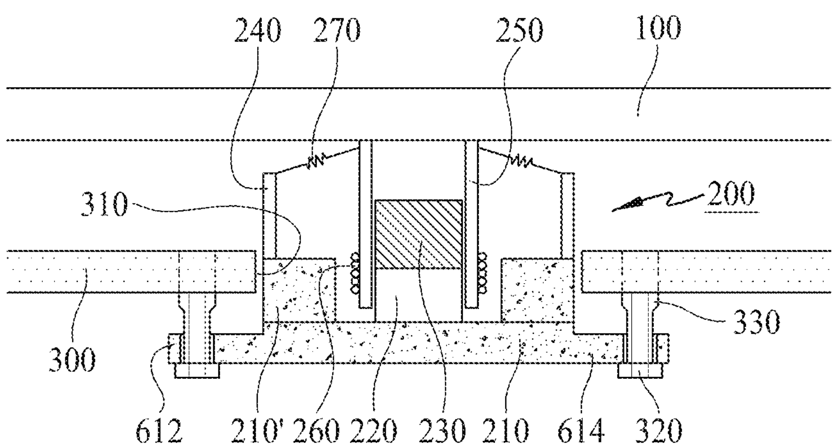
FIG. 5 illustrates a display apparatus including a sound generating device according to an embodiment of the present disclosure.

FIG. 5 illustrates a display apparatus including a sound generating device according to an embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 5, a sound generating device 200 may include a diameter enlargement part 614. The diameter enlargement part 614 may be provided as one body or a single structure body with a first plate 210 of the sound generating device 200. A first plate 210 of the sound generating device 200 may not have a cylindrical shape or a cylinder shape. One side of the first plate 210 may include a protrusion that may be greater than a diameter of the other portion of the first plate 210. The protrusion region having an enlarged diameter may be referred to as a diameter enlargement part 614. The diameter enlargement part 614 may have a ring shape. Also, an extension part 612 for fixing the sound generating device 200 may be in a portion of the diameter enlargement part 614.

A screw 320 and a nut 330 may be in the extension part 612. The sound generating device 200 may be coupled or connected to a supporting member 300 by the screw 320 using the nut 330 fixed to the supporting member 300. The nut 330 may be, for example, a self-clinching nut. An example of the self-clinching nut may include a PEM® nut, and the present embodiment is not limited thereto. Therefore, the sound generating device 200 may be accommodated into a supporting hole 310 in the supporting member 300.

If the self-clinching nut is used, a portion of a vibration generated by the sound generating device 200 may be absorbed by the self-clinching nut, which may be the nut 330. Thus, a vibration transferred to the supporting member 300 may be reduced. And, the display panel 100 may be attached or coupled on the bobbin 250 of the sound generating device 200.

As described with reference to FIG. 5, a sound generating device may be coupled or connected to a display panel through a supporting hole of a supporting member. Therefore, a rear surface of the supporting member may need the supporting hole, and there may be a problem where external particles may penetrate into the inside of the display panel through the supporting hole. Also, because the sound generating device may be exposed at the rear surface of the supporting member, a sense of beauty in appearance may be reduced by the sound generating device exposed at the rear surface of the supporting member. Also, since a protection cover for protecting the sound generating device may be needed for preventing damage of the sound generating device exposed at the rear surface of the supporting member, there may be a problem in which a process of adding the protection cover may be needed or a thickness of the sound generating device may be thickened due to the protection cover. Therefore, the present inventors have performed various experiments for configuring the sound generating device, which may be provided in the display panel without being coupled or connected to the supporting member by the supporting hole of the supporting member. Through the various experiments, the present inventors have recognized that a thickness of the sound generating device should be reduced for configuring the sound generating device in the display panel. When the sound generating device is thick, the present inventors have recognized that there may be a problem in which a thickness of the display panel may be thickened, the image quality of the display panel or an image displayed by the display panel may be adversely affected, and a sense of beauty in appearance is reduced. Also, since a plurality of sound generating devices should be provided for realizing a stereo sound, the present inventors have recognized that a thickness of the sound generating device should be reduced. Therefore, to reduce a thickness of the sound generating device, it may be required to reduce a thickness of element included in the sound generating device. For example, when a thickness of a magnet is reduced, a magnetic flux density may decrease, causing a problem in which a sound pressure may be lowered. Also, when a height (or a thickness) of a bobbin is lowered, a winding width of a coil wound around the bobbin may be reduced. Thus, a magnetic force of the sound generating device may be weakened, causing a problem in which an articulation of a tone may be reduced or a sound pressure may be lowered. Also, a line through which an electrical signal may be transferred to the coil may cause a problem in which an interference sound may occur in the sound generating device due to interference by a damper. Therefore, through various experiments, the present inventors have invented a sound generating device having a new structure, in which a thickness of the sound generating device may be reduced by widening an area of the sound generating device, and a sound is not affected. This will be described below with reference to FIGS. 6 to 12.

Figure 6:
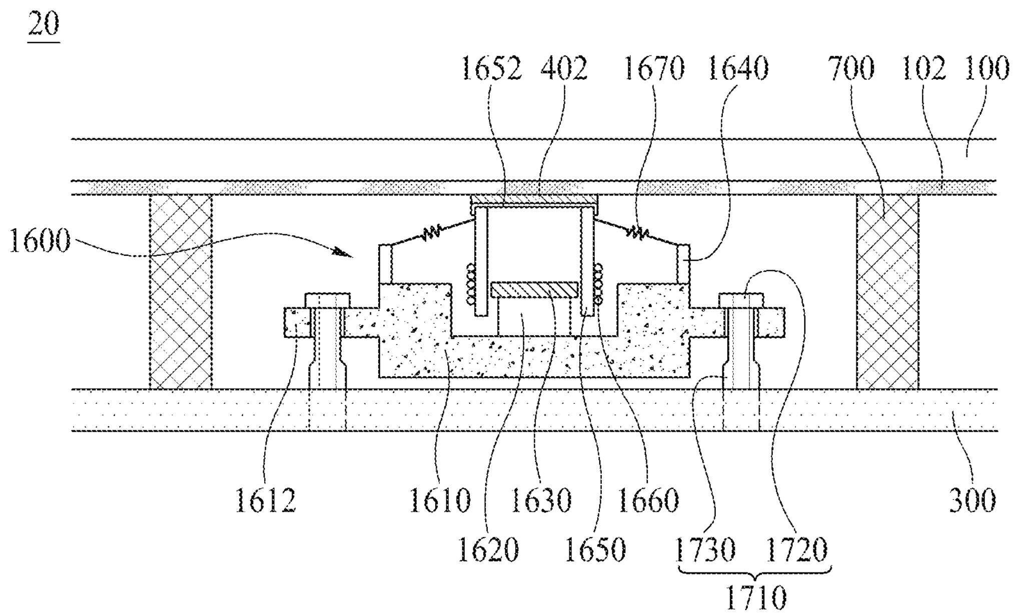
FIG. 6 illustrates a display apparatus including a sound generating device according to another embodiment of the present disclosure.

FIG. 6 illustrates a display apparatus including a sound generating device according to another embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 6, a display apparatus 20 according to an embodiment of the present disclosure may include a display panel 100 and a sound generating device 1600. An encapsulation substrate 102 may be disposed on a rear surface of the display panel 100. For example, the encapsulation substrate 102 may protect a thin film transistor (TFT), a light emitting device layer, and the like disposed in the display panel 100 from an external impact and may prevent water or moisture, or oxygen from penetrating into the light emitting device layer. The encapsulation substrate may be referred to as a sealing substrate or protection substrate.

The sound generating device 1600 may include a magnet 1620 on a yoke 1610, a center pole 1630 on the magnet 1620, a bobbin 1650 around the magnet 1620 and the center pole 1630, and a coil 1660 wound around an outer portion of the bobbin 1650. When the coil 1660 is wound to surround an outer circumference surface of the bobbin 1650, heat occurring in the coil 1660 may be transferred to the bobbin 1650, and the coil 1660 may include a material which is relatively good in heat dissipation characteristic, for decreasing an image quality defect affecting the display panel 100 due to the heat of the bobbin 1650. Since the bobbin 1650 vibrates upward and downward, an eccentric vibration (or a horizontal vibration) may occur due to a vertical vibration, and the eccentric vibration of the bobbin 1650 may be affected by a weight of the bobbin 1650. A weight of the bobbin 1650 may be affected by a weight of the coil 1660. Therefore, when a weight of the coil 1660 is reduced, the eccentric vibration of the bobbin 1650 may decrease. Thus, considering heat transferred to the bobbin 1650 and the eccentric vibration of the bobbin 1650, the coil 1660 may have a relatively good heat dissipation characteristic because thermal conductivity thereof is better than that of copper which is a material of a general coil, and may include an Al material which has a relatively good heat dissipation characteristic and is relatively lightweight compared to copper. The yoke 1610 may be a plate, but the term is not limited thereto.

Moreover, in aluminum, since oxide is formed in air, welding may not be easy in manufacturing the sound generating device 1600, and thus, the coil 1660 according to an embodiment of the present disclosure may include an Al layer (or a first metal layer) for dissipating heat and a metal covering layer (or a second metal layer) surrounding the Al layer. The metal covering layer may include one of Cu, Ag, and Au. For example, the coil 1660 may be a copper clad aluminum wire is covered by copper. The metal covering layer may be formed as a thin film type outside the first metal layer, and thus, may not greatly affect an increase in weight of the coil 1660. Therefore, a weight of the coil 1660 according to an embodiment of the present disclosure may decrease by about 60% compared to a coil including only Cu or a Cu wire.

The bobbin 1650 may include a structure including a material obtained by processing pulp or paper, Al or Mg or an alloy thereof, or synthetic resin such as polyimide. For example, the bobbin 1650 may be implemented with a polyimide film which is relatively good in heat dissipation characteristic and is relatively lightweight, for preventing an image quality defect of the display panel 100 caused by heat occurring in the coil 1660. The polyimide film may have physical properties which are not changed within a wide temperature range from −273° C. to 400° C. and may have a heat resistance, electrical insulation, flexibility, and non-flammable. Also, since the polyimide film is good in thermal and mechanical strength, the polyimide film may enhance the reliability of the bobbin 1650, and the occurrence of heat caused by a vibration of the bobbin 1650 may be reduced based on an excellent heat dissipation characteristic. For example, the polyimide film may be KAPTON and may be a condensation of pyromellitec dianhydride and 4,4'-oxydianiline, but is not limited thereto.

A frame 1640 may be disposed at an outer portion of the yoke 1610. A damper 1670 may be disposed between the frame 1640 and the bobbin 1650. A description of the sound generating device 1600 is the same as the description of FIGS. 2A and 2B, and thus, a detailed description is omitted.

The display panel 100 may be attached or connected on the bobbin 1650 of the sound generating device 1600 by using an adhesive member 402. For example, a bobbin ring 1652 may be further provided on the bobbin 1650. The bobbin ring 1652 may be interposed between the bobbin 1650 and the display panel 100 and may transfer a vibration of the bobbin 1650 to the display panel 100. In FIG. 6, an example where the bobbin ring 1652 is disposed at a whole portion of the bobbin 1650 will be described. However, the present embodiment is not limited thereto, and the bobbin ring 1652 may be disposed at a position at which the bobbin 1650 is disposed. The bobbin ring 1652 may be attached or connected on the display panel 100 by the adhesive member 402. The adhesive member 402 may include a double-sided tape, a single-sided tape, an adhesive, and a bond, but is not limited thereto. As in FIG. 6, the adhesive member 402 may be provided at a portion, on which the sound generating device 1600 is attached or connected, of the display panel 100. However, the present embodiment is not limited thereto, and the adhesive member 402 may be provided on the whole rear surface of the display panel 100. For example, the adhesive member 402 may be provided on a whole surface between the rear surface of the display panel 100 and the sound generating device 1600. Also, a partition 700 may be disposed between the display panel 100 and the supporting member 300. For example, the partition 700 may be disposed between the encapsulation substrate 102 of the display panel 100 and the supporting member 300.

A connection or coupling member 1710 may be disposed at the sound generating device 1600 so that the sound generating device 1600 is disposed in the display panel 100. The yoke 1610 may include an extension portion 1612. The connection member 1710 may be disposed at the extension portion 1612 of the yoke 1610. For example, a screw tap may be formed by enlarging a thickness of the yoke 1610, and then, may be screw-fastened. The screw tap may be formed as a passive tap, a mechanical tap, a gas screw tap, or a master tap, but is not limited thereto. For example, the connection member 1710 may be disposed in the supporting member 300. The connection member 1710 may include a screw 1720 and a nut 1730. The screw 1720 and the nut 1730 may be disposed in the supporting member 300, and the sound generating device 1600 may be fixed to an inner portion of the supporting member 300 by the screw 1720 and the nut 1730. For example, the nut 1730 may be a self-clinching nut. An example of the self-clinching nut may include PEM® nut, but embodiments are not limited thereto.

For example, the sound generating device 1600 may be coupled or connected to the supporting member 300 by the nut 1730 using a press-fitting manner without a supporting hole of the supporting member 300. The press-fitting manner may use a saw-toothed press-fitting manner, and embodiments are not limited to a coupling manner or a coupling shape. Therefore, the sound generating device 1600 may be disposed in the display panel 100. For example, the sound generating device 1600 may be disposed or coupled between the display panel 100 and the supporting member 300 by the connection member 1710. Therefore, a sound generating device may be disposed or coupled in a display panel, and thus, a supporting hole of a supporting member may not be provided, thereby preventing penetration of external particles through the supporting hole of the supporting member. Also, since the sound generating device is not exposed at a rear surface of the supporting member, a display apparatus having an aesthetic appearance may be provided, and damage of the sound generating device may be prevented.

Figure 7:
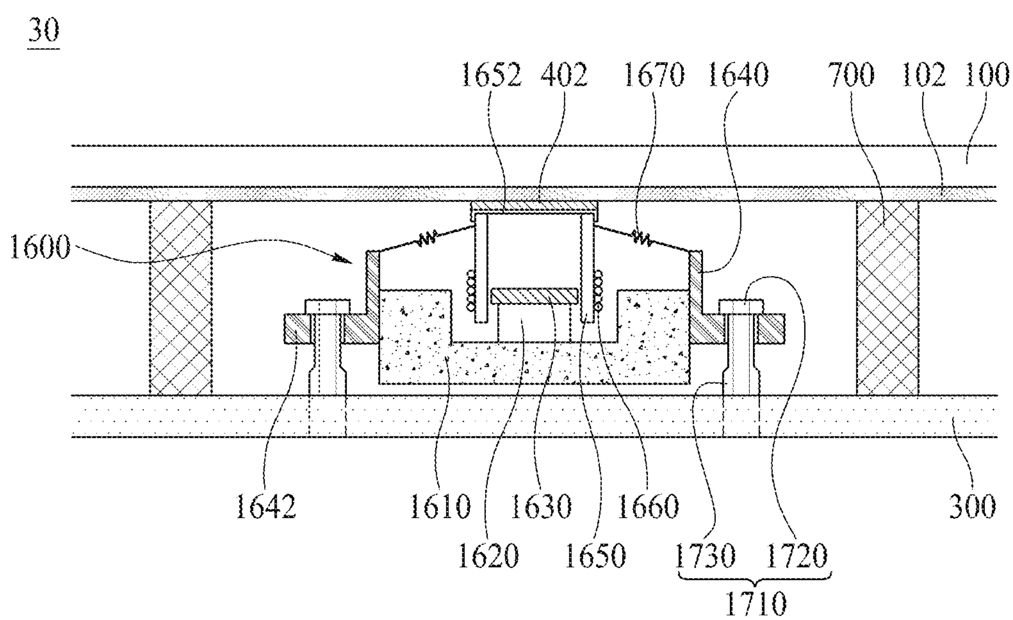
FIG. 7 illustrates a display apparatus including a sound generating device according to another embodiment of the present disclosure.

FIG. 7 illustrates a display apparatus including a sound generating device according to another embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 7, the display apparatus 30 according to an embodiment of the present disclosure may include a display panel 100 and a sound generating device 1600. An encapsulation substrate 102 may be disposed on a rear surface of the display panel 100. For example, the encapsulation substrate 102 may protect a thin film transistor (TFT), a light emitting device layer, and the like each disposed in the display panel 100 from an external impact and may prevent water or moisture, or oxygen from penetrating into the light emitting device layer. The encapsulation substrate may be referred to as a sealing substrate or protection substrate.

The sound generating device 1600 may include a magnet 1620 on a yoke 1610, a center pole 1630 on the magnet 1620, a bobbin 1650 around the magnet 1620 and the center pole 1630, and a coil 1660 wound around an outer portion of the bobbin 1650. The yoke 1610 may be a plate, but the term is not limited thereto. A frame 1640 may be disposed outside the yoke 1610. A damper 1670 may be disposed between the frame 1640 and the bobbin 1650. A description of the sound generating device 1600 may be the substantially similar to the description given above with reference to FIGS. 2A and 2B, and thus, a detailed description may be omitted.

The display panel 100 may be attached or connected to the bobbin 1650 of the sound generating device 1600 by an adhesive member 402. For example, a bobbin ring 1652 may be further provided on the bobbin 1650. The bobbin ring 1652 may be between the bobbin 1650 and the display panel 100 and may transfer a vibration of the bobbin 1650 to the display panel 100. In FIG. 7, an example where the bobbin ring 1652 is disposed all over the bobbin 1650 will be described. However, embodiments are not limited thereto, and the bobbin ring 1652 may be disposed at a position at which the bobbin 1650 is disposed. The bobbin ring 1652 may be attached or connected to the display panel 100 by the adhesive member 402. The adhesive member 402 may include a double-sided tape, a single-sided tape, an adhesive, and a bond, but embodiments are not limited thereto. As in FIG. 7, the adhesive member 402 may be provided at a portion, on which the sound generating device 1600 is attached or connected, of the display panel 100. However, embodiments are not limited thereto. For example, the adhesive member 402 may be provided on the whole rear surface of the display panel 100. For example, the adhesive member 402 may be provided on a whole surface between the rear surface of the display panel 100 and the sound generating device 1600. Also, a partition 700 may be disposed between the display panel 100 and the supporting member 300. For example, the partition 700 may be disposed between the encapsulation substrate 102 of the display panel 100 and the supporting member 300.

A connection or coupling member 1710 may be disposed at a sound generating device 1600 for the sound generating device 1600 to be placed or disposed in a display panel 100. A frame 1640 may include an extension portion 1642. The connection member 1710 may be disposed at the extension portion 1642 of the frame 1640. The connection member 1710 may include a screw 1720 and a nut 1730. The screw 1720 and the nut 1730 may be disposed in the supporting member 300, and the sound generating device 1600 may be fixed to an inner portion of the supporting member 300 or in the supporting member 300 by the screw 1720 and the nut 1730. For example, the nut 1730 may be a self-clinching nut. An example of the self-clinching nut may include PEM® nut, but embodiments are not limited thereto.

For example, the sound generating device 1600 may be coupled or connected to the supporting member 300 by the nut 1730 by a press-fitting manner without a supporting hole of the supporting member 300. The press-fitting manner may use a saw-toothed press-fitting manner, and embodiments are not limited to a coupling or connection manner or a coupling or connection shape. Therefore, the sound generating device 1600 may be disposed in the display panel 100. For example, the sound generating device 1600 may be disposed or coupled between the display panel 100 and the supporting member 300 by the connection member 1710. Therefore, a sound generating device may be disposed or coupled in a display panel, and thus, a supporting hole of a supporting member may not be provided, thereby preventing penetration of external particles through the supporting hole of the supporting member. Also, since the sound generating device is not exposed at a rear surface of the supporting member, a display apparatus having an aesthetic appearance may be provided, and damage of the sound generating device may be prevented.

The encapsulation substrate 102 disposed on the rear surface of the display panel 100 may be formed of a ferromagnetic material (for example, a material such as invar which is an iron-nickel (Fe—Ni) alloy, and thus, the present inventors have recognized that a magnetic force of a magnet of the sound generating device provided in the display panel 100 is absorbed by the encapsulation substrate, and due to this, is lost. The present inventors have recognized that the encapsulation substrate is attracted by the magnetic force of the magnet, and thus, the sound generating device is pressed, whereby the sound generating device is unable to vibrate vertically. Also, the present inventors have recognized that the encapsulation substrate is attracted by the magnetic force of the magnet and is adhered to the sound generating device, and due to this, a space enabling the sound generating device to vibrate is lost. Therefore, through various experiments, the present inventors have invented a display apparatus where the leakage of a magnetic force of a sound generating device is reduced, and a space enabling the sound generating device to vibrate is not reduced. This will be described below with reference to FIGS. 8 to 12.

Figure 8:
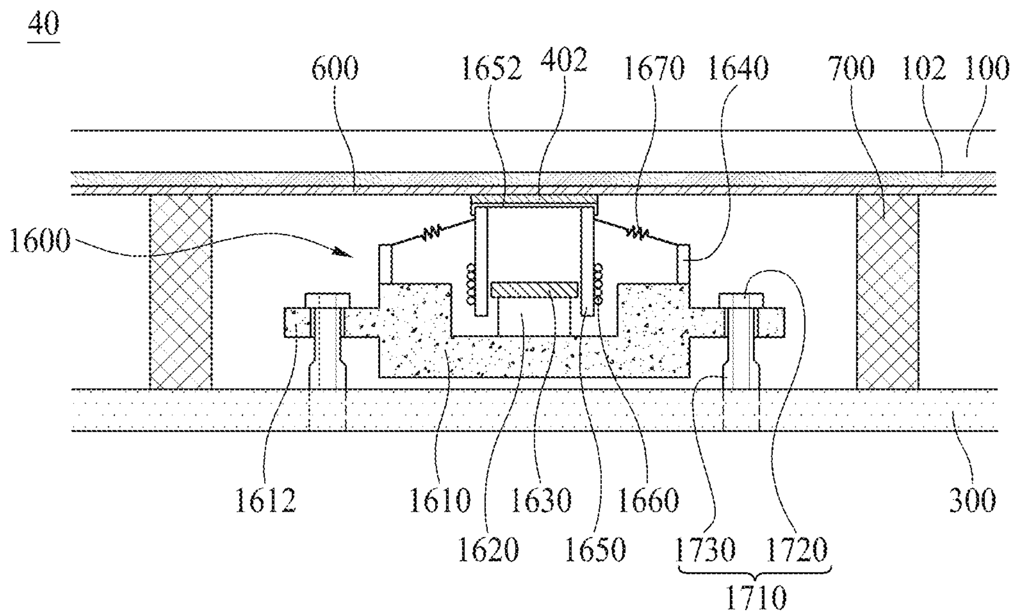
FIG. 8 illustrates a display apparatus including a sound generating device according to another embodiment of the present disclosure.

FIG. 8 illustrates a display apparatus including a sound generating device according to another embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 8, the display apparatus 40 according to another embodiment of the present disclosure may include a display panel 100 and a sound generating device 1600. The sound generating device 1600 may be disposed between the display panel 100 and a supporting member 300. The sound generating device 1600 may be disposed in the display panel 100. A description of the sound generating device 1600 may be substantially similar to descriptions given above with reference to FIGS. 2A, 2B, 6, and 7, and thus, is omitted.

The sound generating device 1600 may include a magnet 1620 on a yoke 1610, a center pole 1630 on the magnet 1620, a bobbin 1650 around the magnet 1620 and the center pole 1630, and a coil 1660 wound around an outer portion of the bobbin 1650. The yoke 1610 may be a plate, but the term is not limited thereto. A frame 1640 may be disposed at an outside portion of the yoke 1610. A damper 1670 may be disposed between the frame 1640 and the bobbin 1650. A bobbin ring 1652 may be further provided on the bobbin 1650. In FIG. 8, an example where the bobbin ring 1652 is disposed all over the bobbin 1650 will be described. However, embodiments are not limited thereto, for example, the bobbin ring 1652 may be disposed at a position at which the bobbin 1650 is disposed.

A connection or coupling member 1710 may be disposed at the sound generating device 1600 so that the sound generating device 1600 is disposed in the display panel 100. The yoke 1610 may include an extension portion 1612. The connection member 1710 may be disposed at the extension portion 1612 of the yoke 1610. For example, a screw tap may be formed by enlarging a thickness of the yoke 1610, and then, may be screw-fastened. The screw tap may be formed as a passive tap, a mechanical tap, a gas screw tap, or a master tap, but embodiments are not limited thereto. For example, the connection member 1710 may be disposed in the supporting member 300. The connection member 1710 may include a screw 1720 and a nut 1730. The screw 1720 and the nut 1730 may be disposed in the supporting member 300, and the sound generating device 1600 may be fixed to an inner portion of the supporting member 300 by the screw 1720 and the nut 1730. For example, the nut 1730 may be a self-clinching nut. An example of the self-clinching nut may include PEM® nut, but embodiments are not limited thereto.

A heat dissipation member 600 may be further disposed on a rear surface of the display panel 100, for decreasing heat occurring when the sound generating device 1600 is vibrating. For example, the heat dissipation member 600 may be disposed on a rear surface of an encapsulation substrate 102 using an adhesive member. The heat dissipation member 600 may be configured to cover the sound generating device 1600 or to have a size that is greater than that of the sound generating device 1600 and may have a polygonal plate shape or a circular plate shape having a certain thickness, but embodiments are not limited thereto. For example, the heat dissipation member 600 may be a heat dissipation sheet or a heat dissipation tape formed of a metal material that has high thermal conductivity like aluminum (Al), copper (Cu), or silver (Ag) and an alloy thereof, but embodiments are not limited thereto. Accordingly, because the heat dissipation member 600 is provided, an influence of heat occurring when the sound generating device is vibrating may be reduced on the image quality of the display panel 100.

Also, a partition 700 may be disposed between the display panel 100 and the supporting member 300. For example, the partition 700 may be disposed between the heat dissipation member 600 disposed on the rear surface of the display panel 100 and the supporting member 300.

Figure 9:
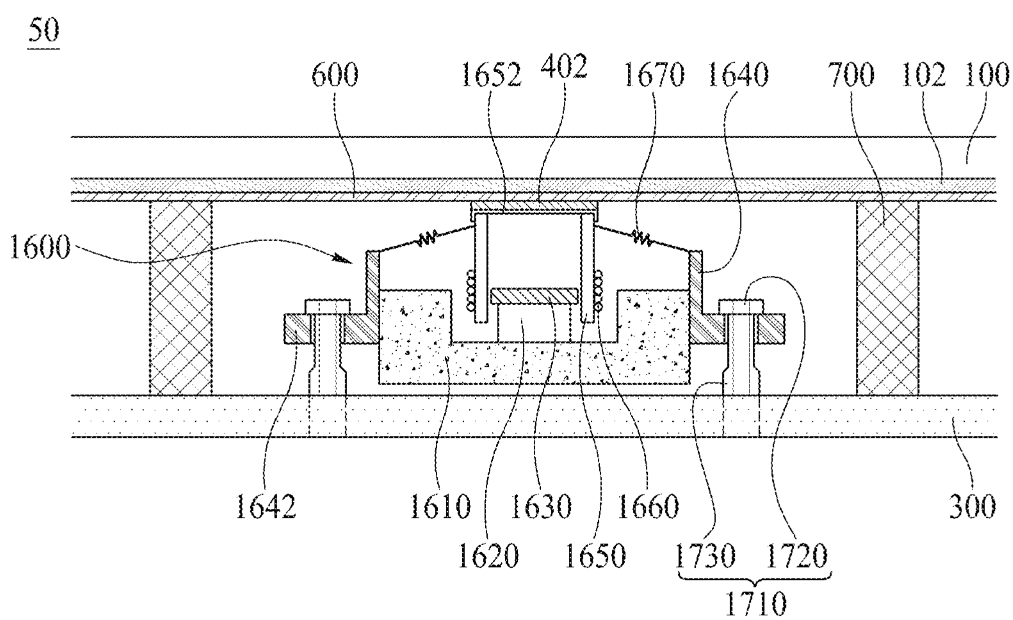
FIG. 9 illustrates a display apparatus including a sound generating device according to another embodiment of the present disclosure.

FIG. 9 illustrates a display apparatus including a sound generating device according to another embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 9, the display apparatus 50 according to another embodiment of the present disclosure may include a display panel 100 and a sound generating device 1600. The sound generating device 1600 may be disposed between the display panel 100 and a supporting member 300. The sound generating device 1600 may be disposed in the display panel 100. A description of the sound generating device 1600 may be substantially similar to descriptions given above with reference to FIGS. 2A, 2B, 6, and 7, and thus, is omitted.

The sound generating device 1600 may include a magnet 1620 on a yoke 1610, a center pole 1630 on the magnet 1620, a bobbin 1650 around the magnet 1620 and the center pole 1630, and a coil 1660 wound around an outer portion of the bobbin 1650. The yoke 1610 may be a plate, but the term is not limited thereto. A frame 1640 may be disposed outside the yoke 1610. A damper 1670 may be disposed between the frame 1640 and the bobbin 1650. A bobbin ring 1652 may be further provided on the bobbin 1650. In FIG. 9, an example where the bobbin ring 1652 is disposed all over the bobbin 1650 will be described. However, embodiments are not limited thereto, and the bobbin ring 1652 may be disposed at a position at which the bobbin 1650 is disposed.

A connection or coupling member 1710 may be disposed at a sound generating device 1600 so that the sound generating device 1600 is disposed in a display panel 100. A frame 1640 may include an extension portion 1642. The connection member 1710 may be disposed at the extension portion 1642 of the frame 1640. The connection member 1710 may include a screw 1720 and a nut 1730. The screw 1720 and the nut 1730 may be disposed in the supporting member 300, and the sound generating device 1600 may be fixed to an inner portion of the supporting member 300 by the screw 1720 and the nut 1730. For example, the nut 1730 may be a self-clinching nut. An example of the self-clinching nut may include PEM® nut, but embodiments are not limited thereto.

A heat dissipation member 600 may be further disposed on a rear surface of the display panel 100, for decreasing heat occurring when the sound generating device 1600 is vibrating. For example, the heat dissipation member 600 may be disposed on a rear surface of an encapsulation substrate 102 using an adhesive member. The heat dissipation member 600 may be configured to cover the sound generating device 1600 or to have a size that is greater than that of the sound generating device 1600 and may have a polygonal plate shape or a circular plate shape having a certain thickness, but embodiments are not limited thereto. For example, the heat dissipation member 600 may be a heat dissipation sheet or a heat dissipation tape formed of a metal material which is high in thermal conductivity like Al, Cu, or Ag and an alloy thereof, but embodiments are not limited thereto. Accordingly, because the heat dissipation member 600 is provided, an influence of heat occurring when the sound generating device is vibrating may be reduced on the image quality of the display panel 100.

Also, a partition 700 may be disposed between the display panel 100 and the supporting member 300. For example, the partition 700 may be disposed between the heat dissipation member 600 disposed on the rear surface of the display panel 100 and the supporting member 300.

FIGS. 10A to 10D illustrate a sound generating device according to another embodiment of the present disclosure.

Figure 10A:
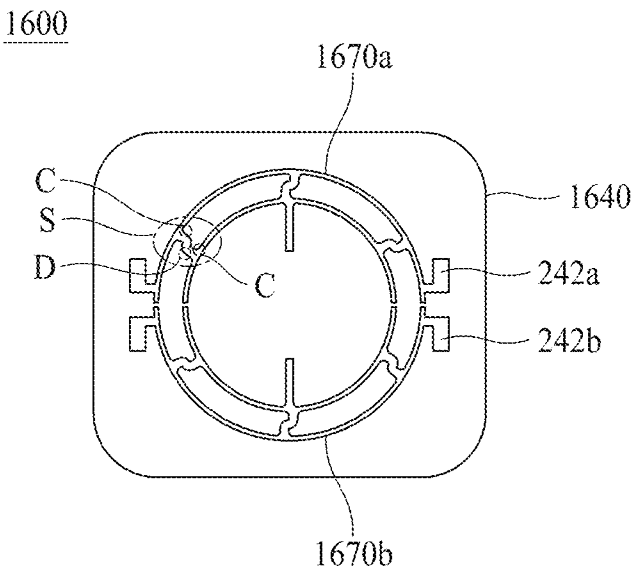
FIGS. 10A to 10D illustrate a sound generating device according to another embodiment of the present disclosure.
Figure 10B:
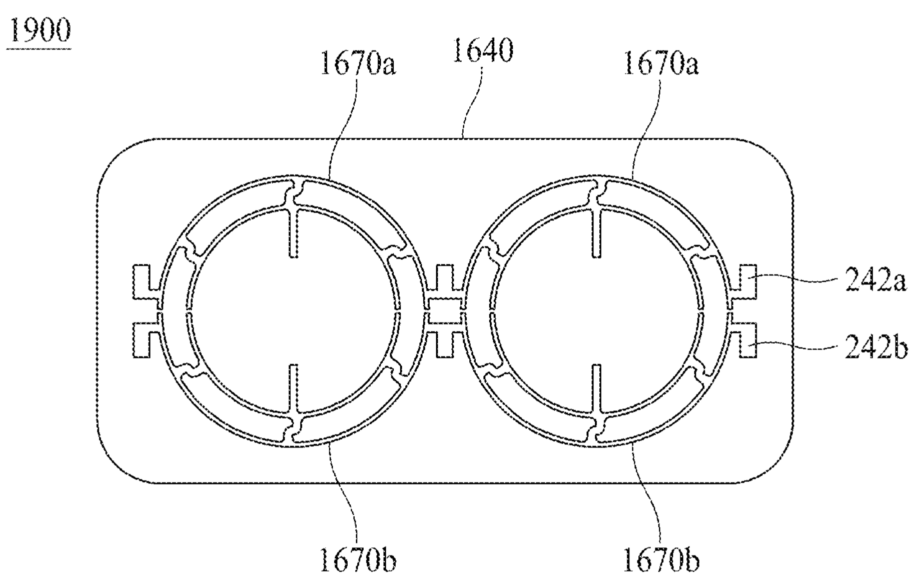
Figure 10C:
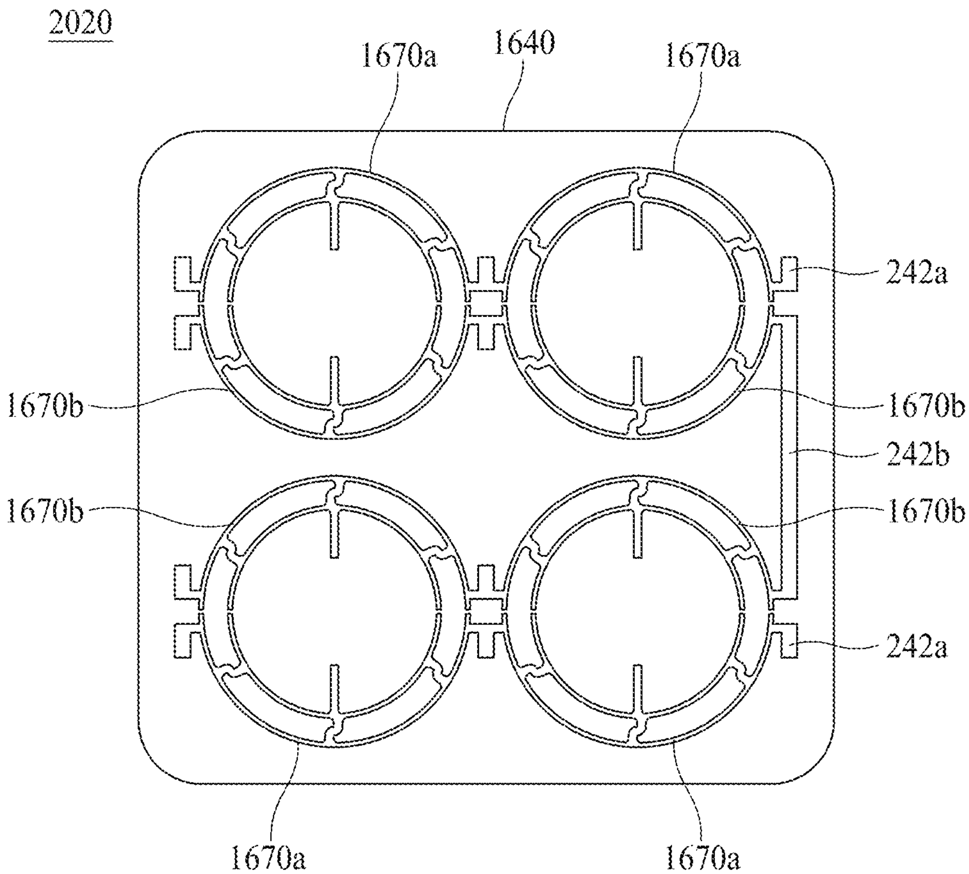
Figure 10D:
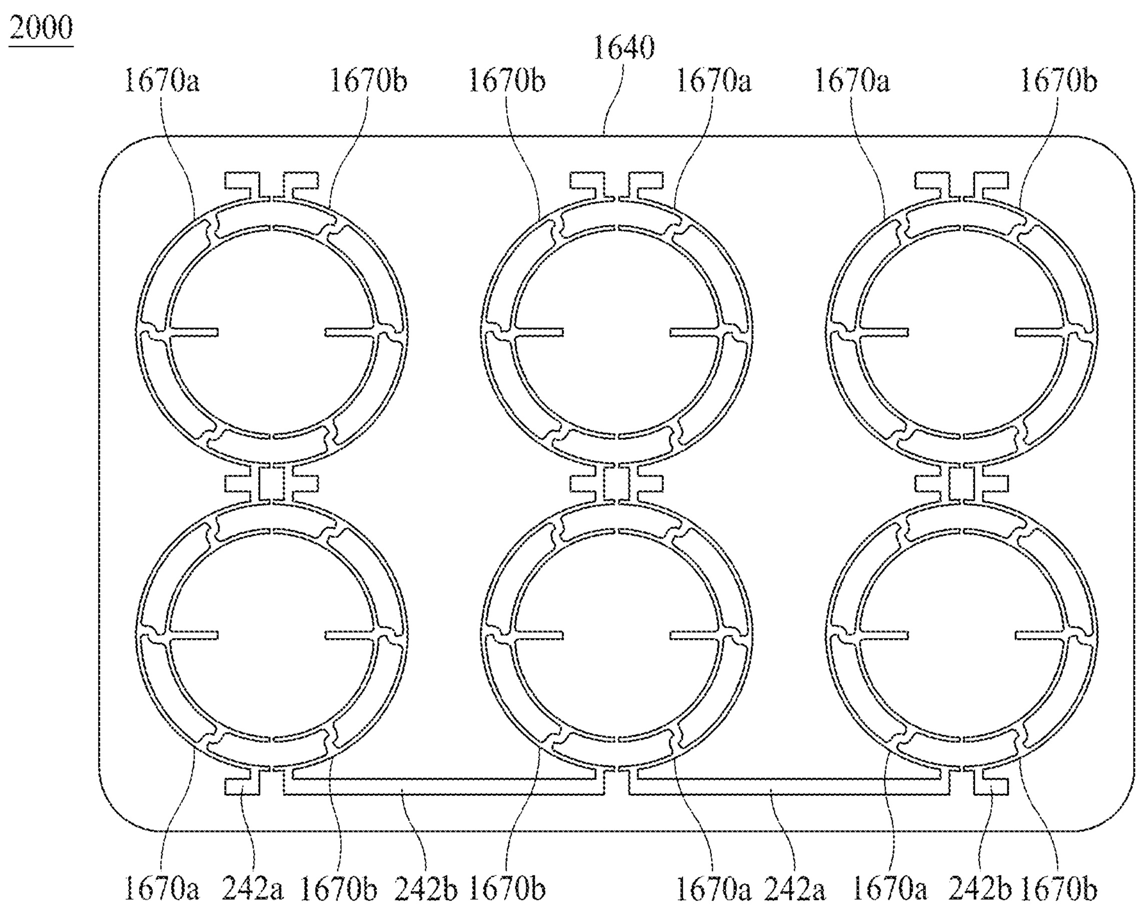

FIG. 10A illustrates one sound generating device or one-array sound generating device. FIG. 10B illustrates a two-array where two sound generating devices are provided. FIG. 10C illustrates a four-array where four sound generating devices are provided. FIG. 10D illustrates a six-array where six sound generating devices are provided. The sound generating device according to the present embodiment may be configured as one sound generating device or a sound generating device having two or more-array structure, but embodiments are not limited thereto. The sound generating device having a first structure or a second structure described above with reference to FIGS. 2A and 2B may be applied to the sound generating device according to an embodiment of the present disclosure. The sound generating device may be a sound generating module, but the term is not limited thereto.

With reference to FIGS. 10A to 10D, an area of a damper may be widely set for decreasing a thickness of a sound generating device, and for enhancing the performance of a magnet. Also, the damper may be formed of stainless steel, Cu, and/or the like, and thus, may be a line for applying a sound signal to the sound generating device.

With reference to FIG. 10A, in one-array sound generating device 1600, a damper 1670 may be disposed on a frame 1640. The one-array sound generating device 1600 may be referred to as a single type. The frame 1640 may be a yoke, but the term is not limited thereto.

The damper 1670 may be configured to perform a function of a line or a power supplying member, and thus, may include a first damper **1670*a* to which positive (+) power (or a sound signal) is applied and a second damper 1670*b* to which negative (−) power (or a sound signal or a voice signal) is applied. The damper 1670 may be divided with respect to a widthwise direction. For example, the first damper 1670*a*, to which the positive power is applied, may be an upper portion with respect to the front of the drawing and the second damper 1670*b*, to which the negative power is applied, may be a lower portion with respect to the front of the drawing. For example, the first damper 1670*a* may be connected to a first line 242*a*, and the second damper 1670*b* may be connected to a second line 242*b*. The first line 242*a* and the second line 242*b* may be a line pad, but the term is not limited thereto. Also, a shape 'S' of the damper 1670 may be provided as an S-shape or a zigzag shape. For example, the first line 242*a* and the second line 242*b* may have a length that is longer than a distance between the frame 1640 and the bobbin 1660, thereby decreasing a thickness of the sound generating device 1600. When the damper 1670 is configured diagonally, disconnection may occur due to a vertical motion of the damper 1670, and when a length of the damper 1670 is long, the damper 1670** may affect a resonance frequency. For example, a portion illustrated by 'C' and a portion illustrated by 'D' may be configured to have the same thickness and different widths, and disconnection may be avoided or prevented from occurring in an overlapping portion therebetween.

With reference to FIG. 10B, in a two-array sound generating device 1900, dampers **1670*a* and 1670*b* may be disposed on a frame 1640. The two-array sound generating device 1900** may be referred to as a twin type.

The dampers **1670*a* and 1670*b* may be connected to each other in parallel. The dampers 1670*a* and 1670*b* may be configured to perform a function of a line or a power supplying member, and thus, may include a first damper 1670*a* to which positive (+) power is applied and a second damper 1670*b* to which negative (−) power is applied. The dampers 1670*a* and 1670*b* may be divided with respect to a widthwise direction. For example, the first damper 1670*a*, to which the positive power is applied, may be an upper portion with respect to the front of the drawing and the second damper 1670*b*, to which the negative power is applied, may be a lower portion with respect to the front of the drawing. For example, the first damper 1670*a* may be connected to a first line 242*a*, and the second damper 1670*b* may be connected to a second line 242*b*. For example, two first dampers 1670*a* may be connected as one body and may be connected to the first line 242*a*, and two second dampers 1670*b* may be connected as one body, and may be connected to the second line 242*b*. A description of a shape of the dampers 1670*a* and 1670*b* may be the same as or similar to description give above with respect to FIG. 10**A.

With reference to FIG. 10C, in a four-array sound generating device 2020, dampers **1670*a* and 1670*b* may be disposed on a frame 1640. The four-array sound generating device 2020** may be referred to as a quad type.

The dampers **1670*a* and 1670*b* may be connected to one another in parallel and serially. The dampers 1670*a* and 1670*b* may be configured to perform a function of a line or a power supplying member, and thus, may include a first damper 1670*a* to which positive (+) power is applied and a second damper 1670*b* to which negative (−) power is applied. The dampers 1670*a* and 1670*b* may be divided with respect to a widthwise direction. For example, the first damper 1670*a*, to which the positive power is applied, may be an upper portion or a lower portion with respect to the front of the drawing and the second damper 1670***b*, to which the negative power is applied, may be a lower portion or an upper portion with respect to the front of the drawing. Each of a plurality of first dampers 1670*a* may be connected to a first line 242*a*, and each of a plurality of second dampers 1670*b* may be connected to a second line 242*b*. For example, two first dampers 1670*a* may be connected as one body and may be connected to the first line 242*a*, and two second dampers 1670*b* may be connected as one body and may be connected to the second line 242*b*. A description of a shape of the dampers 1670*a* and 1670*b* may be the same as or similar to description give above with respect to FIG. 10A.

With reference to FIG. 10D, in a six-array sound generating device 2000, dampers 1670*a* and 1670*b* may be disposed on a frame 1640. The six-array sound generating device 2000 may be referred to as a hexa type.

The dampers 1670*a* and 1670*b* may be connected to one another in parallel and serially. The dampers 1670*a* and 1670*b* may be configured to perform a function of a line, and thus, may include a first damper 1670*a* to which positive (+) power is applied and a second damper 1670*b* to which negative (−) power is applied. The dampers 1670*a* and 1670*b* may be divided with respect to a widthwise direction. For example, in dampers disposed in a left portion and a right portion of the drawing, the first damper 1670*a*, to which the positive power is applied, may be a left portion with respect to the front of the drawing and the second damper 1670*b*, to which the negative power is applied, may be a right portion with respect to the front of the drawing. Also, the first damper 1670*a* disposed at a center of the drawing may be a right portion, and the second damper 1670*b* may be a left portion. For example, each of a plurality of first dampers 1670*a* may be connected to a first line 242*a*, and each of a plurality of second dampers 1670*b* may be connected to a second line 242*b*. For example, two first dampers 1670*a* may be connected as one body and may be connected to the first line 242*a*, and two second dampers 1670*b* may be connected as one body and may be connected to the second line 242*b*. A description of a shape of the dampers 1670*a* and 1670*b* may be the same as or similar to description give above with respect to FIG. 10A.

Therefore, in the display apparatus according to an embodiment of the present disclosure, a sound generating device may be disposed without a supporting hole of a supporting member, and thus, a degree of freedom in disposition of the sound generating device may be enhanced.

Figure 11A:
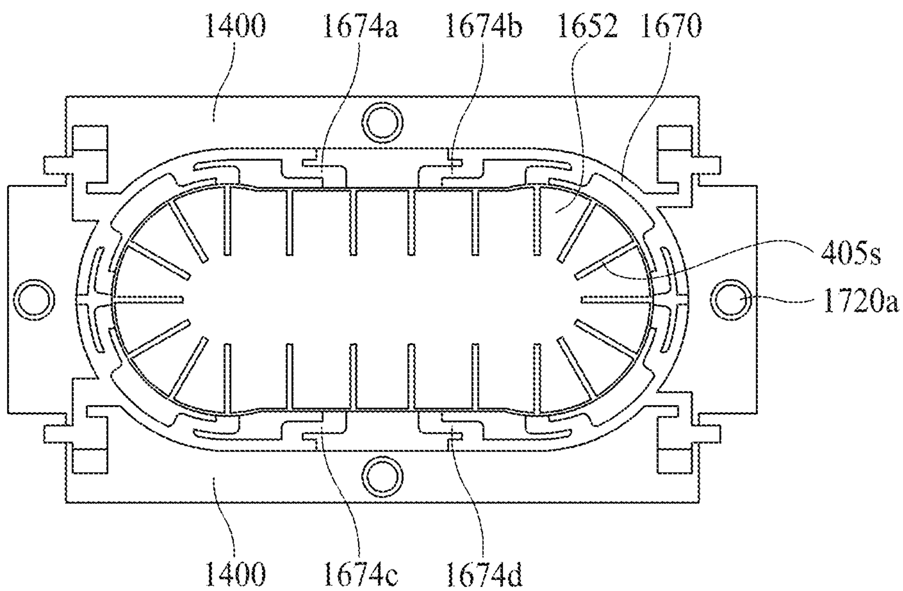
FIGS. 11A and 11B illustrate a sound generating device according to another embodiment of the present disclosure.
Figure 11B:
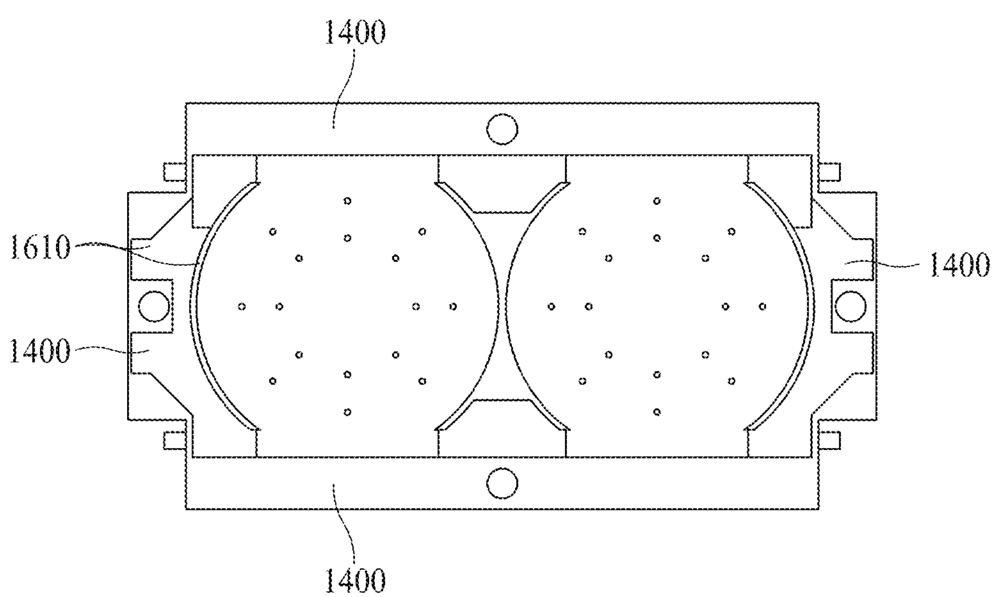

FIGS. 11A and 11B illustrate a sound generating device according to another embodiment of the present disclosure.

FIG. 11A is a diagram seen from above with respect to the sound generating device according to another embodiment of the present disclosure, and FIG. 11B is a diagram seen from below with respect to the sound generating device according to another embodiment of the present disclosure. In FIGS. 11A and 11B, a two-array sound generating device will be described as an example.

With reference to FIG. 11A, one structure may be further provided at one of a peripheral portion and a center portion of a damper 1670. For example, a first structure 1400 may be disposed near the damper 1670. The first structure 1400 may be disposed to surround the damper 1670. The first structure 1400 may reinforce stiffness of the damper 1670. The first structure 1400 may be formed of aluminum (Al), magnesium (Mg), and/or the like, but embodiments are not limited thereto. In FIG. 11A, a sound generating device configured as a two-array is illustrated, and when one sound generating device is provided, a first structure may be disposed near a damper. One or more second structures may be further provided at the center portion of the damper 1670. For example, the second structures may include a 2-1$^{st}$ structure 1674*a*, a 2-2$^{nd}$ structure 1674*b*, a 2-3$^{rd}$ structure 1674*c*, and a 2-4$^{th}$ structure 1674*d*. The second structures 1674 may reinforce stiffness of the center portion of the damper 1670. In FIG. 11A, a sound generating device provided as a two-array is illustrated, and when one sound generating device is provided, at least one second structure may be disposed at a center portion of a damper 1670. However, embodiments are not limited thereto, and when a sound generating device is provided as a two or more-array, a first structure and/or a second structure may be disposed at one of the peripheral portion and the center portion of the damper 1670.

A screw hole 1720*a* may be further provided in the first structure 1400. A sound generating device may be disposed in a display panel by using the screw hole 1720*a*. A slit 405*s* may be further disposed on the bobbin ring 1652. The slit 405*s* may be provided for an attachment function of an adhesive member between the two-array sound generating devices and may remove an air bubble of the adhesive member. For example, the slit 405*s* may prevent a high-pitched sound from being degraded by an air bubble in an attachment process based on the adhesive member. The shape or number of slits 405*s* does not limit an embodiment. As another example, a slit 405*s* may be provided in an adhesive member 402. The slit may prevent a high-pitched sound from being degraded by an air bubble in an attachment process based on the adhesive member 402.

With reference to FIG. 11B, a first structure 1400 may be disposed near a yoke 1610. For example, the first structure 1400 may further reinforce stiffness of an injection material of a yoke or a frame. For example, the first structure 1400 may further reinforce stiffness of an injection material of a yoke or a frame along with the first structure 1400 of FIG. 11A. The injection material may be formed based on insert injection, but is not limited thereto. As another example, an injection material may be fastened based on a screw or a bond, or may be formed of an adhesive. The first structure 1400 may be formed of Al, Mg, and/or the like, but is not limited thereto. The yoke 1610 may be a plate or a frame, but the term is not limited thereto.

Figure 12A:
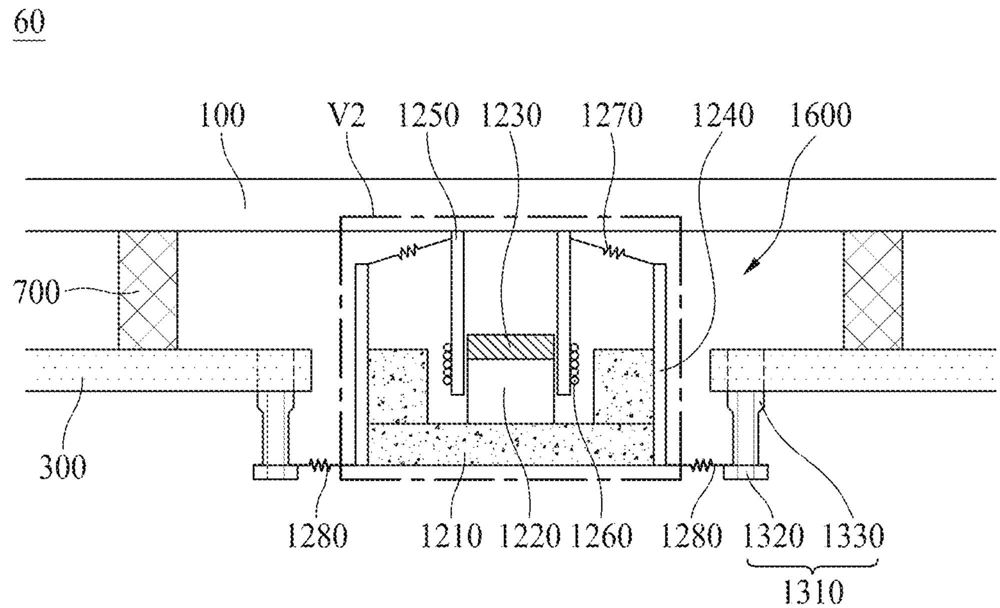
FIGS. 12A and 12B illustrate a display apparatus including a sound generating device according to another embodiment of the present disclosure.
Figure 12B:
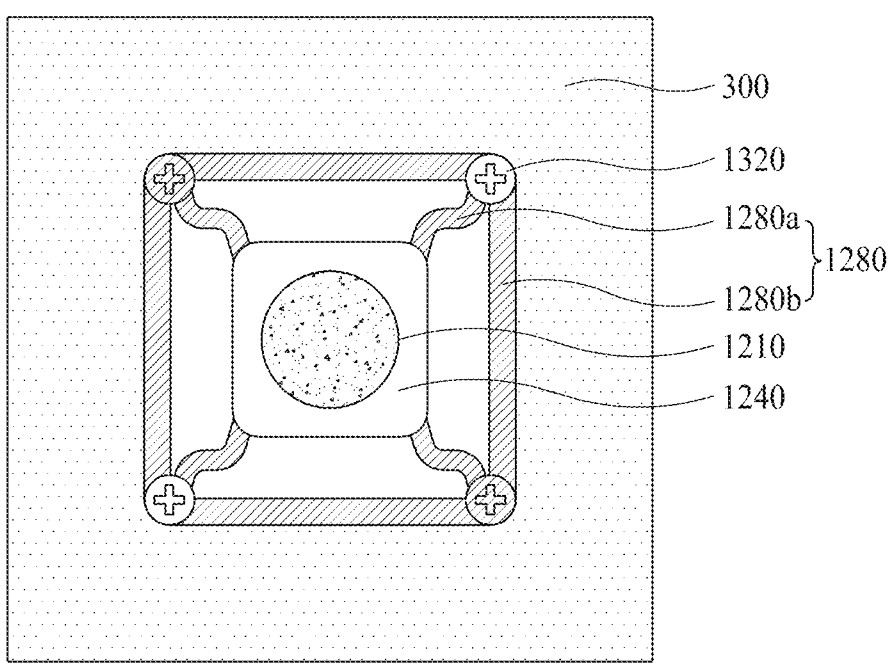

FIGS. 12A and 12B illustrate a display apparatus including a sound generating device according to another embodiment of the present disclosure.

With reference to FIG. 12A, the display apparatus 60 according to an embodiment of the present disclosure may include a display panel 100 and a sound generating device 1600. The sound generating device 1600 may include a magnet 1220 on a plate 1210, a center pole 1230 on the magnet 1220, a bobbin 1250 near the magnet 1220 and the center pole 1230, and a coil 1260 wound around the bobbin 1250.

For example, the magnet 1220 may be on the plate 1210, and the center pole 1230 may be on the magnet 1220. The center pole 1230 may be referred to as "pole pieces." Alternatively, pole pieces may be further included on the center pole 1230. The bobbin 1250 may surround the magnet 1220 and the center pole 1230, and the coil 1260 may be wound around the bobbin 1250. A frame 1240 may be disposed outside the plate 1210. A damper 1270 may be between the frame 1240 and the bobbin 1250. The damper 1270 may be referred to as an "edge," but the term is not limited thereto. The plate 1210 may be referred to as a "yoke," but the term is not limited thereto.

A bobbin 1250 of a sound generating device 1600 may be attached or connected on the display panel 100 by an adhesive member. For example, the adhesive member may be the adhesive member described above with respect to FIGS. 1A, 1B, 6, and 7. For example, the adhesive member may include a double-sided tape, a single-sided tape, an adhesive, a bond, and/or the like, but embodiments are not limited thereto. The adhesive member may be in a portion where the bobbin 1250 of the sound generating device 1600 is attached on the display panel 100, but embodiments are not limited thereto. For example, the adhesive member may be on a whole rear surface of the display panel 100 or on a whole surface between the display panel 100 and the sound generating device 1600.

A heat dissipation member may be further disposed on a rear surface of the display panel 100, for decreasing heat occurring when the sound generating device 1600 is vibrating. For example, the heat dissipation member may be substantially identically or similarly applied in the same manner as described with reference to FIGS. 8 and 9.

According to an embodiment of the present disclosure, the plate 1210 of a sound generating device 1600 is fixed to a supporting member 300, and the bobbin 1250 may upward and downward vibrate. The plate 1210 may be fixed to the supporting member 300 by a screw 1320, and thus, stiffness of the sound generating device 1600 may increase. Therefore, the present inventors have recognized that the plate 1210 is fixed to the supporting member 300, and thus, even when a resonance frequency of the sound generating device 1600 is reduced, a low-pitched sound band of a sound output from the sound generating device 1600 is no longer reduced. Therefore, through various experiments, the present inventors have invented a sound generating device having a new structure, which decreases a resonance frequency of the sound generating device and improves a low-pitched sound band.

Therefore, because a supporting member 300 is connected to a plate 1210 by a screw 1320, the present inventors have recognized that the plate 1210 should not be fixed to the supporting member 300, to solve a problem where the stiffness of a sound generating device 1600 increases. The present inventors have performed various experiments on a method of decreasing stiffness without the plate 1210 being fixed to the supporting member 300, in order for the sound generating device 1600 to be fixed to the supporting member 300. Through various experiments, the present inventors have recognized that the sound generating device 1600 should be fixed to the supporting member 300 without the plate 1210 being fixed to the supporting member 300 by a screw 1320. For example, the plate 1210 may be disposed apart from the supporting member 300, and a structure may be provided between the supporting member 300 and the sound generating device 1600 in order for the sound generating device 1600 to be fixed to the supporting member 300. With reference to FIGS. 12A and 12B, the supporting member 300 and the plate 1210 of the sound generating device 1600 may be disposed apart from each other, and a structure disposed between the plate 1210 and the supporting member 300 may be, for example, a connection part 1280. The connection part 1280 may include metal or plastic, but embodiments are not limited thereto. For example, the connection part 1280 may provide elasticity to the plate 1210 to decrease stiffness and may reduce a resonance frequency to improve a sound of a low-pitched sound band of the sound generating device 1600. This will be described below with reference to Equation (1). A resonance frequency "$f_0$" of a vibration generated by the sound generating device 1600 may be determined as in the following Equation (1).

$$f_0 = \frac{1}{2\pi}\sqrt{\frac{k}{m}} \quad \text{[Equation 1]}$$

Here, k denotes a stiffness of an object, and m denotes a mass of the object. For example, the sound generating device 1600 may decrease the stiffness "k" of the object or may increase the mass "m" of the object, based on Equation (1), thereby improving a sound of a low-pitched sound band. The connection part 1280 may decrease the stiffness of the sound generating device 1600 to lower a resonance frequency, thereby improving a sound of a low-pitched sound band of the sound generating device 1600. As another example, the sound generating device 1600 may decrease the mass "m" of the object and may more decrease the stiffness "k" of the object than a decreasing rate of the mass "m", thereby decreasing the resonance frequency.

For example, a connection part 1280 may be disposed between a plate 1210 and a supporting member 300. For example, the connection part 1280 may be disposed between the frame 1240 and the supporting member 300, and the sound generating device 1600 may not be fixed to the supporting member 300, thereby decreasing stiffness of the sound generating device 1600. For example, the connection part 1280 may be disposed between the frame 1240 and the supporting member 300, and the plate 1210 may not be fixed to the supporting member 300, thereby decreasing stiffness of the sound generating device 1600. For example, the one side of the connection part 1280 may be fixed to the supporting member 300, and the other side of the connection part 1280 may be connected to the frame 1240. For example, the one side of the connection part 1280 may be fixed to the supporting member 300 and the other side of the connection part 1280 may not be fixed to the frame 1240, and thus, the connection part 1280 may vibrate based on a vibration of the sound generating device 1600. For example, the plate 1210 may vibrate without being fixed to the connection part 1280, and thus, may vibrate based on a vibration of the sound generating device 1600. For example, the connection part 1280 may have a thickness relatively thinner than the plate 1210 or the supporting member 300 so that the sound generating device 1600 may upward and downward vibrate. For example, the connection part 1280 may have a thickness relatively thinner than a frame 1240. For example, the connection part 1280 may be a metal wire or a metal strap.

A connection or coupling member 1310 may be a lower portion of or under the supporting member 300. The connection member 1310 may include a screw 1320 and a nut 1330. The nut 1330 may be, for example, a self-clinching nut. Examples of the self-clinching nut may include PEM® nut, and the present embodiment is not limited thereto. The nut 1330 may be fastened to the supporting member 300 in a press-fitting type, but the present embodiment is not limited thereto. The sound generating device 1600 may be coupled to the supporting member 300 by the connection member 1310. The connection part 1280 may be connected to the screw 1320. The connection member 1310 may be a connection member, but the term is not limited thereto.

With reference to FIG. 12A, the connection part 1280 may be disposed between the connection member 1310 and the frame 1240. For example, the connection part 1280 may be disposed between the connection member 1310 and a lower portion of the frame 1240. For example, the connection part 1280 may extend from an outer portion of the lower portion of the frame 1240 to the screw 1320. Therefore, the connection part 1280 may stably support the plate 1210 surrounded by the frame 1240 and may provide elasticity to the plate 1210 to decrease the stiffness of the sound generating device 1600. For example, the connection part 1280 may provide elasticity to the plate 1210 to decrease stiffness of the sound generating device 1600, thereby vibrating a whole portion of the sound generating device 1600. For example, the connection part 1280 may be deformed based on a vibration of the sound generating device 1600, thereby vibrating the whole portion of the sound generating device 1600. For example, the connection part 1280 may vibrate based on a vibration of the sound generating device 1600, thereby vibrating the whole portion of the sound generating device 1600. Therefore, a display apparatus with enhanced sound of a low-pitched sound band may be provided. Comparing with this, when a plate 1210 is fixed to a supporting member 300, a bobbin 1250 may upward and downward vibrate to vibrate a display panel 100, and due to this, a sound pressure level of a sound of the low-pitched sound band may be lowered. For example, comparing with a case where a plate 1210 is fixed to a supporting member 300, a sound pressure of the sound generating device 1600 of FIG. 12 may be enhanced by about 15 dB in about 100 Hz.

With reference to FIG. 12B, a connection part 1280 may be provided in plurality. The plurality of connection parts 1280 may be disposed between a supporting member 300 and a frame 1240. For example, the plurality of connection parts 1280 may be disposed on the same plane between the supporting member 300 and the frame 1240 and may be disposed apart from one another. For example, a space may be formed between the plurality of connection parts 1280. For example, a space on the same plane may be formed between the plurality of connection parts 1280. For example, a space may be formed between the supporting member 300 and the plurality of connection parts 1280. For example, a space may be formed between the sound generating device 1600, the supporting member 300, and the plurality of connection parts 1280.

For example, the sound generating device 1600 may include a plate 1210, a magnet 1220, a center pole 1230, a frame 1240, a bobbin 1250, a coil 1260, a damper 1270, and the connection part 1280 connected to the frame 1240. The connection part 1280 may include a groove or a hole for accommodating a screw 1320. For example, as illustrated in FIG. 12B, the groove or the hole for accommodating the screw 1320 may be provided in the connection part 1280. For example, the connection part 1280 may include two or more first connection part 1280*a* connected to the frame 1240, and a second connection part 1280*b* disposed along an outer portion of the frame 1240 and connected to the supporting member 300. In this case, a supporting force applied to the frame 1240 may be complemented, and the plate 1210 surrounded by the frame 1240 may be stably supported, thereby providing elasticity to the plate 1210 to decrease stiffness of the sound generating device 1600. However, embodiments are not limited thereto, and the sound generating device 1600 may be configured as a sound generating device including the connection part 1280 connected to the frame 1240 and stiffness of the sound generating device 1600 may be reduced by applying elasticity to the plate 1210, thereby enhancing a sound of the low-pitched sound band of the sound generating device 1600.

The frame 1240 may have a circular shape, a tetragonal (e.g., quadrilateral) shape, or a corner-rounded tetragonal shape, but embodiments are not limited thereto. When the frame 1240 has a tetragonal (e.g., quadrilateral) shape or a corner-rounded tetragonal shape, a lower portion or lower end of the frame 1240 may have a tetragonal (e.g., quadrilateral) shape having four corners or a corner-rounded tetragonal shape, and the connection part 1280 may be disposed between the screw 1320 and each of corners of the frame 1240. For example, the connection part 1280 may be disposed between the screw 1320 and each of four corners of the frame 1240. The connection part 1280 may be disposed near the frame 1240 along a shape of the frame 1240, and the connection part 1280 disposed near the frame 1240 may be disposed between a plurality of screws 1320 provided in the frame 1240. For example, when the frame 1240 has a tetragonal (e.g., quadrilateral) shape or a corner-rounded tetragonal shape, the connection part 1280 may be disposed near the frame 1240 along a tetragonal (e.g., quadrilateral) shape or a corner-rounded tetragonal shape of the frame 1240, and the connection part 1280 disposed near the frame 1240 may be disposed between a plurality of screws 1320 provided in each of four corners of the frame 1240. The connection part 1280 may be disposed outside the frame 1240 along a shape of the frame 1240, and the connection part 1280 disposed outside the frame 1240 may be disposed between the screws 1320 provided in the frame 1240. For example, when the frame 1240 has a tetragonal (e.g., quadrilateral) shape or a corner-rounded tetragonal shape, the connection part 1280 may be disposed outside the frame 1240 along a tetragonal (e.g., quadrilateral) shape or a corner-rounded tetragonal shape of the frame 1240, and the connection part 1280 disposed outside the frame 1240 may be disposed between the screws 1320 provided in each of the four corners of the frame 1240. However, embodiments are not limited thereto, and the connection part 1280 may be disposed in a portion other than the corners of the frame 1240. For example, when the frame 1240 has a tetragonal (e.g., quadrilateral) shape or a corner-rounded tetragonal shape, the connection part 1280 may be disposed between the frame 1240 and the connection member 1310, and for example, the connection part 1280 may be disposed at any position between the frame 1240 and the connection member 1310. For example, when the frame 1240 has a circular shape, the connection part 1280 may be disposed between the frame 1240 and the connection member 1310, and for example, the connection part 1280 may be disposed at any position between the frame 1240 and the connection member 1310. A connection part 1280 disposed between each of the four corners of the frame 1240 and the screw 1320 and a connection part 1280 disposed outside the frame 1240 may be provided as one body. For example, the connection part 1280 disposed between each of the four corners of the frame 1240 and the screw 1320 and the connection part 1280 disposed outside the frame 1240 may be configured as one body through a laser process. However, embodiments are not limited thereto, and the connection part 1280 may be formed through a punching process using laser, etching, and molding. Therefore, because the connection part 1280 is provided in plurality, a supporting force applied to the frame 1240 may be complemented, and the plate 1210 surrounded by the frame 1240 may be stably supported, thereby providing elasticity to the plate 1210 to decrease the stiffness of the sound generating device 1600.

With reference to FIG. 12A, a partition 700 may be provided between the supporting member 300 and the display panel 100. The partition 700 may be an air gap or a space where a sound is generated when the display panel 100 vibrates. Comparing with FIG. 5, a vibration of the sound generating device 1600 may vibrate a whole or entire portion V2 of the sound generating device 1600, and thus, a sound output characteristic of the sound generating device 1600 may be more enhanced. For example, the sound generating device 1600 may vibrate the display panel 100 to output a sound by the plate 1210, the magnet 1220, the center pole 1230, the frame 1240, the bobbin 1250, the coil 1260, and the damper 1270, and thus, a sound output characteristic thereof may be more enhanced, thereby providing a display apparatus 60 with an enhanced sound output characteristic of a low-pitched sound band.

Figure 13:
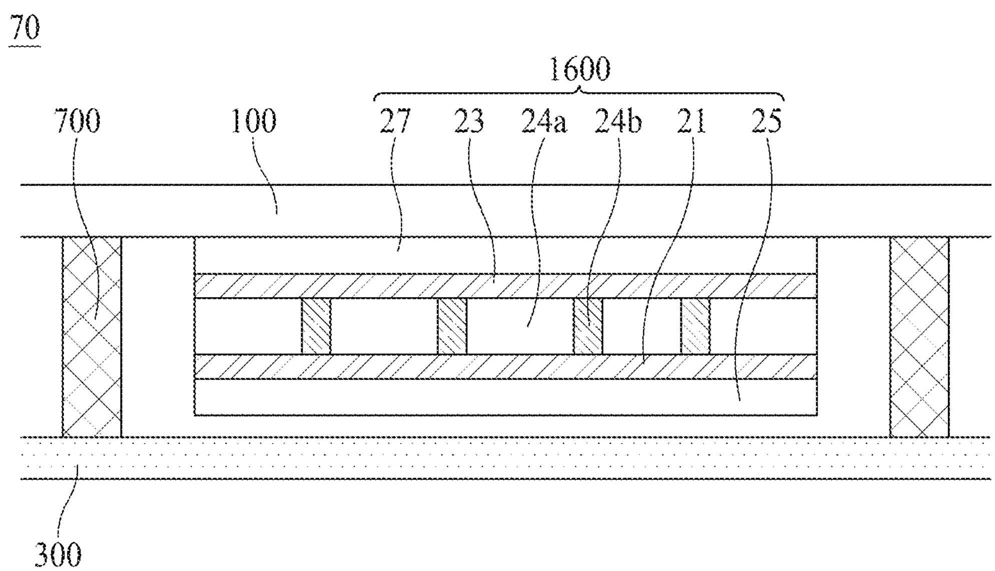
FIG. 13 illustrates a display apparatus including a sound generating device according to another embodiment of the present disclosure.

FIG. 13 illustrates a display apparatus including a sound generating device according to another embodiment of the present disclosure.

With reference to FIG. 13, the display apparatus 70 according to an embodiment of the present disclosure may include a display panel 100 and a sound generating device 1600. The sound generating device 1600 may include a first portion 24*a*, a second portion 24*b*, a first electrode 21, and a second electrode 23. The sound generating device of FIG. 13 may be a film-type sound generating device or a piezoelectric-type sound generating device, but the term is not limited thereto.

The sound generating device 1600 may include a plurality of first portions 24*a* and a plurality of second portions 24*b* each disposed between two adjacent first portions of the plurality of first portions 24*a*. Each of the plurality of first portions 24*a* may include a polygonal pattern. For example, each of the plurality of first portions 24*a* may have a line pattern having a predetermined width (or an interval, or a distance), and the plurality of first portions 24*a* may be spaced apart from one another to have a predetermined width (or an interval, or a distance). Each of the plurality of first portions 24*a* may have the same size (for example, the same width, area, or volume) within a process error range (or an error tolerance) occurring in a manufacturing process.

The sound generating device 1600 may include the first portion 24*a* having a piezoelectric characteristic and the second portion 24*b* disposed between adjacent first portions 24*a* to have flexibility. For example, each of the plurality of first portions 24*a* may include an inorganic material or a piezoelectric material, which vibrates based on a piezoelectric effect (or a piezoelectric characteristic) caused by an electric field. For example, each of the plurality of first portions 24*a* may be referred to as an electro active portion, an inorganic material portion, a piezoelectric material portion, or a vibration portion, but the term is not limited thereto.

Each of the plurality of first portions 24*a* may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". For example, in the chemical formula "$ABO_3$", A may include a divalent metal element, and B may include a tetravalent metal element. For example, in the chemical formula "$ABO_3$", A and B may be cations, and O may be anions. For example, the chemical formula "$ABO_3$" may include one of $PbTiO_3$, $PbZrO_3$, $BaTiO_3$, and $SrTiO_3$, but embodiments are not limited thereto.

When the perovskite crystalline structure includes a center ion (for example, $PbTiO_3$), a position of a titanium (Ti) ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal, orthorhombic, or rhombohedral structure corresponding to an unsymmetric structure, and thus, a piezoelectric effect may be generated. In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

As an example, the inorganic material portion included in each of the plurality of first portions 24*a* may include one or more materials of lead (Pb), zirconium (Zr), titanium (Ti), zinc (Zn), nickel (Ni), and niobium (Nb), but is not limited thereto.

As another example, the inorganic material portion included in each of the plurality of first portions 24*a* may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but is not limited thereto. Also, the inorganic material portion may include at least one of $CaTiO_3$, $BaTiO_3$, and $SrTiO_3$ without lead (Pb), but embodiments are not limited thereto.

Each of the plurality of second portions 24*b* may include a polygonal pattern. Each of the plurality of second portions 24*b* may be disposed between the plurality of first portions 24*a*. The plurality of first portions 24*a* and the plurality of second portions 24*b* may be disposed (or arranged) on the same plane (or the same layer) in parallel. Each of the plurality of second portions 24*b* may be configured to fill a gap between two adjacent first portions of the plurality of first portions 24*a* and may be connected to or attached to the adjacent first portion 24*a*. For example, each of the plurality of second portions 24*b* may include a line pattern having a predetermined width (or an interval) and may be disposed in parallel with each other with the first portion 24*a* therebetween. Each of the plurality of second portions 24*b* may have the same size (for example, the same width, area, or volume) within a process error range (or an error tolerance) occurring in a manufacturing process.

A size of the second portion 24*b* may be equal to or different from that of the first portion 24*a*. For example, a size of the second portion 24*a* and a size of the first portion 24*b* may be set based on a requirement condition including the vibration characteristic and/or flexibility of the sound generating device 1600. For example, when a vibration characteristic of the sound generating device 1600 is more needed than flexibility, a size of the first portion 24*a* may be set to be greater than that of the second portion 24*b*. As another example, when the flexibility of the sound generating device 1600 is more needed than a vibration characteristic, a size of the second portion 24*b* may be set to be greater than that of the first portion 24*a*. Accordingly, a degree of freedom in design of the sound generating device 1600 may be enhanced based on a characteristic needed for the sound generating device 1600.

The plurality of second portions 24*b* may include an organic material or an organic polymer which each has a flexible characteristic in comparison with the inorganic material portion which is the first portion 24*a*. For example, each of the plurality of second portions 24*b* may include an organic material, an organic polymer, an organic piezoelectric material, or an organic non-piezoelectric material. For example, each of the plurality of second portions 24*b* may be referred to as an adhesive portion, an elastic portion, a bending portion, a damping portion, or a flexible portion each having flexibility, but is not limited thereto.

The organic material portion may include at least one of an organic piezoelectric material and an organic non-piezoelectric material. The organic material portion including the organic piezoelectric material may absorb an impact applied to the inorganic material portion (or the first portion), and thus, may enhance the total durability of the sound generating device 1600 and may provide a piezoelectric characteristic corresponding to a certain level or more. For example, the organic piezoelectric material may be an organic material having an electro active material. For example, the organic piezoelectric material may include at least one of polyvinylidene fluoride (PVDF), β-Polyvinylidene fluoride (β-PVDF), polyvinylidene-trifluoroethylene (PVDF-TrFE), and polyvinylidene-trifluoroethylene-chloro fluoro ethylene (PVDF-TrFE-CFE), but is not limited thereto.

The organic material portion including the organic non-piezoelectric material may include a curable resin composition and an adhesive including the curable resin composition, and thus, may absorb an impact applied to the inorganic material portion (or the first portion), thereby enhancing the total durability of the sound generating device 1600. The organic non-piezoelectric material may include at least one of an epoxy-based polymer, an acryl-based polymer, and a silicon-based polymer, but is not limited thereto. Therefore, the first portions 24*a* including an inorganic material and having a piezoelectric characteristic and the second portions 24*b* including an organic material and having flexibility may be alternately and repeatedly arranged to be connected, and thus, the sound generating device 1600 may have a thin film type. Accordingly, the sound generating device 1600 may have a size based on the display panel 100 of the display apparatus, or may have a size for realizing a vibration characteristic or a sound characteristic which is each set based on a vibration of the display panel 100.

The first electrode 21 may be disposed on a first surface (or a front surface) of each of the plurality of the first portions 24*a* and each of the plurality of the second portions 24*b*, and may be electrically connected to the first surface of each of the plurality of the first portions 24*a*. The first electrode 21 may include a transparent conductive material, a semitransparent conductive material, or an opaque conductive material. For example, the transparent conductive material or the semitransparent conductive material of the first electrode 21 may include indium tin oxide (ITO) or indium zinc oxide (IZO), but is not limited thereto. The opaque conductive material may include Al, Cu, Au, Ag, Mo, and Mg or an alloy thereof, but is not limited thereto.

The second electrode 23 may be disposed on a second surface (or a rear surface), which is opposite to the first surface of each of the plurality of the first portions 24*a* and each of the plurality of the second portions 24*b*, and may be electrically connected to the second surface of each of the plurality of the first portions 24*a*. The second electrode 23 may include a transparent conductive material, a semitransparent conductive material, or an opaque conductive material. For example, the second electrode 23 may include the same material as that of the first electrode 21, but is not limited thereto.

The sound generating device 1600 may further include a first passivation layer 25 and a second passivation layer 27.

The first passivation layer 25 may be disposed on the first electrode 21 and may protect the first surface of each of the plurality of the first portions 24*a* and each of the plurality of the second portions 24*b*. For example, the first passivation layer 25 may be a polyimide (PI) film or a polyethylene terephthalate (PET) film, but is not limited thereto.

The second passivation layer 27 may be disposed on the second electrode 23 and may protect the second surface of each of the plurality of the first portions 24*a* and each of the plurality of the second portions 24*b*. For example, the second passivation layer 27 may be a polyimide (PI) film or a polyethylene terephthalate (PET) film, but is not limited thereto.

Figure 14A:
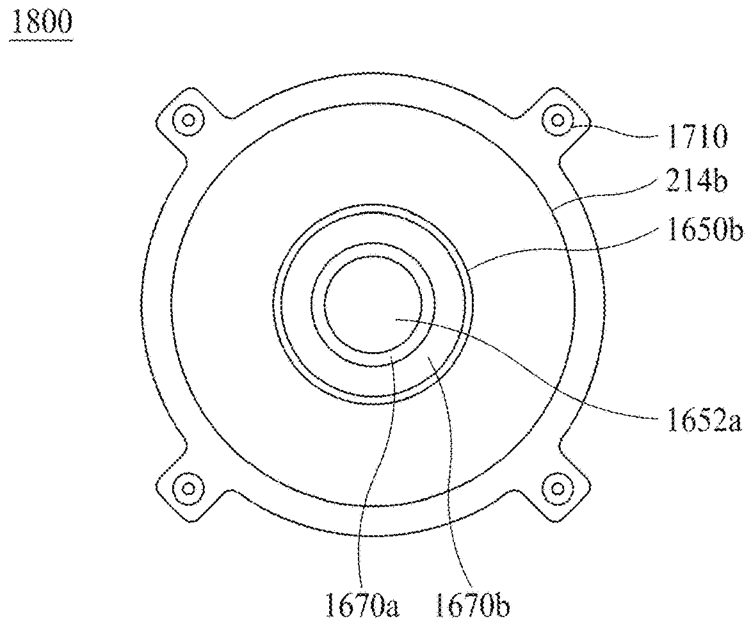
FIGS. 14A and 14B illustrate a sound generating device according to another embodiment of the present disclosure.
Figure 14B:
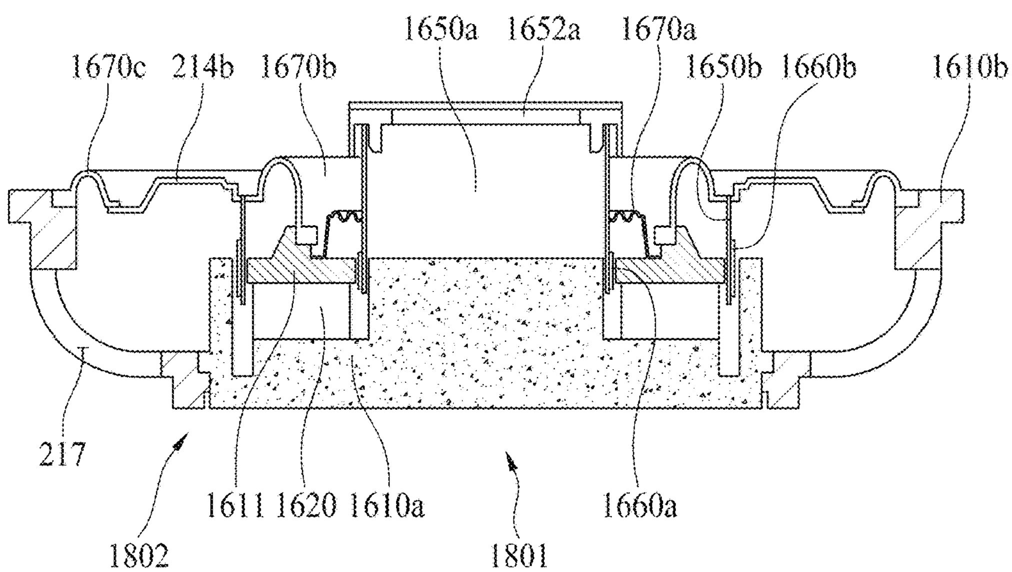

FIGS. 14A and 14B illustrate a sound generating device according to another embodiment of the present disclosure.

A sound generating device 1800 according to another embodiment of the present disclosure may be a woofer-integrated sound generating device, a hybrid sound generating device, and a sound generating device having a woofer, but the term is not limited thereto. FIG. 14A is a front view of a sound generating device, and FIG. 14B is a cross-sectional view of a sound generating device.

With reference to FIGS. 14A and 14B, the sound generating device 1800 may include a first sound generating module 1801 and a second sound generating module 1802. For example, the first sound generating module 1801 may be disposed on a rear surface of a display panel, and the second sound generating module 1802 may be spaced apart from the rear surface of the display panel.

The sound generating device 1800 may include a frame for accommodating the first sound generating module 1801 and the second sound generating module 1802. The frame may include a lower frame 1610*a* that supports a lower portion of the first and second sound generating modules 1801 and 1802 and a side frame 1610*b* connected to the lower frame 1610*a*. The frame may be a yoke, but the term is not limited thereto.

The lower frame 1610*a* may support a magnet 1620. The magnet 1620 may share the first sound generating module 1801 and the second sound generating module 1802. For example, a bobbin 1650*a* of the first sound generating module 1801 and a coil 1660*a* near the bobbin 1650*a* may be disposed near the magnet 1620. For example, a second bobbin 1650*b* of the second sound generating module 1802 and a second coil 1660*b* near the second bobbin 1650*b* may be disposed near the magnet 1620. For example, the lower frame 1610*a* and a plate 1611 may be respectively disposed on a lower portion and an upper portion of the magnet 1620 and may increase a magnet flux density generated through the magnet 1620, the coil 1660*a*, and the second coil 1660*b*, thereby enhancing a vibration characteristic. The lower frame 1610*a* may be a yoke, but the term is not limited thereto.

The side frame 1610*b* may be connected to the lower frame 1610*a*, and may include at least one hole 217 to output sound. For example, the hole 217 may a vent hole. For example, the hole 217 may output sound of a low-pitched sound band, generated by a vibration plate 214*b* of the second sound generating module 1802 in an air gap in the sound generating device 1800, to a rearward region behind a display panel 100.

The side frame 1610*b* may include a conductive material, and may control a magnetic flux generated by the magnet 1620. For example, the side frame 1610*b* may surround the magnet 1620 with being apart therefrom, and thus, may allow a magnet flux generated by the magnet 1620 to concentrate on the inside of the second bobbin 1650*b*, thereby preventing a leakage of magnetic flux. The side frame 1610*b* may be a yoke, but the term is not limited thereto. The hole 217 may be provided in the side frame 1610*b*, and moreover, may be provided in the lower frame 1610*a* and may be provided in a region connected to the side frame 1610*b* and the lower frame 1610*a*. The side frame 1610*b* may be connected to a supporting member using a connection member 1710 such as a nut or may be disposed between the supporting member and the display panel 100.

The first sound generating module 1801 may include the magnet 1620 disposed on the frame, the bobbin 1650*a* near the magnet 1620, and a coil 1660*a* and a damper 1670*a* near the bobbin 1650*a*. For example, their descriptions are similar to descriptions given above with reference to FIGS. 2A, 2B, 6, and 7 to 12, and thus, their detailed descriptions are omitted.

The magnet 1620 may be disposed on the lower frame 1610*a*. For example, the magnet 1620 may be disposed between a plate 1611 and the lower frame 1610*a*. The lower frame 1610*a* and the plate 1611 may control a magnet flux generated by the magnet 1620. For example, the magnet 1620 may be surrounded by the lower frame 1610*a* and the plate 1611, and thus, the magnet flux generated by the magnet 1620 may be concentrated on the inside of the bobbin 1650*a* so that the leakage of magnetic flux may be suppressed or reduced.

The bobbin 1650*a* may be attached on a rear surface of a bobbin ring 1652*a*. For example, when a sound-generating current is applied to the coil 1660*a* wound around an outer circumference surface of the bobbin 1650*a* and thus a magnetic field is generated in the first sound generating module 1801, the display panel may vibrate based on the magnetic field by the bobbin ring 1652*a*. The bobbin ring 1652*a* may be between the bobbin 1650*a* and the display panel and may transfer a vibration of the bobbin 1650*a* to the display panel. The first sound generating module 1801 may output a sound of a middle-high-pitched sound band.

The second sound generating module 1802 may include the magnet 1620 disposed on the frame, the plate 1611 on the magnet 1620, the second bobbin 1650*b* near the magnet 1620, and a second coil 1660*b* and a second damper 1670*b* near the second bobbin 1650*b*.

A vibration plate 214*b* may be disposed on the second bobbin 1650*b*. For example, the vibration plate 214*b* may be spaced apart from the rear surface of the display panel, and may prevent heat occurring in the second bobbin 1650*b* from being transferred to the display panel.

When the sound-generating current is applied to the second coil 1660*b* wound around an outer circumference surface of the second bobbin 1650*b* and thus a magnetic field is generated in the second sound generating module 1802, the second bobbin 1650*b* may vibrate an air layer or an air gap of a vibration plate peripheral portion by the vibration plate 214*b* based on the magnetic field. For example, a front surface of the second bobbin 1650*b* may contact the vibration plate 214*b*, and may vibrate the vibration plate 214*b* based on a state where a current is applied thereto or not. The second sound generating module 1802 may output sound to a forward region and a rearward region with respect to the vibration plate 214*b*. For example, the second sound generating module 1802 may output a sound of a low-pitched sound band. For example, a sound generated by the vibration plate 214*b* of the second sound generating module 1802 may include a first low-pitched sound generated to an upper portion of the vibration plate 214*b* and a second low-pitched sound generated to a lower portion of the vibration plate 214*b*. For example, the second sound generating module 1802 may be a woofer, but the term is not limited thereto.

The magnet 1620 may be disposed on the lower frame 1610*a*. The plate 1611 may be spaced apart from the vibration plate 214*b*. The second bobbin 1650*b* may be disposed on a rear surface of the vibration plate 214*b*. For example, the second bobbin 1650*b* may surround the magnet 1620 and the plate 1611.

The second damper 1670*b* may be disposed between the first sound generating module 1801 and the second sound generating module 1802. For example, the second damper 1670*b* may be disposed between the damper 1670*a* of the first sound generating module 1801 and the second bobbin 1650*b* of the second sound generating module 1802. For example, the second damper 1670*b* may be disposed between the first sound generating module 1801 and the vibration plate 214*b* of the second sound generating module 1802. The vibration plate 214*b* may not physically contact the first sound generating module 1801. For example, the second damper 1670*b* may prevent sound interference between the first sound generating module 1801 and the second sound generating module 1802. An edge 1670*c* may be disposed on the vibration plate 214*b*. The edge 1670*c* may prevent deformation such as distortion of the vibration plate 214*b* when the vibration plate 214*b* performs a vertical motion, and thus, may provide clean sound quality and may enhance the reliability of the sound generating device 1800. The second damper 1670*b* may be a first suspension, and the edge 1670*c* may be a second suspension.

The magnet 1620 of the first sound generating module 1801 and the magnet 1620 of the second sound generating module 1802 may have magnetic fields in opposite directions. The first sound generating module 1801 may directly vibrate the display panel to output sound of a high-pitched sound band to a forward region in front of the display panel, and the second sound generating module 1802 may output sound of a low-pitched sound band to a rearward region behind the display panel. Accordingly, because the first sound generating module 1801 and the second sound generating module 1802 have the magnetic fields in opposite directions, a vibration of the first sound generating module 1801 and the second sound generating module 1802 may be independently driven or controlled.

Therefore, the woofer-integrated sound generating device may include a woofer disposed near the sound generating device. The sound generating device may be disposed on the rear surface of the display panel and may generate a sound of a middle-high-pitched sound band, and the woofer may be spaced apart from the rear surface of the display panel and may perform a vertical vibration to generate a sound of a low-pitched sound band. For example, the sound generating device and the woofer may be driven based on different sound signals or voice signals applied thereto. Accordingly, the sound of the low-pitched sound band may be enhanced by the woofer-integrated sound generating device.

When the sound generating device described above with reference to FIGS. 6 to 13 is applied to a display apparatus, the sound generating device may be provided in at least two regions of three regions. For example, the sound generating device may be disposed in a left region and a right region of the display apparatus, and a left sound and a right sound may be output to a forward region in front of a display panel. For example, the present inventors have recognized that a sound of the display panel in a left-right direction is output, but a sound of the display panel in an upward-downward direction is not output. A plurality of sound generating devices may be disposed for enhancing the sound of the display panel in the upward-downward direction, but when the plurality of sound generating devices are disposed, a problem where a thickness of the display apparatus is thickened may occur. Also, to output a stereo sound, an additional speaker may be disposed near the display apparatus. Since the speaker should need to control a distance to a user based on a desired frequency, there may be problem where a speaker should be disposed based on a location of a user or a position of an image. Therefore, the present inventors have performed various experiments for implementing a sound generating device where a thickness of a display apparatus is not thickened and which realizes a left sound, a right sound, a height sound (or a top sound), and a bottom sound based on an image. For example, sound can be emitted from the left, right, top and bottom of the display apparatus or display panel, thus realizing a surround sound. Through the various experiments, the present inventors have invented a display apparatus including a sound generating device having a new structure, which realizes a left sound, a right sound, a height sound (or a top sound), and a bottom sound. This will be described below with reference to FIGS. 15A to 27I.

Hereinafter, in embodiments, descriptions described with respect to FIGS. 15A to 15I will be given and may be identically or similarly applied to embodiments of FIGS. 16A to 27I.

FIGS. 15A to 15I illustrate an embodiment of the sound generating device and a partition according to an embodiment of the present disclosure.

With reference to FIGS. 15A to 15I, a display panel that displays an image and includes a first region 1, a second region 2, a third region 3, a fourth region 4, and a fifth region 5. For example, a rear surface of the display panel may include first to sixth regions 1 to 6. The first to sixth regions 1 to 6 may have the same area, but are not limited thereto. For example, the first to sixth regions 1 to 6 may be arranged at equal intervals or distances. For example, all channels of sound generating devices disposed in the first to sixth regions 1 to 6 may reproduce or output sounds having the same frequency domain, and thus, sound harmony between the channels may be uniform. Therefore, a sound quality difference between a case (for example, a case where a sound field is widened) having an acoustic effect and a case (for example, a case where a sound field is not widened) having no acoustic effect may decrease, and uniform or constant sound quality may be realized. As another example, the first region 1, the second region 2, and the third region 3 may have an area that are greater than those of the fourth region 4, the fifth region 5, and the sixth region 6. For example, a low-pitched sound range of a left-right stereo may be reinforced, and thus, the quality of a normal sound having no acoustic effect may be enhanced. As another example, the fourth region 4, the fifth region 5, and the sixth region 6 may have an area that are less than those of the first region 1, the second region 2, and the third region 3. For example, a low-pitched sound range of a channel associated with an acoustic effect may be reinforced, and thus, in a case which reproduces or generates a sound having an acoustic effect, a sound field which is a space for expressing or generating a sound may increase, thereby enhancing an acoustic effect expressing a position of a sound. Accordingly, a size of the first to sixth regions 1 to 6 may be adjusted based on a desired-pitched sound band. For example, the first region 1 and the fourth region 4 may be left regions of the rear surface of the display panel. For example, the second region 2 and the fifth region 5 may be right regions of the rear surface of the display panel. For example, the third region 3 and the sixth region 6 may be a center region of the rear surface of the display panel. Description relevant thereto may be identically or similarly applied to FIGS. 15A to 18I.

At least one sound generating device may be disposed in at least one or more of the first region 1, the second region 2, the third region 3, the fourth region 4, the fifth region 5, and a sixth region 6. Hereinafter, in embodiments, an example where a sound generating device is disposed on a rear surface of the display panel will be described, and embodiments are not limited thereto. In other embodiments, a sound generating device may be disposed between the display panel and a supporting member, and for example, may be disposed between the rear surface of the display panel and a front surface of the supporting member. For example, a first sound generating device 1600L may be disposed in the first region 1 of the rear surface of the display panel, a fourth sound generating device 1600HL may be disposed in the fourth region 4 of the rear surface of the display panel. A second sound generating device 1600R may be disposed in the second region 2 of the rear surface of the display panel, a fifth sound generating device 1600HR may be disposed in the fifth region 5 of the rear surface of the display panel. A third sound generating device 1600C may be disposed in the third region 3 of the rear surface of the display panel. The first sound generating device 1600L may be a left channel of the display panel, the fourth sound generating device 1600HL may be a height (or a top) left channel of the display panel. The second sound generating device 1600R may be a right channel of the display panel, the fifth sound generating device 1600HR may be a height (or top) right channel of the display panel. The third sound generating device 1600C may be a center channel of the display panel.

For example, the first sound generating device 1600L may be disposed to be symmetrical with the fourth sound generating device 1600HL, but embodiments are not limited thereto. For example, the first sound generating device 1600L may be disposed on the same line as the fourth sound generating device 1600HL, but embodiments are not limited thereto. For example, the second sound generating device 1600R may be disposed to be symmetrical with the fifth sound generating device 1600HR, but embodiments are not limited thereto. For example, the first sound generating device 1600L and the fourth sound generating device 1600HL may be disposed to be symmetrical with the second sound generating device 1600R and the fifth sound generating device 1600HR, but embodiments are not limited thereto. For example, the first sound generating device 1600L and the second sound generating device 1600R may be disposed on the same line as the third sound generating device 1600C, but embodiments are not limited thereto.

In FIGS. 15A to 15I, a first sound generating device 1600L, a second sound generating device 1600R, a third sound generating device 1600C, a fourth sound generating device 1600HL, and a fifth sound generating device 1600HR may include one or more of an oval sound generating device, a pair of sound generating devices, a circular sound generating device, a single-type sound generating device, a two or more-array sound generating device, and a film-type sound generating device described above with respect to FIGS. 5 to 13. The oval shape may have an elliptical shape, a rectangular shape with rounded corners, or non-circular curved shape having a width different from its height, but the present embodiment is not limited thereto. For example, in the bobbin of the oval shape, a ratio of a long-axis diameter to a short-axis diameter may be set to 1.3:1 to 2:1. The bobbin of the oval shape may more improve a sound of a high-pitched sound band than a circular shape and may decrease the occurrence of heat caused by a vibration, and thus, may have an excellent heat dissipation characteristic. For example, at least one sound generating device may directly vibrate the display panel to generate a sound. A description thereof may be identically or similarly applied to embodiments of FIGS. 15A to 27I.

Since a plurality of sound generating devices are provided, a thickness of a display apparatus may be thickened. In order to implement a display apparatus having a thin thickness, a thickness of a substrate included in the display apparatus may be thinly adjusted. Since the thickness of the substrate is thinned, when a partition is provided on the rear surface of the display panel or a front surface of a supporting member, a problem where the display panel or the supporting member is not flat and a step height is formed in the display panel or the supporting member occurs due to the partition when the display panel and the supporting member are attached to the partition.

A sound wave that is generated when the display panel vibrates by the sound generating device may be spread radially from a center of the sound generating device and may travel. The sound wave may be referred to as a progressive wave. The progressive wave may be reflected at one side of a partition to generate a reflected wave, and the reflected wave may travel in a direction opposite to the progressive wave. The reflected wave overlaps and interferes with the progressive wave and does not travel, thereby generating a standing wave that stands at a certain position. A sound pressure is reduced by the standing wave, and for this reason, a sound output characteristic is deteriorated.

When the partition is provided, it is unable to control the peak and the dipping caused by the standing wave, and thus, the present inventors have recognized that one side of the partition should have a structure for controlling the peak and the dipping caused by the standing wave. Here, the peak may be a phenomenon where a sound pressure bounces in a specific frequency, and the dipping may be a phenomenon where generating of a specific frequency is suppressed, and thus, a low sound pressure is generated. A sound output characteristic of the sound generating devices is reduced by the peak or the dipping. A structure for controlling the peak or the dipping should be configured to prevent the wave phenomenon and to enable the peak and the dipping caused by the standing wave to be easily controlled. The structure is not simply implemented but has been implemented through various experiments. Therefore, a pad may be provided in the partition so as to decrease a peak and dipping that are caused by a standing wave occurring in a lengthwise direction of the sound generating device. Therefore, the phenomenon of sound pressure reduction caused by the standing wave generated by interference between the reflected wave and the progressive wave may be reduced by the pad. However, due to a shape of the pad, a screen of the display panel may be unevenly seen, and a problem where the display panel or the supporting member is not flat and is unevenly seen may occur. Such a phenomenon may be referred to as an uneven phenomenon or a wave phenomenon of the display panel or the supporting member, and the term is not limited thereto. Therefore, the present inventors have performed various experiments. Through the various experiments, the present inventors have recognized that the partition should be disposed along a shape of the display panel. For example, the partition may have a tetragonal (e.g., quadrilateral) shape, but is not limited thereto. In other embodiments, a shape of the partition may be modified based on a shape of the display panel. When the display panel is a curved display panel having a curve shape or the like, the partition may have a curved shape or a curve shape. Accordingly, the partition may be disposed along a shape of the display panel, and thus, a degree to which the display panel is pulled may be reduced in a process of attaching the supporting member 300 on the display panel, thereby preventing the wave phenomenon.

A shape of the pad may be implemented to prevent the wave phenomenon from occurring when the display panel 100 is pulled in a process of attaching a pad, disposed on the supporting member, on the display panel 100. Alternatively, a shape of the pad may be implemented to prevent the wave phenomenon from occurring when the display panel 100 is pulled in a process of attaching the pad, disposed on the display panel 100, on the supporting member. For example, a shape of the pad should be implemented to prevent the wave phenomenon and to enable the peak and the dip caused by the standing wave to be easily controlled. The pad has been implemented in a tetragonal (e.g., quadrilateral) shape or a corner-rounded tetragonal shape through various experiments. This will be described below with reference to FIGS. 15B to 15I. A description thereof may be identically or similarly applied to embodiments of FIGS. 16A to 27I.

Figure 15A:
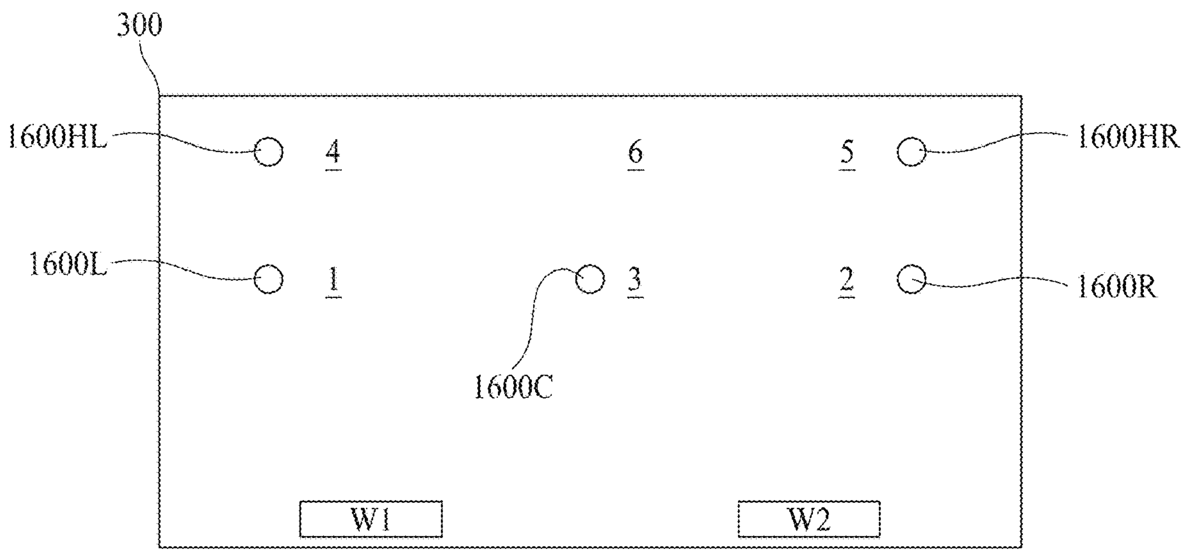
FIGS. 15A to 15I illustrate an embodiment of the sound generating device and a partition according to an embodiment of the present disclosure.
Figure 15B:
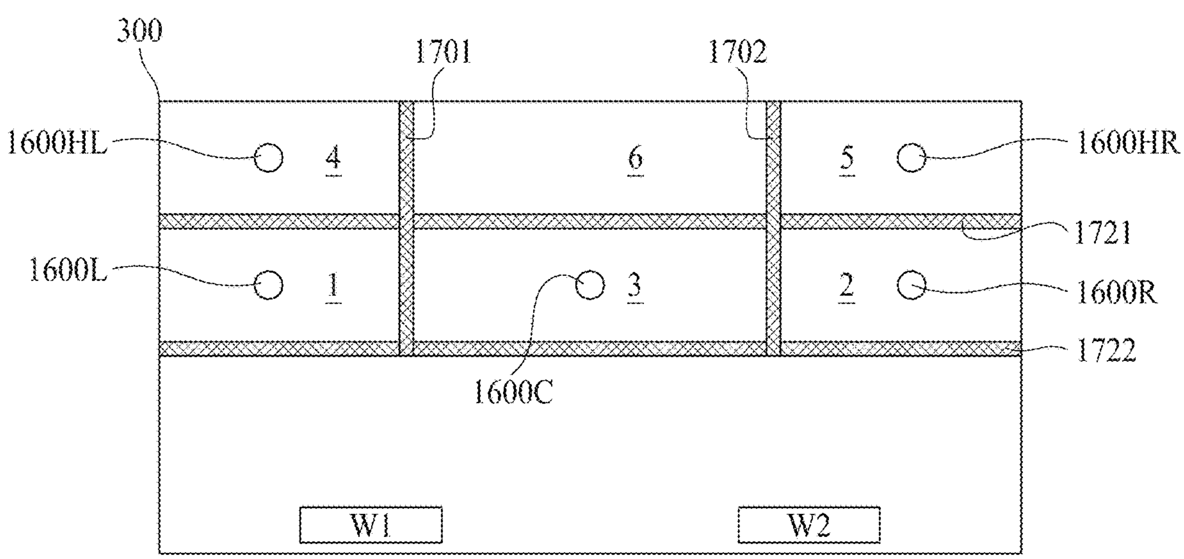

With reference to FIG. 15B, a partition may be further provided near a sound generating device. The partition may be an air gap or a space where a sound is generated when the display panel vibrates. An air gap or a space which generates or transfers a sound may be referred to as a partition. The partition may separate sounds or may separate channels, and may prevent or decrease the occurrence of a non-clear sound caused by sound interference. The partition may be referred to as an enclosure or a baffle, but the term is not limited thereto. In embodiments, an example where the partition is disposed at a supporting member will be described, but an embodiment of the present disclosure is not limited thereto. In other embodiments, the partition may be disposed on a rear surface of the display panel. In order to illustrate the sound generating device and the partition, an example where the partition is disposed at the supporting member will be described. For example, when the partition is disposed at the supporting member, an influence of the image quality of the display panel due to the partition disposed on the display panel may be reduced.

A partition may separate a left sound and a right sound which are output from a sound generating device disposed on a rear surface of a display panel. For example, the partition may be disposed between a supporting member 300 and the display panel 100 corresponding to first to sixth regions 1 to 6 of the display panel 100. For example, a fourth partition 1701 may be disposed between the first and fourth regions 1 and 4 and the third region 3. For example, the fourth partition 1701 may be disposed between the first and fourth regions 1 and 4 and between the third and sixth regions 3 and 6. A fifth partition 1702 may be disposed between the second and fifth regions 2 and 5 and the third region 3. For example, the fifth partition 1702 may be disposed between the second and fifth regions 2 and 5 and between the third and sixth regions 3 and 6. The fourth partition 1701 and the fifth partition 1702 may separate a left channel and a right channel or a left sound and a right sound generated in first and fourth sound generating devices 1600L and 1600HL, and second and fifth sound generating devices 1600R and 1600HR. To realize a stereo sound or a stereophonic sound, the fourth sound generating device 1600HL and the fifth sound generating device 1600HR may be further provided, but the inventors have recognized that a partition should be provided for separating sounds or channel, generated by the fourth sound generating device 1600HL and the fifth sound generating device 1600HR, from sounds or channel generated by the first sound generating device 1600L, the second sound generating device 1600R, and the third sound generating device 1600C. When a fourth partition 1701 and a fifth partition 1702 are provided, the inventors have recognized that left and right sounds or left and right channels may be separated from each other, but an upper sound or an upper channel may not be separated. In order for sound generating devices disposed in regions of the rear surface of the display panel to realize an independent sound for each region, the present inventors have recognized that a partition for generating a sound of each of the sound generating devices should be provided. Therefore, the present inventors have implemented a partition through various experiments. This will be described below.

The partition may be configured to separate a height channel (or a top channel) of the display panel and a bottom channel of the display panel. For example, a first partition 1721 may separate the height channel (or a top channel) of the display panel and the bottom channel of the display panel. For example, the first partition 1721 may separate the channels or the sounds, generated by the fourth sound generating device 1600HL and the fifth sound generating device 1600HR disposed at an upper portion of the display panel, and the channels or the sounds generated by the first sound generating device 1600L, the second sound generating device 1600R, and a third sound generating device 1600C disposed at a lower portion of the display panel. A second partition 1722 may separate the channels of the lower portion of the display panel and a woofer. For example, a second partition 1722 may be disposed under the first sound generating device 1600L or at the lower portion of the first sound generating device 1600L, the second sound generating device 1600R, and the third sound generating device 1600C. For example, the second partition 1722 may be separated the channels or the sounds, generated by the first sound generating device 1600L, the second sound generating device 1600R, and the third sound generating device 1600C, and the channels or the sounds generated by a first woofer W1 and a second woofer W2.

The first partition 1721, the second partition 1722, the fourth partition 1701, and the fifth partition 1702 may be disposed at the supporting member 300. For example, the first partition 1721, the second partition 1722, the fourth partition 1701, and the fifth partition 1702 may be disposed on a front surface of the supporting member 300. For example, the first partition 1721, the second partition 1722, the fourth partition 1701, and the fifth partition 1702 may be disposed between the display panel 100 and the supporting member 300. For example, the first partition 1721, the second partition 1722, the fourth partition 1701, and the fifth partition 1702 may be disposed between the rear surface of the display panel 100 and the front surface of the supporting member 300.

The first partition 1721, the second partition 1722, the fourth partition 1701, and the fifth partition 1702 may be formed of one or more of a double-sided tape, a double-sided foam pad, a single-sided tape, a single-sided foam pad, an adhesive, and a bond, but embodiments are not limited thereto. When the partitions are formed of the double-sided tape or the double-sided foam pad, an adhesive force may be enhanced in a process of attaching the rear surface of the display panel 100 and the front surface of the supporting member 300. For example, the first partition 1721, the second partition 1722, the fourth partition 1701, and the fifth partition 1702 may include a material having an elastic force which enables compression to be made to a certain degree, and for example, may include polyurethane, polyolefin, polyethylene, and/or the like, but embodiments are not limited thereto.

The fourth sound generating device 1600HL may be provided in the fourth region 4, the fifth sound generating device 1600HR may be provided in the fifth region 5, and a sound generating device may not be provided in the sixth region 6. Therefore, vibrations of the fourth sound generating device 1600HL and the fifth sound generating device 1600HR may be attenuated or absorbed by the sixth region 6 of the display panel 100, and thus, the transfer of a sound of the fourth region 4 to the fifth region 5 may be blocked or reduced and the transfer of a sound of the fifth region 5 to the fourth region 4 may be blocked or reduced. Accordingly, the degradation in sound quality caused by interference between sounds generated by the fourth sound generating device 1600HL and the fifth sound generating device 1600HR may be reduced, and a sound characteristic of a middle-high-pitched sound band may be more enhanced.

In FIG. 15B, a partition may not be disposed near the supporting member 300 or periphery of the supporting member 300. The supporting member 300 may be attached on the display panel 100 by the adhesive member described above with respect to FIG. 1B at a position near the supporting member 300, and the adhesive member may be as a partition.

In a process of placing the first partition 1721, the second partition 1722, the fourth partition 1701, and the fifth partition 1702, the first partition 1721 and the second partition 1722 may be first placed, and then, the fourth partition 1701 and the fifth partition 1702 may be placed subsequently. As another example, the fourth partition 1701 and the fifth partition 1702 may be first placed, and then, the first partition 1721 and the second partition 1722 may be placed subsequently. However, an order in which the partitions are placed does not limit descriptions of the embodiment of the present disclosure. In the following embodiments, an example where the first partition 1721 and the second partition 1722 may be first placed, and then, the fourth partition 1701 and the fifth partition 1702 may be placed subsequently is illustrated, but an embodiment of the present disclosure is not limited thereto. Such a description may be identically or similarly applied to the following embodiments.

Therefore, the first sound generating device 1600L and the fourth sound generating device 1600HL may be disposed in the first region 1 and the fourth region 4 that are a left region of a rear surface of the display panel 100, and may vibrate a left region of the display panel 100. The second sound generating device 1600R and the fifth sound generating device 1600HR may be disposed in the second region 2 and the fifth region 5 that are a right region of the rear surface of the display panel 100, and may vibrate a right region of the display panel 100. The third sound generating device 1600C may be disposed in the third region 3 that is a center region of the rear surface of the display panel 100, and may vibrate a center region of the display panel 100. The first sound generating device 1600L, the second sound generating device 1600R, the third sound generating device 1600C, the fourth sound generating device 1600HL, and the fifth sound generating device 1600HR may receive different vibration signals, and may each be independently driven. For example, the first sound generating device 1600L and the fourth sound generating device 1600HL may generate sounds by the left region of the rear surface of the display panel 100 as a vibration plate, and the second sound generating device 1600R and the fifth sound generating device 1600HR may generate sounds by the right region of the rear surface of the display panel 100 as a vibration plate. Also, the third sound generating device 1600C may generate a sound by the center region of the display panel 100 as a vibration plate. A woofer may be disposed for more enhancing a sound of a low-pitched sound band. For example, one or more woofers may be further disposed under at least one of the first sound generating device 1600L and the second sound generating device 1600R or at a lower portion of at least one of the first sound generating device 1600L and the second sound generating device 1600R. For example, a first woofer W1 may be disposed under the first region 1 of the display panel 100 or at a lower portion of the first region 1 of the display panel 100. For example, the first woofer W1 may be disposed under the first sound generating device 1600L or at a lower portion of the first sound generating device 1600L. For example, a second woofer W2 may be disposed under the second region 2 of the display panel 100 or at a lower portion of the second region 2 of the display panel 100. For example, the second woofer W2 may be disposed under the second sound generating device 1600R or at a lower portion of the second sound generating device 1600R. Therefore, the first woofer W1 and the second woofer W2 may output sounds of a low-pitched sound band. The first sound generating device 1600L, the second sound generating device 1600R, the third sound generating device 1600C, the fourth sound generating device 1600HL, and the fifth sound generating device 1600HR may output sounds of about 80 Hz to about 40 kHz, and the first woofer W1 and the second woofer W2 may output sounds of 80 Hz or less. Accordingly, the display apparatus may output a 5.1-channel sound. Moreover, comparing with sound generating devices disposed on the left and the right of the display panel, since sound generating devices are further provided at an upper portion and a lower portion of the display panel with respect to a widthwise direction of the display panel, left and right sounds and height (or top_ and bottom sounds may be enhanced, and a user may feel a sense of sound field like a real sound. For example, since the fourth sound generating device 1600HL and the fifth sound generating device 1600HR are further provided, a sound may be output from an upper portion of the display panel 100, thereby providing a display apparatus for realizing a stereo sound including left and right sounds and height (or top) and bottom sounds. Therefore, left and right sounds corresponding left and right images and height (or top) and bottom sounds corresponding to upper and lower images may be realized, and a real stereo sound of a real sound including stereo left and right sounds and stereo height (or top) and bottom sounds may be realized, thereby providing a user with a real sound instead of a virtual sound. Therefore, a real stereo sound or surround sound of a real sound including stereo left and right sounds and stereo height (or top) and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV (Audio Visual) or Dolby sound system. A description thereof may be identically or similarly applied to embodiments of FIGS. 15B to 27I. Also, when a thick sound generating device is provided in plurality, there is a problem where a display apparatus is thickened due to a thickness of the sound generating device. As described above with respect to FIGS. 6 to 11B, the first sound generating device 1600L, the second sound generating device 1600R, the third sound generating device 1600C, the fourth sound generating device 1600HL, and the fifth sound generating device 1600HR may be disposed in the display panel 100. Therefore, a thickness of a sound generating device may be reduced, and thus, a thickness of a display apparatus may decrease, thereby providing a display apparatus for providing a sense of beauty to a user. Also, as described above with respect to FIGS. 12A and 12B, the first sound generating device 1600L, the second sound generating device 1600R, the third sound generating device 1600C, the fourth sound generating device 1600HL, and the fifth sound generating device 1600HR may be configured as a sound generating device with enhanced low-pitched sound band, thereby providing a display apparatus for realizing left and right sounds and upper and lower sounds of an enhanced low-pitched sound band. Also, as described above with respect to FIG. 13, the first sound generating device 1600L, the second sound generating device 1600R, the third sound generating device 1600C, the fourth sound generating device 1600HL, and the fifth sound generating device 1600HR may be configured as a film-type sound generating device, and thus, a thickness of a sound generating device may be reduced to decrease a thickness of a display apparatus, thereby providing a display apparatus for providing a sense of beauty to a user. For example, a middle-pitched sound band may be 200 Hz to 3 kHz, a high-pitched sound band may be 3 kHz or more, and a low-pitched sound band may be 200 Hz or less. However, embodiments are not limited thereto.

Figure 15C:
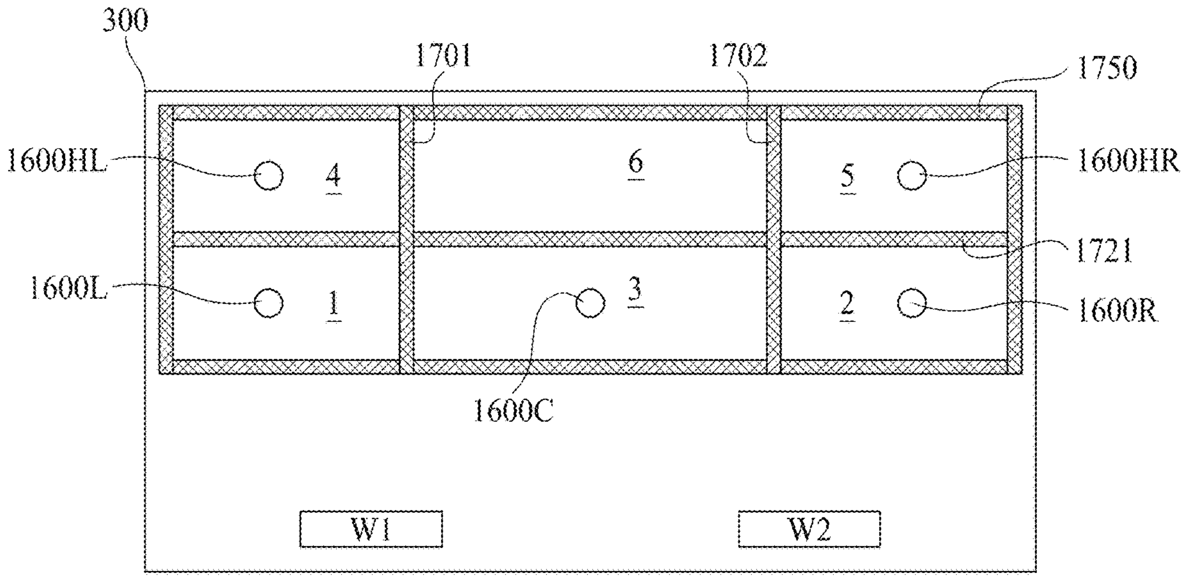

With reference to FIG. 15C, a first partition 1721, a fourth partition 1701, and a fifth partition 1702 may be provided, and a partition 1750 may be disposed between a supporting member 300 and a display panel. For example, the partition 1750 may be disposed at an edge or periphery of the supporting member 300. For example, the partition 1750 may be disposed at an edge or periphery of a front surface of the supporting member 300. The partition 1750 may be a whole region of four outer sides of the front surface of the supporting member 300. As another example, the partition 1750 may be disposed at an edge or periphery of the rear surface of the display panel. The partition 1750 may be a whole region of four outer sides of the rear surface of the display panel 100. The partition 1750 may be a whole region of four outer sides of the rear surface of the supporting member 300 or the four outer sides of the rear surface of the display panel 100. For example, the partition 1750 may be disposed to surround a first sound generating device 1600L, a second sound generating device 1600R, a third sound generating device 1600C, a fourth sound generating device 1600HL, and a fifth sound generating device 1600HR. The partition 1750 may be disposed along a shape of the display panel 100 so as to prevent a wave phenomenon of the display panel 100. For example, when the partition 1750 is an adhesive member for attaching the display panel 100 and the supporting member 300 described above with reference to FIG. 1B, the adhesive member described above with reference to FIG. 1B may be omitted, and the partition 1750 may be as an adhesive member. However, an embodiment of the present disclosure is not limited thereto, and an adhesive member for attaching the display panel 100 and the supporting member 300 may be provided on a rear surface of the display panel 100 or at a front surface of the supporting member 300.

In a process of placing the first partition 1721, the fourth partition 1701, the fifth partition 1702, and the partition 1750, the first partition 1721 may be first placed, the partition 1750 may be placed, and the fourth partition 1701 and the fifth partition 1702 may be placed subsequently. As another example, the first partition 1721 may be first placed, the fourth partition 1701 and the fifth partition 1702 may be placed, and the partition 1750 may be placed subsequently. However, an order in which the partitions are placed does not limit descriptions of the embodiment of the present disclosure. The partition 1750 may be first placed in a lengthwise direction of the supporting member 300, and then, may be placed in a widthwise direction of the supporting member 300. As another example, the partition 1750 may be first placed in a widthwise direction of the supporting member 300, and then, may be placed in a lengthwise direction. However, an order in which the partitions are placed does not limit descriptions of the embodiment of the present disclosure. In the following embodiments, an example where the first partition 1721 is first placed, the partition 1750 is placed, and the fourth partition 1701 and the fifth partition 1702 are placed subsequently is illustrated, but an embodiment of the present disclosure is not limited thereto. Such a description may be identically or similarly applied to the following embodiments.

Figure 15D:
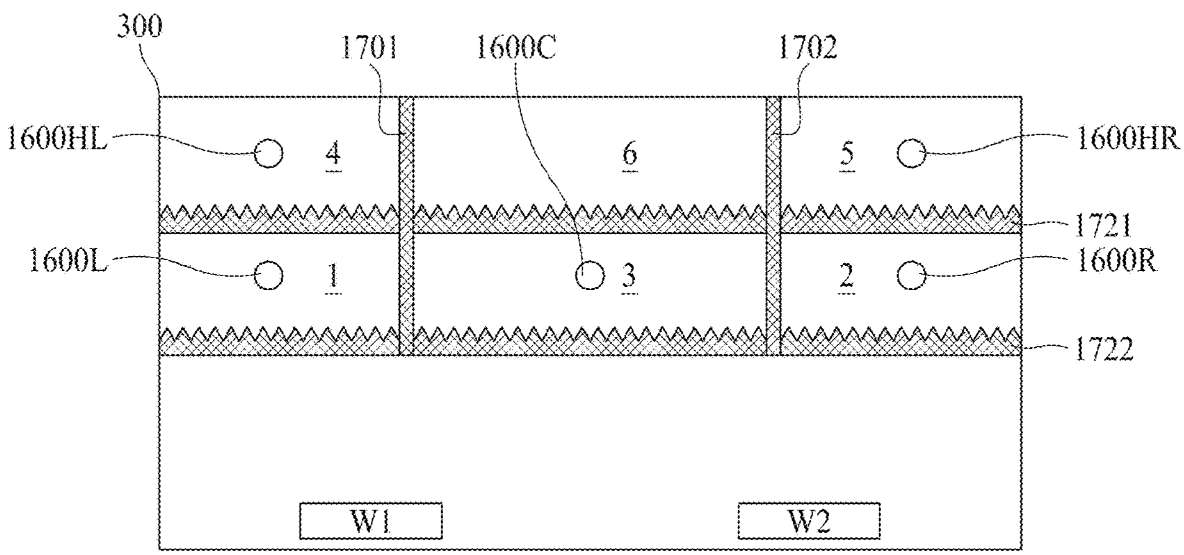
Figure 15E:
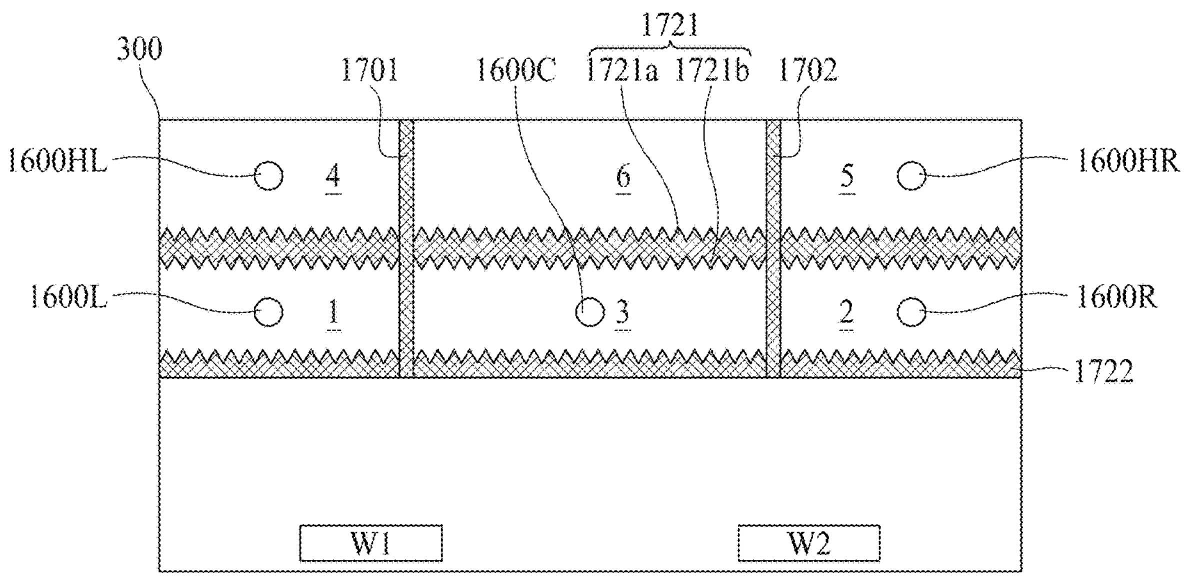

With reference to FIGS. 15D and 15E, a shape of a first partition 1721 and a shape of a second partition 1722 may be differently implemented. A shape of the first partition 1721 and a shape of the second partition 1722 may differ from a shape of a display panel. For example, the first partition 1721 and the second partition 1722 may have a non-flat shape or may not have a linear shape. For example, the first partition 1721 and the second partition 1722 may have a saw-toothed shape, a triangular shape, and an end-rounded triangular shape. For example, sawtooth of the first partition 1721 and the second partition 1722 may be disposed toward a sound generating device. For example, when the first partition 1721 and the second partition 1722 have a triangular shape, an end of a triangle may be disposed toward a sound generating device. For example, when the first partition 1721 and the second partition 1722 have an end-rounded triangular shape, an end of an end-rounded triangle may be disposed toward a sound generating device. For example, with reference to FIG. 15D, when the first partition 1721 has an end-rounded triangular shape, an end of an end-rounded triangle may be provided toward a fourth sound generating device 1600HL and a fifth sound generating device 1600HR. For example, with reference to FIG. 15D, when the second partition 1722 has an end-rounded triangular shape, an end of an end-rounded triangle may be provided toward a first sound generating device 1600L, a second sound generating device 1600R, and a third sound generating device 1600C. Accordingly, since a shape of a partition is provided toward at least one sound generating device, a peak or a dip phenomenon caused by a standing wave of the sound generating device may be controlled, and a wave phenomenon of a display panel may be reduced. Also, by modifying a shape of a partition, sound interference such as diffused reflection of a sound generating device may be solved.

When a partition has a non-flat shape or does not have a linear shape, the partition may diffuse a standing wave. For example, when a partition is implemented in a saw-toothed shape, a triangular shape, and an end-rounded triangular shape, a standing wave may be diffused in various directions by the saw-toothed shape, the triangular shape, and the end-rounded triangular shape, thereby enhancing a sound output characteristic.

With reference to FIG. 15E, a first partition 1721 may be provided as two partitions, but embodiments are not limited thereto. For example, the first partition 1721 may include a 1-1$^{st}$ partition 1721*a* and a 1-2$^{nd}$ partition 1721*b*, and may be configured in an end-rounded triangular shape. An end of a triangular or end-rounded triangular shape of the 1-1$^{st}$ partition 1721*a* may be provided to face a fourth sound generating device 1600HL and a fifth sound generating device 1600HR. An end of a triangular or end-rounded triangular shape of the 1-2$^{nd}$ partition 1721*b* may be provided to face a first sound generating device 1600L, a second sound generating device 1600R, and a third sound generating device 1600C. An end of a triangular or end-rounded triangular shape of a second partition 1722 may be provided to face the first sound generating device 1600L, the second sound generating device 1600R, and the third sound generating device 1600C. Accordingly, a peak or a dip phenomenon caused by a standing wave of a sound generating device may be controlled, and a wave phenomenon of a display panel may be reduced.

With reference to FIGS. 15F to 15I, a pad may be further provided on at least one side of a partition. A standing wave that causes the sound pressure to be reduced is greatly generated at a position at which a level of a progressive wave and a reflected wave is high. Therefore, the pad may be disposed at a position at which a level of a sound wave transferred from a sound generating device is highest. For example, the pad may be disposed on one or more sides, which a strongest sound wave reaches, of the partition and may be configured toward the sound generating device.

Figure 15F:
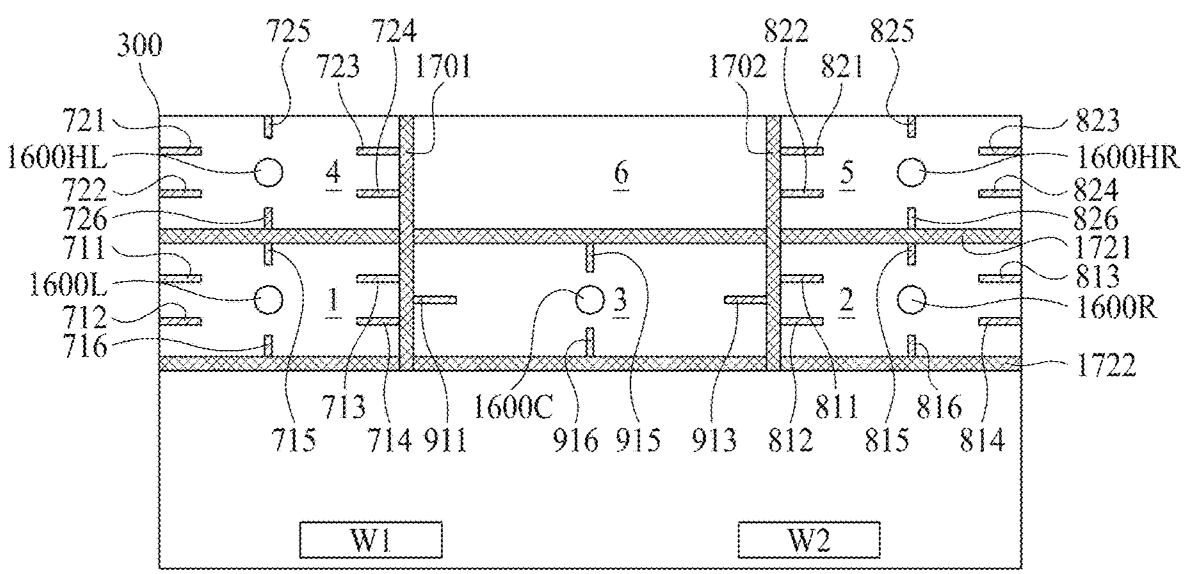

With reference to FIG. 15F, a pad may be disposed on at least one side of a fourth partition 1701 to face or toward one or more of a first sound generating device 1600L and a fourth sound generating device 1600HL. For example, a 1-3$^{rd}$ pad 713 and a 1-4$^{th}$ pad 714 may be disposed on at least one side of the fourth partition 1701 to face or toward the first sound generating device 1600L. A 1-1$^{st}$ pad 711 and a 1-2$^{nd}$ pad 712 may be disposed on a side facing the 1-3$^{rd}$ pad 713 and the 1-4$^{th}$ pad 714. The 1-1$^{st}$ to 1-4$^{th}$ pads 711 to 714 may be provided as two, but embodiments are not limited thereto. One or more of the 1-1$^{st}$ to 1-4$^{th}$ pads 711 to 714 may be provided as one, two, or three or more. For example, a 4-3$^{rd}$ pad 723 and a 4-4$^{th}$ pad 724 may be disposed on at least one side of the fourth partition 1701 to face or toward the fourth sound generating device 1600HL. A 4-1$^{st}$ pad 721 and a 4-2$^{nd}$ pad 722 may be disposed on a side facing the 4-3$^{rd}$ pad 723 and the 4-4$^{th}$ pad 724. The 4-1$^{st}$ to 4-4$^{th}$ pads 721 to 724 may be provided as two, but embodiments are not limited thereto. One or more of the 4-1$^{st}$ to 4-4$^{th}$ pads 721 to 724 may be provided as one, two, or three or more. For example, a 3-1$^{st}$ pad 911 may be disposed on at least other side of the fourth partition 1701 to face a third sound generating device 1600C. The 3-1$^{st}$ pad 911 may be provided as one or more.

A pad may be disposed on at least one side of a fifth partition 1702 to face or toward one or more of a second sound generating device 1600R and a fifth sound generating device 1600HR. For example, a 2-1$^{st}$ pad 811 and a 2-2$^{nd}$ pad 812 may be disposed on at least one side of the fifth partition 1702 to face or toward the second sound generating device 1600R. A 2-3$^{rd}$ pad 813 and a 2-4$^{th}$ pad 814 may be disposed on a side facing the 2-1$^{st}$ pad 811 and the 2-2$^{nd}$ pad 812. In FIG. 15F, the 2-1$^{st}$ to the 2-4$^{th}$ pads 811 to 814 may be provided as two, but embodiments are not limited thereto. One or more of the 2-1$^{st}$ to the 2-4$^{th}$ pads 811 to 814 may be provided as one, two, or three or more. For example, a 5-1$^{st}$ pad 821 and a 5-2$^{nd}$ pad 822 may be disposed on at least one side of the fifth partition 1702 to face or toward the fifth sound generating device 1600HR. A 5-3$^{rd}$ pad 823 and a 5-4$^{th}$ pad 824 may be disposed on a side facing the 5-1$^{st}$ pad 821 and the 5-2$^{nd}$ pad 822. The 5-1$^{st}$ to the 5-4$^{th}$ pads 821 to 824 may be provided as two, but embodiments are not limited thereto. One or more of the 5-1$^{st}$ to the 5-4$^{th}$ pads 821 to 824 may be provided as one, two, or three or more. For example, a 3-3$^{rd}$ pad 913 may be disposed on at least other side of the fifth partition 1702 to face or toward the third sound generating device 1600C. The 3-3$^{rd}$ pad 913 may be provided as one or more. The 3-3$^{rd}$ pad 913 may be disposed on a side facing the 3-1$^{st}$ pad 911.

A pad may be disposed on at least one side of a first partition 1721 to face or toward one or more of the first sound generating device 1600L, the second sound generating device 1600R, and the third sound generating device 1600C. For example, a 1-5$^{th}$ pad 715 may be disposed on at least one side of the first partition 1721 to face or toward the first sound generating device 1600L. For example, a 2-5$^{th}$ pad 815 may be disposed on at least one side of the first partition 1721 to face or toward the second sound generating device 1600R. For example, a 3-5$^{th}$ pad 915 may be disposed on at least one side of the first partition 1721 to face or toward the third sound generating device 1600C. For example, a 4-6$^{th}$ pad 726 may be disposed on at least other side of the first partition 1721 to face the fourth sound generating device 1600HL. For example, a 5-6$^{th}$ pad 826 may be disposed on at least other side of the first partition 1721 to face or toward the fifth sound generating device 1600HR. For example, the 1-5$^{th}$ pad 715, the 2-5$^{th}$ pad 815, the 3-5$^{th}$ pad 915, the 4-6$^{th}$ pad 726, and the 5-6$^{th}$ pad 826 may be provided as one or more, but embodiments are not limited thereto. For example, a 4-5$^{th}$ pad 725 may be disposed on a side facing the 4-6$^{th}$ pad 726, and the 4-5$^{th}$ pad 725 may be disposed to face or toward the fourth sound generating device 1600HL. A 5-5$^{th}$ pad 825 may be disposed on a side facing the 5-6$^{th}$ pad 826, and the 5-5$^{th}$ pad 825 may be disposed to face or toward the fifth sound generating device 1600HR.

For example, a 1-6$^{th}$ pad 716 may be disposed on at least one side of a second partition 1722 to face or toward the first sound generating device 1600L. For example, a 2-6$^{th}$ pad 816 may be disposed on at least one side of the second partition 1722 to face the second sound generating device 1600R. For example, a 3-6$^{th}$ pad 916 may be disposed on at least one side of the second partition 1722 to face or toward the third sound generating device 1600C. The 1-6$^{th}$ pad 716, the 2-6$^{th}$ pad 816, and the 3-6$^{th}$ pad 916 may be provided as one or more, but embodiments are not limited thereto. For example, a 1-5$^{th}$ pad 715 may be disposed on a side facing the 1-6$^{th}$ pad 716, and the 1-5$^{th}$ pad 715 may be disposed to face or toward the first sound generating device 1600L. A 2-5$^{th}$ pad 815 may be disposed on a side facing the 2-6$^{th}$ pad 816, and the 2-5$^{th}$ pad 815 may be disposed to face or toward the second sound generating device 1600R. A 3-5$^{th}$ pad 915 may be disposed on a side facing the 3-6$^{th}$ pad 916, and the 3-5$^{th}$ pad 915 may be disposed to face or toward the third sound generating device 1600C.

In embodiments of the present disclosure, sizes of the 1-1$^{st}$ pad 711 to the 1-4$^{th}$ pad 714 are illustrated to be greater than that of each of the 1-5$^{th}$ pad 715 and the 1-6$^{th}$ pad 716, but a size of each pad does not limit descriptions of the present disclosure. For example, sizes of the 1-1$^{st}$ pad 711 to the 1-4$^{th}$ pad 714 may be equal to or smaller than that of each of the 1-5$^{th}$ pad 715 and the 1-6$^{th}$ pad 716. This may be identically applied to the other pads. In FIG. 15F, a partition may not be disposed near or periphery of the supporting member 300. The display panel 100 may be adhered to the periphery of the supporting member 300 by an adhesive member, described above with reference to FIG. 1B, and the adhesive member may be a partition.

Figure 15G:
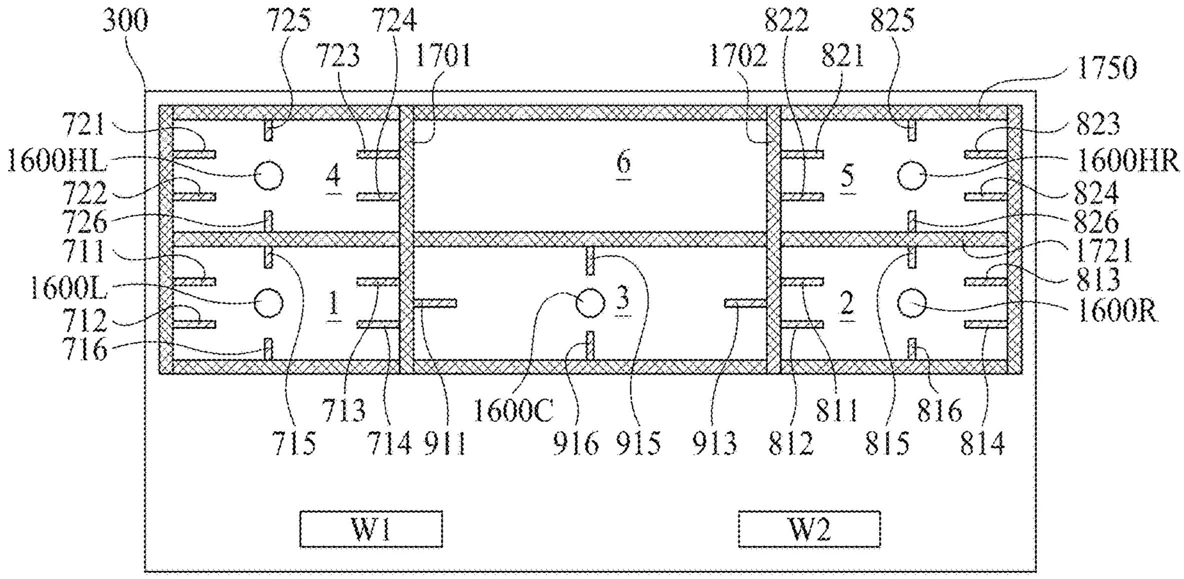

With reference to FIG. 15G, a first partition 1721, a fourth partition 1701, a fifth partition 1702, and a partition 1750 may be provided. For example, the partition 1750 may be disposed to surround first to fifth sound generating devices 1600L to 1600HR. For example, one or more pads may be provided on a side of the partition 1750. A 4-5$^{th}$ pad 725 may be disposed on one side of the partition 1750 to face or toward the fourth sound generating device 1600HL, and a 5-5$^{th}$ pad 825 may be disposed on the one side of the partition 1750 to face or toward the fifth sound generating device 1600HR. A 1-6$^{th}$ pad 716 may be disposed on one other side of the partition 1750 to face or toward the first sound generating device 1600L, a 3-6$^{th}$ pad 916 may be disposed on the one other side of the partition 1750 to face or toward the third sound generating device 1600C, and a 2-6$^{th}$ pad 816 may be disposed on the one other side of the partition 1750 to face the second sound generating device 1600R. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 15F, and thus, their detailed descriptions are omitted.

For example, when the partition 1750 is an adhesive member for attaching a display panel 100 and a supporting member 300 described above with reference to FIG. 1B, the adhesive member described above with reference to FIG. 1B may be omitted, and the partition 1750 may be as an adhesive member. However, an embodiment of the present disclosure is not limited thereto, and an adhesive member for attaching the display panel 100 and the supporting member 300 may be provided on a rear surface of the display panel or at the supporting member 300.

Figure 15H:
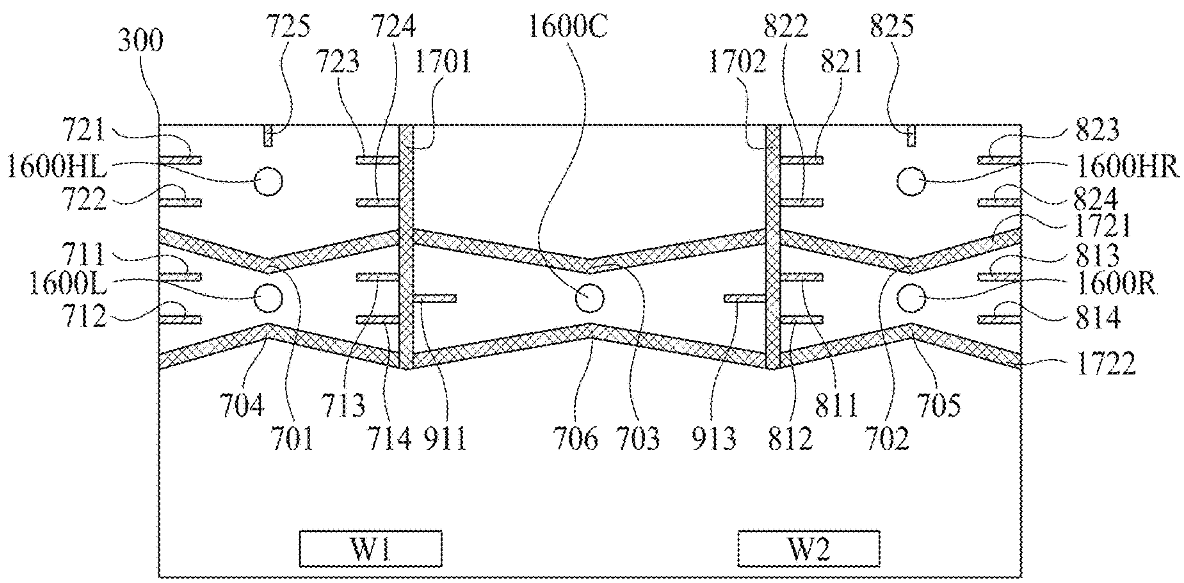
Figure 15I:
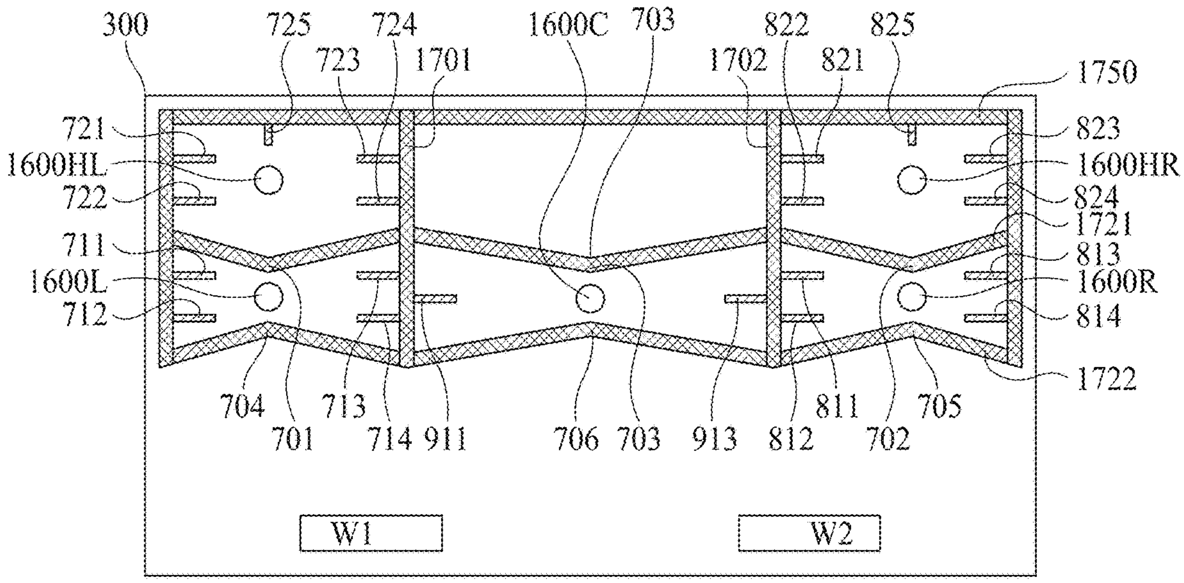

With reference to FIGS. 15H and 15I, a first partition 1721 and a second partition 1722 may include at least one bent portion. The bent portion may be disposed to decrease a reduction in sound pressure caused by a standing wave which occurs due to interference between a reflected wave and a progressive wave. The bent portion may be disposed on one or more sides, which a strongest sound wave reaches among four sides of a partition, and may be provided toward a sound generating device. The other elements are the same as or similar to FIG. 15F, and thus, their detailed descriptions are omitted.

With reference to FIG. 15H, the first partition 1721 may include one or more bent portions. For example, the first partition 1721 may include a first bent portion 701 toward a first sound generating device 1600L and may include a second bent portion 702 toward a second sound generating device 1600R. Also, the first partition 1721 may include a third bent portion 703 toward a third sound generating device 1600C. Also, a reduction in sound pressure caused by standing waves of a fourth sound generating device 1600HL and a fifth sound generating device 1600HR may be reduced by a 4-5$^{th}$ pad 725 and a 5-5$^{th}$ pad 825.

The second partition 1722 may include at least one bent portion. For example, the second partition 1722 may include a fourth bent portion 704 toward the first sound generating device 1600L and may include a fifth bent portion 705 toward the second sound generating device 1600R. Also, the second partition 1722 may include a sixth bent portion 706 toward the third sound generating device 1600C. The bent portion may have an open structure at a center portion of a sound generating device, but is not limited thereto and may have a V-shaped closed structure. When the bent portion has the open structure at the center portion of the sound generating device, the material cost may be reduced compared to the closed structure. According to a sound characteristic experiment, in a case where the bent portion has the open structure at the center portion of the sound generating device and a case where the bent portion has the closed structure at the center portion of the sound generating device, the present inventors have confirmed that a sound characteristic difference is very small or there is no sound characteristic difference. Accordingly, since the first partition 1721 and the second partition 1722 includes one or more bent portions, a reduction in sound pressure caused by a standing wave of a sound generating device may be reduced.

With reference to FIG. 15I, the first partition 1721 and the second partition 1722 may include at least one bent portion, and the partition 1750 may be disposed. The 4-5$^{th}$ pad 725 may be disposed on one side of the partition 1750 to face the fourth sound generating device 1600HL, and the 5-5$^{th}$ pad 825 may be disposed on one side of the partition 1750 to face the fifth sound generating device 1600HR. Since the partition 1750 is provided, a fixing force of a sound generating device disposed on the rear surface of the display panel may be enhanced, and the leakage of a sound occurring in an edge or periphery of the display panel may be reduced, thereby enhancing a sound output characteristic. As another example, as described above with reference to FIG. 15G, the partition 1750 may be disposed, and the first partition 1721 may include at least one bent portion. The other elements are the same as or similar to FIG. 15H, and thus, their detailed descriptions are omitted.

As described above with reference to FIGS. 15H and 15I, a bent portion may not be provided at an edge or periphery portion of a supporting member 300, and thus, a degree to which a display panel is pulled may be reduced in a process of attaching the supporting member 300 on the display panel, thereby preventing the wave phenomenon.

FIGS. 16A to 16I illustrate a sound generating device and a partition according to an embodiment of the present disclosure.

With reference to FIGS. 16A to 16I, a first woofer-integrated sound generating device W3 may be disposed in a first region 1, and a second woofer-integrated sound generating device W4 may be disposed in a second region 2. Descriptions of the first woofer-integrated sound generating device W3 and the second woofer-integrated sound generating device W4 are the same as the descriptions of FIGS. 14A and 14B, and thus, a detailed description is omitted. Descriptions which are the same as or similar to descriptions of FIGS. 15A to 15I will be briefly given or are omitted.

The first woofer-integrated sound generating device W3 and the second woofer-integrated sound generating device W4 may be a sound generating device configured as one body with a woofer, and thus, a separate woofer may not be provided. The first woofer-integrated sound generating device W3 and the second woofer-integrated sound generating device W4 may output a sound of about 60 Hz to about 40 kHz, and the third sound generating device 1600C, the fourth sound generating device 1600HL, and the fifth sound generating device 1600HR may output a sound of about 80 Hz to about 40 kHz. Accordingly, the display apparatus may output a 5.1-channel sound. Moreover, comparing with sound generating devices disposed on the left and the right, since sound generating devices are further provided at an upper portion and a lower portion, left and right sounds and height (or top) and bottom sounds may be enhanced, and a user may feel a sense of sound field like a real sound. For example, since the fourth sound generating device 1600HL and the fifth sound generating device 1600HR are further provided, a sound may be output from an upper portion of the display panel, thereby providing a display apparatus for realizing a stereo sound including left and right sounds and height (or top) and bottom sounds. Therefore, left and right sounds corresponding left and right images and height (or top) and bottom sounds corresponding to upper and lower images may be realized, and a real stereo sound of a real sound including stereo left and right sounds and stereo height (or top) and bottom sounds may be realized, thereby providing a user with a real sound instead of a virtual sound. Therefore, a real stereo sound or surround sound of a real sound including stereo left and right sounds and stereo height (or top) and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV (Audio Visual) or Dolby sound system. Also, as described above with respect to FIGS. 6 to 11B, the first woofer-integrated sound generating device W3, the second woofer-integrated sound generating device W4, the third sound generating device 1600C, the fourth sound generating device 1600HL, and the fifth sound generating device 1600HR may be disposed in the display panel 100. Therefore, a thickness of a sound generating device may be reduced, and thus, a thickness of a display apparatus may decrease, thereby providing a display apparatus for providing a sense of beauty to a user. Also, as described above with respect to FIGS. 12A and 12B, the first sound generating device 1600L, the second sound generating device 1600R, the third sound generating device 1600C, the fourth sound generating device 1600HL, and the fifth sound generating device 1600HR may be configured as a sound generating device with enhanced low-pitched sound band, thereby providing a display apparatus for realizing left and right sounds and upper and lower sounds of an enhanced low-pitched sound band. Also, as described above with respect to FIG. 13, the first sound generating device 1600L, the second sound generating device 1600R, the third sound generating device 1600C, the fourth sound generating device 1600HL, and the fifth sound generating device 1600HR may be configured as a film-type sound generating device, and thus, a thickness of a sound generating device may be reduced to decrease a thickness of a display apparatus, thereby providing a display apparatus for providing a sense of beauty to a user.

With reference to FIGS. 16A to 16I, the first woofer-integrated sound generating device W3 may be disposed to be asymmetrical with the fourth sound generating device 1600HL. The second woofer-integrated sound generating device W4 may be disposed to be asymmetrical with the fifth sound generating device 1600HR. For example, sound constructive interference or destructive interference caused by vibration interference between a vibration and a standing wave generated by the first woofer-integrated sound generating device W3 and a vibration and a standing wave generated by the fourth sound generating device 1600HL may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and the fourth sound generating device 1600HL may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the fifth sound generating device 1600HR may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and the fifth sound generating device 1600HR may prevent the undesired interference, thereby reproducing a natural sound similar to an original sound.

Figure 16A:
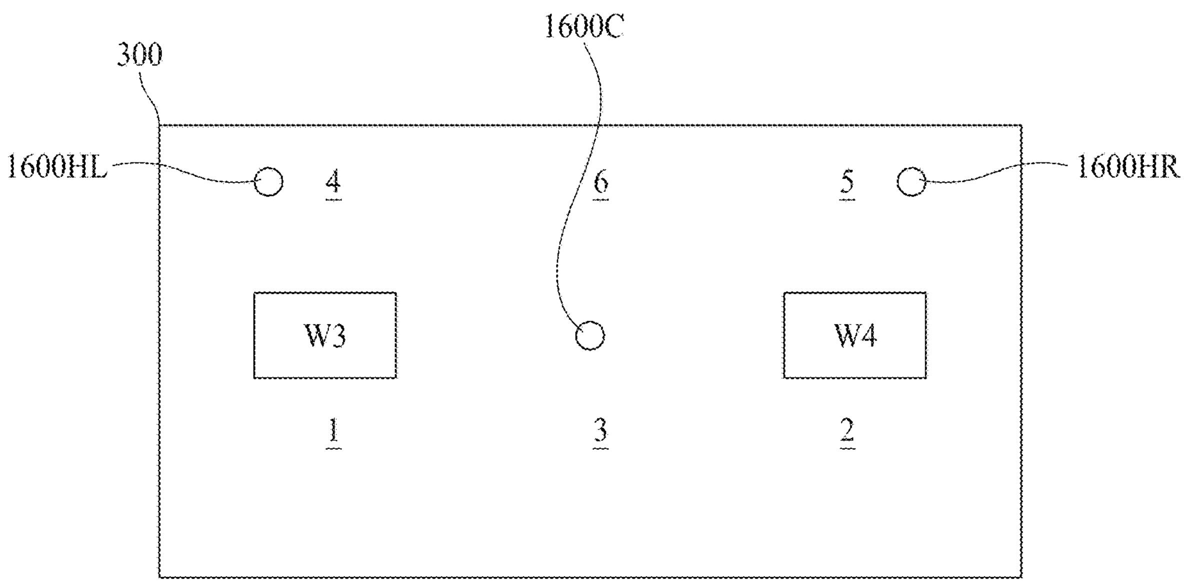
FIGS. 16A to 16I illustrate an embodiment of the sound generating device and a partition according to an embodiment of the present disclosure.
Figure 16B:
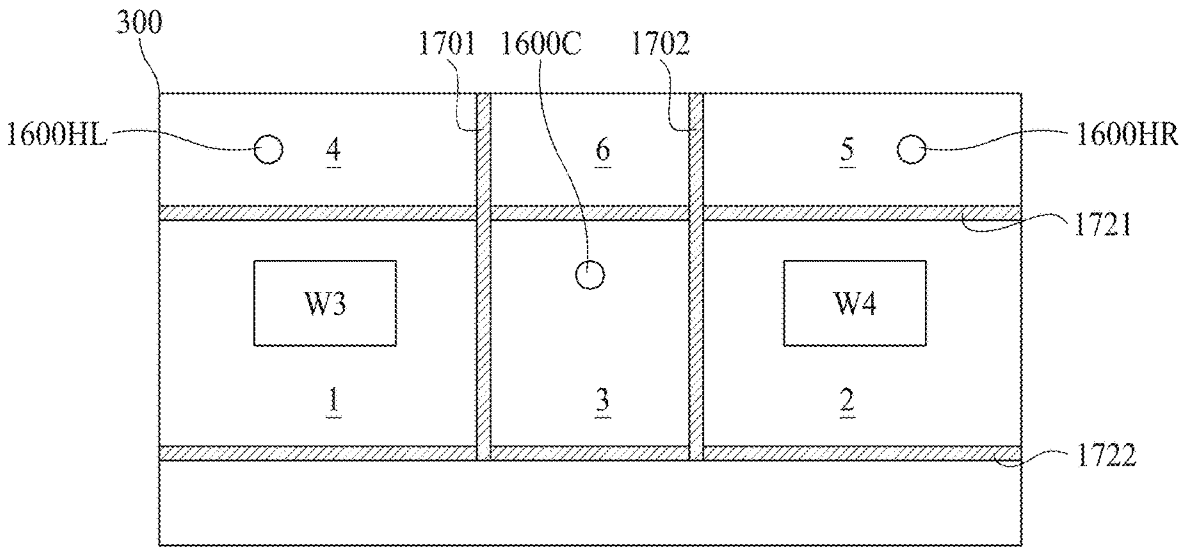
Figure 16C:
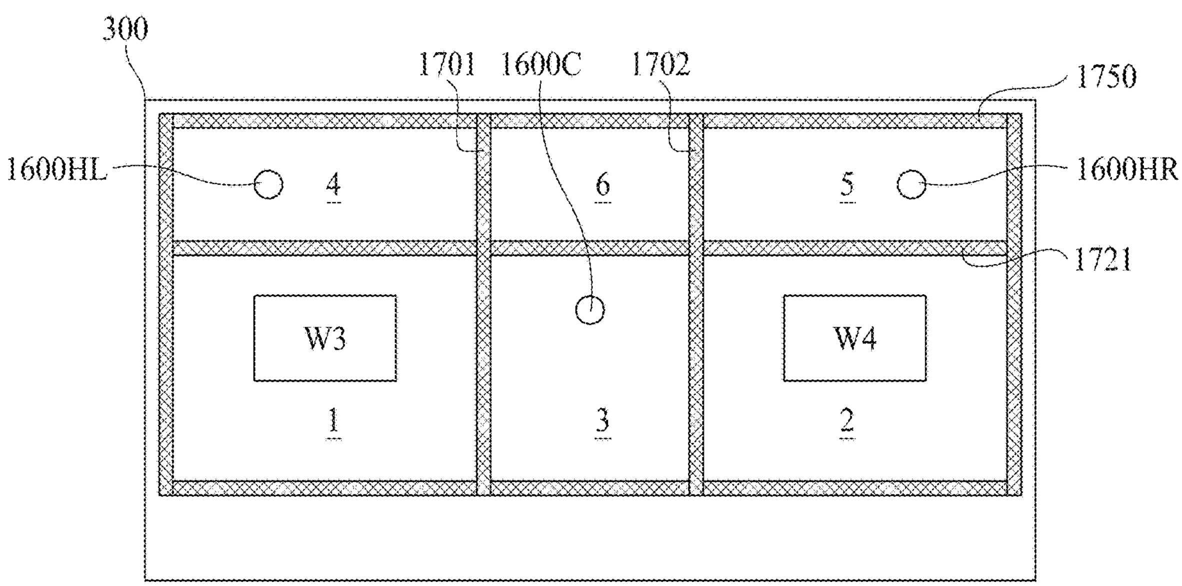
Figure 16D:
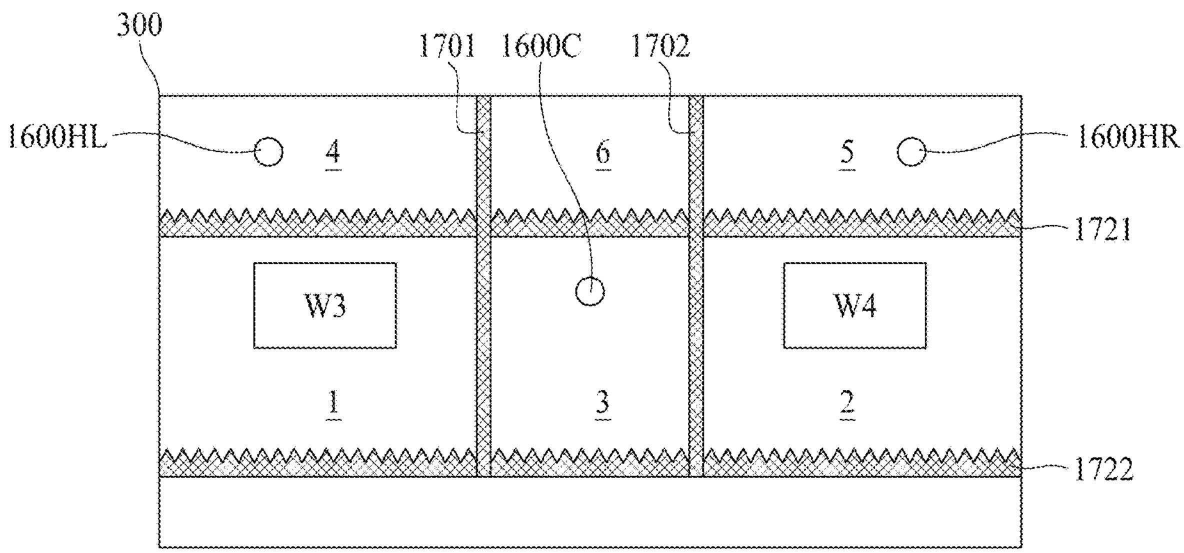
Figure 16E:
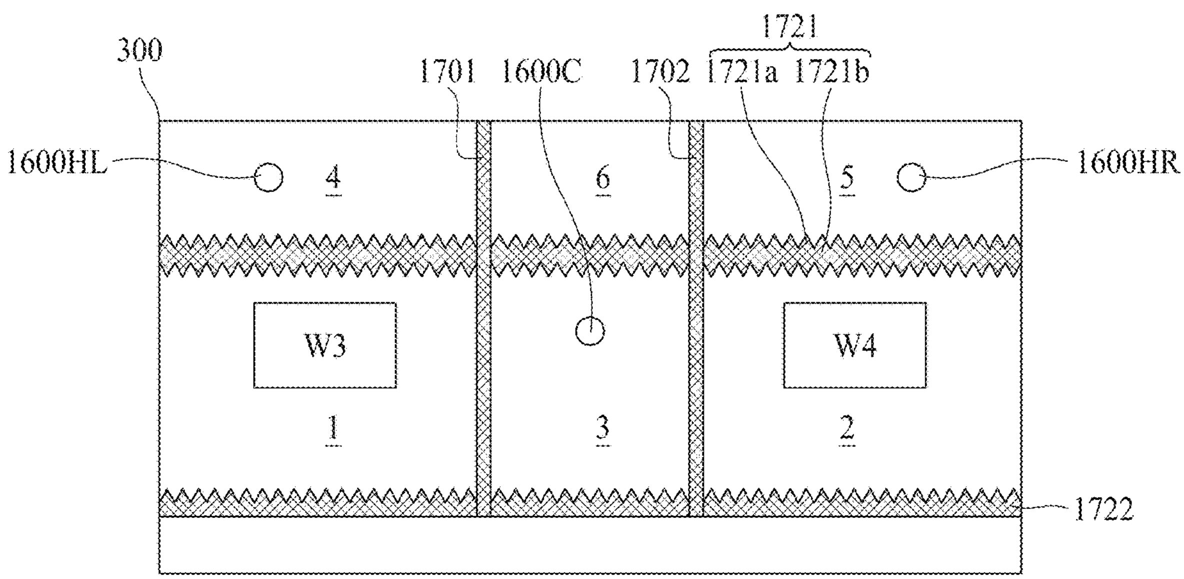
Figure 16F:
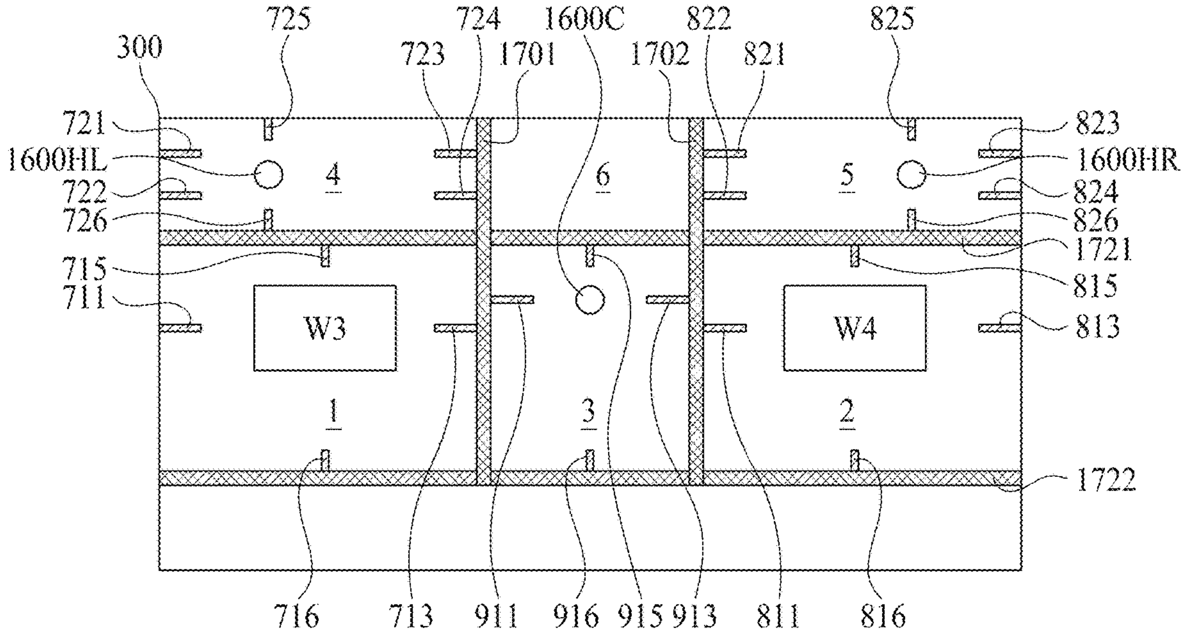
Figure 16G:
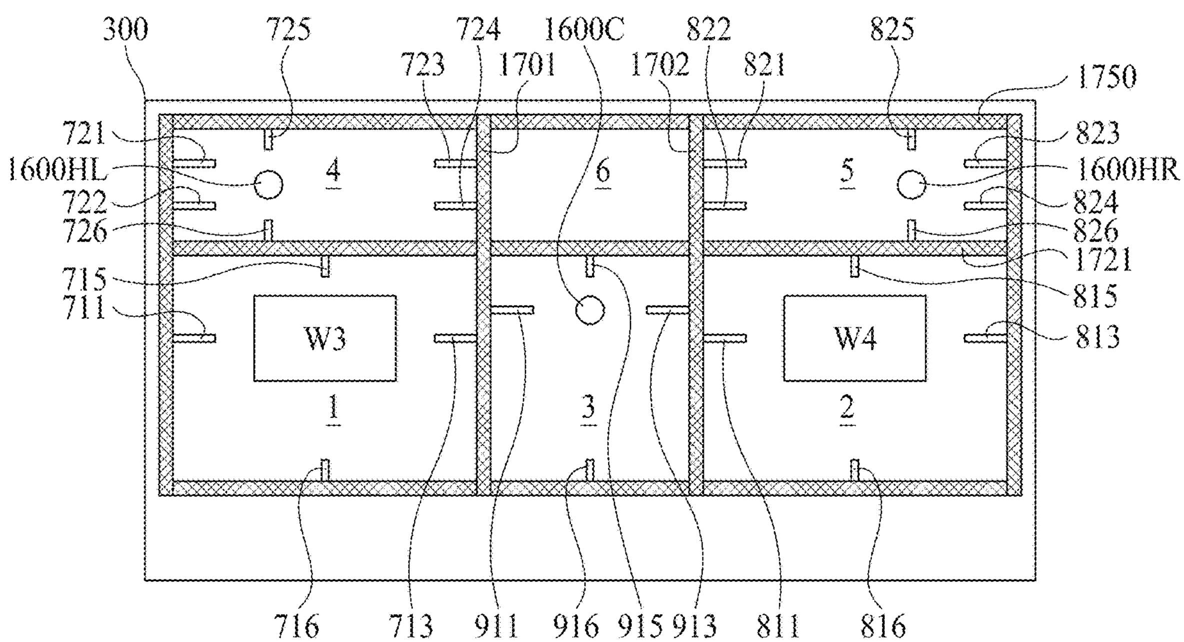

With reference to FIGS. 16F and 16G, a 1-5$^{th}$ pad 715 and a 4-6$^{th}$ pad 726 may be asymmetrically disposed, and a 2-5$^{th}$ pad 815 and a 5-6$^{th}$ pad 826 may be asymmetrically disposed. As another example, the first woofer-integrated sound generating device W3 may be disposed to be symmetrical with a fourth sound generating device 1600HL. The second woofer-integrated sound generating device W4 may be disposed to be symmetrical with a fifth sound generating device 1600HR. For example, reproduction positions of sounds may be aligned on the same line, and comparing with an asymmetrical structure, an effect such as sounds being reproduced at the same position may be provided. Accordingly, a sense of recognition in sound position may be enhanced, and thus, localization of a sound may be enhanced. With reference to FIGS. 16F and 16G, the 1-5$^{th}$ pad 715 and the 4-6$^{th}$ pad 726 may be symmetrically disposed, and the 2-5$^{th}$ pad 815 and the 5-6$^{th}$ pad 826 may be symmetrically disposed.

With reference to FIG. 16F, a pad may be disposed on at least one side of a first partition 1721 to face or toward one or more of the first woofer-integrated sound generating device W3, the second woofer-integrated sound generating device W4, and the third sound generating device 1600C. For example, a 1-5$^{th}$ pad 715 may be disposed on at least one side of the first partition 1721 to face or toward the first woofer-integrated sound generating device W3. For example, a 2-5$^{th}$ pad 815 may be disposed on at least one side of the first partition 1721 to face or toward the second woofer-integrated sound generating device W4. For example, a 3-5$^{th}$ pad 915 may be disposed on at least one side of the first partition 1721 to face or toward the third sound generating device 1600C. The 1-5$^{th}$ pad 715, the 2-5$^{th}$ pad 815, and the 3-5$^{th}$ pad 915 may be provided as one or more, but embodiments are not limited thereto.

For example, a 1-6$^{th}$ pad 716 may be disposed on at least one side of a second partition 1722 to face or toward the first woofer-integrated sound generating device W3. For example, a 2-6$^{th}$ pad 816 may be disposed on at least one side of the second partition 1722 to face the second woofer-integrated sound generating device W4. For example, a 3-6$^{th}$ pad 916 may be disposed on at least one side of the second partition 1722 to face or toward the third sound generating device 1600C. The 1-6$^{th}$ pad 716, the 2-6$^{th}$ pad 816, and the 3-6$^{th}$ pad 916 may be provided as one or more, but embodiments are not limited thereto. The 1-5$^{th}$ pad 715 may be disposed on a side facing the 1-6$^{th}$ pad 716, and the 1-5$^{th}$ pad 715 may be disposed to face or toward the first woofer-integrated sound generating device W3. The 2-5$^{th}$ pad 815 may be disposed on a side facing the 2-6$^{th}$ pad 816, and the 2-5$^{th}$ pad 815 may be disposed to face the second woofer-integrated sound generating device W4. The 3-5$^{th}$ pad 915 may be disposed on a side facing the 3-6$^{th}$ pad 916, and the 3-5$^{th}$ pad 915 may be disposed to face or toward the third sound generating device 1600C.

With reference to FIG. 16G, one or more pads may be provided on a side of the partition 1750. For example, the 4-5$^{th}$ pad 725 may be disposed on one side of the partition 1750 to face or toward one or more of the fourth sound generating device 1600HL, and the 5-5$^{th}$ pad 825 may be disposed on one side of the partition 1750 to face the fifth sound generating device 1600HR. A 1-6$^{th}$ pad 716 may be disposed on one other side of the partition 1750 to face or toward the first woofer-integrated sound generating device W3, a 3-6$^{th}$ pad 916 may be disposed on the one other side of the partition 1750 to face or toward the third sound generating device 1600C, and a 2-6$^{th}$ pad 816 may be disposed on the one other side of the partition 1750 to face or toward the second woofer-integrated sound generating device W4. For example, a 1-5$^{th}$ pad 715 may be disposed on a side facing the 1-6$^{th}$ pad 716, and the 1-5$^{th}$ pad 715 may be disposed to face or toward the first woofer-integrated sound generating device W3. A 3-5$^{th}$ pad 915 may be disposed on a side facing the 3-6$^{th}$ pad 916, and the 3-5$^{th}$ pad 915 may be disposed to face or toward the third sound generating device 1600C. A 2-5$^{th}$ pad 815 may be disposed on a side facing the 2-6$^{th}$ pad 816, and the 2-5$^{th}$ pad 815 may be disposed to face or toward the second woofer-integrated sound generating device W4.

Figure 16H:
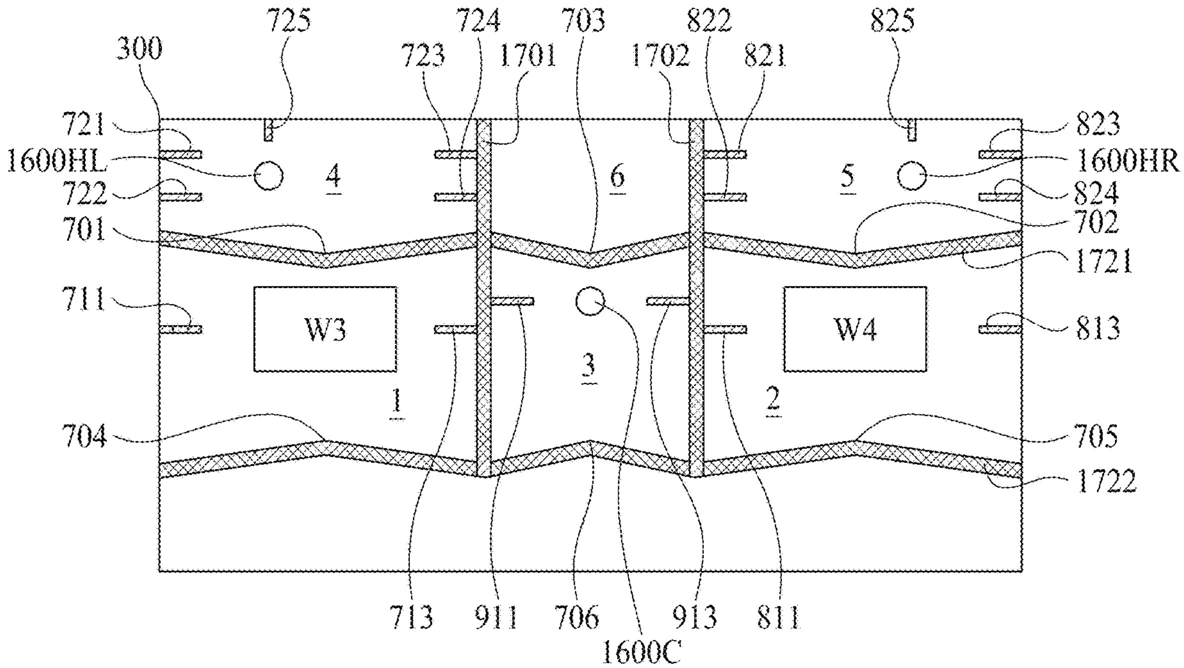

With reference to FIG. 16H, a first partition 1721 may include one or more bent portions. For example, the first partition 1721 may include a first bent portion 701 toward a first woofer-integrated sound generating device W3 and may include a second bent portion 702 toward a second woofer-integrated sound generating device W4. Also, the first partition 1721 may include a third bent portion 703 toward a third sound generating device 1600C.

The second partition 1722 may include at least one bent portion. For example, the second partition 1722 may include fourth bent portion 704 toward the first woofer-integrated sound generating device W3 and may include a fifth bent portion 705 toward the second woofer-integrated sound generating device W4. Also, the second partition 1722 may include a sixth bent portion 706 toward the third sound generating device 1600C.

Figure 16I:
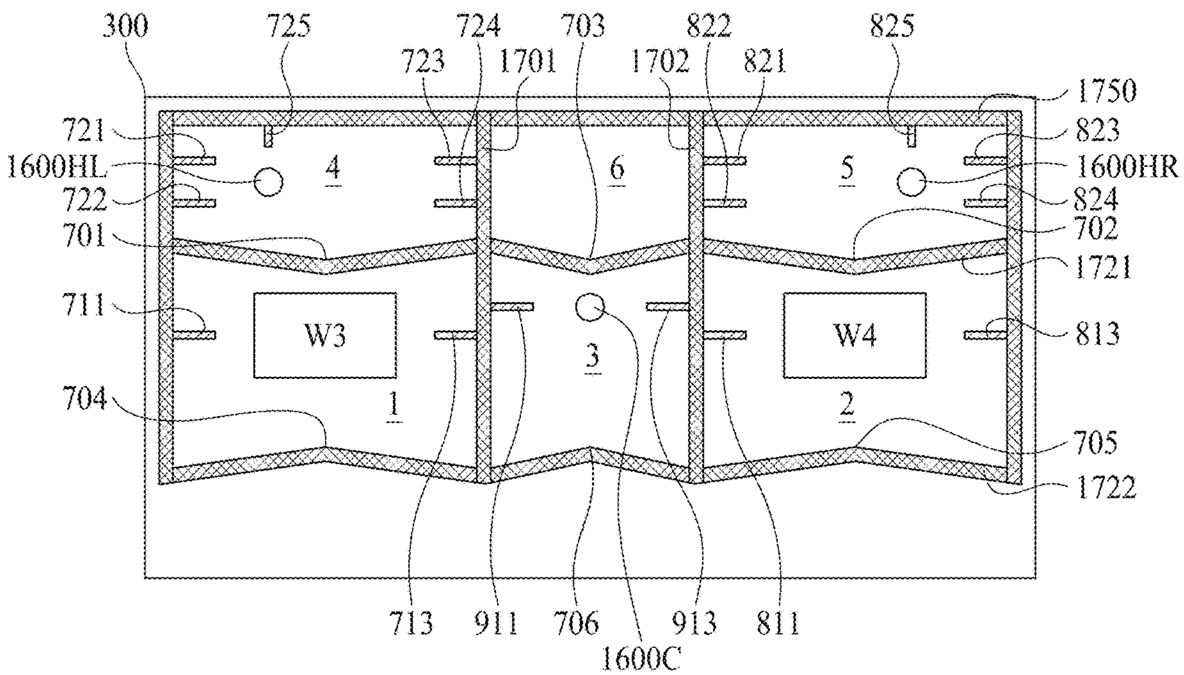

With reference to FIG. 16I, the first partition 1721 and the second partition 1722 may include at least one bent portion, and the partition 1750 may be disposed. As another example, as described above with reference to FIG. 15G, the partition 1750 may be disposed, and the first partition 1721 may include at least one bent portion. Since the partition 1750 is provided, a fixing force of a sound generating device disposed on the rear surface of the display panel may be enhanced, and the leakage of a sound occurring in an edge of the display panel may be reduced, thereby enhancing a sound output characteristic. The other elements are the same as or similar to FIGS. 15I, 16G, and 16H, and thus, their detailed descriptions are omitted.

The bent portion may have an open structure at a center portion of a sound generating device, but is not limited thereto and may have a V-shaped closed structure. When the bent portion has the open structure at the center portion of the sound generating device, the material cost may be reduced compared to the closed structure. According to a sound characteristic experiment, in a case where the bent portion has the open structure at the center portion of the sound generating device and a case where the bent portion has the closed structure at the center portion of the sound generating device, the present inventors have confirmed that a sound characteristic difference is very small or there is no sound characteristic difference. Accordingly, since the first partition 1721 and the second partition 1722 includes one or more bent portions, a reduction in sound pressure caused by a standing wave of a sound generating device may be reduced.

With reference to FIGS. 16A to 16I, the first woofer-integrated sound generating device W3 may be disposed to be asymmetrical with the fourth sound generating device 1600HL. The second woofer-integrated sound generating device W4 may be disposed to be asymmetrical with the fifth sound generating device 1600HR. With reference to FIGS. 16H to 16I, the first bent portion 701 may be disposed to be asymmetrical with the fourth bent portion 704, and the second bent portion 702 may be disposed to be asymmetrical with the fifth bent portion 705. As another example, the first woofer-integrated sound generating device W3 may be disposed to be symmetrically with the fourth sound generating device 1600HL. The second woofer-integrated sound generating device W4 may be disposed to be symmetrically with the fifth sound generating device 1600HR. With reference to FIGS. 16H to 16I, the first bent portion 701 may be disposed to be symmetrically with the fourth bent portion 704, and the second bent portion 702 may be disposed to be symmetrically with the fifth bent portion 705.

With reference to FIGS. 16F to 16I, the 1-1$^{st}$ pad 711, the 1-3$^{rd}$ pad 713, the 2-1$^{st}$ pad 811, and the 2-3$^{rd}$ pad 813 may be provided as one, but are not limited thereto. The 1-1$^{st}$ pad 711, the 1-3$^{rd}$ pad 713, the 2-1$^{st}$ pad 811, and the 2-3$^{rd}$ pad 813 may be provided as two or more.

As described above with reference to FIGS. 16H and 16I, a bent portion may not be provided at an edge or periphery portion of a supporting member, and thus, a degree to which a display panel is pulled may be reduced in a process of attaching the supporting member on the display panel, thereby preventing the wave phenomenon.

FIGS. 17A to 17I illustrate a sound generating device and a partition according to an embodiment of the present disclosure.

With reference to FIGS. 17A to 17I, a first sound generating device 1600L and a second sound generating device 1600R may be disposed unlike a third sound generating device 1600C. Descriptions which are the same as or similar to descriptions of FIGS. 15A to 15I will be briefly given or are omitted.

With reference to FIGS. 17A to 17I, the first sound generating device 1600L and the second sound generating device 1600R may be disposed to be asymmetrical with the third sound generating device 1600C. For example, the first sound generating device 1600L and the second sound generating device 1600R may be disposed on the same line. For example, the third sound generating device 1600C may be disposed on a line which differs from the first sound generating device 1600L. For example, the third sound generating device 1600C may be disposed on a line which differs from the second sound generating device 1600R. For example, the first sound generating device 1600L may be apart from the fourth sound generating device 1600HL disposed in the fourth region 4, and thus, a sound of a lower portion of the display panel 100 may be more vividly realized in the first sound generating device 1600L, and based on a distance between the first sound generating device 1600L and the fourth sound generating device 1600HL, a sound for distinguishing a difference between a sound of the first sound generating device 1600L and a sound of the fourth sound generating device 1600HL may be realized. Also, the second sound generating device 1600R may be apart from the fifth sound generating device 1600HR disposed in the fifth region 5, and thus, a sound of a lower portion of the display panel 100 may be more vividly realized in the second sound generating device 1600R, and based on a distance between the second sound generating device 1600R and the fifth sound generating device 1600HR, a sound for distinguishing a difference between a sound of the second sound generating device 1600R and a sound of the fifth sound generating device 1600HR may be realized. The first sound generating device 1600L, the second sound generating device 1600R, the third sound generating device 1600C, the fourth sound generating device 1600HL, and the fifth sound generating device 1600HR may output sounds of about 80 Hz to about 40 kHz, and the first woofer W1 and the second woofer W2 may output sounds of 80 Hz or less. Accordingly, the display apparatus may output a 5.1-channel sound.

Figure 17A:
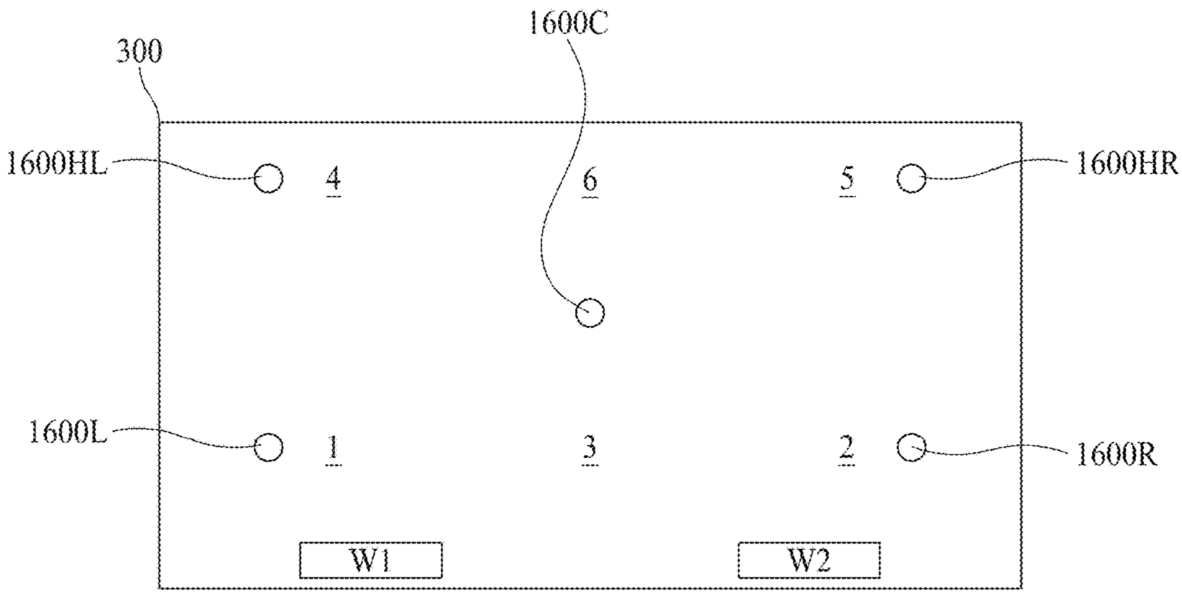
FIGS. 17A to 17I illustrate an embodiment of the sound generating device and a partition according to an embodiment of the present disclosure.
Figure 17B:
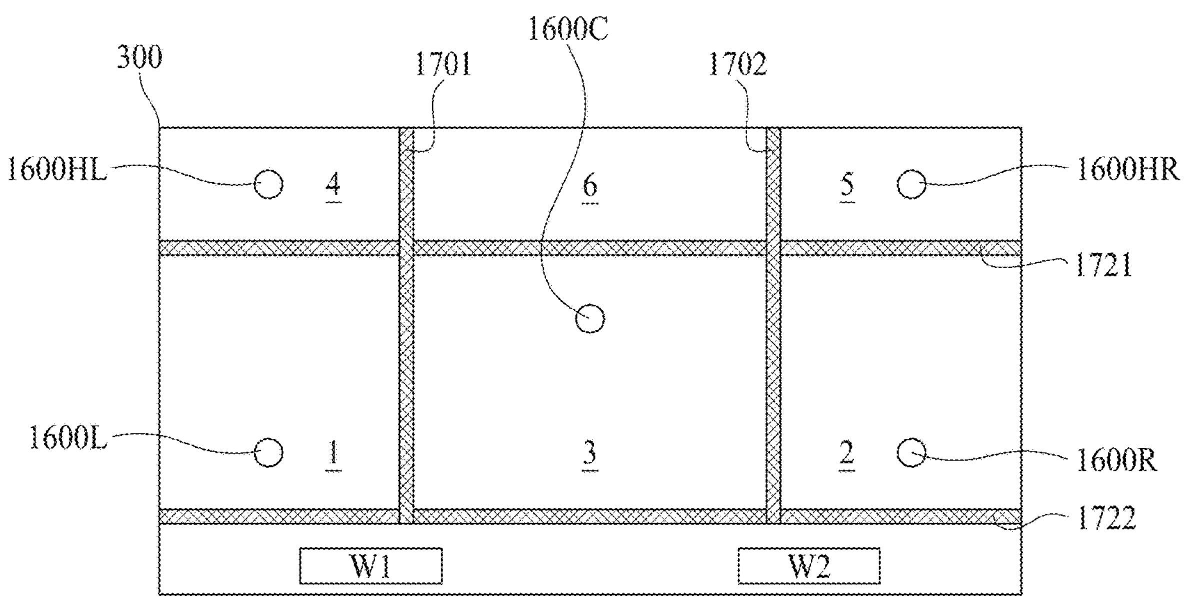
Figure 17C:
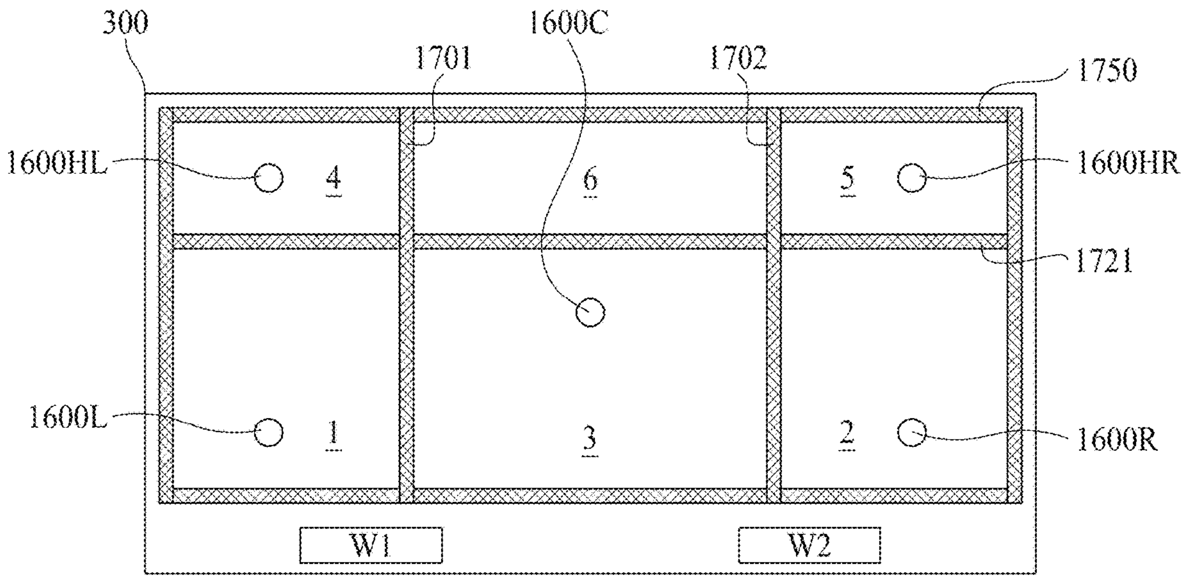
Figure 17D:
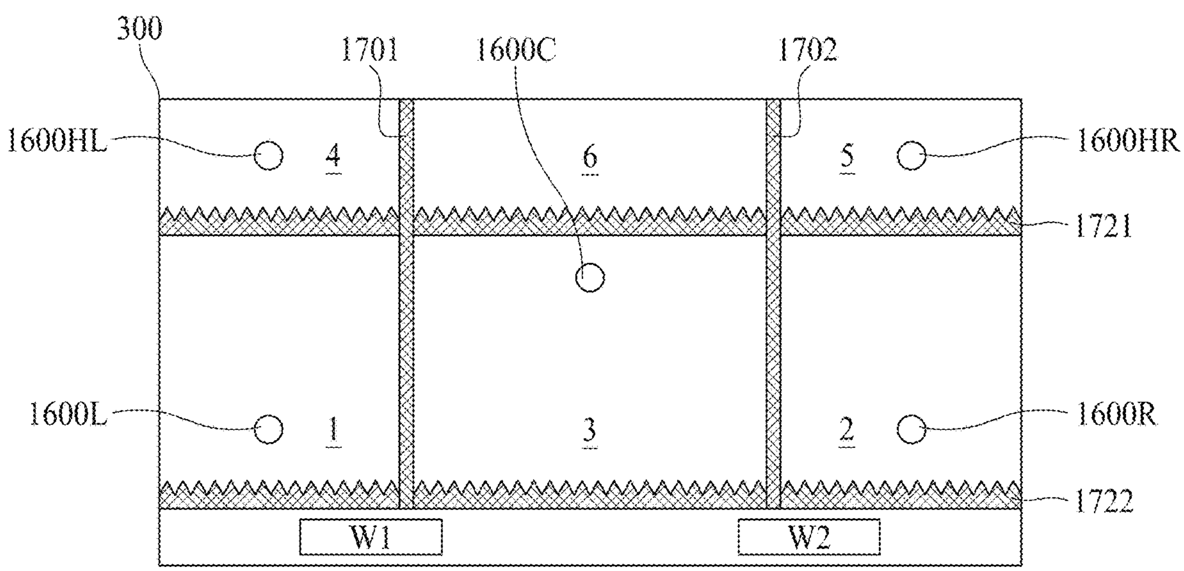
Figure 17E:
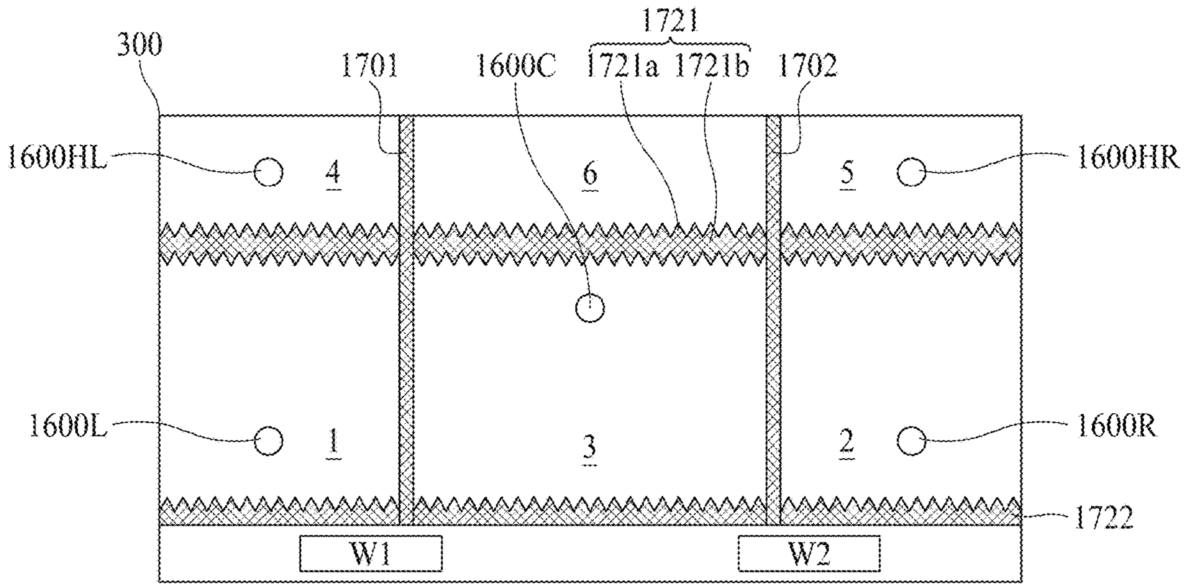
Figure 17F:
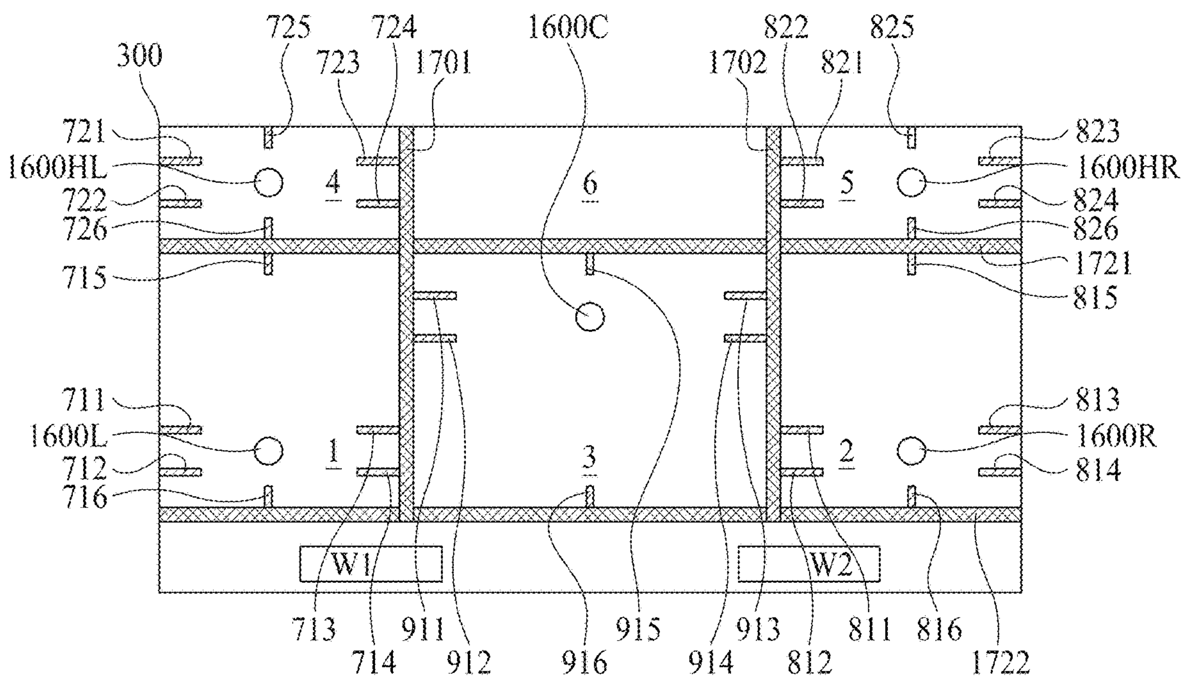
Figure 17G:
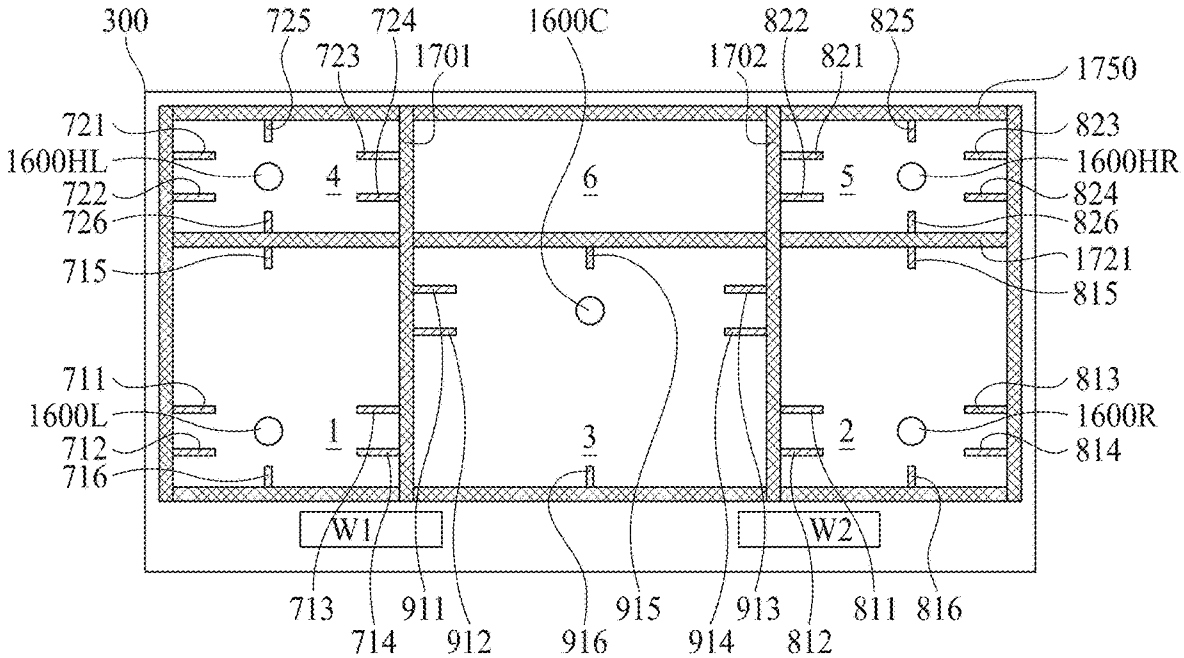
Figure 17H:
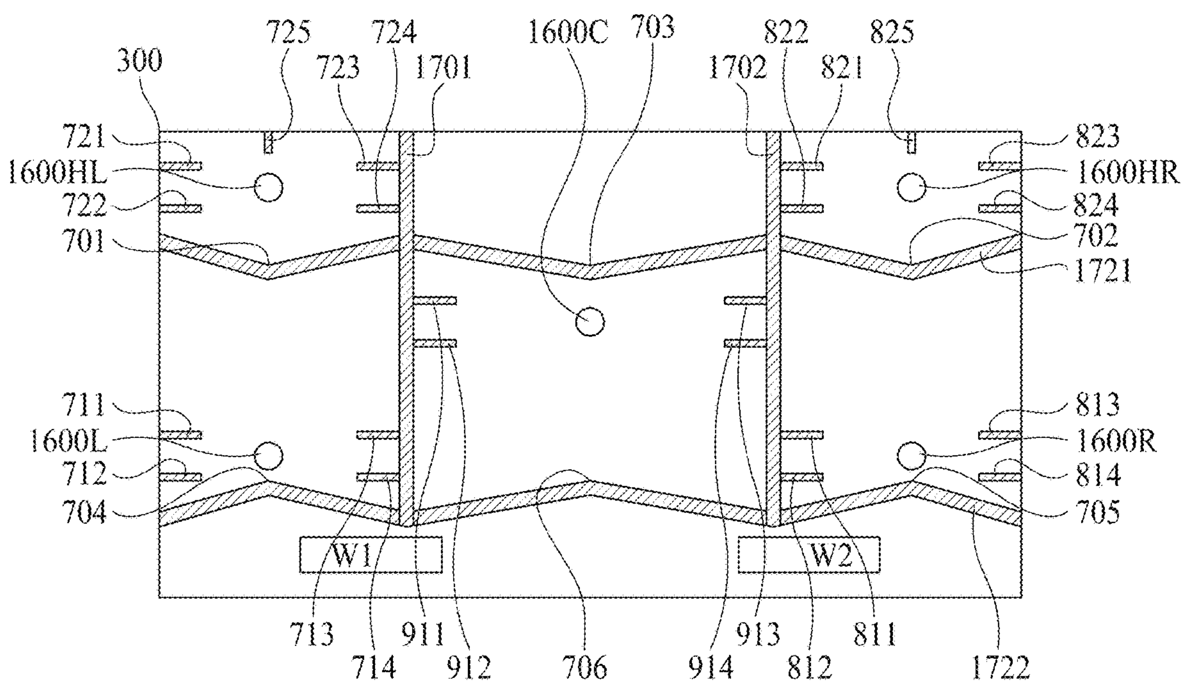
Figure 17I:
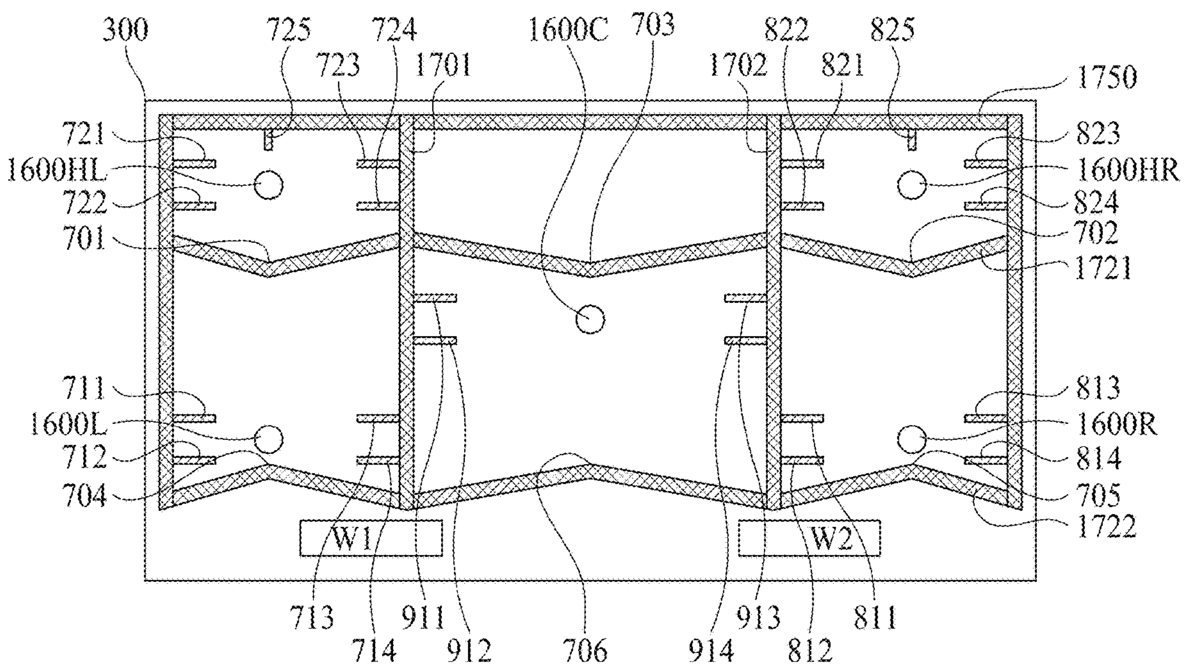

With reference to FIG. 17F, a pad may be disposed on at least one side of a fourth partition 1701 to face or toward one or more of a first sound generating device 1600L and a fourth sound generating device 1600HL. For example, a 1-3$^{rd}$ pad 713 and a 1-4$^{th}$ pad 714 may be disposed on at least one side of the fourth partition 1701 to face or toward the first sound generating device 1600L. A 1-1$^{st}$ pad 711 and a 1-2$^{nd}$ pad 712 may be disposed on a side facing the 1-3$^{rd}$ pad 713 and the 1-4$^{th}$ pad 714. For example, a 4-3$^{rd}$ pad 723 and a 4-4$^{th}$ pad 724 may be disposed on at least one side of the fourth partition 1701 to face or toward the fourth sound generating device 1600HL. A 4-1$^{st}$ pad 721 and a 4-2$^{nd}$ pad 722 may be disposed on a side facing the 4-3$^{rd}$ pad 723 and the 4-4$^{th}$ pad 724.

For example, a 3-1$^{st}$ pad 911 and a 3-2$^{nd}$ pad 912 may be disposed on at least other side of the fourth partition 1701 to face or toward a third sound generating device 1600C. Only one of the 3-1$^{st}$ pad 911 and the 3-2$^{nd}$ pad 912 may be disposed.

A pad may be disposed on at least one side of a fifth partition 1702 to face or toward one or more of a second sound generating device 1600R and a fifth sound generating device 1600HR. For example, a 2-1$^{st}$ pad 811 and a 2-2$^{nd}$ pad 812 may be disposed on at least one side of the fifth partition 1702 to face or toward the second sound generating device 1600R. A 2-3$^{rd}$ pad 813 and a 2-4$^{th}$ pad 814 may be disposed on a side facing the 2-1$^{st}$ pad 811 and the 2-2$^{nd}$ pad 812. The 2-1$^{st}$ to the 2-4$^{th}$ pads 811 to 814 may be provided as two, but embodiments are not limited thereto, and may be provided as one or three or more. For example, a 5-1$^{st}$ pad 821 and a 5-2$^{nd}$ pad 822 may be disposed on at least one side of the fifth partition 1702 to face or toward the fifth sound generating device 1600HR. A 5-3$^{rd}$ pad 823 and a 5-4$^{th}$ pad 824 may be disposed on a side facing the 5-1$^{st}$ pad 821 and the 5-2$^{nd}$ pad 822. The 5-1$^{st}$ to the 5-4$^{th}$ pads 821 to 824 may be provided as two, but embodiments are not limited thereto, and may be provided as one or three or more. For example, a 3-3$^{rd}$ pad 913 and a 3-4$^{th}$ pad 914 may be disposed on at least other side of the fifth partition 1702 to face or toward a third sound generating device 1600C. Only one of the 3-3$^{rd}$ pad 913 and the 3-4$^{th}$ pad 914 may be disposed. The other descriptions are the same as descriptions given above with reference to FIGS. 15F to 15I, and thus, are omitted.

FIGS. 18A to 18I illustrate a sound generating device and a partition according to an embodiment of the present disclosure.

With reference to FIGS. 18A to 18I, a first woofer-integrated sound generating device W3 may be disposed in a first region 1, and a second woofer-integrated sound generating device W4 may be disposed in a second region 2. The first woofer-integrated sound generating device W3 and the second woofer-integrated sound generating device W4 may be disposed unlike a third sound generating device 1600C. Descriptions which are the same as or similar to descriptions of FIGS. 15A to 17I will be briefly given or are omitted.

With reference to FIGS. 18A to 18I, the first woofer-integrated sound generating device W3 and the second woofer-integrated sound generating device W4 may be disposed to be asymmetrical with the third sound generating device 1600C. For example, the first woofer-integrated sound generating device W3 and the second woofer-integrated sound generating device W4 may be disposed on the same line. For example, the third sound generating device 1600C may be disposed on a line which differs from the first woofer-integrated sound generating device W3. For example, the third sound generating device 1600C may be disposed on a line which differs from the second woofer-integrated sound generating device W4. For example, the first woofer-integrated sound generating device W3 may be apart from the fourth sound generating device 1600HL disposed in the fourth region 4, and thus, a sound of a lower portion of the display panel 100 may be more vividly realized in the first woofer-integrated sound generating device W3, and based on a distance between the first woofer-integrated sound generating device W3 and the fourth sound generating device 1600HL, a sound for distinguishing a difference between a sound of the first woofer-integrated sound generating device W3 and a sound of the fourth sound generating device 1600HL may be realized. Also, the second woofer-integrated sound generating device W4 may be apart from the fifth sound generating device 1600HR disposed in the fifth region 5, and thus, a sound of a lower portion of the display panel 100 may be more vividly realized in the second woofer-integrated sound generating device W4, and based on a distance between the second woofer-integrated sound generating device W4 and the fifth sound generating device 1600HR, a sound for distinguishing a difference between a sound of the second woofer-integrated sound generating device W4 and a sound of the fifth sound generating device 1600HR may be realized. The first woofer-integrated sound generating device W3 and the second woofer-integrated sound generating device W4 may output sounds of about 60 Hz to about 40 kHz, and the third sound generating device 1600C, the fourth sound generating device 1600HL, and the fifth sound generating device 1600HR may output sounds of about 80 Hz to about 40 kHz. Accordingly, the display apparatus may output a 5.1-channel sound.

The first woofer-integrated sound generating device W3 and the second woofer-integrated sound generating device W4 may be a sound generating device configured as one body with a woofer, and thus, a separate woofer may not be provided.

With reference to FIGS. 18A to 18I, the first woofer-integrated sound generating device W3 may be disposed to be asymmetrical with the fourth sound generating device 1600HL. The second woofer-integrated sound generating device W4 may be disposed to be asymmetrical with the fifth sound generating device 1600HR. For example, sound constructive interference or destructive interference caused by vibration interference between a vibration and a standing wave generated by the first woofer-integrated sound generating device W3 and a vibration and a standing wave generated by the fourth sound generating device 1600HL may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and the fourth sound generating device 1600HL may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the fifth sound generating device 1600HR may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and the fifth sound generating device 1600HR may prevent the undesired interference, thereby reproducing a natural sound similar to an original sound.

Figure 18A:
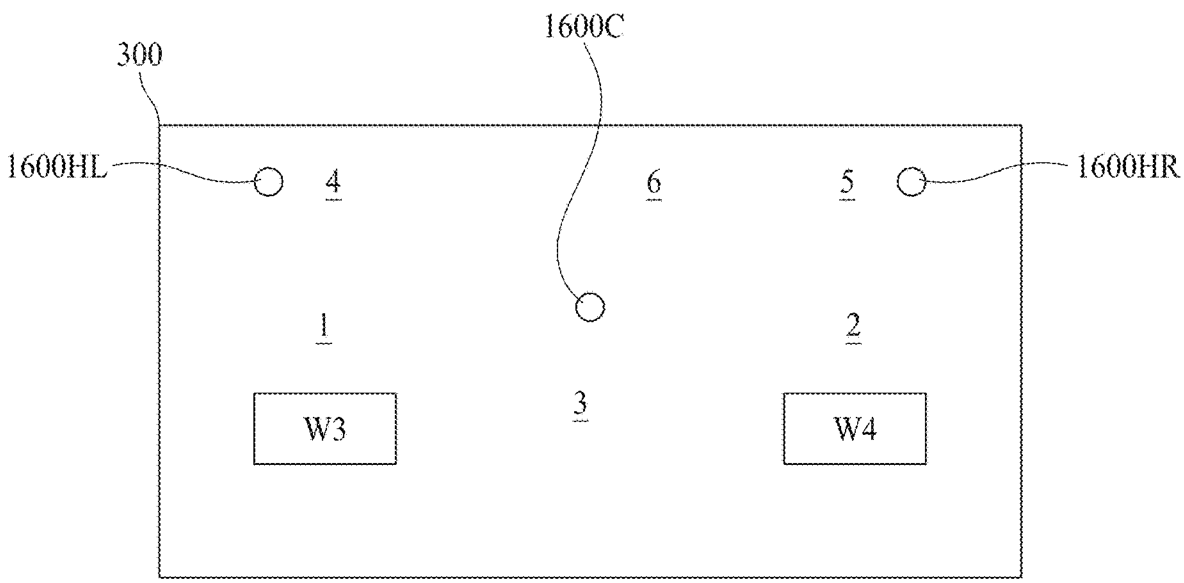
FIGS. 18A to 18I illustrate an embodiment of the sound generating device and a partition according to an embodiment of the present disclosure.
Figure 18B:
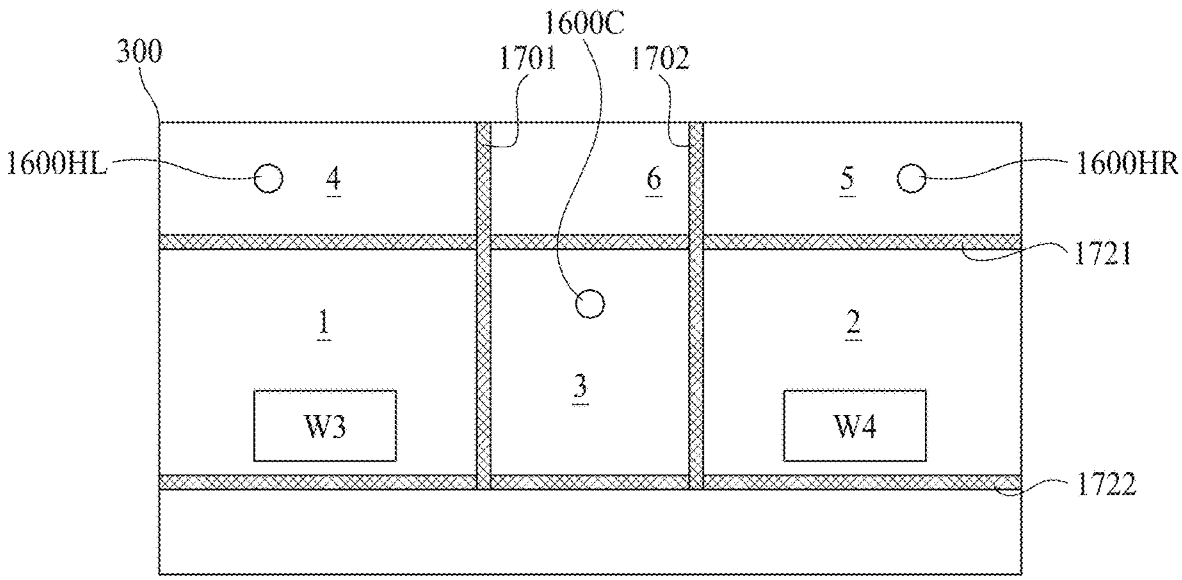
Figure 18C:
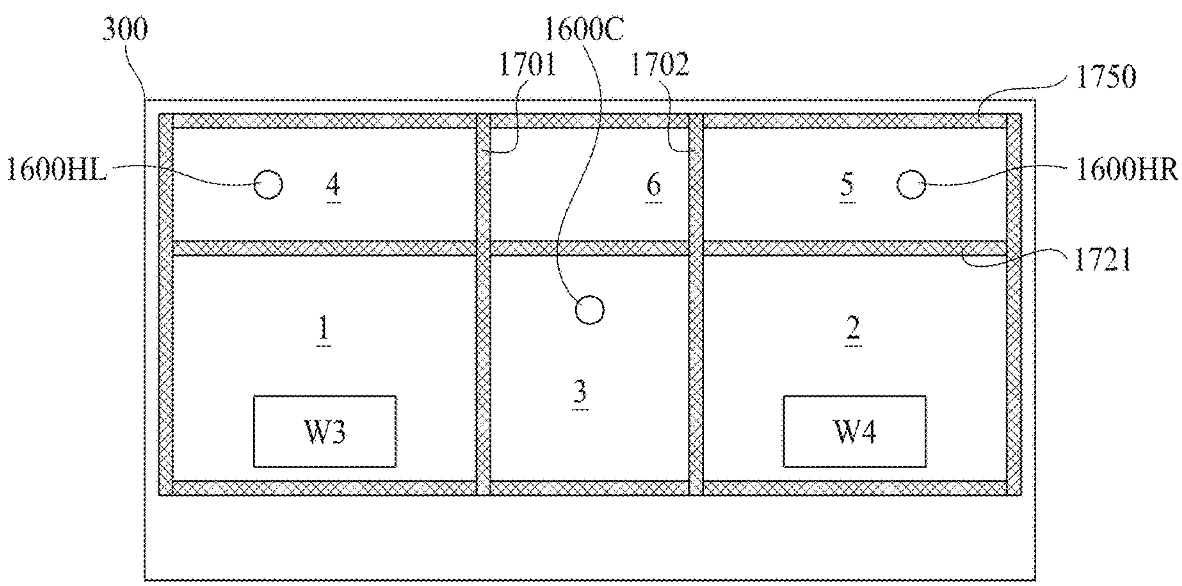
Figure 18D:
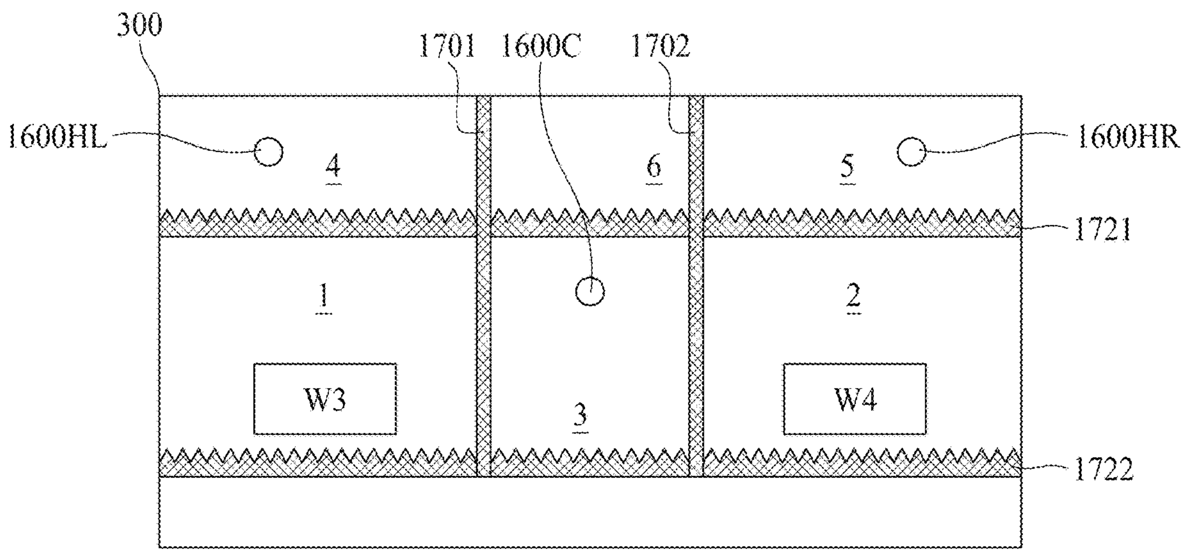
Figure 18E:
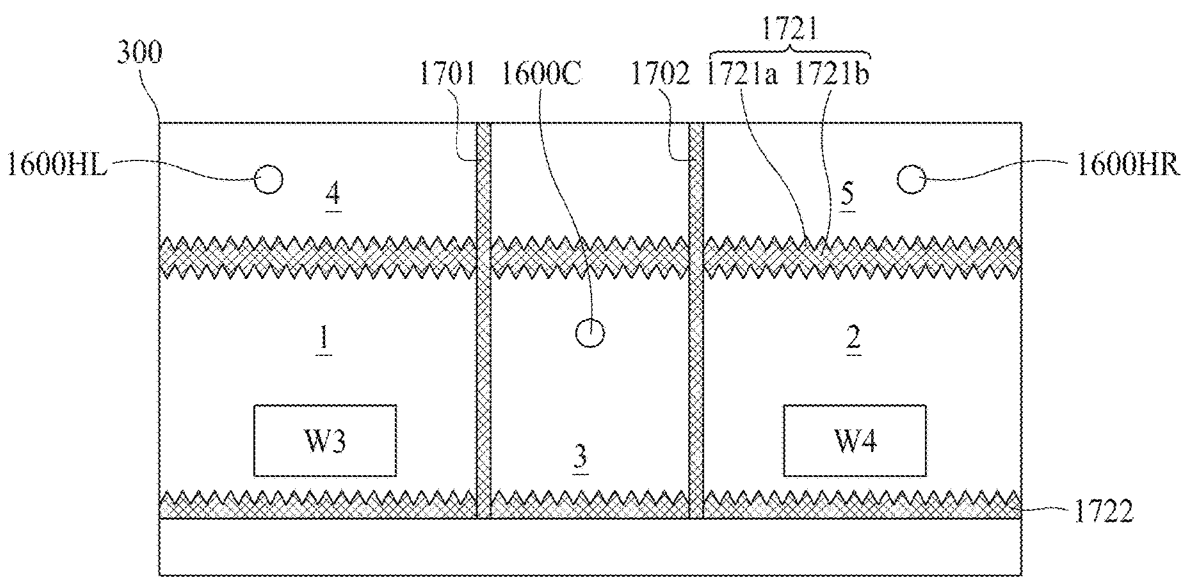
Figure 18F:
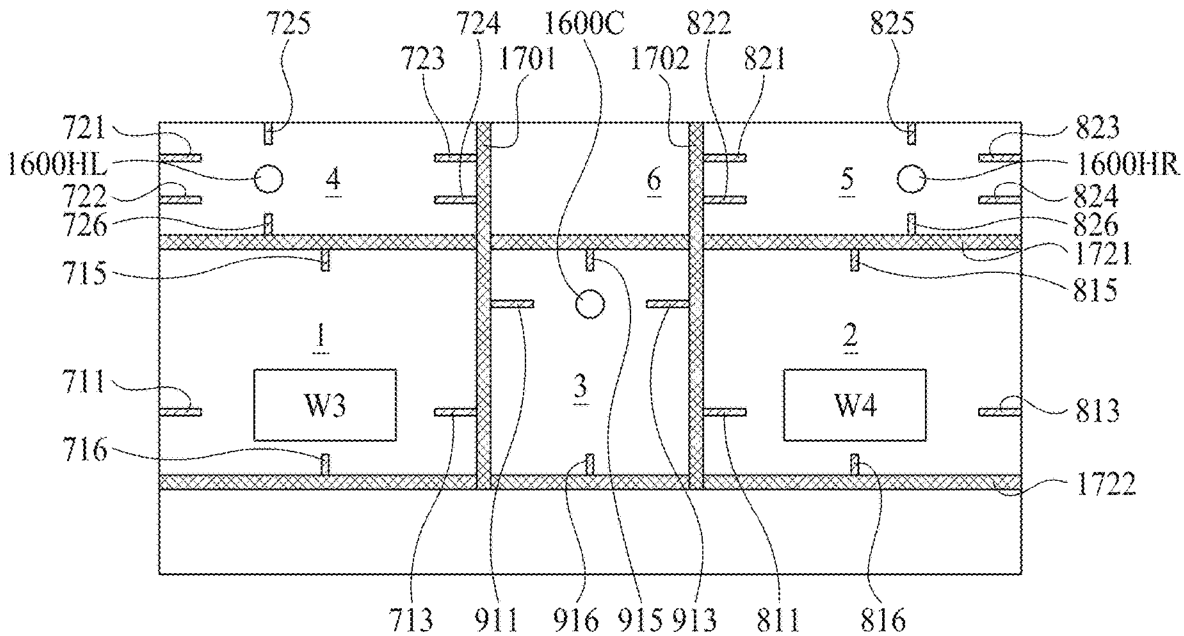
Figure 18G:
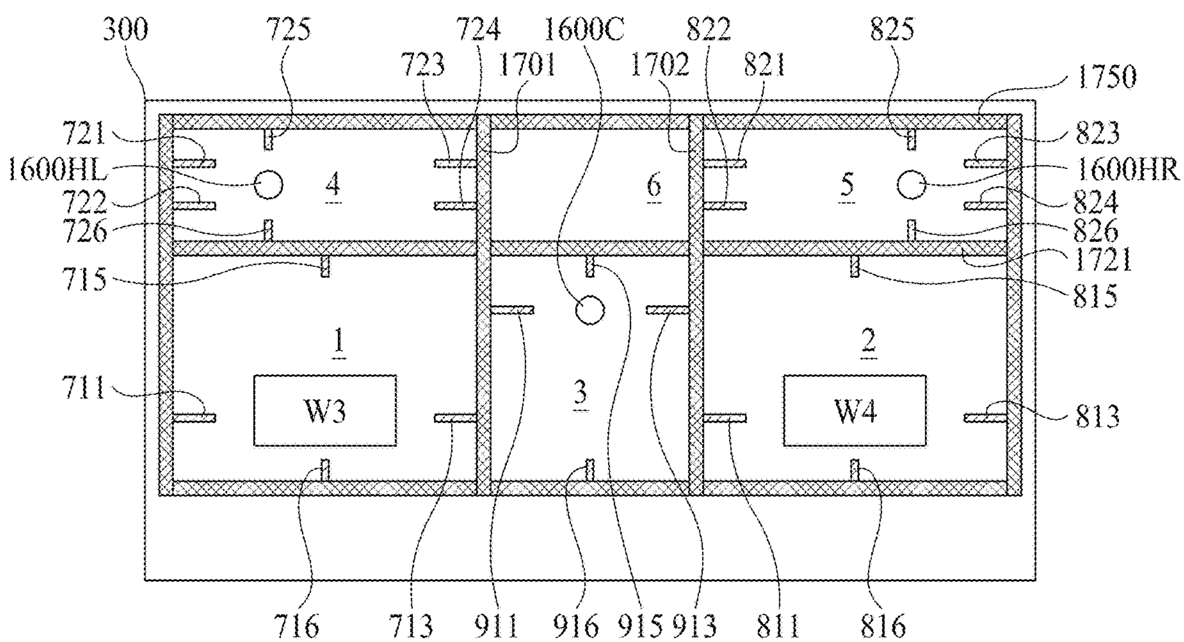
Figure 18H:
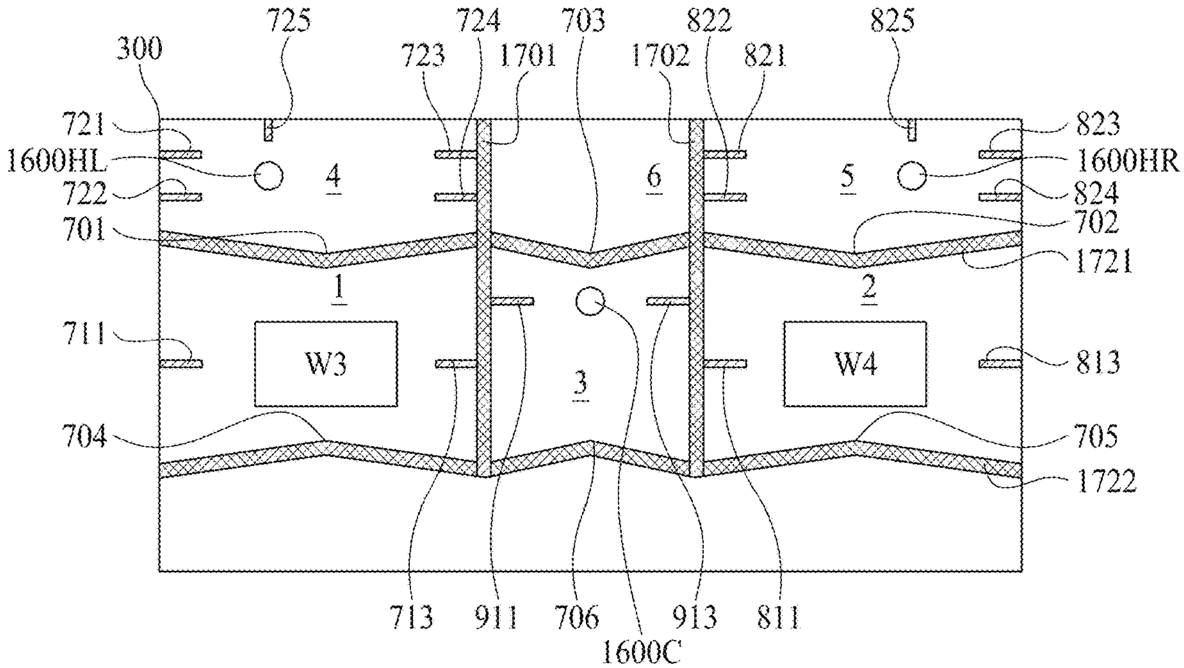
Figure 18I:
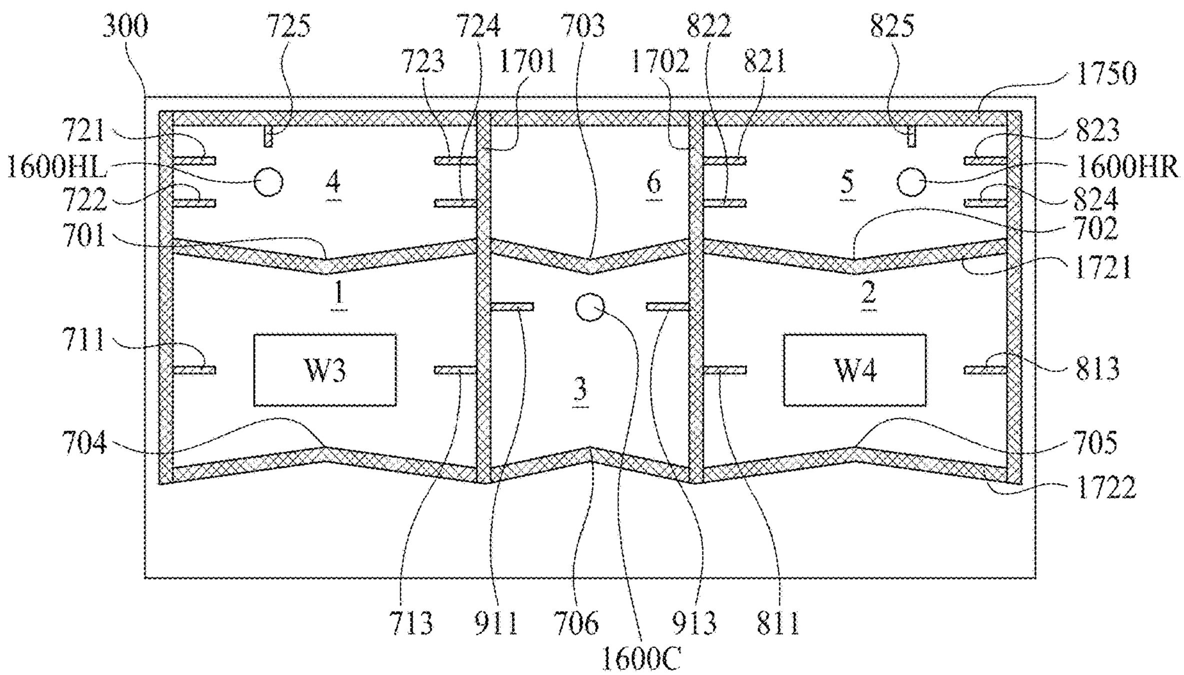

With reference to FIGS. 18F and 18G, a 1-5$^{th}$ pad 715 and a 4-6$^{th}$ pad 726 may be asymmetrically disposed, and a 2-5$^{th}$ pad 815 and a 5-6$^{th}$ pad 826 may be asymmetrically disposed. As another example, the first woofer-integrated sound generating device W3 may be disposed to be symmetrical with a fourth sound generating device 1600HL. The second woofer-integrated sound generating device W4 may be disposed to be symmetrical with a fifth sound generating device 1600HR. For example, reproduction positions of sounds may be aligned on the same line, and comparing with an asymmetrical structure, an effect such as sounds being reproduced at the same position may be provided. Accordingly, a sense of recognition in sound position may be enhanced, and thus, localization of a sound may be enhanced. With reference to FIGS. 18F and 18G, the 1-5$^{th}$ pad 715 and the 4-6$^{th}$ pad 726 may be symmetrically disposed, and the 2-5$^{th}$ pad 815 and the 5-6$^{th}$ pad 826 may be symmetrically disposed. With reference to FIGS. 18H to 18I, the first bent portion 701 may be disposed to be asymmetrical with the fourth bent portion 704, and the second bent portion 702 may be disposed to be asymmetrical with the fifth bent portion 705. As another example, the first woofer-integrated sound generating device W3 may be disposed to be symmetrically with the fourth sound generating device 1600HL. The second woofer-integrated sound generating device W4 may be disposed to be symmetrically with the fifth sound generating device 1600HR. With reference to FIGS. 18H to 18I, the first bent portion 701 may be disposed to be symmetrically with the fourth bent portion 704, and the second bent portion 702 may be disposed to be symmetrically with the fifth bent portion 705.

With reference to FIGS. 18F to 18I, the 1-1$^{st}$ pad 711, the 1-3$^{rd}$ pad 713, the 2-1$^{st}$ pad 811, the 2-3$^{rd}$ pad 813, the 3-1$^{st}$ pad 911, and the 3-3$^{rd}$ pad 913 may be provided as one, but embodiments are not limited thereto. The 1-1$^{st}$ pad 711, the 1-3$^{rd}$ pad 713, the 2-1$^{st}$ pad 811, the 2-3$^{rd}$ pad 813, the 3-1$^{st}$ pad 911, and the 3-3$^{rd}$ pad 913 may be provided as two or more.

FIGS. 19A to 19I illustrate a sound generating device and a partition according to an embodiment of the present disclosure.

Hereinafter, in embodiments, descriptions described with respect to FIGS. 19A to 19I will be given and may be identically or similarly applied to embodiments of FIGS. 20A to 27I.

Figure 19A:
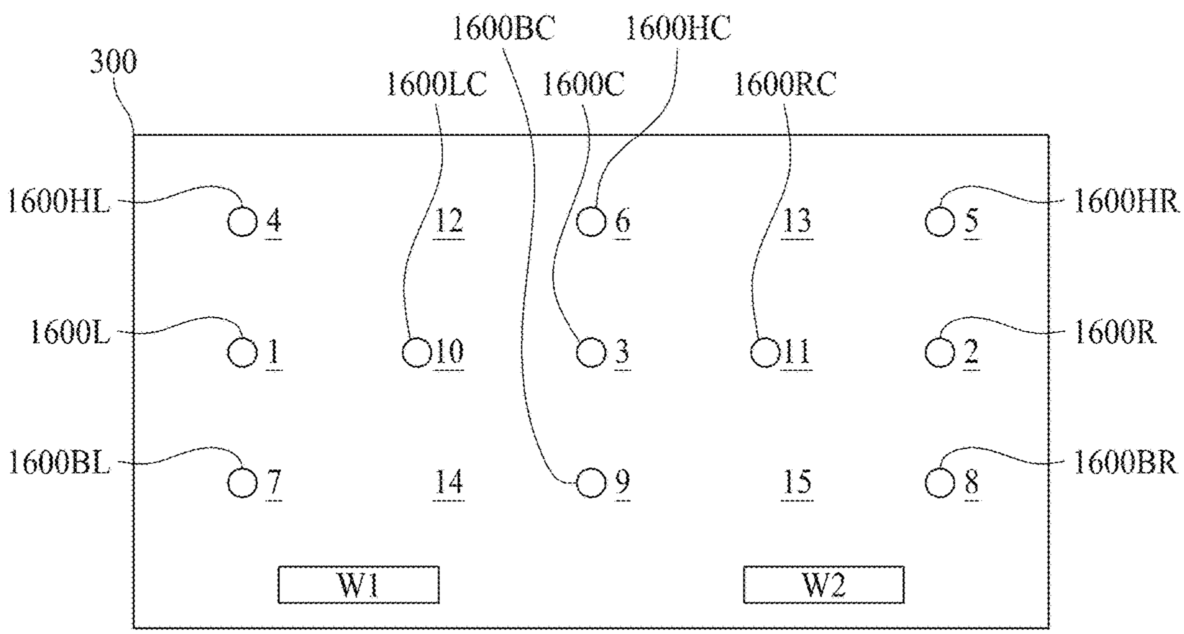
FIGS. 19A to 19I illustrate an embodiment of the sound generating device and a partition according to an embodiment of the present disclosure.
Figure 19B:
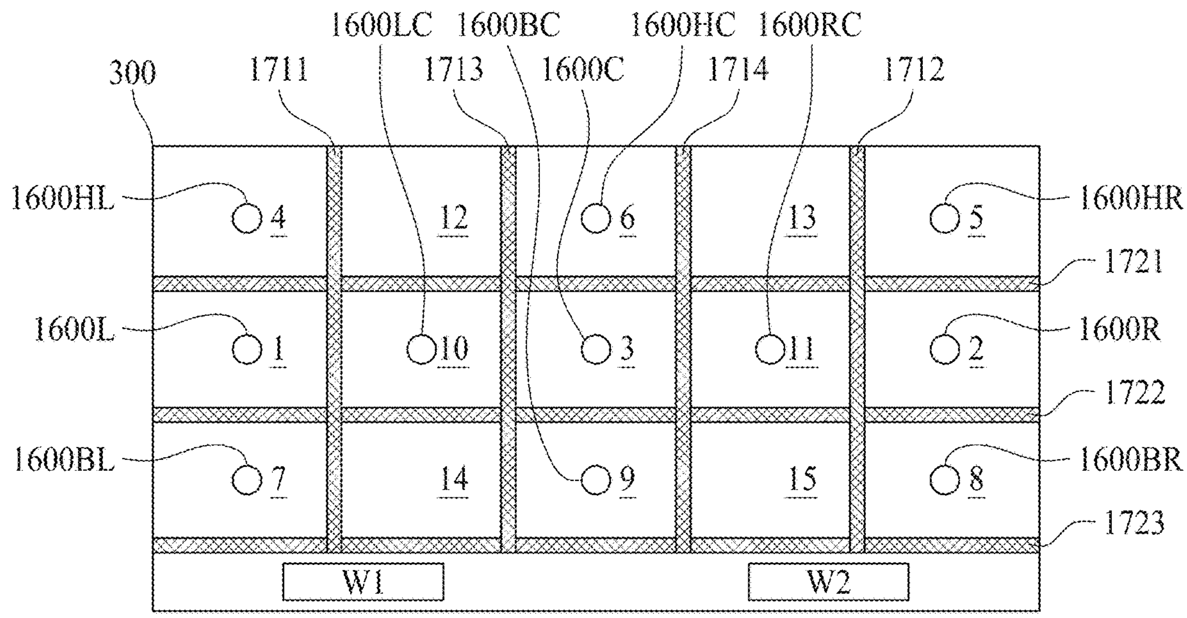
Figure 19C:
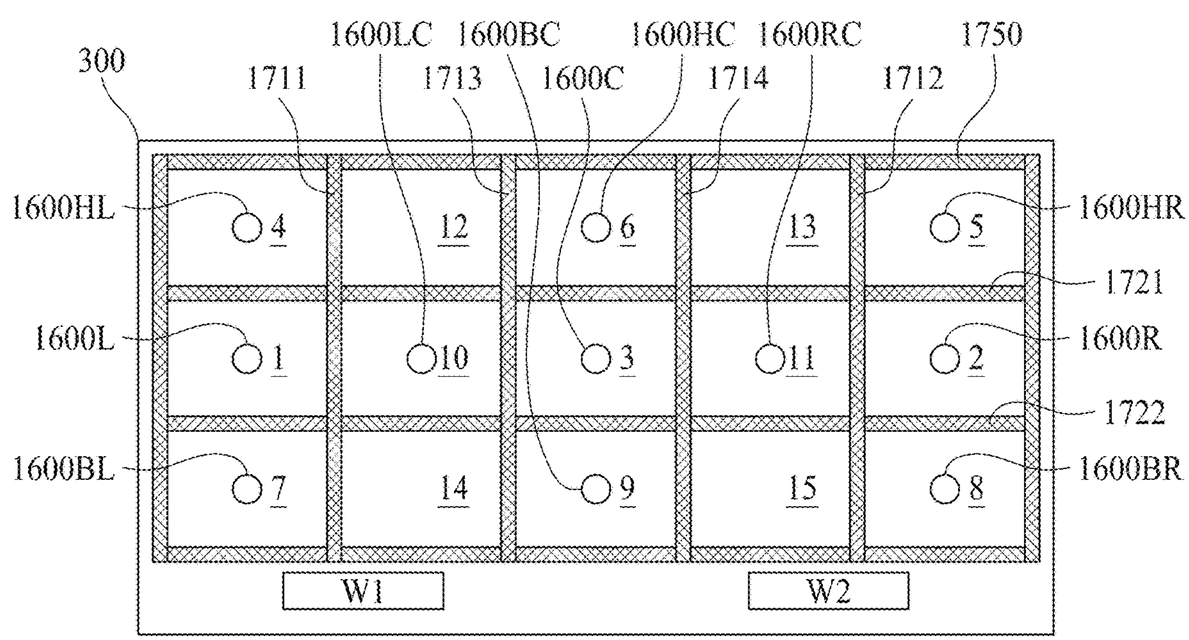
Figure 19D:
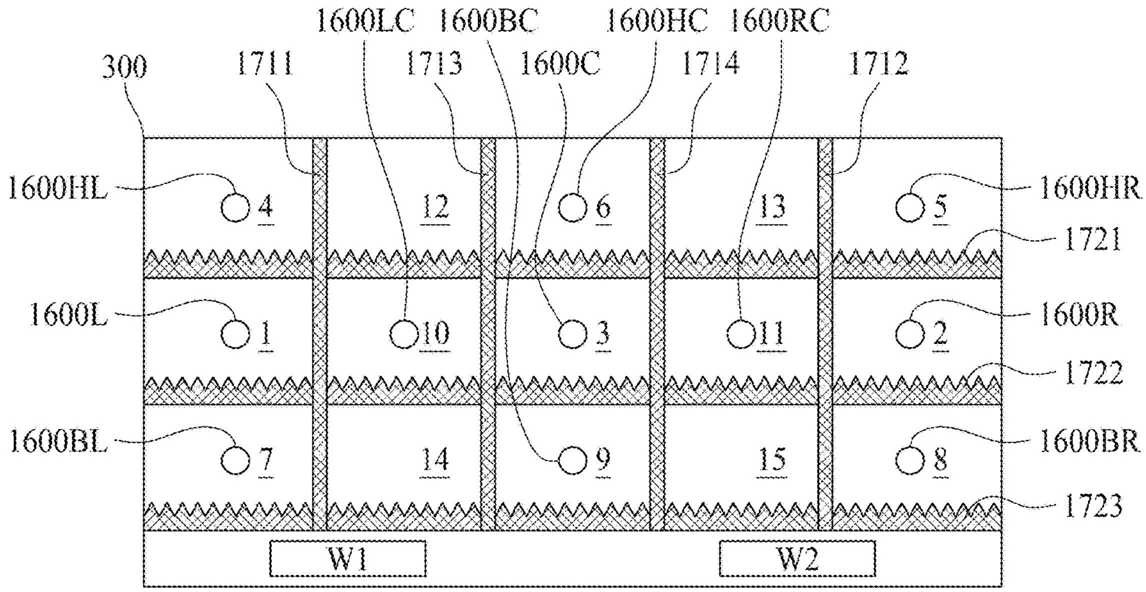
Figure 19E:
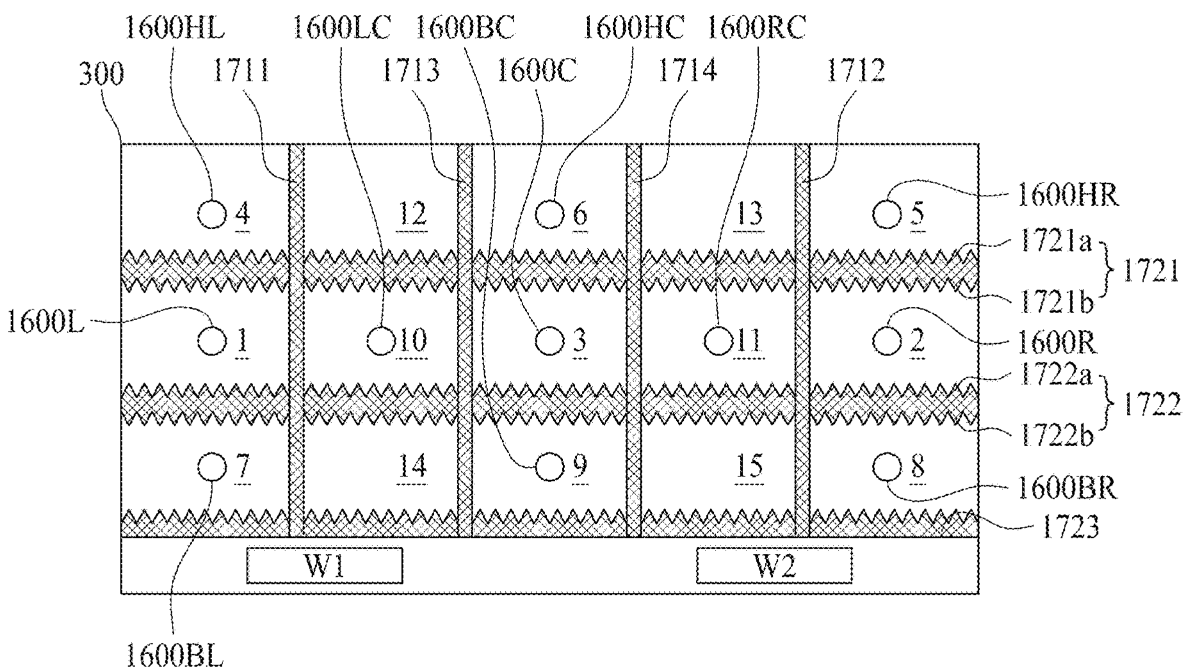
Figure 19F:
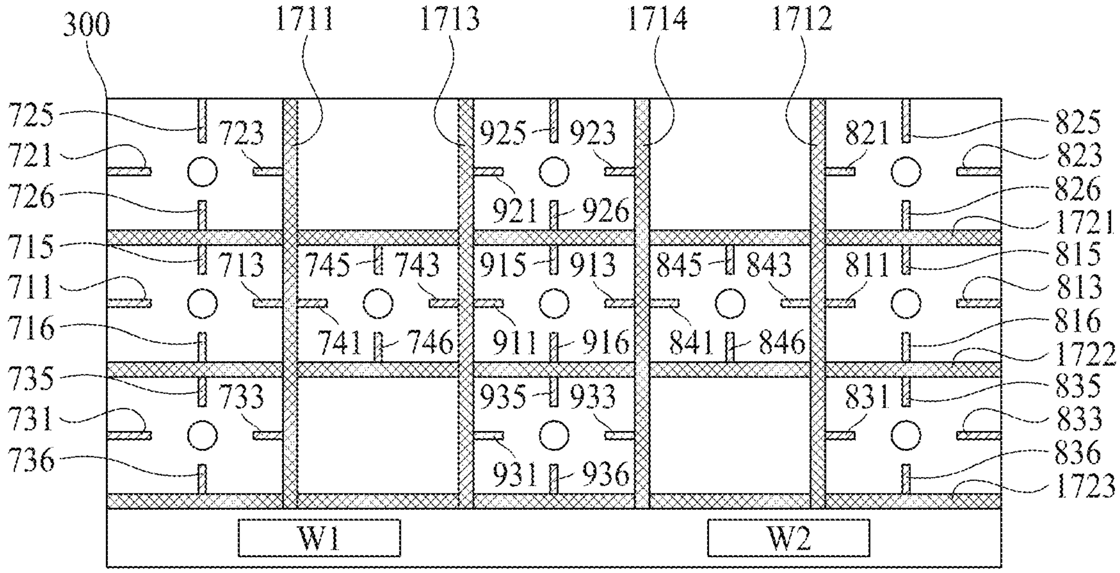
Figure 19G:
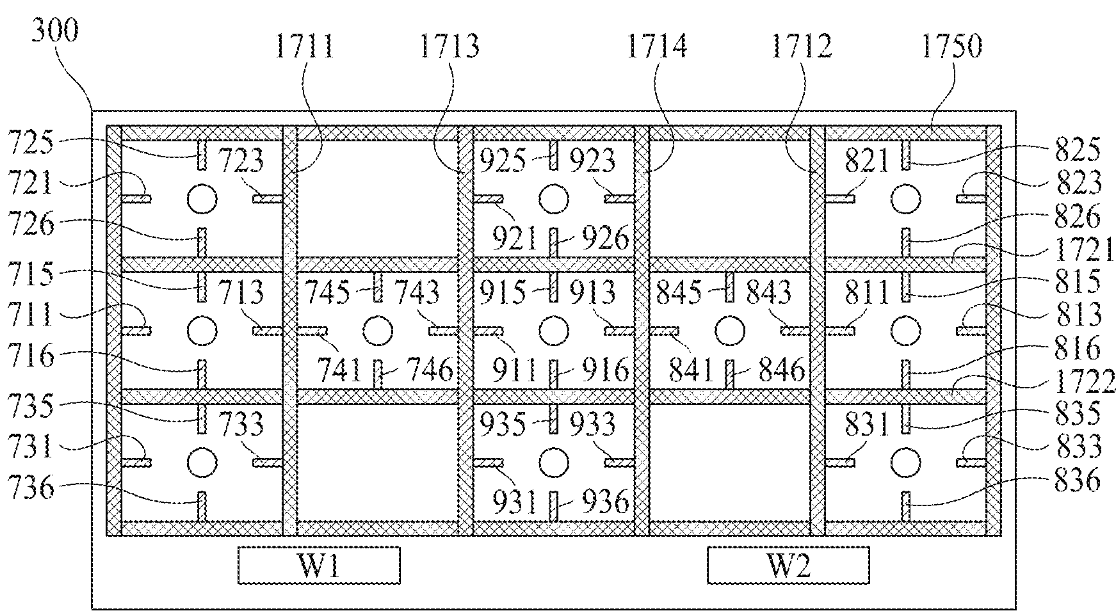
Figure 19H:
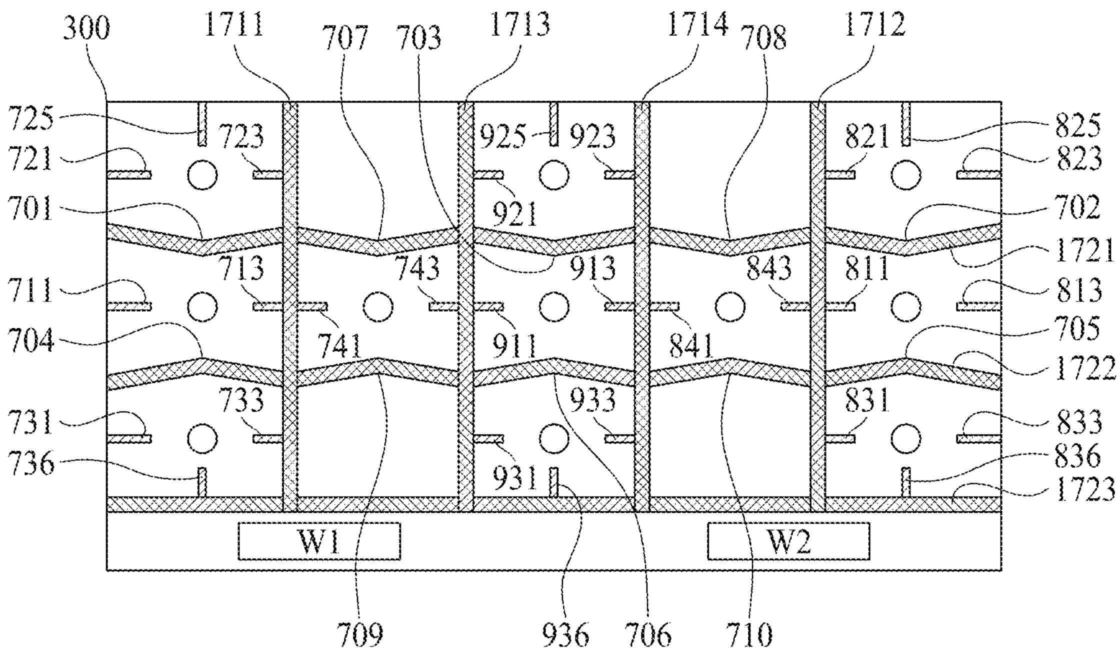
Figure 19I:
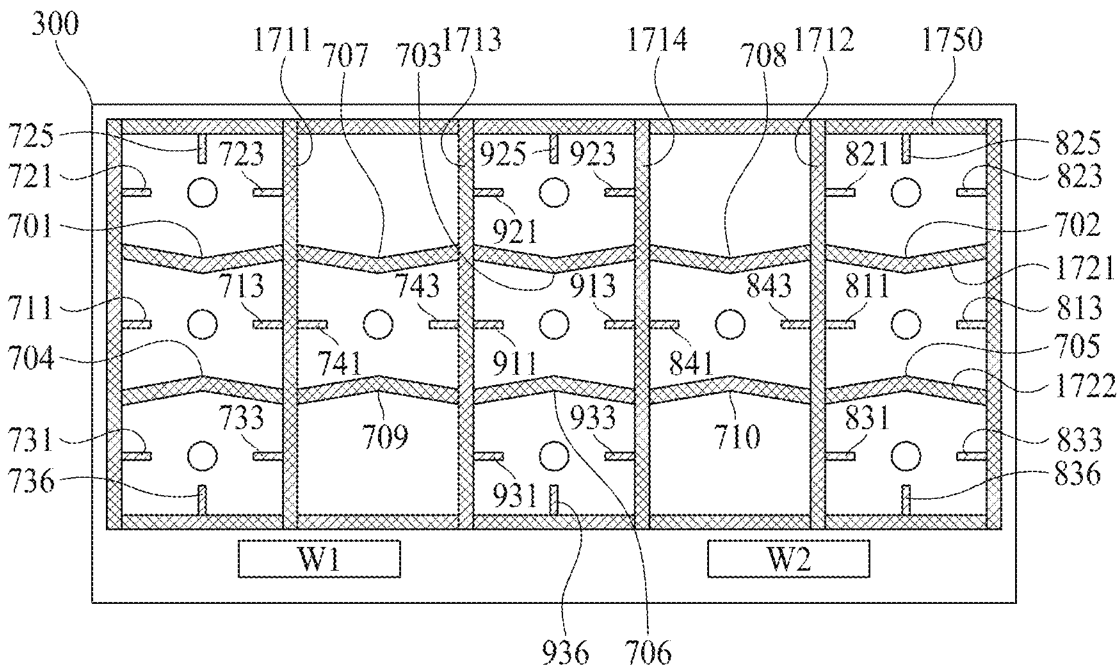

With reference to FIGS. 19A and 19I, a rear surface of the display panel may include first to fifteenth regions 1 to 15. The first to fifteenth regions 1 to 15 may have the same area, but embodiments are not limited thereto. For example, the first to fifteenth regions 1 to 15 may be arranged at equal intervals or distances, but are not limited thereto. A size of the first to fifteenth regions 1 to 15 may be adjusted based on a desired-pitched sound band. For example, the first region 1, the fourth region 4, and the seventh region 7 may be a left region of a rear surface of the display panel. For example, the second region 2, the fifth region 5, and the eighth region 8 may be a right region of the rear surface of the display panel. For example, the third region 3, the sixth region 6, and the ninth region 9 may be a center region of the rear surface of the display panel. For example, the sixth region 6 may be a region between the fourth region 4 and the fifth region 5. For example, the ninth region 9 may be a region between the seventh region 7 and the eighth region 8. For example, the tenth region 10 may be a region between the first region 1 and the second region 3. For example, the eleventh region 11 may be a region between the second region 2 and the third region 3. For example, the seventh region 7 may be under the first region 1 or at the lower portion of the first region 1, and the eighth region 8 may be under the second region 2 or at the lower portion of the second region 2. For example, the tenth region 10, the twelfth region 12, and the fourteenth region 14 may be regions between the first, fourth, and seventh regions 1, 4, and 7 and the third, sixth, and ninth regions 3, 6, and 9. For example, the eleventh region 11, the thirteenth region 13, and the fifteenth region 15 may be regions between the second, fifth, and eighth regions 2, 5, and 8 and the third, sixth, and ninth regions 3, 6, and 9. Reference numerals 1 to 15 referring to regions in the first to fifteenth regions 1 to 15 may be arbitrarily illustrated, and classification of reference numerals 1 to 15 and the first to fifteenth regions 1 to 15 do not limit descriptions of the present disclosure. Description relevant thereto may be identically or similarly applied to FIGS. 20A to 27I.

At least one sound generating device may be disposed in at least one of the first to fifteenth regions 1 to 15. Hereinafter, in embodiments, an example where a sound generating device is disposed on a rear surface of the display panel will be described, and embodiments are not limited thereto. A sound generating device may be disposed between the display panel and a supporting member 300. For example, the sound generating device may be disposed between the rear surface of the display panel and a front surface of the supporting member 300. For example, a first sound generating device 1600L may be disposed in the first region 1 of the rear surface of the display panel, a fourth sound generating device 1600HL may be disposed in the fourth region 4 of the rear surface of the display panel, and a seventh sound generating device 1600BL may be disposed in the seventh region 7 of the rear surface of the display panel. A second sound generating device 1600R may be disposed in the third region 2 of the rear surface of the display panel, a fifth sound generating device 1600HR may be disposed in the fifth region 5 of the rear surface of the display panel, and an eighth sound generating device 1600BR may be disposed in the eighth region 8 of the rear surface of the display panel. A third sound generating device 1600C may be disposed in the third region 3 of the rear surface of the display panel, a sixth sound generating device 1600HC may be disposed in the sixth region 6 of the rear surface of the display panel, and a ninth sound generating device 1600BC may be disposed in the ninth region 9 of the rear surface of the display panel. A tenth sound generating device 1600LC may be disposed in the tenth region 10 of the rear surface of the display panel, and an eleventh sound generating device 1600RC may be disposed in the eleventh region 11 of the rear surface of the display panel. The first sound generating device 1600L may be a left channel of the display panel, the fourth sound generating device 1600HL may be a height (or top) left channel of the display panel, and the seventh sound generating device 1600BL may be a bottom left channel of the display panel. The tenth sound generating device 1600LC may be a left center channel of the display panel. The second sound generating device 1600R may be a right channel of the display panel, the fifth sound generating device 1600HR may be a height (or top) right channel of the display panel, and the eighth sound generating device 1600BR may be a bottom right channel of the display panel. The eleventh sound generating device 1600RC may be a right center channel of the display panel. The third sound generating device 1600C may be a center channel of the display panel, the sixth sound generating device 1600HC may be a height (or top) center channel of the display panel, and the ninth sound generating device 1600BC may be a bottom center channel of the display panel.

For example, the first sound generating device 1600L may be disposed to be symmetrical with the fourth sound generating device 1600HL and/or the seventh sound generating device 1600BL, but embodiments are not limited thereto. For example, the first sound generating device 1600L may be disposed on the same line as the fourth sound generating device 1600HL and/or the seventh sound generating device 1600BL, but embodiments are not limited thereto. For example, the second sound generating device 1600R may be disposed to be symmetrical with the fifth sound generating device 1600HR and/or the eighth sound generating device 1600BR, but embodiments are not limited thereto. For example, the second sound generating device 1600R may be disposed on the same line as the fifth sound generating device 1600HR and/or the eighth sound generating device 1600BR, but embodiments are not limited thereto. For example, the third sound generating device 1600C may be disposed to be symmetrical with the sixth sound generating device 1600HC and/or the ninth sound generating device 1600BC, but embodiments are not limited thereto. For example, the tenth sound generating device 1600LC and the eleventh sound generating device 1600RC may be disposed to be symmetrical with at least one of the first sound generating device 1600L, the second sound generating device 1600R, and the third sound generating device 1600C, but embodiments are not limited thereto. For example, the tenth sound generating device 1600LC and the eleventh sound generating device 1600RC may be aligned on the same line as at least one of the first sound generating device 1600L, the second sound generating device 1600R, and the third sound generating device 1600C, but embodiments are not limited thereto. A description thereof may be identically or similarly applied to embodiments of FIGS. 20A to 27I.

For example, one of the fourth sound generating device 1600HL and the fifth sound generating device 1600HR may be disposed to be symmetrical with the sixth sound generating device 1600HC, but embodiments are not limited thereto. For example, one of the fourth sound generating device 1600HL and the fifth sound generating device 1600HR may be disposed on the same line as the sixth sound generating device 1600HC, but embodiments are not limited thereto. For example, one of the first sound generating device 1600L, the second sound generating device 1600R, the tenth sound generating device 1600LC, and the eleventh sound generating device 1600RC may be disposed to be symmetrical with the third sound generating device 1600C, but embodiments are not limited thereto. For example, one of the first sound generating device 1600L, the second sound generating device 1600R, the tenth sound generating device 1600LC, and the eleventh sound generating device 1600RC may be disposed on the same line as third sound generating device 1600C, but embodiments are not limited thereto. For example, one of the seventh sound generating device 1600BL and the eighth sound generating device 1600BR may be disposed to be symmetrical with the ninth sound generating device 1600BC, but embodiments are not limited thereto. For example, one of the seventh sound generating device 1600BL and the eighth sound generating device 1600BR may be disposed on the same line as the ninth sound generating device 1600BC, but embodiments are not limited thereto. A description thereof may be identically or similarly applied to embodiments of FIGS. 20A to 27I.

In FIGS. 19A to 19I, the first, second, third, fourth, fifth, sixth, seventh, eighth, ninth, tenth, and eleventh sound generating devices 1600L, 1600R, 1600C, 1600HL, 1600HR, 1600HC, 1600BL, 1600BR, 1600BC, 1600LC, and 1600RC may include one or more of an oval sound generating device, a pair of sound generating devices, a circular sound generating device, a single-type sound generating device, a two or more-array sound generating device, and a film-type sound generating device described above with respect to FIGS. 5 to 13. The oval shape may have an elliptical shape, a rectangular (e.g., quadrilateral) shape with rounded corners, or non-circular curved shape having a width different from its height, but the present embodiment is not limited thereto. For example, in the bobbin of the oval shape, a ratio of a long-axis diameter to a short-axis diameter may be set to 1.3:1 to 2:1. The bobbin of the oval shape may more improve a sound of a high-pitched sound band than a circular shape and may decrease the occurrence of heat caused by a vibration, and thus, may have an excellent heat dissipation characteristic. For example, at least one sound generating device may directly vibrate the display panel to generate a sound. A description thereof may be identically or similarly applied to embodiments of FIGS. 20A to 27I.

With reference to FIG. 19B, a partition may be further provided near or periphery of a sound generating device. The partition may be an air gap or a space where a sound is generated when the display panel vibrates. The partition may separate sounds or may separate channels, and may prevent or decrease the occurrence of a non-clear sound caused by sound interference. An air gap or a space which generates or transfers a sound may be referred to as a partition. The partition may be referred to as an enclosure or a baffle, but the term is not limited thereto. In embodiments, an example where the partition is disposed at a supporting member will be described, but an embodiment of the present disclosure is not limited thereto. In other embodiments, the partition may be disposed on a rear surface of the display panel. In order to illustrate the sound generating device and the partition, an example where the partition is disposed at the supporting member will be described. For example, when the partition is disposed at the supporting member, an influence of the image quality of the display panel due to the partition disposed on the display panel may be reduced.

For example, the partition may be disposed between a supporting member 300 and a display panel corresponding to first to eleventh regions 1 to 11. For example, a fourth partition 1713 may be disposed between the first, fourth, and seventh regions 1, 4, and 7 and the third, sixth, and ninth regions 3, 6, and 9. The fourth partition 1713 may separate channels or sounds, generated by the first, fourth, and seventh sound generating devices 1600L, 1600HL, and 1600BL, and channels or sounds generated by the third, sixth, and ninth sound generating devices 1600C, 1600HC, and 1600BC. For example, a fifth partition 1714 may be disposed between the second, fifth, and eighth regions 2, 5, and 8, the third, sixth, and ninth regions 3, 6, and 9. The fifth partition 1714 may separate channels or sounds, generated by the second, fifth, and eighth sound generating devices 1600R, 1600HR, and 1600BR, and channels or sounds generated by the third, sixth, and ninth sound generating devices 1600C, 1600HC, and 1600BC. Accordingly, the fourth partition 1713 and the fifth partition 1714 may separate a left sound and a right sound.

A first partition 1721 may separate the height channel (or top channel) of the display panel and the bottom channel of the display panel. For example, the first partition 1721 may separate the channels or the sounds, generated by the fourth sound generating device 1600HL, the fifth sound generating device 1600HR, and the sixth sound generating device 1600HC disposed at an upper portion of the display panel, and the channels or the sounds generated by the seventh sound generating device 1600BL, the eighth sound generating device 1600BR, and the ninth sound generating device 1600BC disposed at a lower portion of the display panel. In order to realize a stereo sound or a stereophonic sound, the tenth sound generating device 1600LC and the eleventh sound generating device 1600RC may be further provided, but the present inventors have recognized that a partition should be provided for separating sounds or channel, generated by the tenth sound generating device 1600LC, from sounds or channel generated by the seventh, eighth, and ninth sound generating devices 1600BL, 1600BR, and 1600BC. And, the present inventors have recognized that a partition should be provided for separating sounds or channel, generated by the eleventh sound generating device 1600RC, from sounds or channel generated by the seventh, eighth, and ninth sound generating devices 1600BL, 1600BR, and 1600BC. The fourth partition 1713 and the fifth partition 1714 may separate a left sound and a right sound or a left channel and a right channel. To realize a stereo sound or a stereophonic sound, the tenth sound generating device 1600LC and the eleventh sound generating device 1600RC may be further provided, but the present inventors have recognized that a partition should be provided for separating sounds or channel, generated by the tenth sound generating device 1600LC, from sounds or channel generated by the first, fourth, and seventh sound generating devices 1600L, 1600HL, and 1600BL. And, the present inventors have recognized that a partition should be provided for separating sounds or channel, generated by the eleventh sound generating device 1600RC, from sounds or channel generated by the second, fifth, and eighth sound generating devices 1600R, 1600HR, and 1600BR. When the first partition 1721 is provided, a height sound (or a top sound) and a bottom sound or a height channel (or a top channel) and a bottom channel may be separated from each other, but the present inventors have recognized that a height sound (or a top sound) and a bottom sound or a height channel (or a top channel) and a bottom channel may not be separated from a center sound or a center channel. When the fourth partition 1713 and the fifth partition 1714 are provided, a left sound and a right sound or a left channel and a right channel may be separated, but the present inventors have recognized that a left sound and a right sound or a left channel and a right channel may not be separated from a center sound or a center channel. Therefore, the present inventors have implemented a partition through various experiments. This will be described below.

For example, a sixth partition 1711 may be between the first, fourth, and seventh regions 1, 4, and 7 and the tenth region 10. For example, the sixth partition 1711 may separate channels or sounds generated by the first, fourth, and seventh sound generating devices 1600L, 1600HL, and 1600BL, and the channel or the sound generated by the tenth sound generating device 1600LC, thereby enhancing a sound output characteristic. For example, the sixth partition 1711 may separate channels or sounds generated by the first, fourth, and seventh sound generating devices 1600L, 1600HL, and 1600BL, and channels or sounds generated by the third, sixth, and ninth sound generating devices 1600C, 1600HC, and 1600BC, thereby enhancing a sound output characteristic. For example, the sixth partition 1711 may separate a left sound or a left channel, a left center sound or a left center channel, and a center sound or a center channel, thereby enhancing a sound output characteristic.

For example, a seventh partition 1712 may be between the second, fifth, and eighth regions 2, 5, and 8 and the eleventh region 11. For example, the seventh partition 1712 may separate channels or sounds generated by the second, fifth, and eighth sound generating devices 1600R, 1600HR, and 1600BR, and a channel or a sound generated by the eleventh sound generating device 1600RC, thereby enhancing a sound output characteristic. For example, the seventh partition 1712 may separate channels or sounds generated by the second, fifth, and eighth sound generating devices 1600R, 1600HR, and 1600BR, and the channels or the sounds generated by the third, sixth, and ninth sound generating devices 1600C, 1600HC, and 1600BC, thereby enhancing a sound output characteristic. For example, the seventh partition 1712 may separate a right sound or a right channel, a right center sound or a right center channel, and a center sound or a center channel, thereby enhancing a sound output characteristic.

For example, a fourth partition 1713 may be disposed between the third, sixth, and ninth regions 3, 6, and 9 and the tenth region 10. For example, the fourth partition 1713 may separate channels or sounds generated by the third, sixth, and ninth sound generating devices 1600C, 1600HC, and 1600BC, and a channel or a sound generated by the tenth sound generating device 1600LC, thereby enhancing a sound output characteristic. For example, a fifth partition 1714 may be disposed between the third, sixth, and ninth regions 3, 6, and 9 and the eleventh region 11. For example, the fifth partition 1714 may separate the channels or the sounds generated by the third, sixth, and ninth sound generating devices 1600C, 1600HC, and 1600BC, and the channel or the sound generated by the eleventh sound generating device 1600RC, thereby enhancing a sound output characteristic. For example, the fourth partition 1713 may separate a channel or a sound of a center region and a channel or a sound of a left center region. For example, the fifth partition 1714 may separate the channel or the sound of the center region and a channel or a sound of a right center region.

The first partition 1721 may separate the height channel (or top channel) of the display panel and the bottom channel of the display panel. For example, the first partition 1721 may separate the channels or the sounds, generated by the fourth, fifth, and sixth sound generating devices 1600HL, 1600HR, and 1600HC, and the channels or the sounds generated by the seventh, eighth, and ninth sound generating devices 1600BL, 1600BR, and 1600BC. The first partition 1721 may separate the height channel (or top channel) of the display panel and the center channel of the display panel. For example, the first partition 1721 may separate the channels or the sounds, generated by the fourth, fifth, and sixth sound generating devices 1600HL, 1600HR, and 1600HC, and the channels or the sounds generated by the first, second, third, tenth, and eleventh sound generating devices 1600L, 1600R, 1600C, 1600LC, and 1600RC.

The second partition 1722 may separate the center channel of the display panel and the bottom channel of the display panel. For example, the second partition 1722 may separate the channels or the sounds, generated by the first, second, third, tenth, and eleventh sound generating devices 1600L, 1600R, 1600C, 1600LC, and 1600RC and the channels or the sounds generated by the seventh, eighth, and ninth sound generating devices 1600BL, 1600BR, and 1600BC. The third partition 1723 may separate the bottom channel of the display panel and a woofer. For example, the third partition 1723 may be disposed under the seventh, eighth, and ninth sound generating devices 1600BL, 1600BR, and 1600BC or at a lower portion of the seventh, eighth, and ninth sound generating devices 1600BL, 1600BR, and 1600BC. For example, the third partition 1723 may separate the channels or the sounds, generated by the seventh, eighth, and ninth sound generating devices 1600BL, 1600BR, and 1600BC, and channels or sounds generated by a first woofer W1 and a second woofer W2.

The first, second, third, fourth, fifth, sixth, and seventh partitions 1721, 1722, 1723, 1713, 1714, 1711, and 1712 may be disposed at the supporting member 300. For example, the first, second, third, fourth, fifth, sixth, and seventh partitions 1721, 1722, 1723, 1713, 1714, 1711, and 1712 may be disposed on a front surface of the supporting member 300. For example, the first, second, third, fourth, fifth, sixth, and seventh partitions 1721, 1722, 1723, 1713, 1714, 1711, and 1712 may be disposed between the display panel and the supporting member 300. For example, the first, second, third, fourth, fifth, sixth, and seventh partitions 1721, 1722, 1723, 1713, 1714, 1711, and 1712 may be disposed between the rear surface of the display panel and the front surface of the supporting member 300.

The first, second, third, fourth, fifth, sixth, and seventh partitions 1721, 1722, 1723, 1713, 1714, 1711, and 1712 may be formed of one or more of a double-sided tape, a double-sided foam pad, a single-sided tape, a single-sided foam pad, an adhesive, and a bond, but embodiments are not limited thereto. When the partitions are formed of the double-sided tape or the double-sided foam pad, an adhesive force may be enhanced in a process of attaching the front surface of the supporting member 300 on the rear surface of the display panel. For example, the first, second, third, fourth, fifth, sixth, and seventh partitions 1721, 1722, 1723, 1713, 1714, 1711, and 1712 may include a material having an elastic force which enables compression to be made to a certain degree, and for example, may include polyurethane, polyolefin, polyethylene, and/or the like, but embodiments are not limited thereto.

The fourth sound generating device 1600HL may be provided in the fourth region 4, and a sound generating device may not be provided in the twelfth region 12. Therefore, vibrations of the fourth sound generating device 1600HL and the sixth sound generating device 1600HC may be attenuated or absorbed by the twelfth region 12 of the display panel, and thus, the transfer of a sound of the fourth region 4 to the sixth region 6 may be blocked or reduced and the transfer of a sound of the sixth region 6 to the fourth region 4 may be blocked or reduced. Accordingly, the degradation in sound quality caused by sound interference occurring in the fourth region 4 and the fifth region 5 may be reduced, and a sound characteristic of a middle-highpitched sound band may be more enhanced. For example, the fifth sound generating device 1600HR may be provided in the fifth region 5, the sixth sound generating device 1600HC may be provided in the sixth region 6, and a sound generating device may not be provided in the thirteenth region 13. Therefore, a vibration of each of the fifth sound generating device 1600HR and the sixth sound generating device 1600HC may be attenuated or absorbed in the thirteenth region 13 of the display panel, and thus, may block or decrease the transfer of a sound of the fifth region 5 to the sixth region 6 and may block or decrease the transfer of a sound of the sixth region 6 to the fifth region 5. Accordingly, the degradation in sound quality caused by sound interference occurring in the fifth region 5 and the sixth region 6 may be reduced, and a sound characteristic of a middle-high-pitched sound band may be more enhanced.

The seventh sound generating device 1600BL may be provided in the seventh region 7, the ninth sound generating device 1600BC may be provided in the ninth region 9, and a sound generating device may not be provided in the fourteenth region 14. Therefore, a vibration of each of the seventh sound generating device 1600BL and the ninth sound generating device 1600BC may be attenuated or absorbed in the fourteenth region 14 of the display panel, and thus, may block or decrease the transfer of a sound of the seventh region 7 to the ninth region 9 and may block or decrease the transfer of a sound of the ninth region 9 to the seventh region 7. Accordingly, the degradation in sound quality caused by sound interference occurring in the seventh region 7 and the ninth region 9 may be reduced, and a sound characteristic of a middle-high-pitched sound band may be more enhanced. For example, the eighth sound generating device 1600BR may be provided in the eighth region 8, the ninth sound generating device 1600BC may be provided in the ninth region 9, and a sound generating device may not be provided in the fifteenth region 15. Therefore, a vibration of the eighth sound generating device 1600BR and the ninth sound generating device 1600BC may be attenuated or absorbed in the fifteenth region 15 of the display panel, and thus, may block or decrease the transfer of a sound of the eighth region 8 to the ninth region 9 and may block or decrease the transfer of a sound of the ninth region 9 to the eighth region 8. Accordingly, the degradation in sound quality caused by sound interference occurring in the eighth region 8 and the ninth region 9 may be reduced, and a sound characteristic of a middle-high-pitched sound band may be more enhanced.

In FIG. 19B, a partition may not be disposed near the supporting member 300. The display panel 100 may be adhered to the periphery of the supporting member 300 by an adhesive member, described above with reference to FIG. 1B, and the adhesive member may be a partition.

In a process of placing the first, second, third, fourth, fifth, sixth, and seventh partitions 1721, 1722, 1723, 1713, 1714, 1711, and 1712, the first partition 1721, the second partition 1722, and the third partition 1723 may be first placed, and then, the fourth partition 1713, the fifth partition 1714, the sixth partition 1711, and the seventh partition 1712 may be placed subsequently. As another example, the fourth partition 1713, the fifth partition 1714, the sixth partition 1711, and the seventh partition 1712 may be first placed, and then, the first partition 1721, the second partition 1722, the third partition 1723 may be placed subsequently. However, an order in which the partitions are placed does not limit descriptions of an embodiment of the present disclosure. In the following embodiments, an example where the first partition 1721, the second partition 1722, and the third partition 1723 are first placed, and then, the fourth partition 1713, the fifth partition 1714, the sixth partition 1711, and the seventh partition 1712 are placed subsequently is illustrated, but an embodiment of the present disclosure is not limited thereto. Such a description may be identically or similarly applied to the following embodiments.

Therefore, the first sound generating device 1600L, the fourth sound generating device 1600HL, and the seventh sound generating device 1600BL may be disposed in the first region 1, the fourth region 4, and the seventh region 7 that are a left region of a rear surface of the display panel, and may vibrate a left region of the display panel. The second sound generating device 1600R, the fifth sound generating device 1600HR, and the eighth sound generating device 1600BR may be disposed in the second region 2, the fifth region 5, and the eighth region 8 that are a right region of the rear surface of the display panel, and may vibrate a right region of the display panel. The third sound generating device 1600C, the sixth sound generating device 1600HC, and the ninth sound generating device 1600BC may be disposed in the third region 3, the sixth region 6, and the ninth region 9 that are a center region of the rear surface of the display panel, and may vibrate a center region of the display panel. The tenth sound generating device 1600LC and the eleventh sound generating device 1600RC may be disposed in the tenth region 10 and the eleventh region 11, and may vibrate a left region, a center region, and a right region of the rear surface of the display panel. The first, second, third, fourth, fifth, sixth, seventh, eighth, ninth, tenth, and eleventh sound generating devices 1600L, 1600R, 1600C, 1600HL, 1600HR, 1600HC, 1600BL, 1600BR, 1600BC, 1600LC, and 1600RC may receive different vibration signals, and may each be independently driven. For example, the first sound generating device 1600L, the fourth sound generating device 1600HL, and the seventh sound generating device 1600BL may generate sounds by the left region of the rear surface of the display panel as a vibration plate. The second sound generating device 1600R, the fifth sound generating device 1600HR, and the eighth sound generating device 1600BR may generate sounds by the right region of the rear surface of the display panel as a vibration plate. The third sound generating device 1600C, the sixth sound generating device 1600HC, and the ninth sound generating device 1600BC may generate sounds by the center region of the rear surface of the display panel as a vibration plate. The tenth sound generating device 1600LC and the eleventh sound generating device 1600RC may generate sounds by the left region, the center region, and the right region of the rear surface of the display panel as a vibration plate. For example, the sixth sound generating device 1600HC may generate a sound toward an upper portion of the display panel. For example, the fourth sound generating device 1600HL, the fifth sound generating device 1600HR, and the sixth sound generating device 1600HC may generate sounds toward the upper portion of the display panel, thereby enhancing a sound at the upper portion of the display panel. For example, the seventh sound generating device 1600BL, the eighth sound generating device 1600BR, and the ninth sound generating device 1600BC may generate sounds toward a lower portion of the display panel, thereby enhancing a sound at the lower portion of the display panel. A woofer may be disposed for more enhancing a sound of a low-pitched sound band. For example, one or more woofers may be further disposed under at least one of the seventh region 7 and the eighth region 8 or at a lower portion of the at least one of the seventh region 7 and the eighth region 8. For example, one or more woofers may be further provided under at least one of the seventh sound generating device 1600BL and the eighth sound generating device 1600BR or at a lower portion of the at least one of the seventh sound generating device 1600BL and the eighth sound generating device 1600BR. For example, a first woofer W1 may be disposed under the seventh region 7 of the display panel or at a lower portion of the seventh region 7 of the display panel. For example, the first woofer W1 may be disposed under the seventh sound generating device 1600BL or at a lower portion of the seventh sound generating device 1600BL. For example, the first woofer W1 may be disposed between the seventh region 7 and the fourteenth region 14. For example, a second woofer W2 may be disposed under the eighth region 8 of the display panel or at a lower portion of the eighth region 8 of the display panel. For example, the second woofer W2 may be disposed under the eighth sound generating device 1600BR or at a lower portion of the eighth sound generating device 1600BR. For example, the second woofer W2 may be disposed between the eighth region 8 and the fifteenth region 15. Therefore, the first woofer W1 and the second woofer W2 may output sounds of a low-pitched sound band. The first, second, third, fourth, fifth, sixth, seventh, eighth, ninth, tenth, and eleventh sound generating devices 1600L, 1600R, 1600C, 1600HL, 1600HR, 1600HC, 1600BL, 1600BR, 1600BC, 1600LC, and 1600RC may output sounds of about 80 Hz to about 40 kHz. The first woofer W1 and the second woofer W2 may output sounds of 80 Hz or less. Accordingly, the display apparatus may output an 11.1-channel sound. Moreover, comparing with sound generating devices disposed on the left and the right of the display panel, since sound generating devices are further provided at an upper portion and a lower portion of the display panel with respect to a widthwise direction of the display panel, left and right sounds and height (or top) and bottom sounds may be enhanced, and a user may feel a sense of sound field like a real sound.

For example, since the tenth sound generating device 1600LC and the eleventh sound generating device 1600RC are further provided, sounds at a left, a right, and a center portions of the display panel may be more enhanced. For example, the fourth sound generating device 1600HL, the fifth sound generating device 1600HR, and the sixth sound generating device 1600HC are further provided, sounds at an upper portion of the display panel may be more enhanced, the seventh sound generating device 1600BL, the eighth sound generating device 1600BR, and the ninth sound generating device 1600BC are further provided, sounds at a bottom portion of the display panel may be more enhanced, thereby providing a display apparatus for realizing a stereo sound including left and right sounds and height (or top) and bottom sounds. Therefore, left and right sounds corresponding left and right images and height (or top) and bottom sounds corresponding to upper and lower images may be realized, and a real stereo sound of a real sound including stereo left and right sounds and stereo height (or top) and bottom sounds may be realized, thereby providing a user with a real sound instead of a virtual sound. Therefore, a real stereo sound or surround sound of a real sound including stereo left and right sounds and stereo height (or top) and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV (Audio Visual) or Dolby sound system. A description thereof may be identically or similarly applied to embodiments of FIGS. 19B to 27I. And, as described above with respect to FIGS. 6 to 11B, the first, second, third, fourth, fifth, sixth, seventh, eighth, ninth, tenth, and eleventh sound generating devices 1600L, 1600R, 1600C, 1600HL, 1600HR, 1600HC, 1600BL, 1600BR, 1600BC, 1600LC, and 1600RC may be disposed in the display panel 100. Therefore, a thickness of a sound generating device may be reduced, and thus, a thickness of a display apparatus may decrease, thereby providing a display apparatus for providing a sense of beauty to a user. Also, as described above with respect to FIGS. 12A and 12B, the first, second, third, fourth, fifth, sixth, seventh, eighth, ninth, tenth, and eleventh sound generating devices 1600L, 1600R, 1600C, 1600HL, 1600HR, 1600HC, 1600BL, 1600BR, 1600BC, 1600LC, and 1600RC may be configured as a sound generating device with enhanced low-pitched sound band, thereby providing a display apparatus for realizing left and right sounds and upper and lower sounds of an enhanced low-pitched sound band. Also, as described above with respect to FIG. 13, the first, second, third, fourth, fifth, sixth, seventh, eighth, ninth, tenth, and eleventh sound generating devices 1600L, 1600R, 1600C, 1600HL, 1600HR, 1600HC, 1600BL, 1600BR, 1600BC, 1600LC, and 1600RC may be configured as a film-type sound generating device, and thus, a thickness of a sound generating device may be reduced to decrease a thickness of a display apparatus, thereby providing a display apparatus for providing a sense of beauty to a user.

With reference to FIG. 19C, a first partition 1721, a second partition 1722, a fourth partition 1713, a fifth partition 1714, a sixth partition 1711, and a seventh partition 1712 may be provided, and a partition 1750 may be disposed between a supporting member 300 and a display panel. For example, the partition 1750 may be disposed at an edge or periphery of the supporting member 300. The partition 1750 may be a whole region of four outer sides of the front surface of the supporting member 300. As another example, the partition 1750 may be disposed at an edge or periphery of the rear surface of the display panel. The partition 1750 may be a whole region of four outer sides of the rear surface of the display panel. The partition 1750 may be a whole region of the four outer sides of the front surface of the supporting member 300 or the rear surface of the display panel. The partition 1750 may be disposed along a shape of the display panel 100 so as to prevent a wave phenomenon of the display panel. For example, when the partition 1750 is an adhesive member for attaching the display panel and the supporting member 300 described above with reference to FIG. 1B, the adhesive member described above with reference to FIG. 1B may be omitted, and the partition 1750 may be as an adhesive member. However, an embodiment of the present disclosure is not limited thereto, and an adhesive member for attaching the display panel 100 and the supporting member 300 may be provided on a rear surface of the display panel 100 or at the supporting member 300.

In a process of placing the first partition 1721, the second partition 1722, the fourth partition 1713, the fifth partition 1714, the sixth partition 1711, the seventh partition 1712, and the partition 1750, the first partition 1721 and the second partition 1722 may be first placed, the partition 1750 may be placed, and then, the fourth partition 1713, the fifth partition 1714, the sixth partition 1711, and the seventh partition 1712 may be placed subsequently. As another example, the fourth partition 1713, the fifth partition 1714, the sixth partition 1711, and the seventh partition 1712 may be first placed, the first partition 1721 and the second partition 1722 may be placed, and then, the partition 1750 may be placed subsequently. However, an order in which the partitions are placed does not limit descriptions of an embodiment of the present disclosure. The partition 1750 may be first placed in a lengthwise direction of the supporting member 300, and then, may be placed in a widthwise direction. As another example, the partition 1750 may be first placed in a widthwise direction of the supporting member 300, and then, may be placed in a lengthwise direction. However, an order in which the partitions are placed does not limit descriptions of the embodiment of the present disclosure. In the following embodiments, an example where the first partition 1721, the second partition 1722, and/or the third partition 1723 are first placed, the partition 1750 is placed, and then, the fourth partition 1713, the fifth partition 1714, the sixth partition 1711, and the seventh partition 1712 are placed subsequently is illustrated, but an embodiment of the present disclosure is not limited thereto. Such a description may be identically or similarly applied to the following embodiments.

With reference to FIGS. 19D and 19E, a shape of a first partition 1721, a shape of a second partition 1722, and a shape of a third partition 1723 may be differently implemented. A shape of a first partition 1721, a shape of a second partition 1722, and a shape of a third partition 1723 may differ from a shape of a display panel. For example, the first partition 1721, the second partition 1722, and the third partition 1723 may have a non-flat shape or may not have a linear shape. For example, the first partition 1721, the second partition 1722, and the third partition 1723 may have a saw-toothed shape, a triangular shape, and an end-rounded triangular shape. For example, sawtooth of the first partition 1721, the second partition 1722, and the third partition 1723 may be disposed toward a sound generating device. For example, when the first partition 1721, the second partition 1722, and the third partition 1723 have a triangular shape, an end of a triangle may be disposed toward a sound generating device. For example, when the first partition 1721, the second partition 1722, and the third partition 1723 may have an end-rounded triangular shape, an end of an end-rounded triangle may be disposed toward a sound generating device. For example, with reference to FIG. 19D, when the first partition 1721 has an end-rounded triangular shape, an end of an end-rounded triangle may be provided toward one or more of a fourth sound generating device 1600HL, a fifth sound generating device 1600HR, and a sixth sound generating device 1600HC. For example, when the second partition 1722 has an end-rounded triangular shape, an end of an end-rounded triangle may be provided toward one or more of a first sound generating device 1600L, a second sound generating device 1600R, a third sound generating device 1600C, a tenth sound generating device 1600LC, and an eleventh sound generating device 1600RC. For example, when the third partition 1723 has an end-rounded triangular shape, an end of an end-rounded triangle may be provided toward one or more of a seventh sound generating device 1600BL, an eighth sound generating device 1600BR, and a ninth sound generating device 1600BC. Accordingly, since a shape of a partition is provided toward at least one sound generating device, a peak or a dip phenomenon caused by a standing wave of the sound generating device may be controlled, and a wave phenomenon of a display panel may be reduced. Also, by modifying a shape of a partition, sound interference such as diffused reflection of a sound generating device may be solved.

When a partition has a non-flat shape or does not have a linear shape, the partition may diffuse a standing wave. For example, when a partition is implemented in a saw-toothed shape, a triangular shape, and an end-rounded triangular shape, a standing wave may be diffused in various directions by the saw-toothed shape, the triangular shape, and the end-rounded triangular shape, thereby enhancing a sound output characteristic.

With reference to FIG. 19E, one of the first partition 1721, the second partition 1722, and the third partition 1723 may be provided as two partitions, but is not limited thereto, and one of the first partition 1721 and the second partition 1722 may be provided as two partitions. For example, the first partition 1721 may include a 1-1$^{st}$ partition **1721*a* and a 1-2$^{nd}$ partition 1721*b*, and may be configured in a triangular or an end-rounded triangular shape. An end of the triangular or end-rounded triangular shape of the 1-1$^{st}$ partition 1721*a* may be provided to face or toward one or more of the fourth sound generating device 1600HL, the fifth sound generating device 1600HR, and the sixth sound generating device 1600HC. An end of the triangular or end-rounded triangular shape of the 1-2$^{nd}$ partition 1721*b* may be provided to face or toward one or more of the first sound generating device 1600L, a second sound generating device 1600R, the third sound generating device 1600C, the tenth sound generating device 1600LC, and the eleventh sound generating device 1600**RC.

For example, the second partition 1722 may include a 2-1$^{st}$ partition **1722*a* and a 2-2$^{nd}$ partition 1722*b*, and may be configured in a triangular or an end-rounded triangular shape. An end of the triangular or end-rounded triangular shape of the 2-1$^{st}$ partition 1722*a* may be provided to face or toward one or more of the first sound generating device 1600L, a second sound generating device 1600R, the third sound generating device 1600C, a tenth sound generating device 1600LC, and the eleventh sound generating device 1600RC. An end of the triangular or end-rounded triangular shape of the 2-2$^{nd}$ partition 1722*b* may be provided to face or toward one or more of the seventh sound generating device 1600BL, the eighth sound generating device 1600BR, and the ninth sound generating device 1600BC. An end of a triangular or end-rounded triangular shape of the third partition 1723 may be provided to face or toward one or more of the seventh sound generating device 1600BL, the eighth sound generating device 1600BR, and the ninth sound generating device 1600**BC. Accordingly, a peak or a dip phenomenon caused by a standing wave of a sound generating device may be controlled, and a wave phenomenon of a display panel may be reduced.

With reference to FIGS. 19F to 19I, a pad may be disposed on at least one side of a sixth partition 1711 to face or toward one or more of the first sound generating device 1600L, the fourth sound generating device 1600HL, and the seventh sound generating device 1600BL. For example, a 1-3$^{rd}$ pad 713 may be disposed on at least one side of the sixth partition 1711 to face the first sound generating device 1600L. A 1-1$^{st}$ pad 711 may be disposed on a side facing the 1-3$^{rd}$ pad 713. The 1-1$^{st}$ pad 711 and the 1-3$^{rd}$ pad 713 may be provided as one, but embodiments are not limited thereto, and one or more of the 1-1$^{st}$ pad 711 and the 1-3$^{rd}$ pad 713 may be provided as two or more. For example, a 4-3$^{rd}$ pad 723 may be disposed on at least one side of the sixth partition 1711 to face or toward one or more of the fourth sound generating device 1600HL. A 4-1$^{st}$ pad 721 may be disposed on a side facing the 4-3$^{rd}$ pad 723. The 4-1$^{st}$ pad 721 and the 4-3$^{rd}$ pad 723 may be provided as one, but embodiments are not limited thereto, and one or more of the 4-1$^{st}$ pad 721 and the 4-3$^{rd}$ pad 723 may be provided as two or more. For example, a 7-3$^{rd}$ pad 733 may be disposed on at least one side of the sixth partition 1711 to face or toward the seventh sound generating device 1600BL. A 7-1$^{st}$ pad 731 may be disposed on a side facing the 7-3$^{rd}$ pad 733. The 7-1$^{st}$ pad 731 and the 7-3$^{rd}$ pad 733 may be provided as one, but embodiments are not limited thereto, and one or more of the 7-1$^{st}$ pad 731 and the 7-3$^{rd}$ pad 733 may be provided as two or more.

A pad may be disposed on at least one other side of the sixth partition 1711 to face or toward the tenth sound generating device 1600LC. For example, a 10-1$^{st}$ pad 741 may be disposed on at least one other side of the sixth partition 1711 to face or toward the tenth sound generating device 1600LC. The 10-1$^{st}$ pad 741 may be provided as one, but embodiments are not limited thereto, and may be provided as two or more.

A pad may be disposed on at least one side of a seventh partition 1712 to face or toward one or more of the second sound generating device 1600R, the fifth sound generating device 1600HR, and the eighth sound generating device 1600BR. For example, a 2-1$^{st}$ pad 811 may be disposed on at least one side of the seventh partition 1712 to face or toward the second sound generating device 1600R. A 2-3$^{rd}$ pad 813 may be disposed on a side facing the 2-1$^{st}$ pad 811. The 2-1$^{st}$ pad 811 and the 2-3$^{rd}$ pad 813 may be provided as one, but embodiments are not limited thereto, and one or more of the 2-1$^{st}$ pad 811 and the 2-3$^{rd}$ pad 813 may be provided as two or more. For example, a 5-1$^{st}$ pad 821 may be disposed on at least one side of the seventh partition 1712 to face or toward the fifth sound generating device 1600HR. A 5-3$^{rd}$ pad 823 may be disposed on a side facing the 5-1$^{st}$ pad 821. The 5-1$^{st}$ pad 821 and the 5-3$^{rd}$ pad 823 may be provided as one, but embodiments are not limited thereto, and one or more of the 5-1$^{st}$ pad 821 and the 5-3$^{rd}$ pad 823 may be provided as two or more. For example, an 8-1$^{st}$ pad 831 may be disposed on at least one side of the seventh partition 1712 to face or toward the eighth sound generating device 1600BR. An 8-3$^{rd}$ pad 833 may be disposed on a side facing the 8-1$^{st}$ pad 831. The 8-1$^{st}$ pad 831 and the 8-3$^{rd}$ pad 833 may be provided as one, but embodiments are not limited thereto, and one or more of the 8-1$^{st}$ pad 831 and the 8-3$^{rd}$ pad 833 may be provided as two or more.

A pad may be disposed on at least one other side of the seventh partition 1712 to face or toward the eleventh sound generating device 1600RC. For example, an 11-3$^{rd}$ pad 843 may be disposed on at least one other side of the seventh partition 1712 to face or toward the eleventh sound generating device 1600RC. The 11-3$^{rd}$ pad 843 may be provided as one, but embodiments are not limited thereto, and may be provided as two or more.

A pad may be disposed on at least one side of a fourth partition 1713 and at least one side of the fifth partition 1714 to face or toward one or more of the third sound generating device 1600C, the sixth sound generating device 1600HC, and the ninth sound generating device 1600BC.

For example, a 3-1$^{st}$ pad 911 may be disposed on at least one side of the fourth partition 1713 to face or toward the third sound generating device 1600C. For example, a 3-3$^{rd}$ pad 913 may be disposed on at least one side of the fifth partition 1714 to face or toward the third sound generating device 1600C. The 3-1$^{st}$ pad 911 may be disposed to face or toward the 3-3$^{rd}$ pad 913. For example, the 3-3$^{rd}$ pad 913 may be disposed on a side of the fifth partition 1714 facing the 3-1$^{st}$ pad 911. The 3-1$^{st}$ pad 911 and the 3-3$^{rd}$ pad 913 may be provided as one, but embodiments are not limited thereto, and one or more of the 3-1$^{st}$ pad 911 and the 3-3$^{rd}$ pad 913 may be provided as two or more. For example, a 6-1$^{st}$ pad 921 may be disposed on at least one side of the fourth partition 1713 to face or toward one or more of the sixth sound generating device 1600HC. For example, a 6-3$^{rd}$ pad 923 may be disposed on at least one side of the fifth partition 1714 to face or toward the sixth sound generating device 1600HC. The 6-1$^{st}$ pad 921 may be disposed to face or toward the 6-3$^{rd}$ pad 923. The 6-3$^{rd}$ pad 923 may be disposed on a side of the fifth partition 1714 facing the 6-1$^{st}$ pad 921. The 6-1$^{st}$ pad 921 and the 6-3$^{rd}$ pad 923 may be provided as one, but embodiments are not limited thereto, and one or more of the 6-1$^{st}$ pad 921 and the 6-3$^{rd}$ pad 923 may be provided as two or more. For example, a 9-1$^{st}$ pad 931 may be disposed on at least one side of the fourth partition 1713 to face or toward the ninth sound generating device 1600BC. For example, a 9-3$^{rd}$ pad 933 may be disposed on at least one side of the fifth partition 1714 to face or toward the ninth sound generating device 1600BC. The 9-1$^{st}$ pad 931 may be disposed to face the 9-3$^{rd}$ pad 933. The 9-3$^{rd}$ pad 933 may be disposed on a side of the fifth partition 1714 facing the 9-1$^{st}$ pad 931. The 9-1$^{st}$ pad 931 and the 9-3$^{rd}$ pad 933 may be provided as one, but embodiments are not limited thereto, and one or more of the 9-1$^{st}$ pad 931 and the 9-3$^{rd}$ pad 933 may be provided as two or more.

For example, a 10-3$^{rd}$ pad 743 may be disposed on at least one other side of the fourth partition 1713 to face the tenth sound generating device 1600LC. For example, an 11-1$^{st}$ pad 841 may be disposed on at least one other side of the fifth partition 1714 to face or toward the eleventh sound generating device 1600RC. The 10-3$^{rd}$ pad 743 and the 11-1$^{st}$ pad 841 may be provided as one, but embodiments are not limited thereto, and one or more of the 10-3$^{rd}$ pad 743 and the 11-1$^{st}$ pad 841 may be provided as two or more.

A pad may be disposed on at least one side of the first partition 1721 to face or toward one or more of the fourth sound generating device 1600HL, the fifth sound generating device 1600HR, and the sixth sound generating device 1600HC. For example, a 4-6$^{th}$ pad 726 may be disposed on at least one side of the first partition 1721 to face or toward the fourth sound generating device 1600HL. A 4-5$^{th}$ pad 725 may be disposed on a side facing the 4-6$^{th}$ pad 726, and the 4-5$^{th}$ pad 725 may be disposed to face or toward the fourth sound generating device 1600HL. The 4-5$^{th}$ pad 725 and the 4-6$^{th}$ pad 726 may be provided as one, but embodiments are not limited thereto, and one or more of the 4-5$^{th}$ pad 725 and the 4-6$^{th}$ pad 726 may be provided as two or more.

For example, a 5-6$^{th}$ pad 826 may be disposed on at least one side of the first partition 1721 to face or toward the fifth sound generating device 1600HR. A 5-5$^{th}$ pad 825 may be disposed on a side facing the 5-6$^{th}$ pad 826, and the 5-5$^{th}$ pad 825 may be disposed to face or toward the fifth sound generating device 1600HR. The 5-5$^{th}$ pad 825 and the 5-6$^{th}$ pad 826 may be provided as one, but embodiments are not limited thereto, and one or more of the 5-5$^{th}$ pad 825 and the 5-6$^{th}$ pad 826 may be provided as two or more.

For example, a 6-6$^{th}$ pad 926 may be disposed on at least one side of the first partition 1721 to face or toward the sixth sound generating device 1600HC. A 6-5$^{th}$ pad 925 may be disposed on a side facing the 6-6$^{th}$ pad 926, and the 6-5$^{th}$ pad 925 may be disposed to face or toward the sixth sound generating device 1600HC. The 6-5$^{th}$ pad 925 and the 6-6$^{th}$ pad 926 may be provided as one, but embodiments are not limited thereto, and one or more of the 6-5$^{th}$ pad 925 and the 6-6$^{th}$ pad 926 may be provided as two or more.

For example, a pad may be disposed on at least one other side of the first partition 1721 to face or toward one or more of the first sound generating device 1600L, the second sound generating device 1600R, the third sound generating device 1600C, the tenth sound generating device 1600LC, and the eleventh sound generating device 1600RC. For example, a 1-5$^{th}$ pad 715 may be disposed on at least one other side of the first partition 1721 to face or toward the first sound generating device 1600L. For example, a 2-5$^{th}$ pad 815 may be disposed on at least one other side of the first partition 1721 to face or toward the second sound generating device 1600R. For example, a 3-5$^{th}$ pad 915 may be disposed on at least one other side of the first partition 1721 to face or toward the third sound generating device 1600C. For example, a 10-5$^{th}$ pad 745 may be disposed on at least one other side of the first partition 1721 to face or toward the tenth sound generating device 1600LC. For example, an 11-5$^{th}$ pad 845 may be disposed on at least one other side of the first partition 1721 to face or toward the eleventh sound generating device 1600RC. The 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as one, but embodiments are not limited thereto, and one or more of the 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as two or more.

For example, a pad may be disposed on at least one side of the second partition 1722 to face or toward one or more of the first sound generating device 1600L, the second sound generating device 1600R, the third sound generating device 1600C, the tenth sound generating device 1600LC, and the eleventh sound generating device 1600RC. For example, a 1-6$^{th}$ pad 716 may be disposed on at least one side of the second partition 1722 to face or toward the first sound generating device 1600L. For example, a 2-6$^{th}$ pad 816 may be disposed on at least one side of the second partition 1722 to face or toward the second sound generating device 1600R. For example, a 3-6$^{th}$ pad 916 may be disposed on at least one side of the second partition 1722 to face the third sound generating device 1600C. For example, a 10-6$^{th}$ pad 746 may be disposed on at least one side of the second partition 1722 to face or toward the tenth sound generating device 1600LC. For example, an 11-6$^{th}$ pad 846 may be disposed on at least one side of the second partition 1722 to face or toward the eleventh sound generating device 1600RC. The 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as one, but embodiments are not limited thereto, and one or more of the 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as two or more.

The 1-5$^{th}$ pad 715 may be disposed to face the 1-6$^{th}$ pad 716. For example, the 1-6$^{th}$ pad 716 may be disposed on a side of the second partition 1722 facing the 1-5$^{th}$ pad 715. The 2-5$^{th}$ pad 815 may be disposed to face or toward the 2-6$^{th}$ pad 816. For example, the 2-6$^{th}$ pad 816 may be disposed on a side of the second partition 1722 facing the 2-5$^{th}$ pad 815. The 3-5$^{th}$ pad 915 may be disposed to face or toward the 3-6$^{th}$ pad 916. For example, the 3-6$^{th}$ pad 916 may be disposed on a side of the second partition 1722 facing the 3-5$^{th}$ pad 915. The 10-5$^{th}$ pad 745 may be disposed to face or toward the 10-6$^{th}$ pad 746. For example, the 10-6$^{th}$ pad 746 may be disposed on a side of the second partition 1722 facing the 10-5$^{th}$ pad 745. The 11-5$^{th}$ pad 845 may be disposed to face or toward the 11-6$^{th}$ pad 846. For example, the 11-6$^{th}$ pad 846 may be disposed on a side of the second partition 1722 facing the 11-5$^{th}$ pad 845.

For example, a pad may be disposed on at least one other side of the second partition 1722 to face or toward one or more of the seventh sound generating device 1600BL, the eighth sound generating device 1600BR, and the ninth sound generating device 1600BC. For example, a 7-5$^{th}$ pad 735 may be disposed on at least one other side of the second partition 1722 to face or toward the seventh sound generating device 1600BL. For example, an 8-5$^{th}$ pad 835 may be disposed on at least one other side of the second partition 1722 to face or toward the eighth sound generating device 1600BR. For example, a 9-5$^{th}$ pad 935 may be disposed on at least one other side of the second partition 1722 to face or toward the ninth sound generating device 1600BC. The 7-5$^{th}$ pad 735, the 8-5$^{th}$ pad 835, and the 9-5$^{th}$ pad 935 may be provided as one, but embodiments are not limited thereto, and one or more of the 7-5$^{th}$ pad 735, the 8-5$^{th}$ pad 835, and the 9-5$^{th}$ pad 935 may be provided as two or more.

For example, a pad may be disposed on at least one side of the third partition 1723 to face or toward one or more of the seventh sound generating device 1600BL, the eighth sound generating device 1600BR, and the ninth sound generating device 1600BC. For example, a 7-6$^{th}$ pad 736 may be disposed on at least one side of the third partition 1723 to face or toward the seventh sound generating device 1600BL. For example, an 8-6$^{th}$ pad 836 may be disposed on at least one side of the third partition 1723 to face or toward the eighth sound generating device 1600BR. For example, a 9-6$^{th}$ pad 936 may be disposed on at least one side of the third partition 1723 to face or toward the ninth sound generating device 1600BC. The 7-6$^{th}$ pad 736, the 8-6$^{th}$ pad 836, and the 9-6$^{th}$ pad 936 may be provided as one, but embodiments are not limited thereto, and one or more of the 7-6$^{th}$ pad 736, the 8-6$^{th}$ pad 836, and the 9-6$^{th}$ pad 936 may be provided as two or more. In embodiments, sizes of the 1-1$^{st}$ pad 711 and the 1-3$^{th}$ pad 713 are illustrated to be greater than that of each of the 1-5$^{th}$ pad 715 and the 1-6$^{th}$ pad 716, but a size of each pad does not limit descriptions of the present disclosure. For example, sizes of the 1-1$^{st}$ and 1-3$^{rd}$ pads 711 and 713 may be equal to or smaller than that of each of the 1-5$^{th}$ pad 715 and the 1-6$^{th}$ pad 716. This may be identically applied to the other pads. In FIG. 19F, a partition may not be disposed near the supporting member 300. The display panel 100 may be adhered to the periphery of the supporting member 300 by an adhesive member, described above with reference to FIG. 1B, and the adhesive member may be a partition.

With reference to FIG. 19G, a first partition 1721, a second partition 1722, a fourth partition 1713, a fifth partition 1714, a sixth partition 1711, a seventh partition 1712, and a partition 1750 may be provided. For example, one or more pads may be provided on a side of the partition 1750. A 4-5$^{th}$ pad 725 may be disposed on one side of the partition 1750 to face the fourth sound generating device 1600HL, a 5-5$^{th}$ pad 825 may be disposed on the one side of the partition 1750 to face or toward the fifth sound generating device 1600HR, and a 6-5$^{th}$ pad 925 may be disposed on the one side of the partition 1750 to face or toward the sixth sound generating device 1600HC. A 7-6$^{th}$ pad 736 may be disposed on one other side of the partition 1750 to face or toward the seventh sound generating device 1600BL, an 8-6$^{th}$ pad 836 may be disposed on the one other side of the partition 1750 to face or toward the eighth sound generating device 1600BR, and a 9-6$^{th}$ pad 936 may be disposed on the one other side of the partition 1750 to face or toward the ninth sound generating device 1600BC. Since the partition 1750 is provided, a fixing force of a sound generating device disposed on the rear surface of the display panel may be enhanced, and the leakage of a sound occurring in the edge of the display panel may be reduced, thereby enhancing a sound output characteristic. The other elements are the same as or similar to FIG. 19F, and thus, their detailed descriptions are omitted.

For example, when the partition 1750 is an adhesive member for attaching a display panel 100 and a supporting member 300 described above with reference to FIG. 1B, the adhesive member described above with reference to FIG. 1B may be omitted, and the partition 1750 may be as an adhesive member. However, an embodiment of the present disclosure is not limited thereto, and an adhesive member for attaching the display panel 100 and the supporting member 300 may be provided on a rear surface of the display panel or at the supporting member 300.

With reference to FIGS. 19H and 19I, a first partition 1721 and a second partition 1722 may include a bent portion. The other elements are the same as or similar to FIG. 19F, and thus, their detailed descriptions are omitted.

With reference to FIG. 19H, the first partition 1721 may include one or more bent portions. For example, the first partition 1721 may include a first bent portion 701 toward the first sound generating device 1600L and may include a seventh bent portion 707 toward the tenth sound generating device 1600LC. The first partition 1721 may include a second bent portion 702 toward the second sound generating device 1600R and may include an eighth bent portion 708 toward the eleventh sound generating device 1600RC. The first partition 1721 may include a third bent portion 703 toward the third sound generating device 1600C. Also, a reduction in sound pressure caused by standing waves of the fourth sound generating device 1600HL, the fifth sound generating device 1600HR, and the sixth sound generating device 1600HC may be reduced by a 4-5$^{th}$ pad 725, a 5-5$^{th}$ pad 825, and a 6-5$^{th}$ pad 925.

The second partition 1722 may include one or more bent portions. For example, the second partition 1722 may include a fourth bent portion 704 toward the first sound generating device 1600L and may include a ninth bent portion 709 toward the tenth sound generating device 1600LC. The second partition 1722 may include a fifth bent portion 705 toward the second sound generating device 1600R and may include a tenth bent portion 710 toward the eleventh sound generating device 1600RC. The second partition 1722 may include a sixth bent portion 706 toward the third sound generating device 1600C.

Figure 20A:
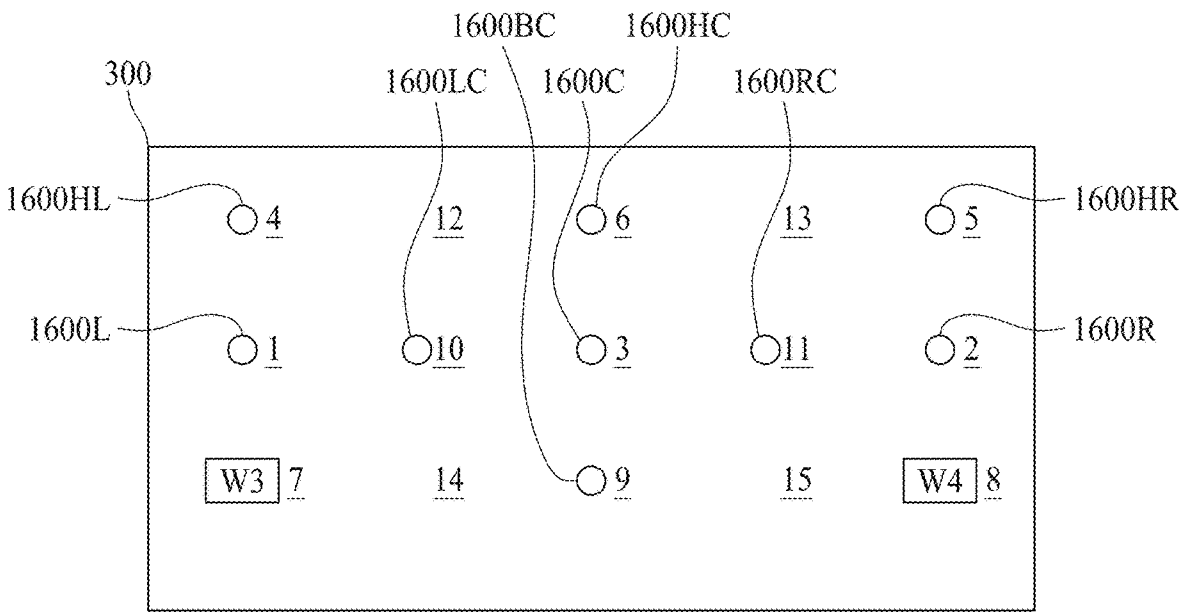
FIGS. 20A to 20I illustrate an embodiment of the sound generating device and a partition according to an embodiment of the present disclosure.
Figure 20B:
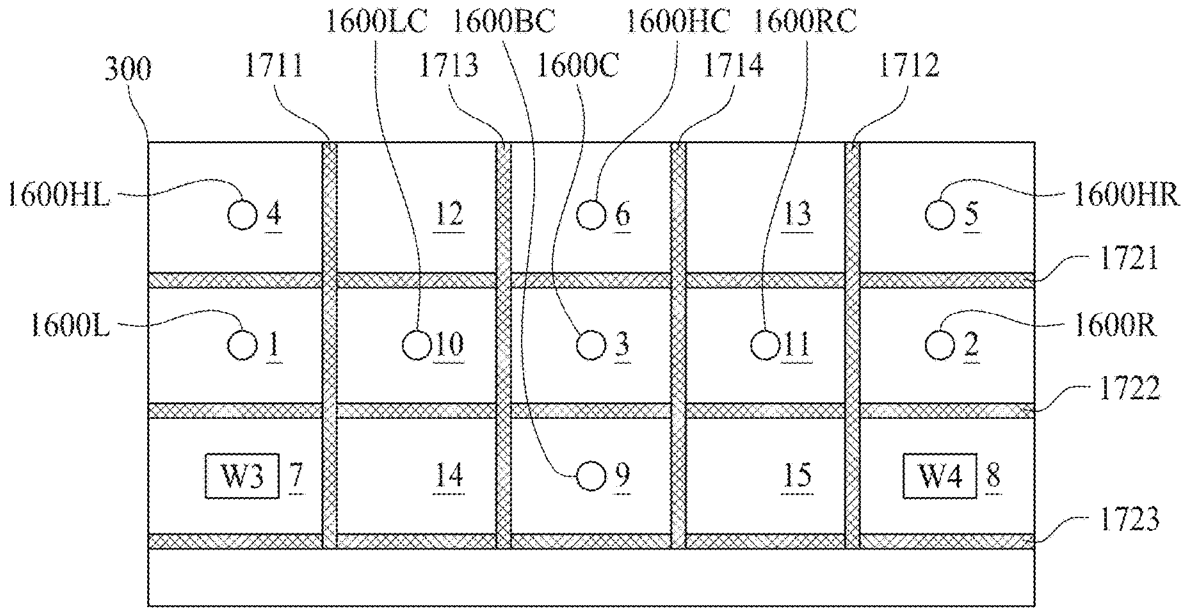
Figure 20C:
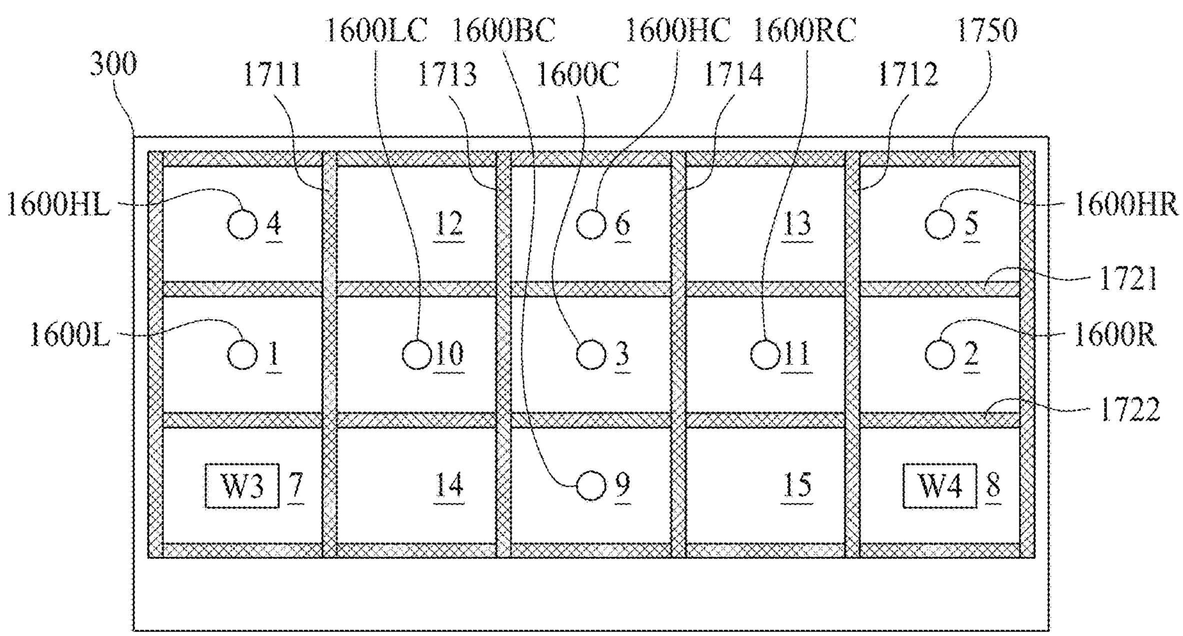
Figure 20D:
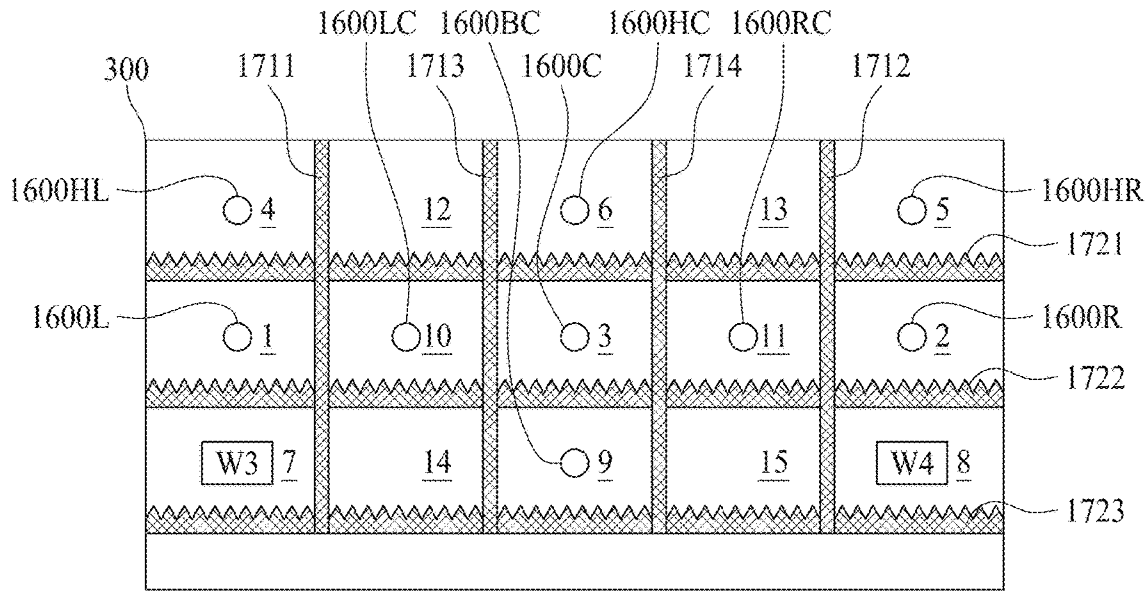
Figure 20E:
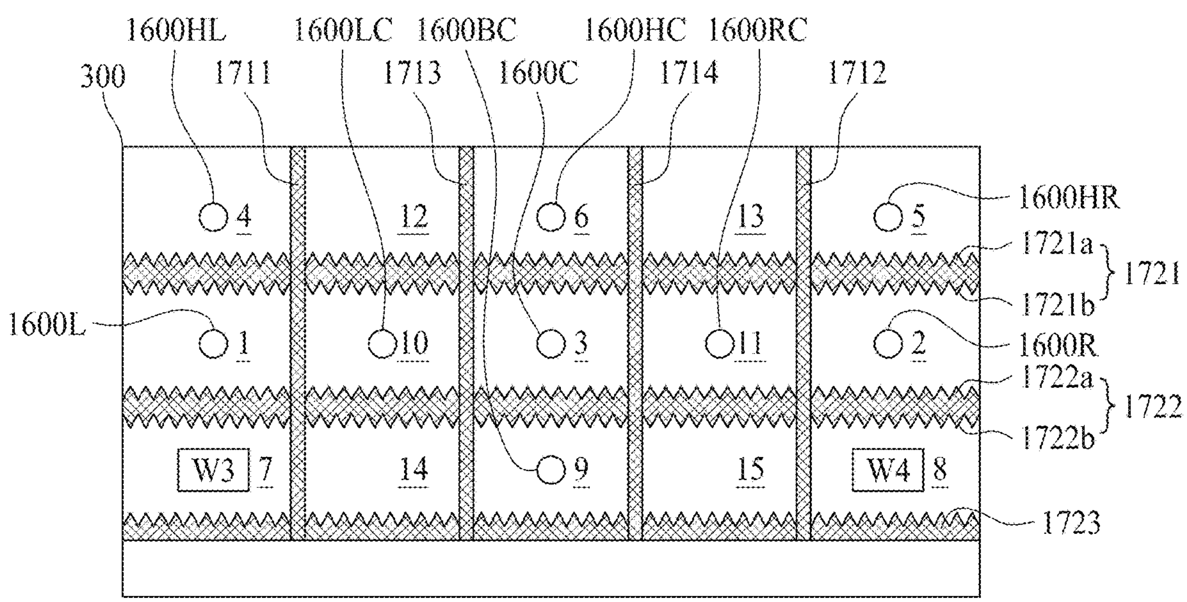
Figure 20F:
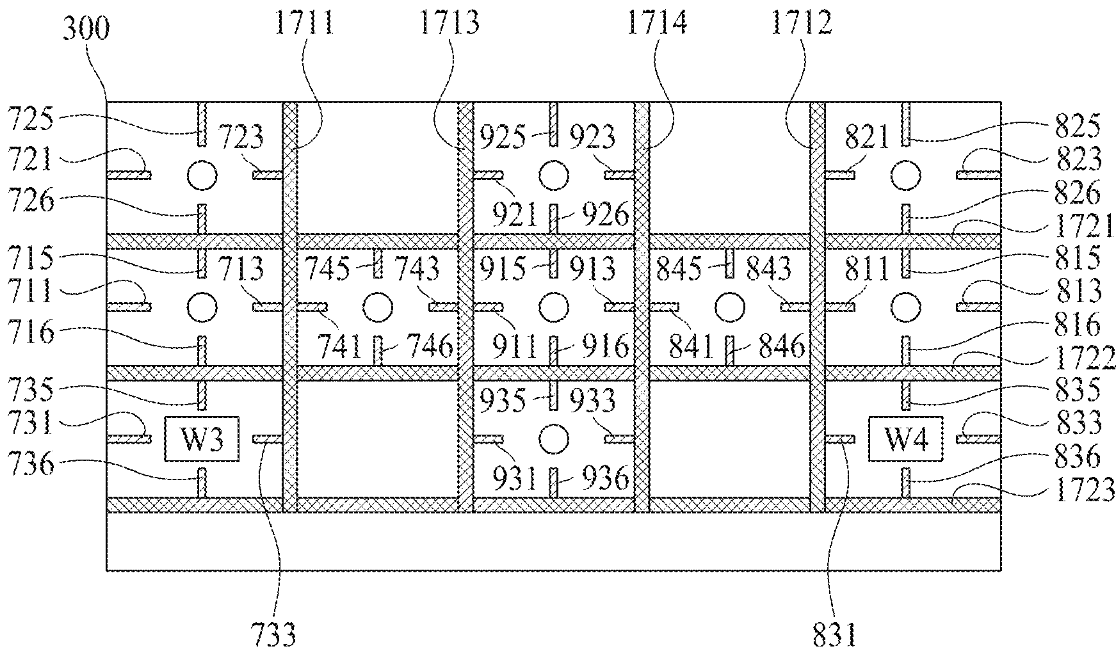
Figure 20G:
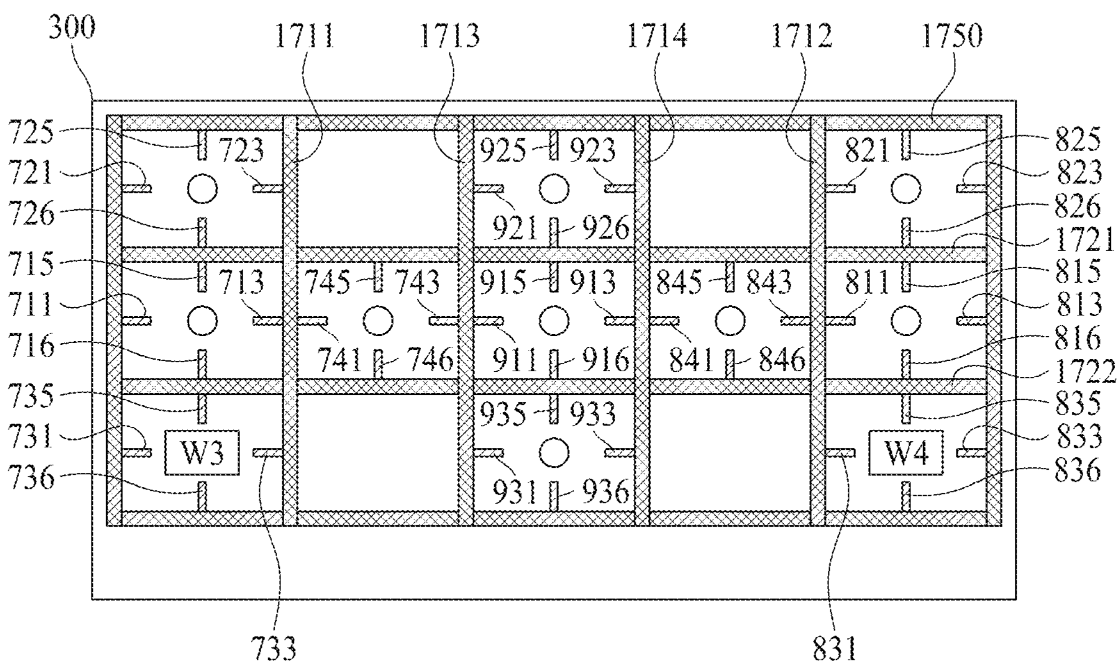
Figure 20H:
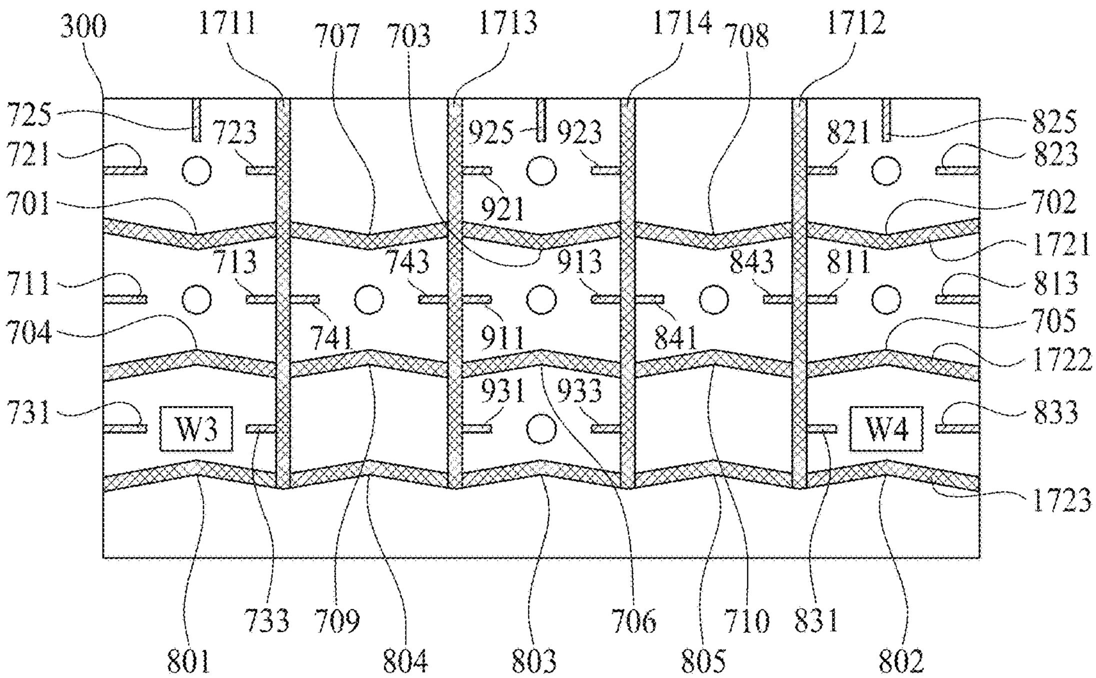

A third partition 1723 may not include a bent portion, but embodiments are not limited thereto, and may include one or more bent portions, as shown in FIG. 20H.

The bent portion may have an open structure at a center portion of a sound generating device, but embodiments are not limited thereto, and may have a V-shaped closed structure. When the bent portion has the open structure at the center portion of the sound generating device, the material cost may be reduced compared to the closed structure. According to a sound characteristic experiment, when the bent portion has the open structure at the center portion of the sound generating device and a case where the bent portion has the closed structure at the center portion of the sound generating device, the present inventors have confirmed that a sound characteristic difference is very small or there is no sound characteristic difference. Accordingly, since the first partition 1721 and the second partition 1722 includes one or more bent portions, a reduction in sound pressure caused by a standing wave of a sound generating device may be reduced.

Figure 20I:
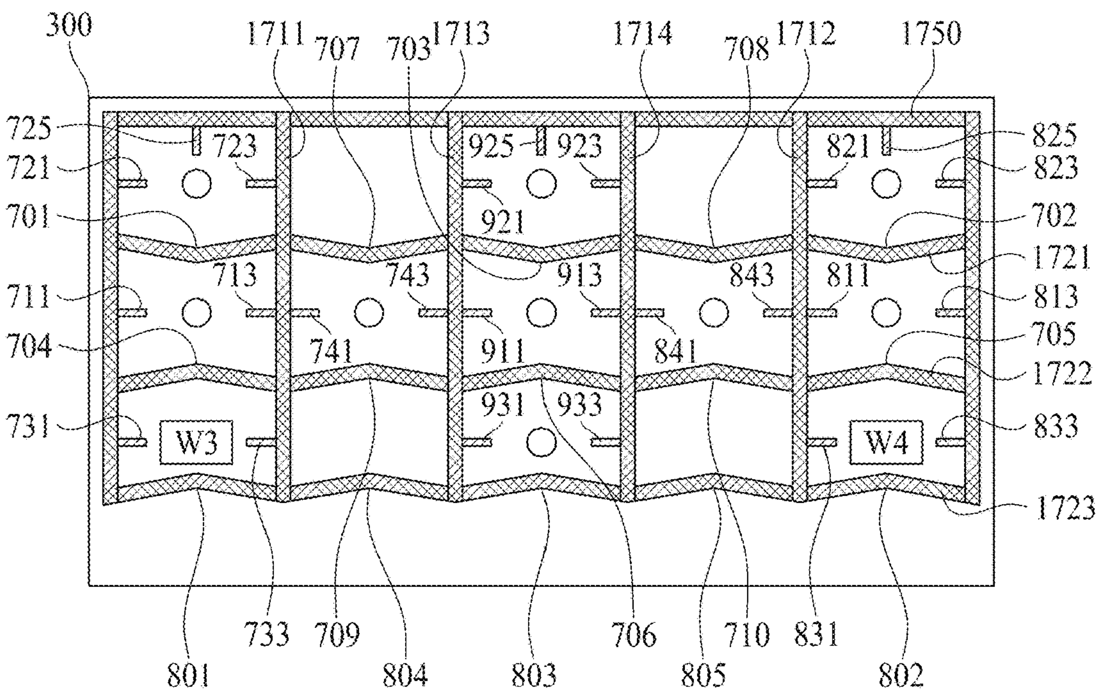

With reference to FIG. 19I, the first partition 1721 and the second partition 1722 may include one or more bent portions, and the partition 1750 may be disposed. The third partition 1723 may not include a bent portion, but embodiments are not limited thereto, and may include one or more bent portions, as shown in FIG. 20I. Since the partition 1750 is provided, a fixing force of a sound generating device disposed on the rear surface of the display panel may be enhanced, and the leakage of a sound occurring in an edge or periphery of the display panel may be reduced, thereby enhancing a sound output characteristic. The other elements are the same as or similar to FIG. 19H, and thus, their detailed descriptions are omitted.

As described above with reference to FIGS. 19H and 19I, a bent portion may not be provided at an edge portion of a supporting member 300, and thus, a degree to which a display panel is pulled may be reduced in a process of attaching the supporting member 300 on the display panel, thereby preventing the wave phenomenon.

FIGS. 20A to 20I illustrate a sound generating device and a partition according to an embodiment of the present disclosure.

With reference to FIGS. 20A to 20I, a first woofer-integrated sound generating device W3 may be disposed in a seventh region 7, and a second woofer-integrated sound generating device W4 may be disposed in an eighth region 8. Descriptions which are the same as or similar to descriptions of FIGS. 15A to 15I and/or 18A to 19I will be briefly given or are omitted.

The first woofer-integrated sound generating device W3 and the second woofer-integrated sound generating device W4 may be a sound generating device configured as one body with a woofer, and thus, a separate woofer may not be provided.

With reference to FIGS. 20A to 20I, the first woofer-integrated sound generating device W3 may be symmetrically disposed with one of the first sound generating device 1600L and the fourth sound generating device 1600HL. For example, the first woofer-integrated sound generating device W3 may be disposed on the same line as one of the first sound generating device 1600L and the fourth sound generating device 1600HL. The second woofer-integrated sound generating device W4 may be symmetrically disposed with one of the second sound generating device 1600R and the fifth sound generating device 1600HR. For example, the second woofer-integrated sound generating device W4 may be disposed on the same line as one of the second sound generating device 1600R and the fifth sound generating device 1600HR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 20F and 20G, the 7-5$^{th}$ pad 735 and the 7-6$^{th}$ pad 736 may be symmetrically disposed with one of the 1-5$^{th}$ pad 715, the 1-6$^{th}$ pad 716, the 4-5$^{th}$ pad 725, and the 4-6$^{th}$ pad 726. The 8-5$^{th}$ pad 835 and the 8-6$^{th}$ pad 836 may be symmetrically disposed with one of the 2-5$^{th}$ pad 815, the 2-6$^{th}$ pad 816, the 5-5$^{th}$ pad 825, and the 5-6$^{th}$ pad 826. With reference to FIGS. 20H and 20I, an eleventh bent portion 801 may be symmetrically disposed with one of the first bent portion 701 and the fourth bent portion 704, a twelfth bent portion 802 may be symmetrically disposed with one of the second bent portion 702 and the fifth bent portion 705.

As another example, the first woofer-integrated sound generating device W3 may be asymmetrically disposed with one of the first sound generating device 1600L and the fourth sound generating device 1600HL. The second woofer-integrated sound generating device W4 may be asymmetrically disposed with one of the second sound generating device 1600R and the fifth sound generating device 1600HR. For example, sound constructive interference or destructive interference caused by vibration interference between a vibration and a standing wave generated by the first woofer-integrated sound generating device W3 and a vibration and a standing wave generated by the first sound generating device 1600L or the fourth sound generating device 1600HL may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the first sound generating device 1600L and the fourth sound generating device 1600HL may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the second sound generating device 1600R or the fifth sound generating device 1600HR may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the second sound generating device 1600R and the fifth sound generating device 1600HR may prevent the undesired interference, thereby reproducing a natural sound similar to an original sound. With reference to FIGS. 20F and 20G, the 7-5$^{th}$ pad 735 and the 7-6$^{th}$ pad 736 may be asymmetrically disposed with one of the 1-5$^{th}$ pad 715, the 1-6$^{th}$ pad 716, the 4-5$^{th}$ pad 725, and the 4-6$^{th}$ pad 726. The 8-5$^{th}$ pad 835 and the 8-6$^{th}$ pad 836 may be asymmetrically disposed with one of the 2-5$^{th}$ pad 815, the 2-6$^{th}$ pad 816, the 5-5$^{th}$ pad 825, and the 5-6$^{th}$ pad 826. With reference to FIGS. 20H and 20I, the eleventh bent portion 801 may be asymmetrically disposed with one of the first bent portion 701 and the fourth bent portion 704, the twelfth bent portion 802 may be asymmetrically disposed with one of the second bent portion 702 and the fifth bent portion 705. With reference to FIGS. 20F and 20I, the pads may be provided as one, but embodiments are not limited thereto, and at least one of the pads may be provided as two or more.

With reference to FIGS. 20A to 20I, the first woofer-integrated sound generating device W3 may be disposed to be symmetrical with the ninth sound generating device 1600BC. For example, the first woofer-integrated sound generating device W3 may be disposed on the same line as the ninth sound generating device 1600BC. The second woofer-integrated sound generating device W4 may be disposed to be symmetrical with the ninth sound generating device 1600BC. For example, the second woofer-integrated sound generating device W4 may be disposed on the same line as the ninth sound generating device 1600BC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 20F and 20G, the 7-1$^{st}$ pad 731 and the 7-3$^{rd}$ pad 733 may be symmetrically disposed with one of the 9-1$^{st}$ pad 931 and the 9-3$^{rd}$ pad 933. The 8-1$^{st}$ pad 831 and the 8-3$^{rd}$ pad 833 may be symmetrically disposed with one of the 9-1$^{st}$ pad 931 and the 9-3$^{rd}$ pad 933.

As another example, the first woofer-integrated sound generating device W3 may be asymmetrically disposed with the ninth sound generating device 1600BC. The second woofer-integrated sound generating device W4 may be asymmetrically disposed with the ninth sound generating device 1600BC. For example, sound constructive interference or destructive interference caused by vibration interference between a vibration and a standing wave generated by the first woofer-integrated sound generating device W3 and a vibration and a standing wave generated by the ninth sound generating device 1600BC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and the ninth sound generating device 1600BC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the ninth sound generating device 1600BC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and the ninth sound generating device 1600BC may prevent the undesired interference, thereby reproducing a natural sound similar to an original sound. With reference to FIGS. 20F and 20G, the 7-1$^{st}$ pad 731 and the 7-3$^{rd}$ pad 733 may be asymmetrically disposed with one of the 9-1$^{st}$ pad 931 and the 9-3$^{rd}$ pad 933. The 8-1$^{st}$ pad 831 and the 8-3$^{rd}$ pad 833 may be asymmetrically disposed with one of the 9-1$^{st}$ pad 931 and the 9-3$^{rd}$ pad 933.

The first woofer-integrated sound generating device W3 and the second woofer-integrated sound generating device W4 may output sounds of about 60 Hz to about 40 kHz. The first, second, third, fourth, fifth, sixth, ninth, tenth, and eleventh sound generating devices 1600L, 1600R, 1600C, 1600HL, 1600HR, 1600HC, 1600BC, 1600LC, and 1600RC may output sounds of about 80 Hz to about 40 kHz. Accordingly, the display apparatus may output an 11.1-channel sound.

With reference to FIG. 20F, a pad may be disposed on at least one side of the first, second, third, fourth, fifth, sixth, and seventh partitions 1721, 1722, 1723, 1713, 1714, 1711, and 1712 to face a sound generating device. For example, the 7-3$^{rd}$ pad 733 may be disposed on at least one side of the sixth partition 1711 to face or toward the first woofer-integrated sound generating device W3. The 7-1$^{st}$ pad 731 may be disposed on a side facing the 7-3$^{rd}$ pad 733. For example, the 7-5$^{th}$ pad 735 may be disposed on at least one side of the second partition 1722 to face or toward the first woofer-integrated sound generating device W3. For example, the 7-6$^{th}$ pad 736 may be disposed on at least one side of the third partition 1723 to face or toward the first woofer-integrated sound generating device W3. The 7-5$^{th}$ pad 735 may be disposed to face or toward the 7-6$^{th}$ pad 736. For example, the 7-6$^{th}$ pad 736 may be disposed on a side of the third partition 1723 facing the 7-5$^{th}$ pad 735.

For example, the 8-1$^{st}$ pad 831 may be disposed on at least one side of the seventh partition 1712 to face or toward the second woofer-integrated sound generating device W4. The 8-3$^{rd}$ pad 833 may be disposed on a side facing the 8-1$^{st}$ pad 831, and the 8-3$^{rd}$ pad 833 may be disposed to face or toward the second woofer-integrated sound generating device W4. For example, the 8-5$^{th}$ pad 835 may be disposed on at least one side of the second partition 1722 to face the second woofer-integrated sound generating device W4. For example, the 8-6$^{th}$ pad 836 may be disposed on at least one side of the third partition 1723 to face or toward the second woofer-integrated sound generating device W4. The 8-5$^{th}$ pad 835 may be disposed to face or toward the 8-6$^{th}$ pad 836. For example, the 8-6$^{th}$ pad 836 may be disposed on a side of the third partition 1723 facing the 8-5$^{th}$ pad 835.

With reference to FIG. 20G, one or more pads may be provided on a side of the partition 1750. The 4-5$^{th}$ pad 725 may be disposed on one side of the partition 1750 to face or toward the fourth sound generating device 1600HL, the 5-5$^{th}$ pad 825 may be disposed on the one side of the partition 1750 to face or toward the fifth sound generating device 1600HR, and the 6-5$^{th}$ pad 925 may be disposed on the one side of the partition 1750 to face the sixth sound generating device 1600HC. The 7-6$^{th}$ pad 736 may be disposed on one other side of the partition 1750 to face or toward the first woofer-integrated sound generating device W3, the 8-6$^{th}$ pad 836 may be disposed on the one other side of the partition 1750 to face or toward the second woofer-integrated sound generating device W4, and the 9-6$^{th}$ pad 936 may be disposed on the one other side of the partition 1750 to face or toward the ninth sound generating device 1600BC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 20F, and thus, their detailed descriptions are omitted.

With reference to FIG. 20H, one of a first partition 1721, a second partition 1722, and a third partition 1723 may include one or more bent portions. The first partition 1721 may include one or more bent portions. For example, the first partition 1721 may include a first bent portion 701 toward the first sound generating device 1600L and may include a seventh bent portion 707 toward the tenth sound generating device 1600LC. The first partition 1721 may include a second bent portion 702 toward the second sound generating device 1600R and may include an eighth bent portion 708 toward the eleventh sound generating device 1600RC. The first partition 1721 may include a third bent portion 703 toward the third sound generating device 1600C.

The second partition 1722 may include one or more bent portions. For example, the second partition 1722 may include a fourth bent portion 704 toward the first sound generating device 1600L and may include a ninth bent portion 709 toward the tenth sound generating device 1600LC. The second partition 1722 may include a fifth bent portion 705 toward the second sound generating device 1600R and may include a tenth bent portion 710 toward the eleventh sound generating device 1600RC. The second partition 1722 may include a sixth bent portion 706 toward the third sound generating device 1600C.

The third partition 1723 may include one or more bent portions. For example, the third partition 1723 may include an eleventh bent portion 801 toward the first woofer-integrated sound generating device W3, and may include a twelfth bent portion 802 toward the second woofer-integrated sound generating device W4. The third partition 1723 may include a thirteenth bent portion 803 toward the ninth sound generating device 1600BC. The third partition 1723 may include a fourteenth bent portion 804 and a fifteenth bent portion 805. The fourteenth bent portion 804 and the fifteenth bent portion 805 may be configured in a bent shape or a non-bent shape, but embodiments are not limited thereto. As another example, the third partition 1723 may not include one or more bent portions, as shown in FIG. 19H.

With reference to FIG. 20I, one of a first partition 1721, a second partition 1722, and a third partition 1723 may include one or more bent portions, and the partition 1750 may be disposed. For example, the 4-5$^{th}$ pad 725 may be disposed on one side of the partition 1750 to face or toward the fourth sound generating device 1600HL, the 5-5$^{th}$ pad 825 may be disposed on the one side of the partition 1750 to face or toward the fifth sound generating device 1600HR, and the 6-5$^{th}$ pad 925 may be disposed on the one side of the partition 1750 to face or toward the sixth sound generating device 1600HC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. As another example, the third partition 1723 may not include one or more bent portions, as shown in FIG. 19I. The other elements are the same as or similar to FIG. 20H, and thus, their detailed descriptions are omitted.

FIGS. 21A to 21I illustrate a sound generating device and a partition according to an embodiment of the present disclosure.

With reference to FIGS. 21A to 21I, a first woofer-integrated sound generating device W3 may be disposed in a first region 1, and a second woofer-integrated sound generating device W4 may be disposed in a second region 2. Descriptions which are the same as or similar to descriptions of FIGS. 15A to 15I and/or 20A to 20I will be briefly given or are omitted.

Figure 21A:
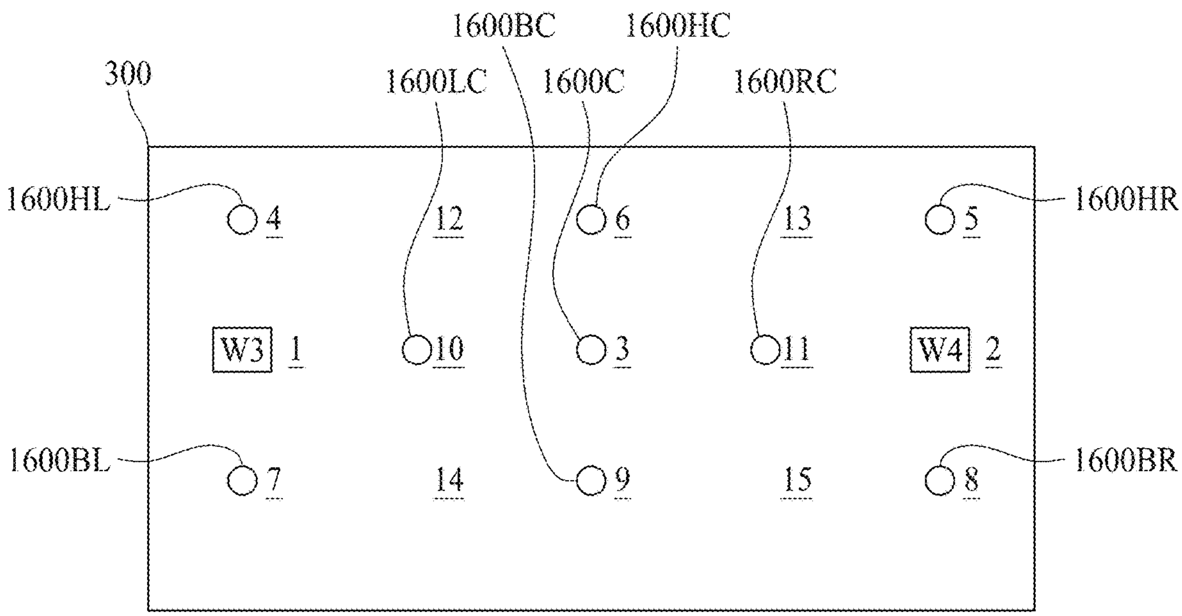
FIGS. 21A to 21I illustrate an embodiment of the sound generating device and a partition according to an embodiment of the present disclosure.
Figure 21B:
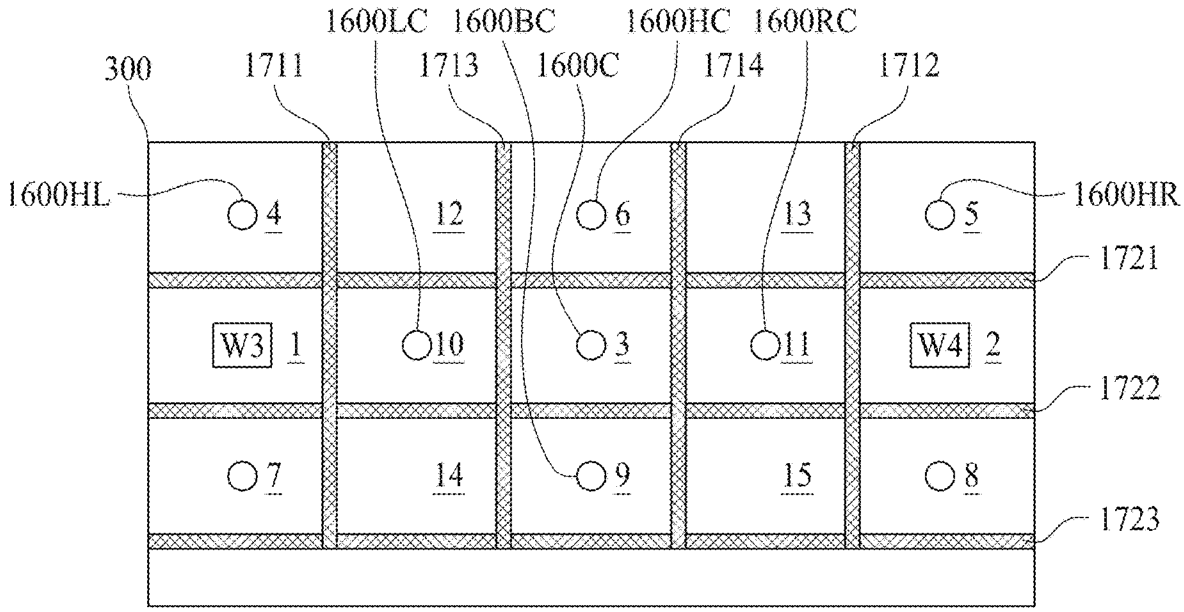
Figure 21C:
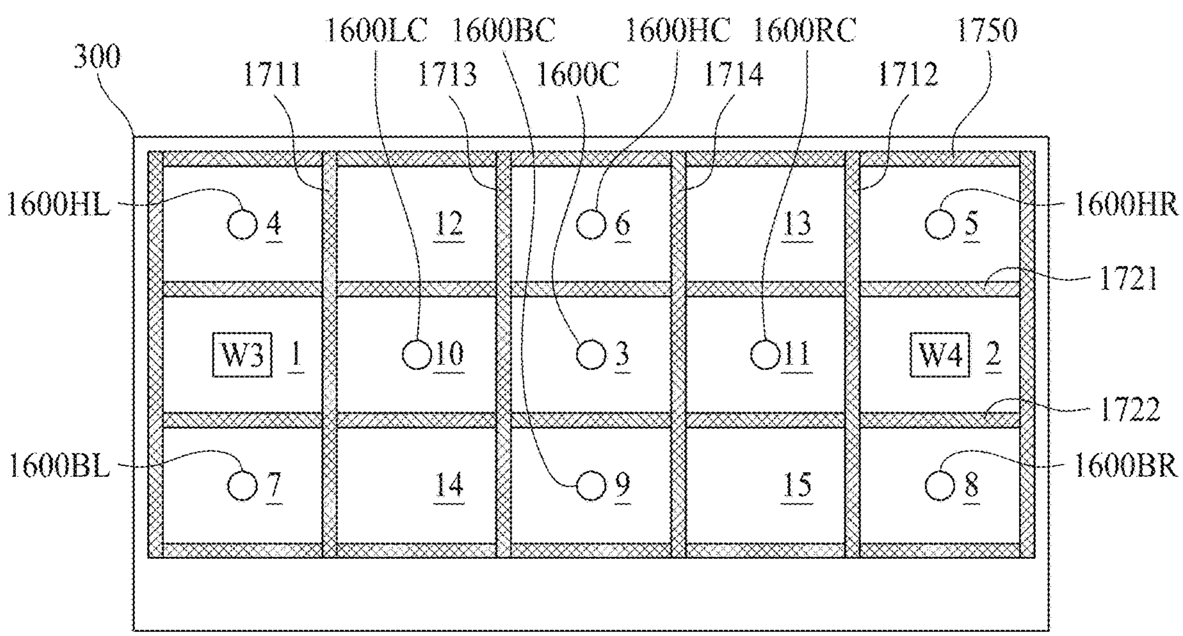
Figure 21D:
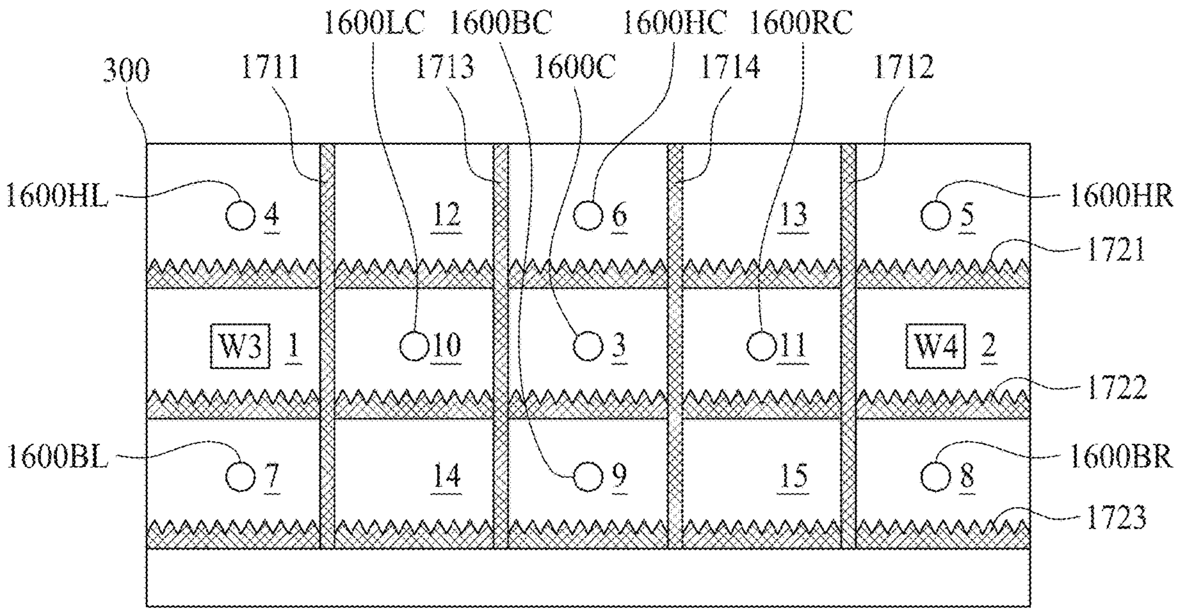
Figure 21E:
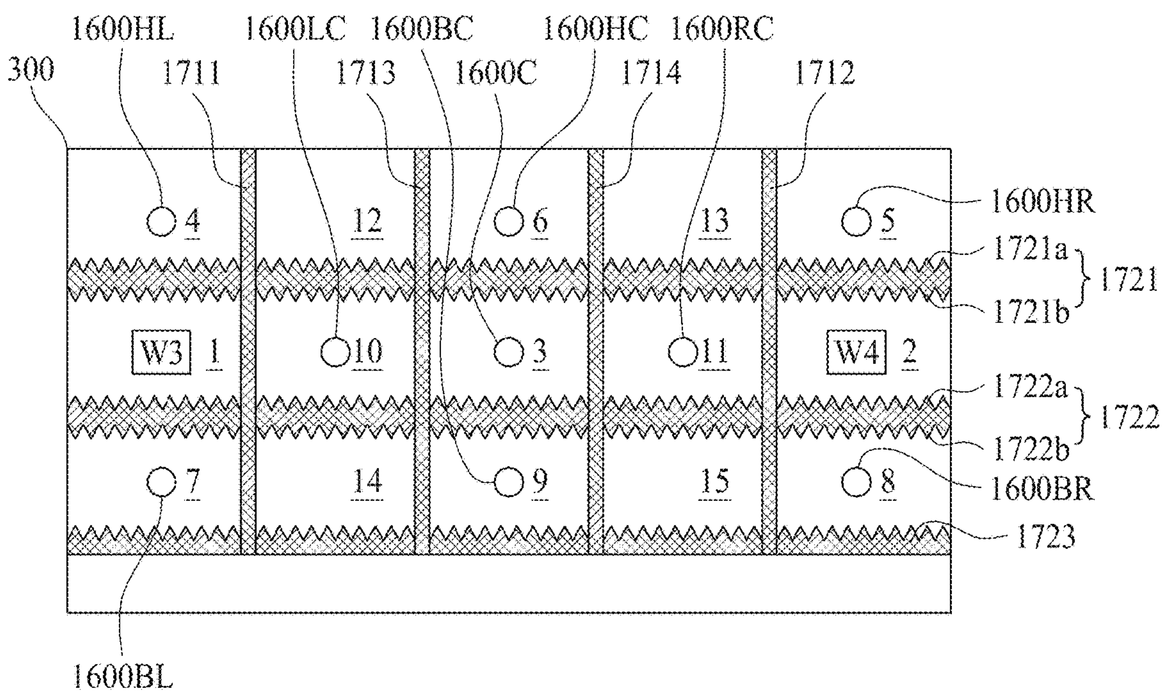
Figure 21F:
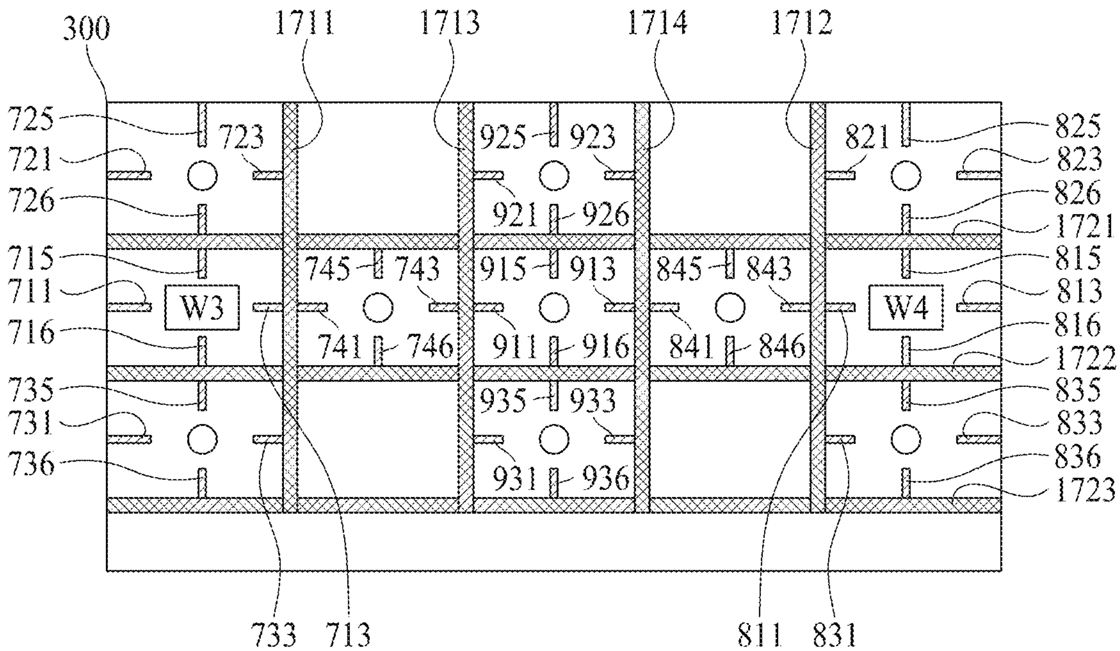
Figure 21G:
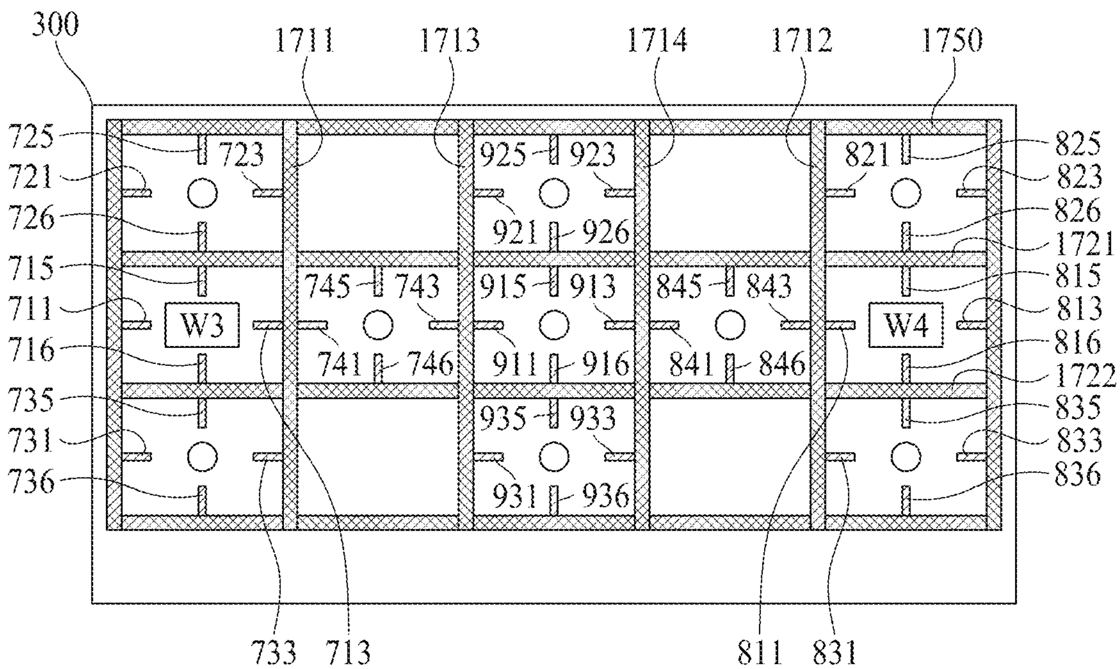
Figure 21H:
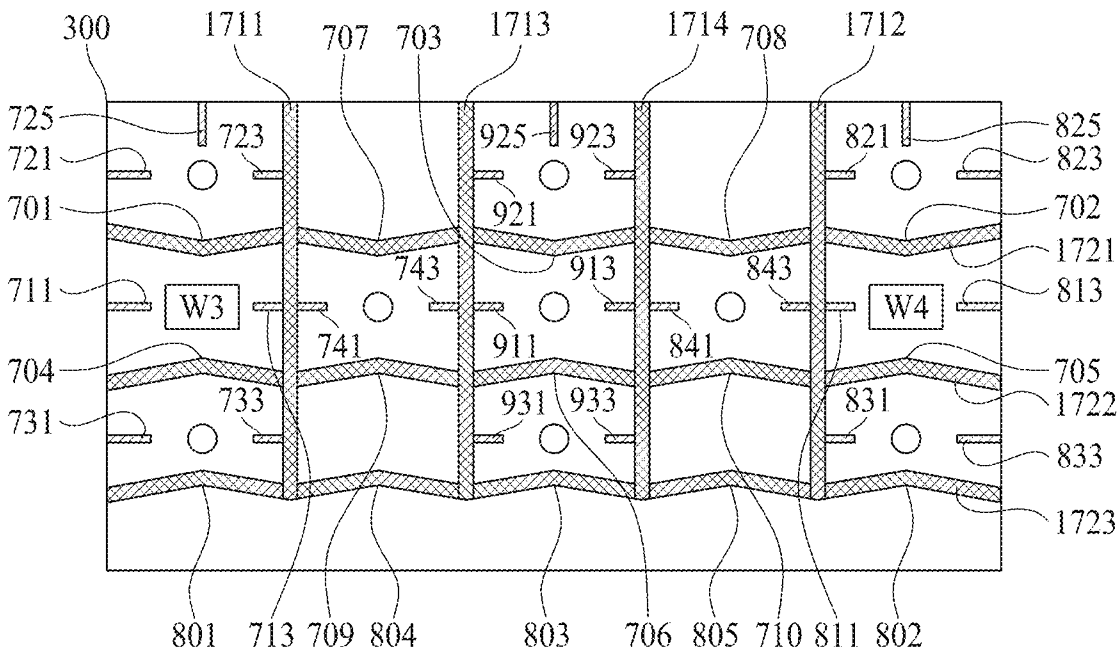
Figure 21I:
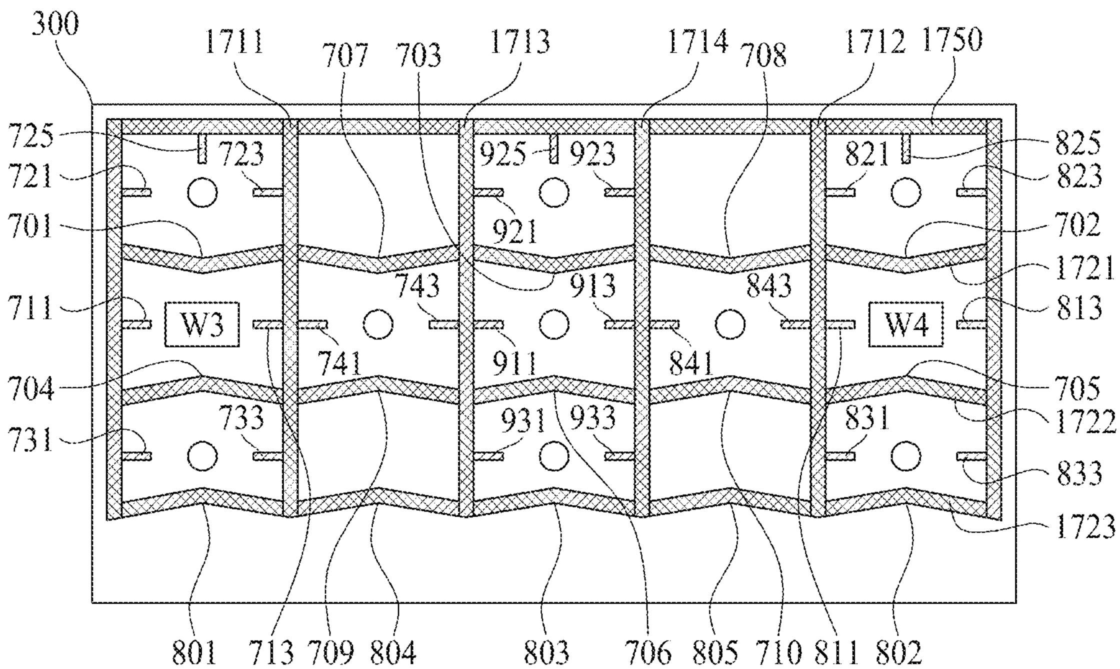

With reference to FIGS. 21A to 21I, the first woofer-integrated sound generating device W3 may be symmetrically disposed with one of the fourth sound generating device 1600HL and the seventh sound generating device 1600BL. The first woofer-integrated sound generating device W3 may be disposed on the same line as one of the fourth sound generating device 1600HL and the seventh sound generating device 1600BL. The second woofer-integrated sound generating device W4 may be symmetrically disposed with one of the fifth sound generating device 1600HR and the eighth sound generating device 1600BR. The second woofer-integrated sound generating device W4 may be disposed on the same line as one of the fifth sound generating device 1600HR and the eighth sound generating device 1600BR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 21F and 21G, the 1-5$^{th}$ pad 715 and the 1-6$^{th}$ pad 716 may be symmetrically disposed with one of the 4-5$^{th}$ pad 725, the 4-6$^{th}$ pad 726, the 7-5$^{th}$ pad 735 and the 7-6$^{th}$ pad 736. The 2-5$^{th}$ pad 815 and the 2-6$^{th}$ pad 816 may be symmetrically disposed with one of the 5-5$^{th}$ pad 825, the 5-6$^{th}$ pad 826, the 8-5$^{th}$ pad 835, and the 8-6$^{th}$ pad 836. With reference to FIGS. 21H and 21I, one of the first bent portion 701 and the fourth bent portion 704 may be symmetrically disposed with the eleventh bent portion 801. One of the second bent portion 702 and the fifth bent portion 705 may be symmetrically disposed with the twelfth bent portion 802.

As another example, the first woofer-integrated sound generating device W3 may be asymmetrically disposed with one of the fourth sound generating device 1600HL and the seventh sound generating device 1600BL. The second woofer-integrated sound generating device W4 may be asymmetrically disposed with one of the fifth sound generating device 1600HR and the eighth sound generating device 1600BR. For example, sound constructive interference or destructive interference caused by vibration interference between a vibration and a standing wave generated by the first woofer-integrated sound generating device W3 and a vibration and a standing wave generated by the fourth sound generating device 1600HL or the seventh sound generating device 1600BL. Undesired sound constructive or destructive interference caused by external interference except for a vibration based on a reproduced sound source may cause distortion of a sound to degrade sound quality, and an asymmetrical structure between the first woofer-integrated sound generating device W3 and one of the fourth sound generating device 1600HL and the seventh sound generating device 1600BL may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the fifth sound generating device 1600HR or the eighth sound generating device 1600BR may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the fifth sound generating device 1600HR and the eighth sound generating device 1600BR may prevent the undesired interference, thereby reproducing a natural sound similar to an original sound. With reference to FIGS. 21F and 21G, the 1-5$^{th}$ pad 715 and the 1-6$^{th}$ pad 716 may be asymmetrically disposed with one of the 4-5$^{th}$ pad 725, the 4-6$^{th}$ pad 726, the 7-5$^{th}$ pad 735 and the 7-6$^{th}$ pad 736. The 2-5$^{th}$ pad 815 and the 2-6$^{th}$ pad 816 may be asymmetrically disposed with one of the 5-5$^{th}$ pad 825, the 5-6$^{th}$ pad 826, the 8-5$^{th}$ pad 835, and the 8-6$^{th}$ pad 836. With reference to FIGS. 21H and 21I, one of the first bent portion 701 and the fourth bent portion 704 may be asymmetrically disposed with the eleventh bent portion 801. One of the second bent portion 702 and the fifth bent portion 705 may be asymmetrically disposed with the twelfth bent portion 802. With reference to FIGS. 21F and 21I, the pads may be provided as one, but embodiments are not limited thereto, and at least one of the pads may be provided as two or more.

With reference to FIGS. 21A and 21I, the first woofer-integrated sound generating device W3 may be disposed to be symmetrical with one of the third sound generating device 1600C, a tenth sound generating device 1600LC, and the eleventh sound generating device 1600RC. For example, the first woofer-integrated sound generating device W3 may be disposed on the same line as one of the third sound generating device 1600C, a tenth sound generating device 1600LC, and the eleventh sound generating device 1600RC. The second woofer-integrated sound generating device W4 may be disposed to be symmetrical with one of the third sound generating device 1600C, a tenth sound generating device 1600LC, and the eleventh sound generating device 1600RC. For example, the second woofer-integrated sound generating device W4 may be disposed on the same line as one of the third sound generating device 1600C, a tenth sound generating device 1600LC, and the eleventh sound generating device 1600RC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 21F and 21G, one of the 1-1$^{st}$ pad 711, the 1-3$^{rd}$ pad 713, the 2-1$^{st}$ pad 811, and the 2-3$^{rd}$ pad 813 may be symmetrically disposed with one of the 3-1$^{st}$ pad 911, the 3-3$^{rd}$ pad 913, the 10-1$^{st}$ pad 741, the 10-3$^{rd}$ pad 743, the 11-1$^{st}$ pad 841, and the 11-3$^{rd}$ pad 843.

As another example, the first woofer-integrated sound generating device W3 may be disposed to be asymmetrical with one of the third sound generating device 1600C, a tenth sound generating device 1600LC, and the eleventh sound generating device 1600RC. The second woofer-integrated sound generating device W4 may be disposed to be asymmetrical with one of the third sound generating device 1600C, a tenth sound generating device 1600LC, and the eleventh sound generating device 1600RC. For example, sound constructive interference or destructive interference caused by vibration interference between a vibration and a standing wave generated by the first woofer-integrated sound generating device W3 and a vibration and a standing wave generated by the third sound generating device 1600C, or a tenth sound generating device 1600LC, or the eleventh sound generating device 1600RC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the third sound generating device 1600C, a tenth sound generating device 1600LC, and the eleventh sound generating device 1600RC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the third sound generating device 1600C, or a tenth sound generating device 1600LC, or the eleventh sound generating device 1600RC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the third sound generating device 1600C, a tenth sound generating device 1600LC, and the eleventh sound generating device 1600RC may prevent the undesired interference, thereby reproducing a natural sound similar to an original sound. With reference to FIGS. 21F and 21G, one of the 1-1$^{st}$ pad 711, the 1-3$^{rd}$ pad 713, the 2-1$^{st}$ pad 811, and the 2-3$^{rd}$ pad 813 may be asymmetrically disposed with one of the 3-1$^{st}$ pad 911, the 3-3$^{rd}$ pad 913, the 10-1$^{st}$ pad 741, the 10-3$^{rd}$ pad 743, the 11-1$^{st}$ pad 841, and the 11-3$^{rd}$ pad 843.

The first woofer-integrated, second woofer-integrated, third, fourth, fifth, sixth, seventh, eighth, ninth, tenth, and eleventh sound generating devices W3, W4, 1600C, 1600HL, 1600HR, 1600HC, 1600BL, 1600BR, 1600BC, 1600LC, and 1600RC may output sounds of about 80 Hz to about 40 kHz. Accordingly, the display apparatus may output an 11.1-channel sound.

With reference to FIG. 21F, a pad may be disposed on at least one side of the first, second, third, fourth, fifth, sixth, and seventh partitions 1721, 1722, 1723, 1713, 1714, 1711, and 1712 to face or toward a sound generating device. For example, the 1-3$^{rd}$ pad 713 may be disposed on at least one side of the sixth partition 1711 to face or toward the first woofer-integrated sound generating device W3. The 1-1$^{st}$ pad 711 may be disposed on a side facing the 1-3$^{rd}$ pad 713. For example, the 1-5$^{th}$ pad 715 may be disposed on at least one side of the first partition 1721 to face or toward the first woofer-integrated sound generating device W3. For example, the 1-6$^{th}$ pad 716 may be disposed on at least one side of the second partition 1722 to face or toward the first woofer-integrated sound generating device W3. The 1-5$^{th}$ pad 715 may be disposed to face or toward the 1-6$^{th}$ pad 716. For example, the 1-6$^{th}$ pad 716 may be disposed on a side of the second partition 1722 facing the 1-5$^{th}$ pad 715.

For example, the 2-1$^{st}$ pad 811 may be disposed on at least one side of the seventh partition 1712 to face or toward the second woofer-integrated sound generating device W4. The 2-3$^{rd}$ pad 813 may be disposed on a side facing the 2-1$^{st}$ pad 811, and the 2-3$^{rd}$ pad 813 may be disposed to face or toward the second woofer-integrated sound generating device W4. For example, the 2-5$^{th}$ pad 815 may be disposed on at least one side of the first partition 1721 to face or toward the second woofer-integrated sound generating device W4. For example, the 2-6$^{th}$ pad 816 may be disposed on at least one side of the second partition 1722 to face or toward the second woofer-integrated sound generating device W4. The 2-5$^{th}$ pad 815 may be disposed to face the 2-6$^{th}$ pad 816. For example, the 2-6$^{th}$ pad 816 may be disposed on a side of the second partition 1722 facing the 2-5$^{th}$ pad 815.

With reference to FIG. 21G, one or more pads may be provided on a side of the partition 1750. The 4-5$^{th}$ pad 725 may be disposed on one side of the partition 1750 to face the fourth sound generating device 1600HL, the 5-5$^{th}$ pad 825 may be disposed on the one side of the partition 1750 to face or toward the fifth sound generating device 1600HR, and the 6-5$^{th}$ pad 925 may be disposed on the one side of the partition 1750 to face or toward the sixth sound generating device 1600HC. The 7-6$^{th}$ pad 736 may be disposed on one other side of the partition 1750 to face or toward the seventh sound generating device 1600BL, the 8-6$^{th}$ pad 836 may be disposed on the one other side of the partition 1750 to face or toward the eighth sound generating device 1600BR, and the 9-6$^{th}$ pad 936 may be disposed on the one other side of the partition 1750 to face or toward the ninth sound generating device 1600BC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 21F, and thus, their detailed descriptions are omitted.

With reference to FIG. 21H, one of a first partition 1721, a second partition 1722, and a third partition 1723 may include one or more bent portions. The first partition 1721 may include one or more bent portions. For example, the first partition 1721 may include a first bent portion 701 toward the first woofer-integrated sound generating device W3 and may include a seventh bent portion 707 toward the tenth sound generating device 1600LC. The first partition 1721 may include a second bent portion 702 toward the second woofer-integrated sound generating device W4 and may include an eighth bent portion 708 toward the eleventh sound generating device 1600RC. The first partition 1721 may include a third bent portion 703 toward the third sound generating device 1600C.

The second partition 1722 may include one or more bent portions. For example, the second partition 1722 may include a fourth bent portion 704 toward the first woofer-integrated sound generating device W3 and may include a ninth bent portion 709 toward the tenth sound generating device 1600LC. The second partition 1722 may include a fifth bent portion 705 toward the second woofer-integrated sound generating device W4 and may include a tenth bent portion 710 toward the eleventh sound generating device 1600RC. The second partition 1722 may include a sixth bent portion 706 toward the third sound generating device 1600C.

The third partition 1723 may include one or more bent portions. For example, the third partition 1723 may include an eleventh bent portion 801 toward the seventh sound generating device 1600BL, and may include a twelfth bent portion 802 toward the eighth sound generating device 1600BR. The third partition 1723 may include a thirteenth bent portion 803 toward the ninth sound generating device 1600BC. The third partition 1723 may include a fourteenth bent portion 804 and a fifteenth bent portion 805. The fourteenth bent portion 804 and the fifteenth bent portion 805 may be configured in a bent shape or a non-bent shape, but is not limited thereto. As another example, the third partition 1723 may not include one or more bent portions, as shown in FIG. 19H.

With reference to FIG. 21I, one of a first partition 1721, a second partition 1722, and a third partition 1723 may include one or more bent portions, and the partition 1750 may be disposed. For example, the 4-5$^{th}$ pad 725 may be disposed on one side of the partition 1750 to face or toward the fourth sound generating device 1600HL, the 5-5$^{th}$ pad 825 may be disposed on the one side of the partition 1750 to face the fifth sound generating device 1600HR, and the 6-5$^{th}$ pad 925 may be disposed on the one side of the partition 1750 to face or toward the sixth sound generating device 1600HC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. As another example, the third partition 1723 may not include one or more bent portions, as shown in FIG. 19I. The other elements are the same as or similar to FIG. 21H, and thus, their detailed descriptions are omitted.

FIGS. 22A to 22I illustrate a sound generating device and a partition according to an embodiment of the present disclosure.

With reference to FIGS. 22A to 22I, a first woofer-integrated sound generating device W3 may be disposed in a tenth region 10, and a second woofer-integrated sound generating device W4 may be disposed in an eleventh region 11. Descriptions which are the same as or similar to descriptions of FIGS. 15A to 15I and/or 20A to 21I will be briefly given or are omitted.

Figure 22A:
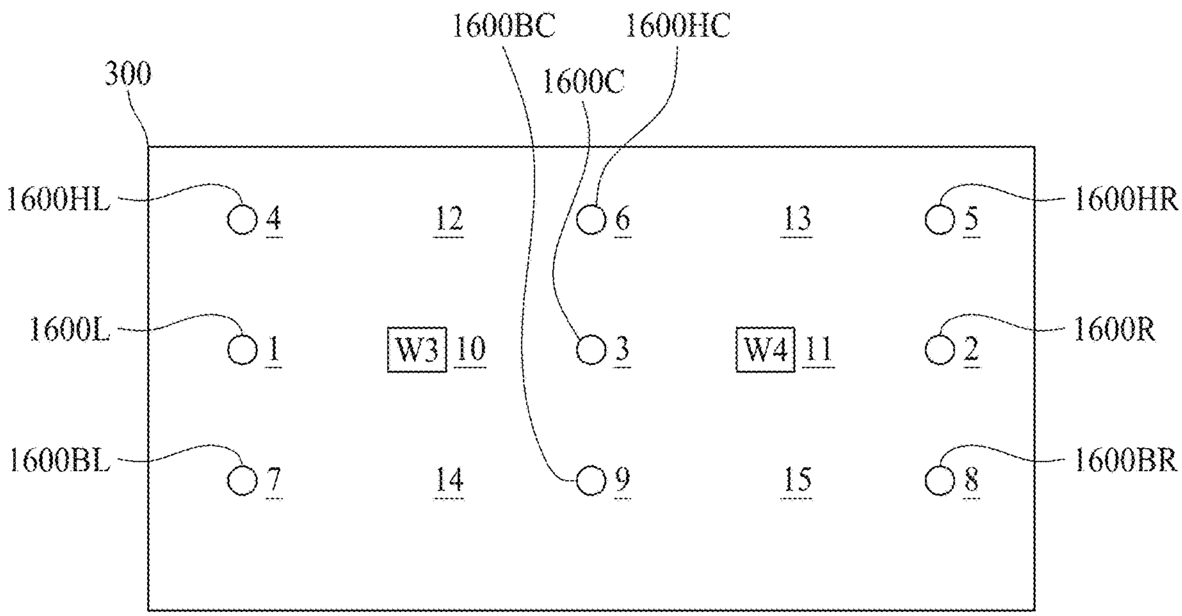
FIGS. 22A to 22I illustrate an embodiment of the sound generating device and a partition according to an embodiment of the present disclosure.
Figure 22B:
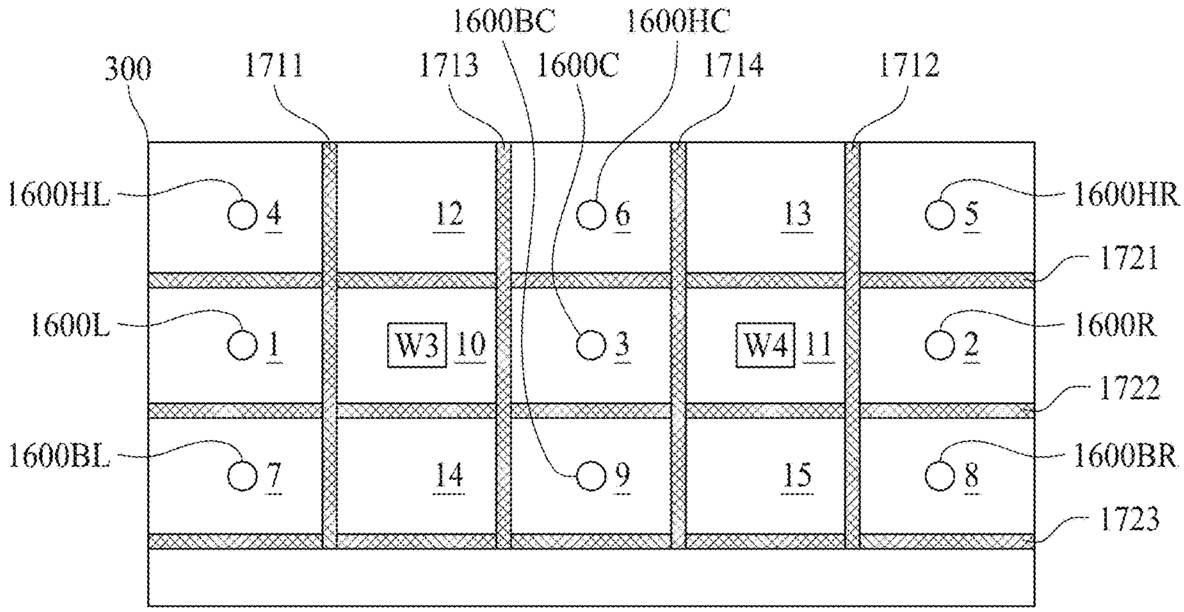
Figure 22C:
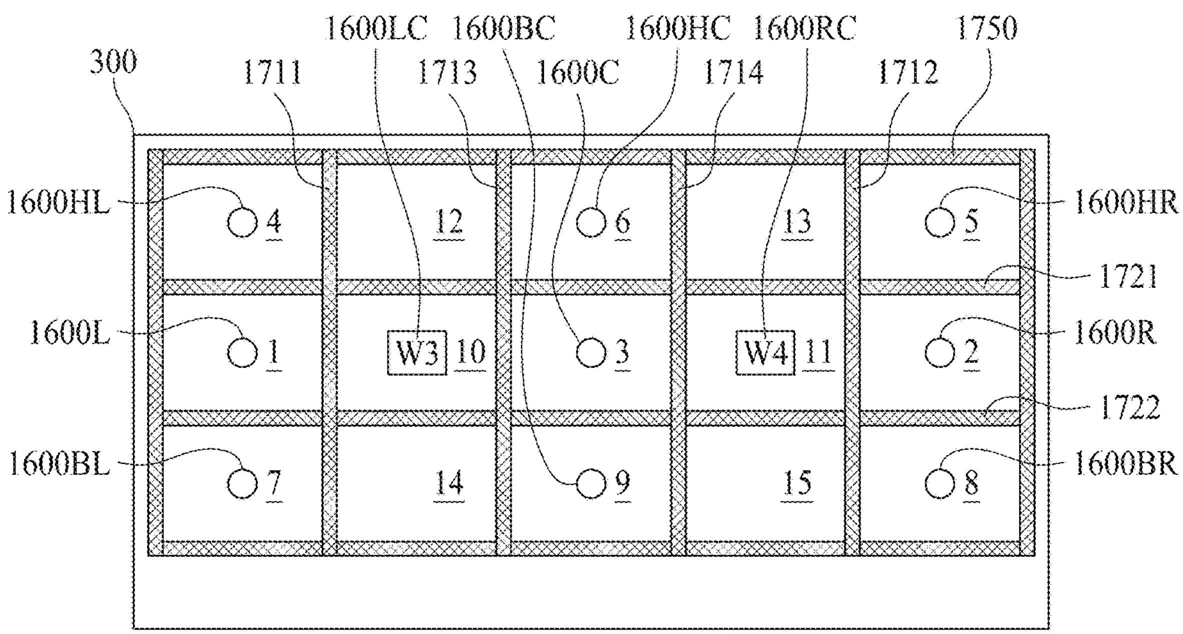
Figure 22D:
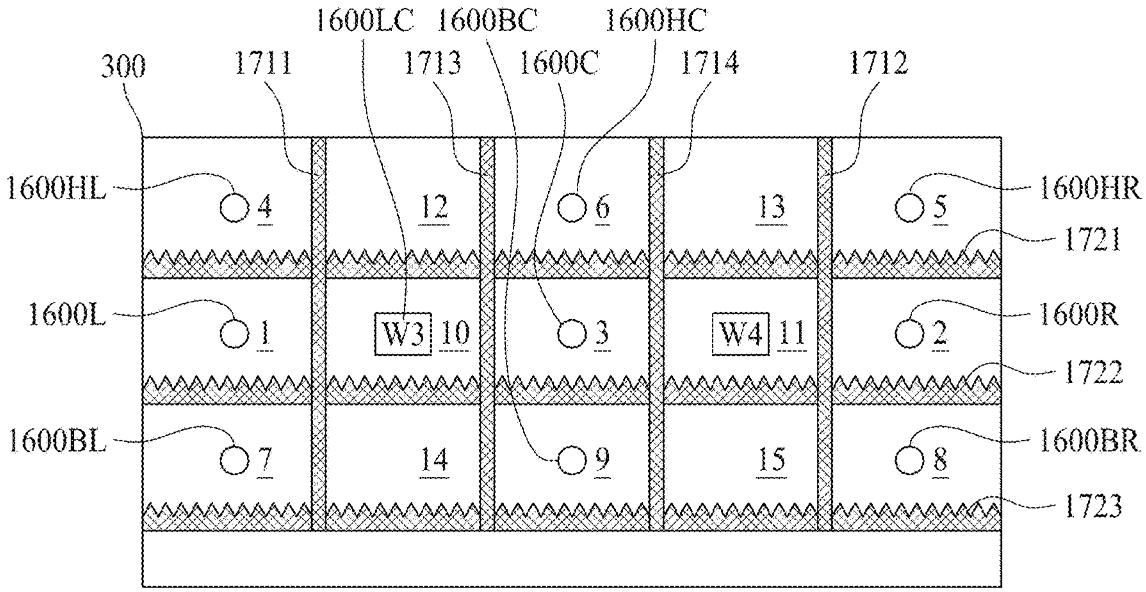
Figure 22E:
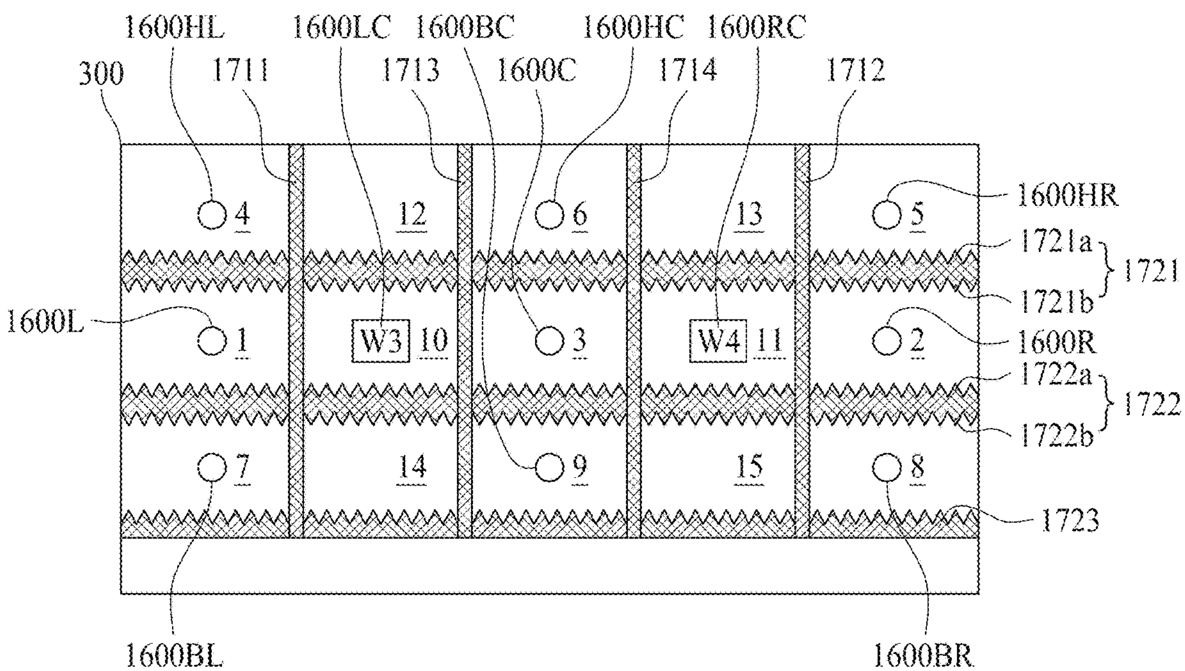
Figure 22F:
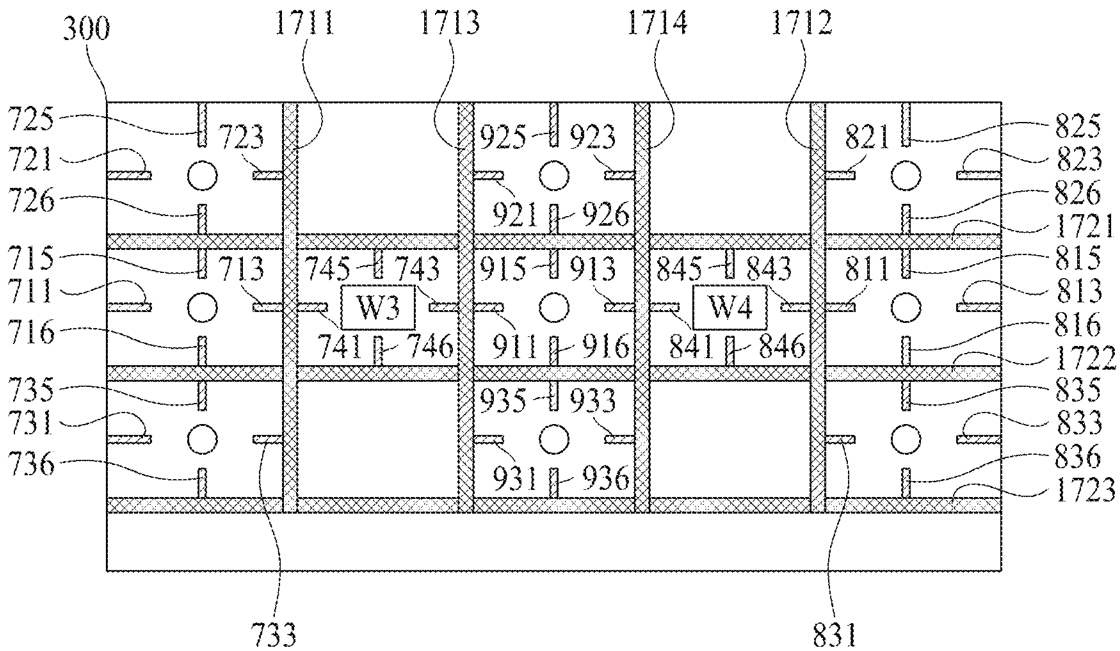
Figure 22G:
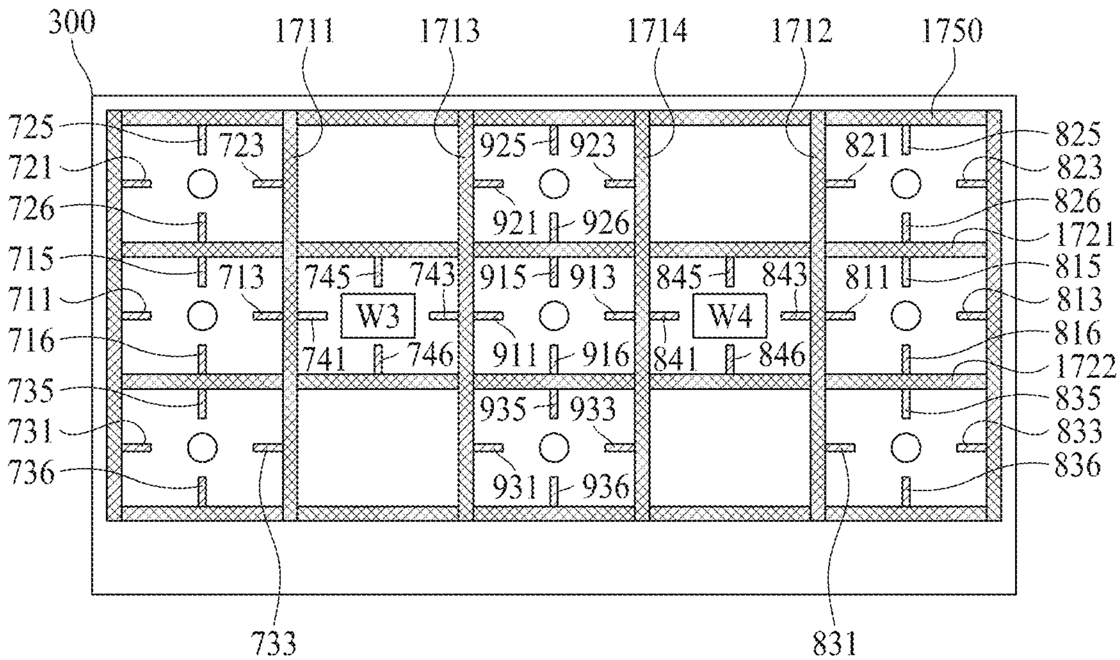
Figure 22H:
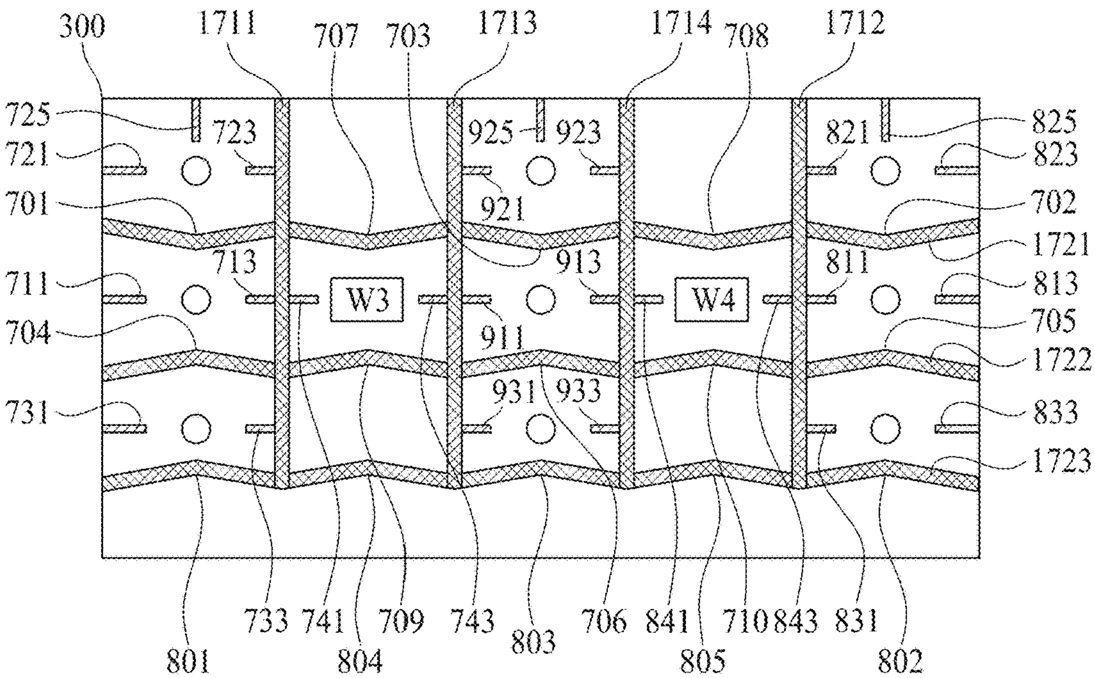
Figure 22I:
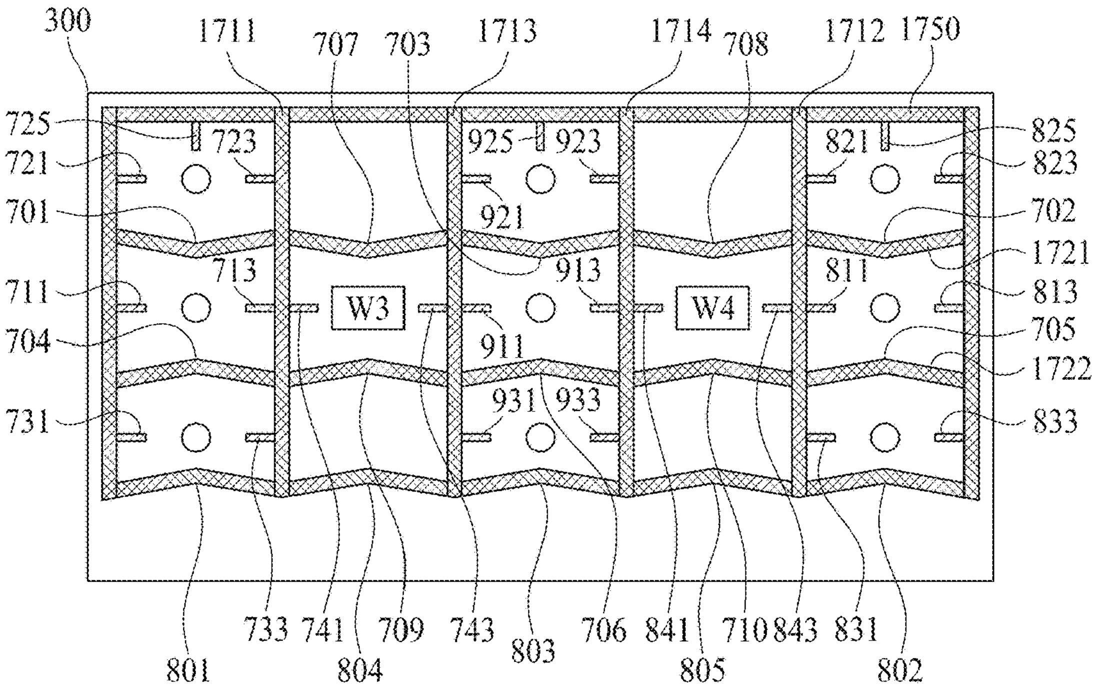

With reference to FIGS. 22A to 22I, the first woofer-integrated sound generating device W3 may be symmetrically disposed with one of the first sound generating device 1600L, the second sound generating device 1600R, and the third sound generating device 1600C. The first woofer-integrated sound generating device W3 may be disposed on the same line as one of the first sound generating device 1600L, the second sound generating device 1600R, and the third sound generating device 1600C. The second woofer-integrated sound generating device W4 may be symmetrically disposed with one of the first sound generating device 1600L, the second sound generating device 1600R, and the third sound generating device 1600C. The second woofer-integrated sound generating device W4 may be disposed on the same line as one of the first sound generating device 1600L, the second sound generating device 1600R, and the third sound generating device 1600C. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 22F and 22G, the 10-$1^{st}$ pad 741 and the 10-$3^{rd}$ pad 743 may be symmetrically disposed with one of the 1-$1^{st}$ pad 711, the 1-$3^{rd}$ pad 713, the 2-$1^{st}$ pad 811, the 2-$3^{rd}$ pad 813, the 3-$1^{st}$ pad 911, and the 3-$3^{rd}$ pad 913. The 11-$1^{st}$ pad 841 and the 11-$3^{rd}$ pad 843 may be symmetrically disposed with one of the 1-$1^{st}$ pad 711, the 1-$3^{rd}$ pad 713, the 2-$1^{st}$ pad 811, the 2-$3^{rd}$ pad 813, the 3-$1^{st}$ pad 911, and the 3-$3^{rd}$ pad 913. With reference to FIGS. 22F and 22I, each of the pads may be provided as one, but are not limited thereto, and at least one of the pads may be provided as two or more.

As another example, the first woofer-integrated sound generating device W3 may be asymmetrically disposed with one of the first sound generating device 1600L, the second sound generating device 1600R, and the third sound generating device 1600C. The second woofer-integrated sound generating device W4 may be asymmetrically disposed with one of the first sound generating device 1600L, the second sound generating device 1600R, and the third sound generating device 1600C. For example, sound constructive interference or destructive interference caused by vibration interference between a vibration and a standing wave generated by the first woofer-integrated sound generating device W3 and a vibration and a standing wave generated by the first sound generating device 1600L, or the second sound generating device 1600R, or the third sound generating device 1600C may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the first sound generating device 1600L, the second sound generating device 1600R, and the third sound generating device 1600C may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the first sound generating device 1600L, or the second sound generating device 1600R, or the third sound generating device 1600C may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the first sound generating device 1600L, the second sound generating device 1600R, and the third sound generating device 1600C may prevent the undesired interference, thereby reproducing a natural sound similar to an original sound. With reference to FIGS. 22F and 22G, the 1-$5^{th}$ pad 715 and the 1-$6^{th}$ pad 716 may be asymmetrically disposed with one of the 4-$5^{th}$ pad 725, the 4-$6^{th}$ pad 726, the 7-$5^{th}$ pad 735, and the 7-$6^{th}$ pad 736. The 2-$5^{th}$ pad 815 and the 2-$6^{th}$ pad 816 may be asymmetrically disposed with one of the 5-$5^{th}$ pad 825, the 5-$6^{th}$ pad 826, the 8-$5^{th}$ pad 835, and the 8-$6^{th}$ pad 836.

The first, second, third, fourth, fifth, sixth, seventh, eighth, ninth, first woofer-integrated, and second woofer-integrated sound generating devices 1600L, 1600R, 1600C, 1600HL, 1600HR, 1600HC, 1600BL, 1600BR, 1600BC, W3, and W4 may output sounds of about 60 Hz to about 40 kHz or about 80 Hz to about 40 kHz. Accordingly, the display apparatus may output an 11.1-channel sound.

With reference to FIG. 22F, a pad may be disposed on at least one side of the first, second, third, fourth, fifth, sixth, and seventh partitions 1721, 1722, 1723, 1713, 1714, 1711, and 1712 to face a sound generating device. For example, the 10-$1^{st}$ pad 741 may be disposed on at least one side of the sixth partition 1711 to face or toward the first woofer-integrated sound generating device W3. For example, the 10-$3^{rd}$ pad 743 may be disposed on at least one side of the fourth partition 1713 to face or toward the first woofer-integrated sound generating device W3. The 10-$1^{st}$ pad 741 may be disposed on a side facing the 10-$3^{rd}$ pad 743. For example, the 10-$3^{rd}$ pad 743 may be disposed on a side of the fourth partition 1713 facing the 10-$1^{st}$ pad 741.

For example, the 10-$5^{th}$ pad 745 may be disposed on at least one side of the first partition 1721 to face or toward the first woofer-integrated sound generating device W3. For example, the 10-$6^{th}$ pad 746 may be disposed on at least one side of the second partition 1722 to face or toward the first woofer-integrated sound generating device W3. The 10-$5^{th}$ pad 745 may be disposed on a side facing the 10-$6^{th}$ pad 746. For example, the 10-$6^{th}$ pad 746 may be disposed on a side of the second partition 1722 facing the 10-$5^{th}$ pad 745.

For example, the 11-$3^{rd}$ pad 843 may be disposed on at least one side of the seventh partition 1712 to face or toward the second woofer-integrated sound generating device W4. For example, the 11-$1^{st}$ pad 841 may be disposed on at least one side of the fifth partition 1714 to face or toward the second woofer-integrated sound generating device W4. The 11-$3^{rd}$ pad 843 may be disposed on a side facing the 11-$1^{st}$ pad 841, and the 11-$3^{rd}$ pad 843 may be disposed to face or toward the second woofer-integrated sound generating device W4. For example, the 11-$5^{th}$ pad 845 may be disposed on at least one side of the first partition 1721 to face or toward the second woofer-integrated sound generating device W4. For example, the 11-$6^{th}$ pad 846 may be disposed on at least one side of the second partition 1722 to face or toward the second woofer-integrated sound generating device W4. The 11-$5^{th}$ pad 845 may be disposed on a side facing the 11-$6^{th}$ pad 846. For example, the 11-$6^{th}$ pad 846 may be disposed on a side of the second partition 1722 facing the 11-$5^{th}$ pad 845.

With reference to FIG. 22G, one or more pads may be provided on a side of the partition 1750. the 4-$5^{th}$ pad 725 may be disposed on one side of the partition 1750 to face or toward the fourth sound generating device 1600HL, the 5-$5^{th}$ pad 825 may be disposed on the one side of the partition 1750 to face or toward the fifth sound generating device 1600HR, and the 6-$5^{th}$ pad 925 may be disposed on the one side of the partition 1750 to face or toward the sixth sound generating device 1600HC. The 7-$6^{th}$ pad 736 may be disposed on one other side of the partition 1750 to face or toward the seventh sound generating device 1600BL, the 8-$6^{th}$ pad 836 may be disposed on the one other side of the partition 1750 to face or toward the eighth sound generating device 1600BR, and the 9-$6^{th}$ pad 936 may be disposed on the one other side of the partition 1750 to face or toward the ninth sound generating device 1600BC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 22F, and thus, their detailed descriptions are omitted.

With reference to FIG. 22H, one of a first partition 1721, a second partition 1722, and a third partition 1723 may include one or more bent portions. The first partition 1721 may include one or more bent portions. For example, the first partition 1721 may include a seventh bent portion 707 toward the first woofer-integrated sound generating device W3 and may include a first bent portion 701 toward the first sound generating device 1600L. The first partition 1721 may include an eighth bent portion 708 toward the second woofer-integrated sound generating device W4 and may include a second bent portion 702 toward the second sound generating device 1600R. The first partition 1721 may include a third bent portion 703 toward the third sound generating device 1600C.

The second partition 1722 may include one or more bent portions. For example, the second partition 1722 may include a ninth bent portion 709 toward the first woofer-integrated sound generating device W3 and may include a fourth bent portion 704 toward the first sound generating device 1600L. The second partition 1722 may include a tenth bent portion 710 toward the second woofer-integrated sound generating device W4 and may include a fifth bent portion 705 toward the second sound generating device 1600R. The second partition 1722 may include a sixth bent portion 706 toward the third sound generating device 1600C.

The third partition 1723 may include one or more bent portions. For example, the third partition 1723 may include an eleventh bent portion 801 toward the seventh sound generating device 1600BL, and may include a twelfth bent portion 802 toward the eighth sound generating device 1600BR. The third partition 1723 may include a thirteenth bent portion 803 toward the ninth sound generating device 1600BC. The third partition 1723 may include a fourteenth bent portion 804 and a fifteenth bent portion 805. The fourteenth bent portion 804 and the fifteenth bent portion 805 may be configured in a bent shape or a non-bent shape, but embodiments are not limited thereto.

With reference to FIG. 22I, one of a first partition 1721, a second partition 1722, and a third partition 1723 may include one or more bent portions, and the partition 1750 may be disposed. For example, the 4-5$^{th}$ pad 725 may be disposed on one side of the partition 1750 to face or toward the fourth sound generating device 1600HL, the 5-5$^{th}$ pad 825 may be disposed on the one side of the partition 1750 to face or toward the fifth sound generating device 1600HR, and the 6-5$^{th}$ pad 925 may be disposed on the one side of the partition 1750 to face or toward the sixth sound generating device 1600HC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. As another example, the third partition 1723 may not include one or more bent portions, as shown in FIG. 19I. The other elements are the same as or similar to FIG. 22H, and thus, their detailed descriptions are omitted.

In FIGS. 22H and 22I, the third partition 1723 may be configured not to include the bent portion, but embodiments are not limited thereto. For example, the third partition 1723 may not include bent portion to face the seventh sound generating device 1600BL, the eighth sound generating device 1600BR, the ninth sound generating device 1600BC, but embodiments are not limited thereto. For example, the partition 1750 may not include bent portion to face or toward the seventh sound generating device 1600BL, the eighth sound generating device 1600BR, and the ninth sound generating device 1600BC. The partition 1750 may be disposed in an edge or periphery of the supporting member 300.

FIGS. 23A to 23I illustrate a sound generating device and a partition according to an embodiment of the present disclosure.

Hereinafter, in embodiments, descriptions described with respect to FIGS. 23A to 23I will be given and may be identically or similarly applied to embodiments of FIGS. 24A to 27I.

Figure 23A:
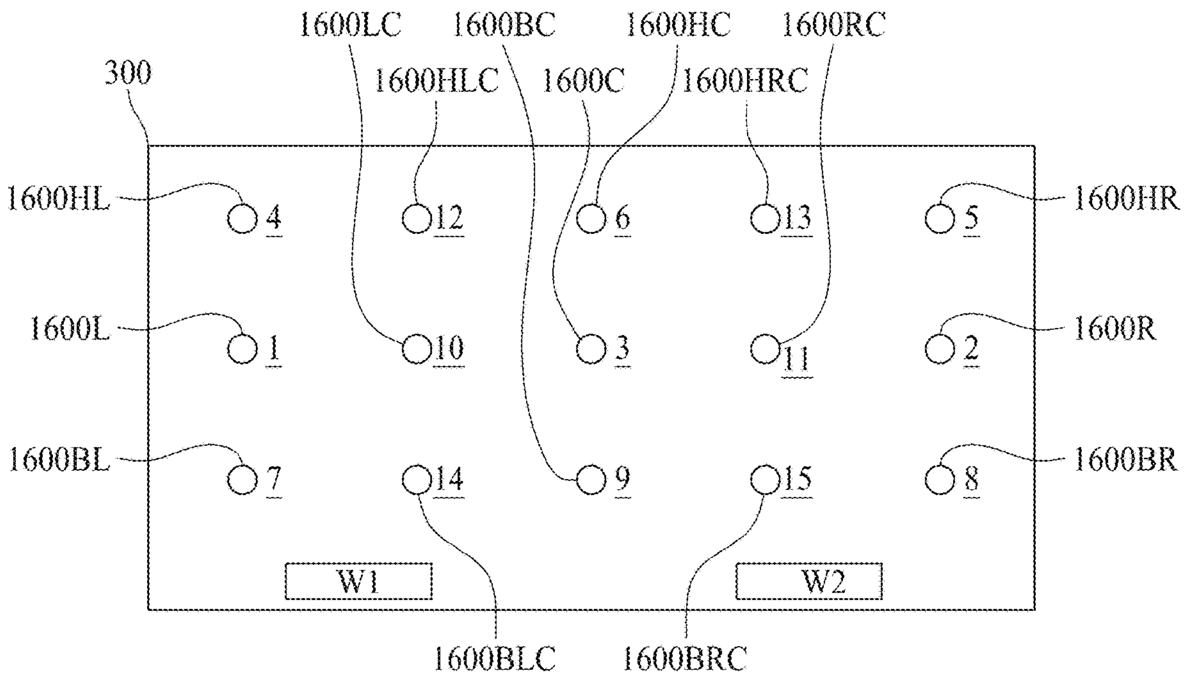
FIGS. 23A to 23I illustrate an embodiment of the sound generating device and a partition according to an embodiment of the present disclosure.
Figure 23B:
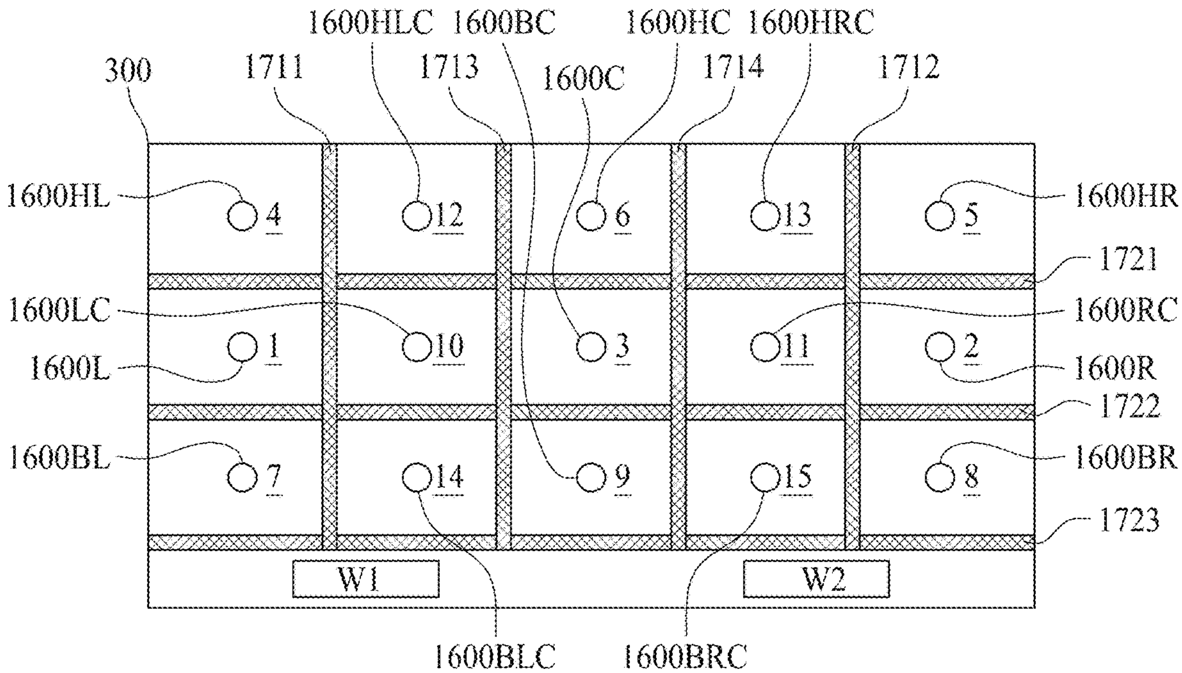
Figure 23C:
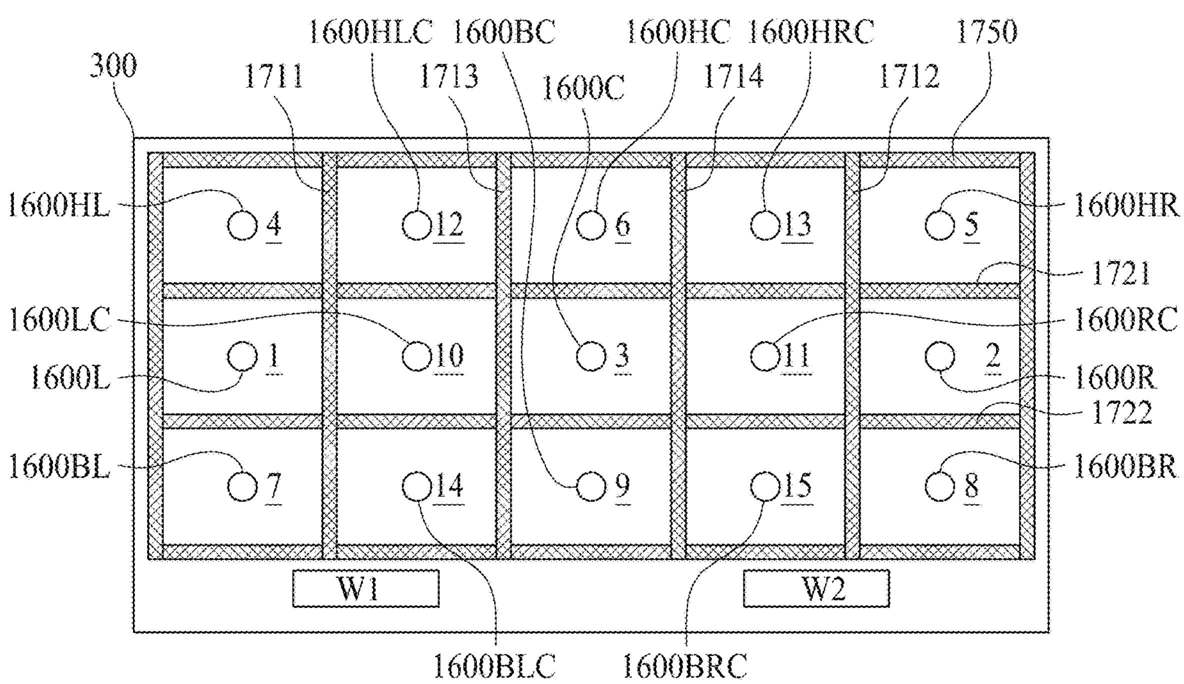
Figure 23D:
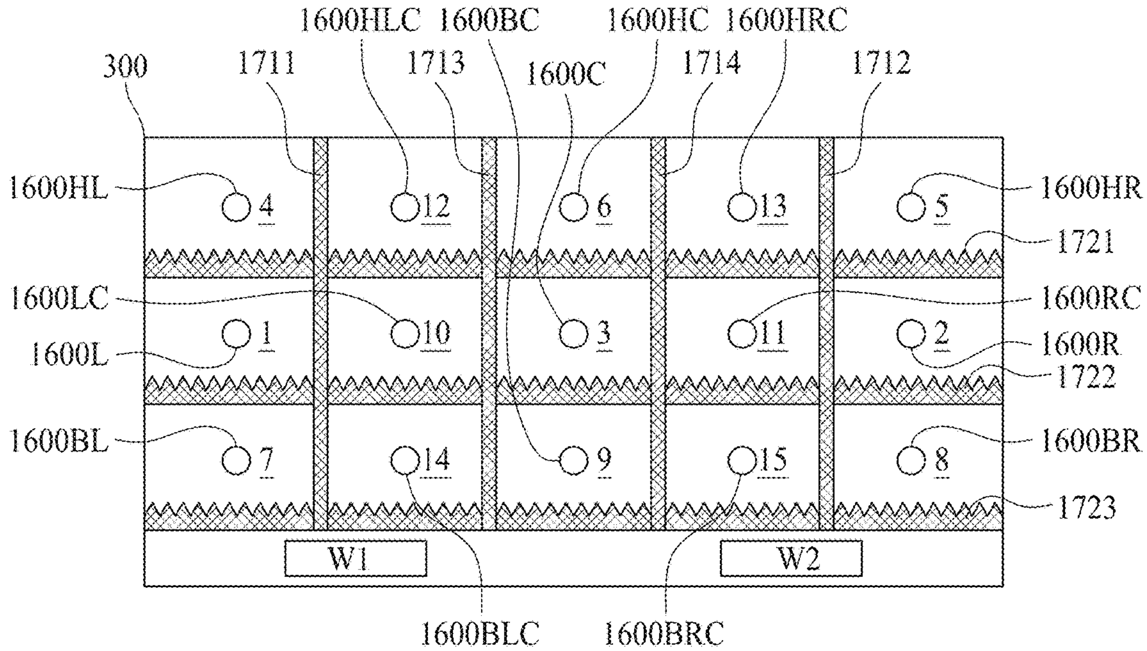
Figure 23E:
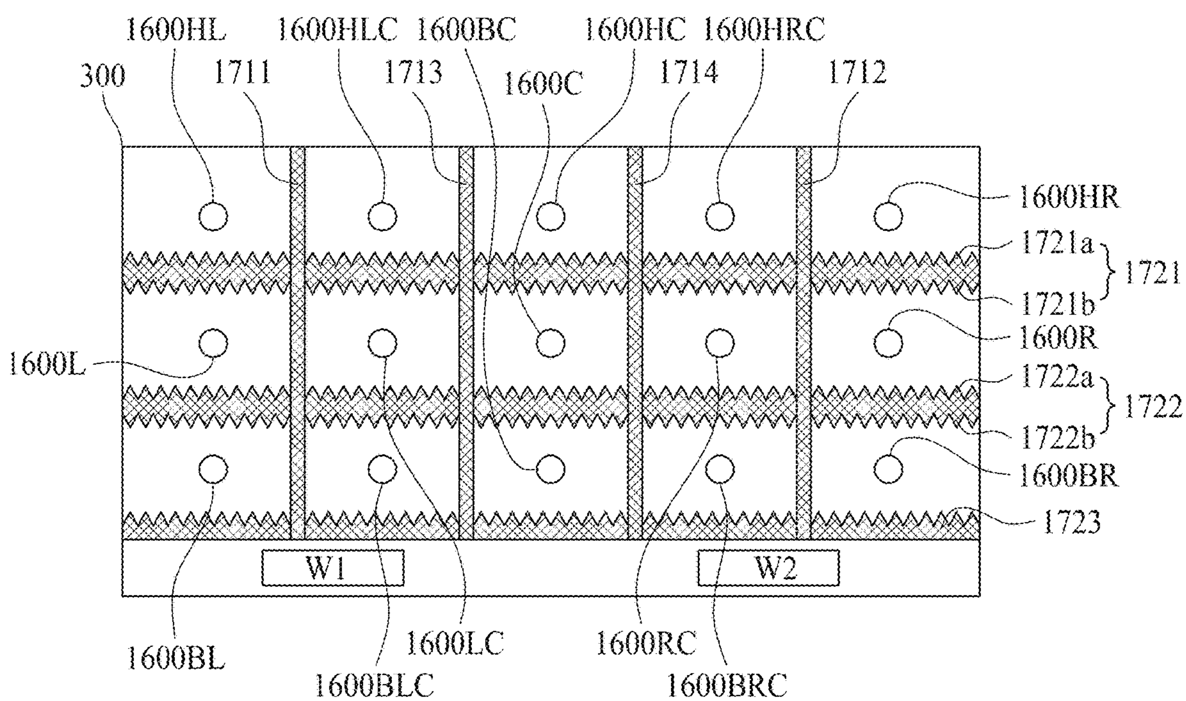
Figure 23F:
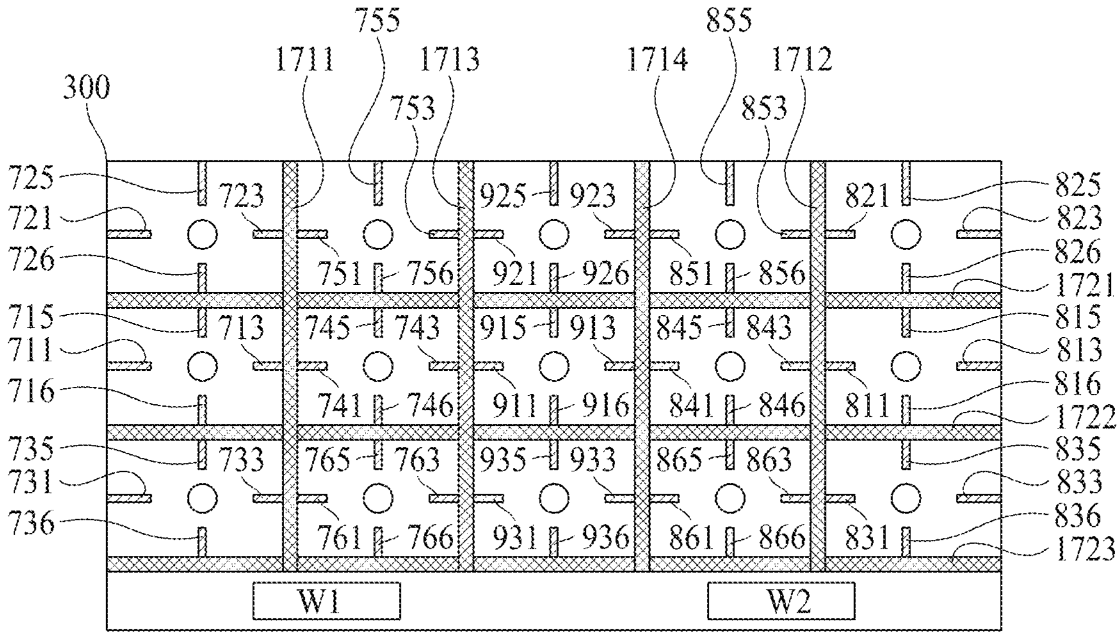
Figure 23G:
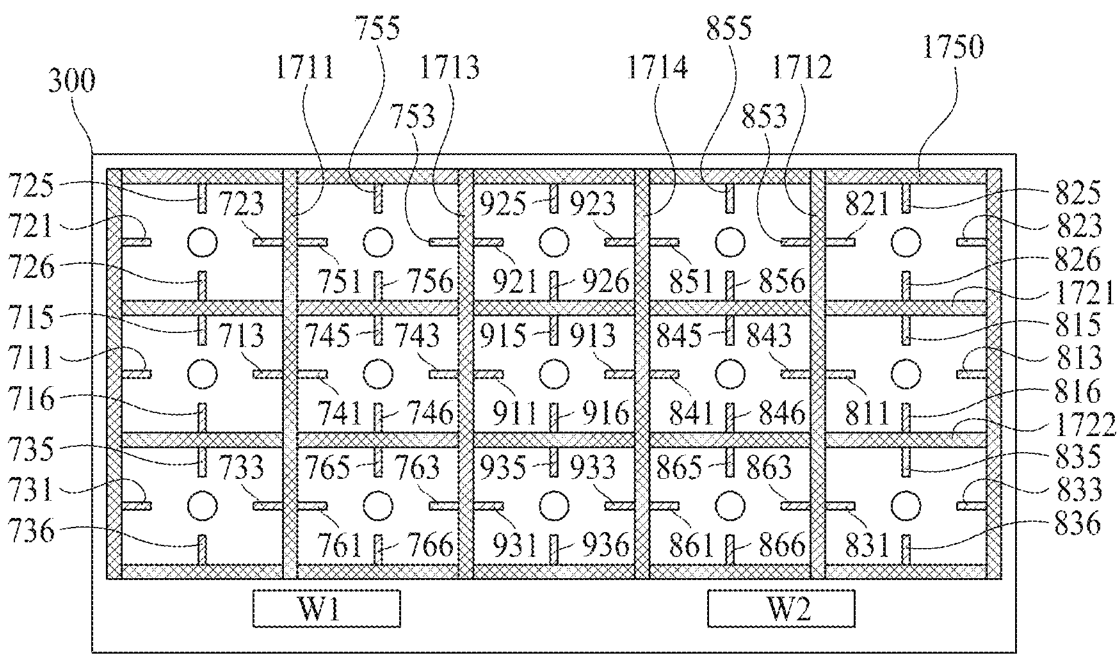
Figure 23H:
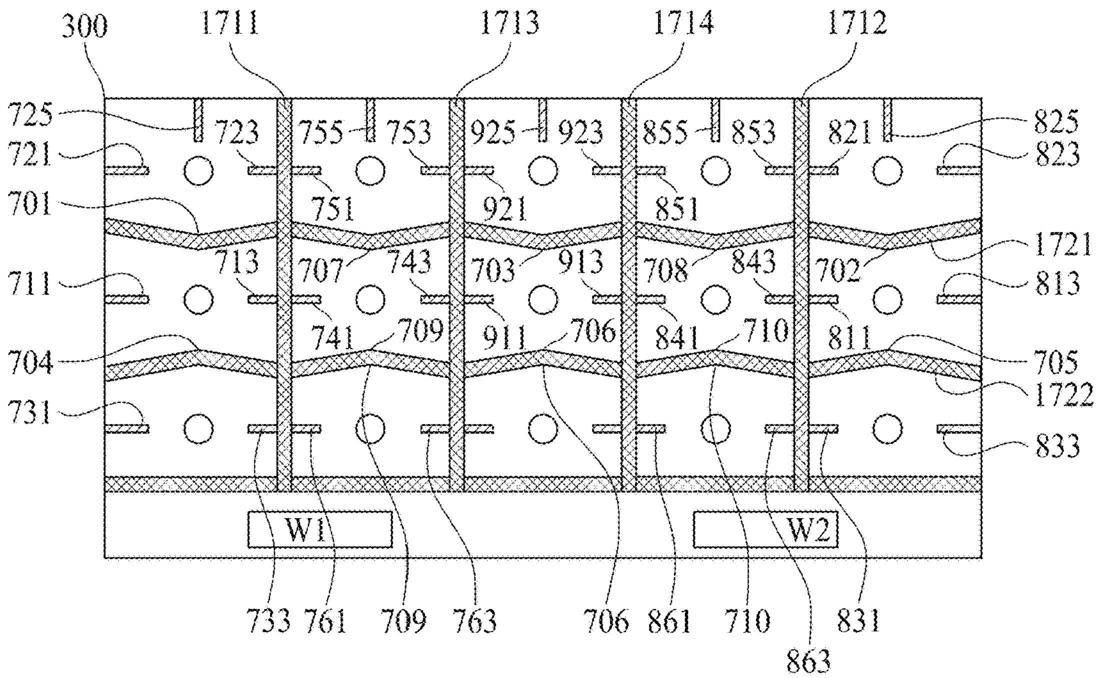
Figure 23I:
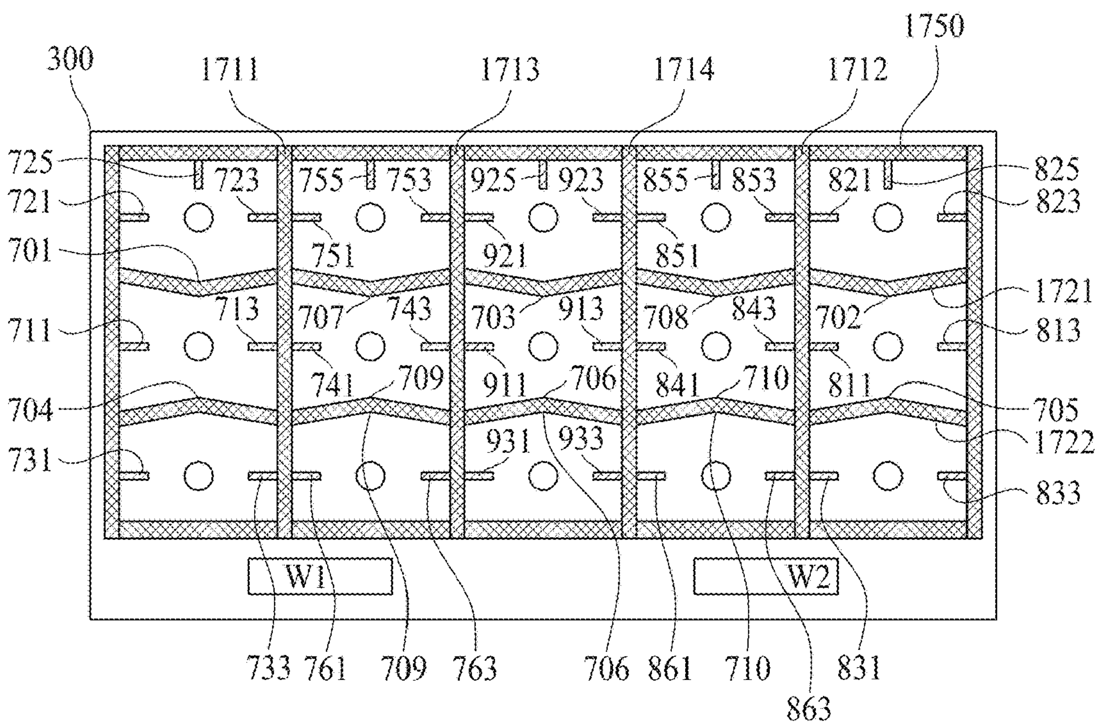

With reference to FIGS. 23A and 23I, a rear surface of the display panel may include first to fifteenth regions 1 to 15. The first to fifteenth regions 1 to 15 may have the same area, but embodiments are not limited thereto. For example, the first to fifteenth regions 1 to 15 may be arranged at equal intervals or distances, but embodiments are not limited thereto.

For example, the first region 1, the fourth region 4, and the seventh region 7 may be a left region of a rear surface of the display panel. For example, the second region 2, the fifth region 5, and the eighth region 8 may be a right region of the rear surface of the display panel. For example, the third region 3, the sixth region 6, and the ninth region 9 may be a center region of the rear surface of the display panel. For example, the twelfth region 12 may be regions between the fourth region 4 and the sixth region 6. For example, the thirteenth region 13 may be regions between the fifth region 5 and the sixth region 6. For example, the fourteenth region 14 may be regions between the seventh region 7 and the ninth region 9. For example, the fifteenth region 15 may be regions between the eighth region 8 and the ninth region 9. For example, the tenth region 10, the twelfth region 12, and the fourteenth region 14 may be regions between the first, fourth, and seventh regions 1, 4, and 7 and the third, sixth, and ninth regions 3, 6, and 9. For example, the eleventh region 11, the thirteenth region 13, and the fifteenth region 15 may be regions between the second, fifth, and eighth regions 2, 5, and 8 and the third, sixth, and ninth regions 3, 6, and 9. Reference numerals 1 to 15 referring to regions in the first to fifteenth regions 1 to 15 may be arbitrarily illustrated, and classification of reference numerals 1 to 15 and the first to fifteenth regions 1 to 15 do not limit descriptions of the present disclosure. Description relevant thereto may be identically or similarly applied to FIGS. 24A to 27I.

At least one sound generating device may be disposed in at least one of the first to fifteenth regions 1 to 15. Hereinafter, in embodiments, an example where a sound generating device is disposed on a rear surface of the display panel will be described, and the present disclosure is not limited thereto. A sound generating device may be disposed between the display panel and a supporting member 300. For example, the sound generating device may be disposed between the rear surface of the display panel and a front surface of the supporting member 300. For example, a first sound generating device 1600L may be disposed in the first region 1 of the rear surface of the display panel, a fourth sound generating device 1600HL may be disposed in the fourth region 4 of the rear surface of the display panel, and a seventh sound generating device 1600BL may be disposed in the seventh region 7 of the rear surface of the display panel. A second sound generating device 1600R may be disposed in the second region 2 of the rear surface of the display panel, a fifth sound generating device 1600HR may be disposed in the fifth region 5 of the rear surface of the display panel, and an eighth sound generating device 1600BR may be disposed in the eighth region 8 of the rear surface of the display panel. A third sound generating device 1600C may be disposed in the third region 3 of the rear surface of the display panel, a sixth sound generating device 1600HC may be disposed in the sixth region 6 of the rear surface of the display panel, and a ninth sound generating device 1600BC may be disposed in the ninth region 9 of the rear surface of the display panel. A tenth sound generating device 1600LC may be disposed in the tenth region 10 of the rear surface of the display panel, a twelfth sound generating device 1600HLC may be disposed in the twelfth region 12 of the rear surface of the display panel, and a fourteenth sound generating device 1600BLC may be disposed in the fourteenth region 14 of the rear surface of the display panel. An eleventh sound generating device 1600RC may be disposed in the eleventh region 11 of the rear surface of the display panel, a thirteenth sound generating device 1600HRC may be disposed in the thirteenth region 13 of the rear surface of the display panel, and a fifteenth sound generating device 1600BRC may be disposed in the fifteenth region 15 of the rear surface of the display panel.

The first sound generating device 1600L may be a left channel of the display panel, the fourth sound generating device 1600HL may be a height (or top) left channel of the display panel, and the seventh sound generating device 1600BL may be a bottom left channel of the display panel. The tenth sound generating device 1600LC may be a left center channel of the display panel, the twelfth sound generating device 1600HLC may be a height (or top) left channel of the display panel, and the fourteenth sound generating device 1600BLC may be a bottom left channel of the display panel. The second sound generating device 1600R may be a right channel of the display panel, the fifth sound generating device 1600HR may be a height (or top) right channel of the display panel, and the eighth sound generating device 1600BR may be a bottom right channel of the display panel. The eleventh sound generating device 1600RC may be a right center channel of the display panel, the thirteenth sound generating device 1600HRC may be a height (or top) right channel of the display panel, and the fifteenth sound generating device 1600BRC may be a bottom right channel of the display panel. The third sound generating device 1600C may be a center channel of the display panel, the sixth sound generating device 1600HC may be a height (or top) center channel of the display panel, and the ninth sound generating device 1600BC may be a bottom center channel of the display panel.

For example, the first sound generating device 1600L may be disposed to be symmetrical with the fourth sound generating device 1600HL and/or the seventh sound generating device 1600BL, but embodiments are not limited thereto. For example, the first sound generating device 1600L may be disposed on the same line as the fourth sound generating device 1600HL and/or the seventh sound generating device 1600BL, but embodiments are not limited thereto. For example, the second sound generating device 1600R may be disposed to be symmetrical with the fifth sound generating device 1600HR and/or the eighth sound generating device 1600BR, but embodiments are not limited thereto. For example, the second sound generating device 1600R may be disposed on the same line as the fifth sound generating device 1600HR and/or the eighth sound generating device 1600BR, but embodiments are not limited thereto.

For example, the third sound generating device 1600C may be disposed to be symmetrical with the sixth sound generating device 1600HC and/or the ninth sound generating device 1600BC, but embodiments are not limited thereto. For example, the third sound generating device 1600C may be disposed on the same line as the sixth sound generating device 1600HC and/or the ninth sound generating device 1600BC, but embodiments are not limited thereto.

For example, the tenth sound generating device 1600LC may be disposed to be symmetrical with one of the twelfth sound generating device 1600HLC and/or the fourteenth sound generating device 1600BLC, but embodiments are not limited thereto. For example, the tenth sound generating device 1600LC may be disposed on the same line as one of the twelfth sound generating device 1600HLC and/or the fourteenth sound generating device 1600BLC, but embodiments are not limited thereto. A description thereof may be identically or similarly applied to embodiments of FIGS. 24A to 27I.

For example, the eleventh sound generating device 1600RC may be disposed to be symmetrical with one of the thirteenth sound generating device 1600HRC and/or the fifteenth sound generating device 1600BRC, but embodiments are not limited thereto. For example, the eleventh sound generating device 1600RC may be disposed on the same line as one of the thirteenth sound generating device 1600HRC and/or the fifteenth sound generating device 1600BRC, but embodiments are not limited thereto. A description thereof may be identically or similarly applied to embodiments of FIGS. 24A to 27I.

For example, one of the fourth sound generating device 1600HL, the fifth sound generating device 1600HR, and the sixth sound generating device 1600HC may be disposed to be symmetrical with one of the twelfth sound generating device 1600HLC and the thirteenth sound generating device 1600HRC, but embodiments are not limited thereto. For example, one of the fourth sound generating device 1600HL, the fifth sound generating device 1600HR, and the sixth sound generating device 1600HC may be disposed on the same line as one of the twelfth sound generating device 1600HLC and the thirteenth sound generating device 1600HRC, but embodiments are not limited thereto.

For example, one of the first sound generating device 1600L, the second sound generating device 1600R, and the third sound generating device 1600C may be disposed to be symmetrical with one of the tenth sound generating device 1600LC and the eleventh sound generating device 1600RC, but embodiments are not limited thereto. For example, one of the first sound generating device 1600L, the second sound generating device 1600R, and the third sound generating device 1600C may be disposed on the same line as one of the tenth sound generating device 1600LC and the eleventh sound generating device 1600RC, but embodiments are not limited thereto. For example, one of the seventh sound generating device 1600BL, the eighth sound generating device 1600BR, and the ninth sound generating device 1600BC may be disposed to be symmetrical with one of the fourteenth sound generating device 1600BLC and the fifteenth sound generating device 1600BRC, but embodiments are not limited thereto. For example, one of the seventh sound generating device 1600BL, the eighth sound generating device 1600BR, and the ninth sound generating device 1600BC may be disposed on the same line as one of the fourteenth sound generating device 1600BLC and the fifteenth sound generating device 1600BRC, but embodiments are not limited thereto. A description thereof may be identically or similarly applied to embodiments of FIGS. 24A to 27I.

In FIGS. 23A to 23I, the first, second, third, fourth, fifth, sixth, seventh, eighth, ninth, tenth, eleventh, twelfth, thirteenth, fourteenth, and fifteenth sound generating devices 1600L, 1600R, 1600C, 1600HL, 1600HR, 1600HC, 1600BL, 1600BR, 1600BC, 1600LC, 1600RC, 1600HLC, 1600HRC, 1600BLC, and 1600BRC may include one or more of an oval sound generating device, a pair of sound generating devices, a circular sound generating device, a single-type sound generating device, a two or more-array sound generating device, and a film-type sound generating device. The oval shape may have an elliptical shape, a rectangular shape with rounded corners, or non-circular curved shape having a width different from its height, but the present embodiment is not limited thereto. For example, in the bobbin of the oval shape, a ratio of a long-axis diameter to a short-axis diameter may be set to 1.3:1 to 2:1. The bobbin of the oval shape may more improve a sound of a high-pitched sound band than a circular shape and may decrease the occurrence of heat caused by a vibration, and thus, may have an excellent heat dissipation characteristic. For example, at least one sound generating device may directly vibrate the display panel to generate a sound. A description thereof may be identically or similarly applied to embodiments of FIGS. 24A to 27I.

With reference to FIG. 23B, a partition may be further provided near or periphery of a sound generating device. The partition may be an air gap or a space where a sound is generated when the display panel vibrates. An air gap or a space which generates or transfers a sound may be referred to as a partition. The partition may separate sounds or may separate channels, and may prevent or decrease the occurrence of a non-clear sound caused by sound interference. The partition may be referred to as an enclosure or a baffle, but the term is not limited thereto. In embodiments, an example where the partition is disposed at a supporting member will be described, but an embodiment of the present disclosure is not limited thereto. In other embodiments, the partition may be disposed on a rear surface of the display panel. In order to illustrate the sound generating device and the partition, an example where the partition is disposed at the supporting member will be described. For example, when the partition is disposed at the supporting member, an influence of the image quality of the display panel due to the partition disposed on the display panel may be reduced.

For example, the partition may be disposed between a supporting member 300 and a display panel corresponding to first to fifteenth regions 1 to 15. For example, a fourth partition 1713 may be disposed between the first, fourth, and seventh regions 1, 4, and 7 and the third, sixth, and ninth regions 3, 6, and 9. The fourth partition 1713 may separate channels or sounds, generated by the first, fourth, and seventh sound generating devices 1600L, 1600HL, and 1600BL, and channels or sounds generated by the third, sixth, and ninth sound generating devices 1600C, 1600HC, and 1600BC. For example, a fifth partition 1714 may be disposed between the second, fifth, and eighth regions 2, 5, and 8 and the third, sixth, and ninth regions 3, 6, and 9. The fifth partition 1714 may separate channels or sounds, generated by the second, fifth, and eighth sound generating devices 1600R, 1600HR, and 1600BR, and channels or sounds generated by the third, sixth, and ninth sound generating devices 1600C, 1600HC, and 1600BC. Accordingly, the fourth partition 1713 and the fifth partition 1714 may separate a left sound and a right sound.

For example, a first partition 1721 may separate the height channel (or top channel) of the display panel and the bottom channel of the display panel. For example, the first partition 1721 may separate the channels or the sounds, generated by the fourth, fifth, sixth, twelfth, and thirteenth sound generating devices 1600HL, 1600HR, 1600HC, 1600HLC, and 1600HRC, and the channels or the sounds generated by the seventh, eighth, ninth, tenth, and eleventh sound generating devices 1600BL, 1600BR, 1600BC, 1600LC, and 1600RC. In order to realize a stereo sound or a stereophonic sound, the tenth sound generating device 1600LC and the eleventh sound generating device 1600RC may be further provided, but the inventors have recognized that a partition should be provided for separating sounds or channel, generated by the tenth sound generating device 1600LC, from sounds or channel generated by the seventh, eighth, and ninth sound generating devices 1600BL, 1600BR, and 1600BC. And, the inventors have recognized that a partition should be provided for separating sounds or channel, generated by the eleventh sound generating device 1600RC, from sounds or channel generated by the seventh, eighth, and ninth sound generating devices 1600BL, 1600BR, and 1600BC. The fourth partition 1713 and the fifth partition 1714 may separate a left sound and a right sound or a left channel and a right channel. In order to realize a stereo sound or a stereophonic sound, the twelfth sound generating device 1600HLC and the fourteenth sound generating device 1600BLC may be further provided, but the inventors have recognized that a partition should be provided for separating sounds or channel, generated by the tenth, twelfth, and fourteenth sound generating devices 1600LC, 1600HLC and 1600BLC, from sounds or channel generated by the first, fourth, and seventh sound generating devices 1600L, 1600HL, and 1600BL. And, in order to realize a stereo sound or a stereophonic sound, the thirteenth sound generating device 1600HRC and the fifteenth sound generating device 1600BRC may be further provided, but the inventors have recognized that a partition should be provided for separating sounds or channel, generated by the eleventh, thirteenth, and fifteenth sound generating devices 1600RC, 1600HRC and 1600BRC, from sounds or channel generated by the second, fifth, and eighth sound generating devices 1600R, 1600HR, and 1600BR. When the first partition 1721 is provided, a height sound (or a top sound) and a bottom sound or a height channel (or a top channel) and a bottom channel may be separated from each other, but the present inventors have recognized that a height sound (or a top sound) and a bottom sound or a height channel (or a top channel) and a bottom channel may not be separated from a center sound or a center channel. When the fourth partition 1713 and the fifth partition 1714 are provided, a left sound and a right sound or a left channel and a right channel may be separated, but the present inventors have recognized that a left sound and a right sound or a left channel and a right channel may not be separated from a center sound or a center channel. Therefore, the present inventors have implemented a partition through various experiments. This will be described below.

For example, a sixth partition 1711 may be between the first, fourth, and seventh regions 1, 4, and 7 and the tenth, twelfth, and fourteenth regions 10, 12, and 14. For example, the sixth partition 1711 may separate channels or sounds generated by the first, fourth, and seventh sound generating devices 1600L, 1600HL, and 1600BL, and the channel or the sound generated by the tenth, twelfth, and fourteenth sound generating devices 1600LC, 1600HLC, and 1600BLC, thereby enhancing a sound output characteristic.

For example, the sixth partition 1711 may separate channels or sounds generated by the first, fourth, and seventh sound generating devices 1600L, 1600HL, and 1600BL, and channels or sounds generated by the third, sixth, and ninth sound generating devices 1600C, 1600HC, and 1600BC, thereby enhancing a sound output characteristic. For example, the sixth partition 1711 may separate a left sound or a left channel, a left center sound or a left center channel, and a center sound or a center channel, thereby enhancing a sound output characteristic.

For example, a seventh partition 1712 may be between the second, fifth, and eighth regions 2, 5, and 8 and the eleventh, thirteenth, and fifteenth regions 11, 13, and 15. For example, the seventh partition 1712 may separate channels or sounds generated by the second, fifth, and eighth sound generating devices 1600R, 1600HR, and 1600BR, and a channel or a sound generated by the eleventh, thirteenth, and fifteenth sound generating devices 1600RC, 1600HRC, and 1600BRC, thereby enhancing a sound output characteristic. For example, the seventh partition 1712 may separate channels or sounds generated by the second, fifth, and eighth sound generating devices 1600R, 1600HR, and 1600BR, and the channels or the sounds generated by the third, sixth, and ninth sound generating devices 1600C, 1600HC, and 1600BC, thereby enhancing a sound output characteristic. For example, the seventh partition 1712 may separate a right sound or a right channel, a right center sound or a right center channel, and a center sound or a center channel, thereby enhancing a sound output characteristic.

For example, a fourth partition 1713 may be disposed between the third, sixth, and ninth regions 3, 6, and 9 and the tenth, twelfth, and fourteenth regions 10, 12, 14. For example, the fourth partition 1713 may separate channels or sounds generated by the third, sixth, and ninth sound generating devices 1600C, 1600HC, and 1600BC, and a channel or a sound generated by the tenth, twelfth, and fourteenth sound generating devices 1600LC, 1600HLC, and 1600BLC, thereby enhancing a sound output characteristic. For example, a fifth partition 1714 may be disposed between the third, sixth, and ninth regions 3, 6, and 9 and the eleventh, thirteenth, and fifteenth regions 11, 13, and 15. For example, the fifth partition 1714 may separate the channels or the sounds generated by the third, sixth, and ninth sound generating devices 1600C, 1600HC, and 1600BC, and the channel or the sound generated by the eleventh, thirteenth, and fifteenth sound generating devices 1600RC, 1600HRC, and 1600BRC, thereby enhancing a sound output characteristic. For example, the fourth partition 1713 may separate a channel or a sound of a center region and a channel or a sound of a left center region. For example, the fifth partition 1714 may separate the channel or the sound of the center region and a channel or a sound of a right center region.

The first partition 1721 may separate the height channel (or top channel) of the display panel and the bottom channel of the display panel. For example, the first partition 1721 may separate the channels or the sounds, generated by the fourth, fifth, sixth, twelfth, and thirteenth sound generating devices 1600HL, 1600HR, 1600HC, 1600HLC, and 1600HRC, and the channels or the sounds generated by the first, second, third, tenth, and eleventh sound generating devices 1600L, 1600R, 1600C, 1600LC, and 1600RC.

The second partition 1722 may separate the center channel of the display panel and the bottom channel of the display panel. For example, the second partition 1722 may separate the channels or the sounds, generated by the first, second, third, tenth, and eleventh sound generating devices 1600L, 1600R, 1600C, 1600LC, and 1600RC and the channels or the sounds generated by the seventh, eighth, ninth, fourteenth, and fifteenth sound generating devices 1600BL, 1600BR, 1600BC, 1600BLC, and 1600BRC.

The third partition 1723 may separate the bottom channel of the display panel and a woofer. For example, the third partition 1723 may separate the channels or the sounds, generated by the seventh, eighth, ninth, fourteenth, and fifteenth sound generating devices 1600BL, 1600BR, 1600BC, 1600BLC, and 1600BRC, and channels or sounds generated by a first woofer W1 and a second woofer W2.

The first, second, third, fourth, fifth, sixth, and seventh partitions 1721, 1722, 1723, 1713, 1714, 1711, and 1712 may be disposed at the supporting member 300. For example, the first, second, third, fourth, fifth, sixth, and seventh partitions 1721, 1722, 1723, 1713, 1714, 1711, and 1712 may be disposed on a front surface of the supporting member 300. As another example, the first, second, third, fourth, fifth, sixth, and seventh partitions 1721, 1722, 1723, 1713, 1714, 1711, and 1712 may be disposed on the rear surface of the display panel. For example, the first, second, third, fourth, fifth, sixth, and seventh partitions 1721, 1722, 1723, 1713, 1714, 1711, and 1712 may be disposed between the display panel and the supporting member 300. For example, the first, second, third, fourth, fifth, sixth, and seventh partitions 1721, 1722, 1723, 1713, 1714, 1711, and 1712 may be disposed between the rear surface of the display panel and the front surface of the supporting member 300.

The first, second, third, fourth, fifth, sixth, and seventh partitions 1721, 1722, 1723, 1713, 1714, 1711, and 1712 may be formed of one or more of a double-sided tape, a double-sided foam pad, a single-sided tape, a single-sided foam pad, an adhesive, and a bond, but is not limited thereto. When the partitions are formed of the double-sided tape or the double-sided foam pad, an adhesive force may be enhanced in a process of attaching the front surface of the supporting member 300 on the rear surface of the display panel. For example, the first, second, third, fourth, fifth, sixth, and seventh partitions 1721, 1722, 1723, 1713, 1714, 1711, and 1712 may include a material having an elastic force which enables compression to be made to a certain degree, and for example, may include polyurethane, polyolefin, polyethylene, and/or the like, but embodiments are not limited thereto.

In a process of placing the first, second, third, fourth, fifth, sixth, and seventh partitions 1721, 1722, 1723, 1713, 1714, 1711, and 1712, the first partition 1721, the second partition 1722, and the third partition 1723 may be first placed, and then, the fourth partition 1713, the fifth partition 1714, the sixth partition 1711, and the seventh partition 1712 may be placed subsequently. As another example, the fourth partition 1713, the fifth partition 1714, the sixth partition 1711, and the seventh partition 1712 may be first placed, and then, the first partition 1721, the second partition 1722, the third partition 1723 may be placed subsequently. However, an order in which the partitions are placed does not limit descriptions of an embodiment of the present disclosure. In the following embodiments, an example where the first partition 1721, the second partition 1722, and the third partition 1723 are first placed, and then, the fourth partition 1713, the fifth partition 1714, the sixth partition 1711, and the seventh partition 1712 are placed subsequently is illustrated, but an embodiment of the present disclosure is not limited thereto. Such a description may be identically or similarly applied to the following embodiments.

Therefore, the first sound generating device 1600L, the fourth sound generating device 1600HL, and the seventh sound generating device 1600BL may be disposed in the first region 1, the fourth region 4, and the seventh region 7 that are a left region of a rear surface of the display panel, and may vibrate a left region of the display panel. The second sound generating device 1600R, the fifth sound generating device 1600HR, and the eighth sound generating device 1600BR may be disposed in the second region 2, the fifth region 5, and the eighth region 8 that are a right region of the rear surface of the display panel, and may vibrate a right region of the display panel. The third sound generating device 1600C, the sixth sound generating device 1600HC, and the ninth sound generating device 1600BC may be disposed in the third region 3, the sixth region 6, and the ninth region 9 that are a center region of the rear surface of the display panel, and may vibrate a center region of the display panel. The tenth, eleventh, twelfth, thirteenth, fourteenth, and fifteenth sound generating devices 1600LC, 1600RC, 1600HLC, 1600HRC, 1600BLC, and 1600BRC may be disposed in the tenth, eleventh, twelfth, thirteenth, fourteenth, and fifteenth regions 10, 11, 12, 13, 14, and 15 that are a left region, a center region, and a right region of the rear surface of the display panel, and may vibrate a left region, a center region, and a right region of the rear surface of the display panel. The first, second, third, fourth, fifth, sixth, seventh, eighth, ninth, tenth, eleventh, twelfth, thirteenth, fourteenth, and fifteenth sound generating devices 1600L, 1600R, 1600C, 1600HL, 1600HR, 1600HC, 1600BL, 1600BR, 1600BC, 1600LC, 1600RC, 1600HLC, 1600HRC, 1600BLC, and 1600BRC may receive different vibration signals, and may each be independently driven. For example, the first sound generating device 1600L, the fourth sound generating device 1600HL, and the seventh sound generating device 1600BL may generate sounds by using the left region of the rear surface of the display panel as a vibration plate. The second sound generating device 1600R, the fifth sound generating device 1600HR, and the eighth sound generating device 1600BR may generate sounds by using the right region of the rear surface of the display panel as a vibration plate. The third sound generating device 1600C, the sixth sound generating device 1600HC, and the ninth sound generating device 1600BC may generate sounds by using the center region of the rear surface of the display panel as a vibration plate. The tenth, eleventh, twelfth, thirteenth, fourteenth, and fifteenth sound generating devices 1600LC, 1600RC, 1600HLC, 1600HRC, 1600BLC, and 1600BRC may generate sounds by using the left region, the center region, and the right region of the rear surface of the display panel as a vibration plate. For example, the fourth, fifth, sixth, twelfth, and thirteenth sound generating device 1600HL, 1600HR, 1600HC, 1600HLC, and 1600HRC may generate sounds toward the upper portion of the display panel, thereby enhancing a sound at the upper portion of the display panel. For example, the seventh, eighth, ninth, fourteenth, and fifteenth sound generating devices 1600BL, 1600BR, 1600BC, 1600BLC, and 1600BRC may generate sounds toward a lower portion of the display panel, thereby enhancing a sound at the lower portion of the display panel. Accordingly, a display apparatus with enhanced sound at the upper portion and the lower portion of the display panel may be provided.

And, a woofer may be disposed for more enhancing a sound of a low-pitched sound band. For example, one or more woofers may be further disposed under at least one or more of the first to fifteenth regions 1 to 15 or at a lower region of the at least one or more of the first to fifteenth regions 1 to 15. For example, one or more woofers may be further provided under at least one or more of the first to fifteenth sound generating device 1600L to 1600BRC or at a lower region of the at least one or more of the first to fifteenth sound generating device 1600L to 1600BRC. For example, a first woofer W1 may be disposed under the seventh region 7 of the display panel or at a lower portion of the seventh region 7 of the display panel. For example, the first woofer W1 may be disposed under the seventh sound generating device 1600BL or at a lower region of the seventh sound generating device 1600BL. For example, the first woofer W1 may be disposed between the seventh region 7 and the fourteenth region 14. For example, a second woofer W2 may be disposed under the eighth region 8 of the display panel or at a lower region of the eighth region 8 of the display panel. For example, the second woofer W2 may be disposed under the eighth sound generating device 1600BR or at a lower region of the eighth sound generating device 1600BR. For example, the second woofer W2 may be disposed between the eighth region 8 and the fifteenth region 15. Therefore, the first woofer W1 and the second woofer W2 may output sounds of a low-pitched sound band. The first, second, third, fourth, fifth, sixth, seventh, eighth, ninth, tenth, eleventh, twelfth, thirteenth, fourteenth, and fifteenth sound generating devices 1600L, 1600R, 1600C, 1600HL, 1600HR, 1600HC, 1600BL, 1600BR, 1600BC, 1600LC, 1600RC, 1600HLC, 1600HRC, 1600BLC, and 1600BRC may output sounds of about 80 Hz to about 40 kHz. The first woofer W1 and the second woofer W2 may output sounds of 80 Hz or less. Accordingly, the display apparatus may output a 15.1-channel sound. Moreover, comparing with sound generating devices disposed on the left and the right of the display panel, since sound generating devices are further provided at an upper portion and a lower portion of the display panel with respect to a widthwise direction of the display panel, left and right sounds and height (or top) and bottom sounds may be enhanced, and a user may feel a sense of sound field like a real sound. For example, the fourth, fifth, sixth, twelfth, and thirteenth sound generating devices 1600HL, 1600HR, 1600HC, 1600HLC, and 1600HRC are further provided, sounds at an upper portion of the display panel may be more enhanced, the seventh, eighth, ninth, fourteenth, and fifteenth sound generating devices 1600BL, 1600BR, 1600BC, 1600BLC, and 1600BRC are further provided, sounds at a bottom portion of the display panel may be more enhanced, thereby providing a display apparatus for realizing a stereo sound including left and right sounds and height (or top) and bottom sounds. Therefore, left and right sounds corresponding left and right images and height (or top) and bottom sounds corresponding to upper and lower images may be realized, and a real stereo sound of a real sound including stereo left and right sounds and stereo height (or top) and bottom sounds may be realized, thereby providing a user with a real sound instead of a virtual sound. Therefore, a real stereo sound or surround sound of a real sound including stereo left and right sounds and stereo height (or top) and bottom sounds may be provided to a user, thereby enhancing a realistic sense. Accordingly, in theaters, private cinemas, and apparatuses such as televisions, a user may simultaneously feel a realistic sound and image similarly or identically to reality, and for example, may feel a realistic AV (Audio Visual) or Dolby sound system. A description thereof may be identically or similarly applied to embodiments of FIGS. 24B to 27I. And, as described above with respect to FIGS. 6 to 11B, the first, second, third, fourth, fifth, sixth, seventh, eighth, ninth, tenth, eleventh, twelfth, thirteenth, fourteenth, and fifteenth sound generating devices 1600L, 1600R, 1600C, 1600HL, 1600HR, 1600HC, 1600BL, 1600BR, 1600BC, 1600LC,

1600RC, 1600HLC, 1600HRC, 1600BLC, and 1600BRC may be disposed in the display panel 100. Therefore, a thickness of a sound generating device may be reduced, and thus, a thickness of a display apparatus may decrease, thereby providing a display apparatus for providing a sense of beauty to a user. Also, as described above with respect to FIGS. 12A and 12B, the first, second, third, fourth, fifth, sixth, seventh, eighth, ninth, tenth, eleventh, twelfth, thirteenth, fourteenth, and fifteenth sound generating devices 1600L, 1600R, 1600C, 1600HL, 1600HR, 1600HC, 1600BL, 1600BR, 1600BC, 1600LC, 1600RC, 1600HLC, 1600HRC, 1600BLC, and 1600BRC may each be configured as a sound generating device with enhanced low-pitched sound band, thereby providing a display apparatus for realizing left and right sounds and upper and lower sounds of an enhanced low-pitched sound band. Also, as described above with respect to FIG. 13, the first, second, third, fourth, fifth, sixth, seventh, eighth, ninth, tenth, eleventh, twelfth, thirteenth, fourteenth, and fifteenth sound generating devices 1600L, 1600R, 1600C, 1600HL, 1600HR, 1600HC, 1600BL, 1600BR, 1600BC, 1600LC, 1600RC, 1600HLC, 1600HRC, 1600BLC, and 1600BRC may each be configured as a film-type sound generating device, and thus, a thickness of a sound generating device may be reduced to decrease a thickness of a display apparatus, thereby providing a display apparatus for providing a sense of beauty to a user.

With reference to FIG. 23C, the first, second, fourth, fifth, sixth, and seventh partitions 1721, 1722, 1723, 1713, 1714, 1711, and 1712 may be provided, and a partition 1750 may be disposed between a supporting member 300 and a display panel. For example, the partition 1750 may be disposed at an edge or periphery of the supporting member 300. For example, the partition 1750 may be disposed at an edge or periphery of a front surface of the supporting member 300. The partition 1750 may be a whole region of four outer sides of the front surface of the supporting member 300. As another example, the partition 1750 may be disposed at an edge or periphery of the rear surface of the display panel. The partition 1750 may be a whole region of four outer sides of the rear surface of the display panel. The partition 1750 may be a whole region of the four outer sides of the front surface of the supporting member 300 or the rear surface of the display panel. The partition 1750 may be disposed along a shape of the display panel 100 so as to prevent a wave phenomenon of the display panel. For example, when the partition 1750 is an adhesive member for attaching the display panel and the supporting member 300 described above with reference to FIG. 1B, the adhesive member described above with reference to FIG. 1B may be omitted, and the partition 1750 may be as an adhesive member. However, an embodiment of the present disclosure is not limited thereto, and an adhesive member for attaching the display panel 100 and the supporting member 300 may be provided on a rear surface of the display panel 100 or at the supporting member 300.

In a process of placing the first partition 1721, the second partition 1722, the fourth partition 1713, the fifth partition 1714, the sixth partition 1711, the seventh partition 1712, and the partition 1750, the first partition 1721 and the second partition 1722 may be first placed, the partition 1750 may be placed, and then, the fourth partition 1713, the fifth partition 1714, the sixth partition 1711, and the seventh partition 1712 may be placed subsequently. As another example, the fourth partition 1713, the fifth partition 1714, the sixth partition 1711, and the seventh partition 1712 may be first placed, the first partition 1721 and the second partition 1722 may be placed, and then, the partition 1750 may be placed subsequently. However, an order in which the partitions are placed does not limit descriptions of an embodiment of the present disclosure. The partition 1750 may be first placed in a lengthwise direction of the supporting member 300, and then, may be placed in a widthwise direction. As another example, the partition 1750 may be first placed in a widthwise direction of the supporting member 300, and then, may be placed in a lengthwise direction. However, an order in which the partitions are placed does not limit descriptions of the embodiment of the present disclosure. In the following embodiments, an example where the first partition 1721, the second partition 1722, and/or the third partition 1723 are first placed, the partition 1750 is placed, and then, the fourth partition 1713, the fifth partition 1714, the sixth partition 1711, and the seventh partition 1712 are placed subsequently is illustrated, but an embodiment of the present disclosure is not limited thereto. Such a description may be identically or similarly applied to the following embodiments.

With reference to FIGS. 23D and 23E, a shape of a first partition 1721, a shape of a second partition 1722, and a shape of a third partition 1723 may be differently implemented. A shape of a first partition 1721, a shape of a second partition 1722, and a shape of a third partition 1723 may differ from a shape of a display panel. For example, the first partition 1721, the second partition 1722, and the third partition 1723 may have a non-flat shape or may not have a linear shape. For example, the first partition 1721, the second partition 1722, and the third partition 1723 may have a saw-toothed shape, a triangular shape, and an end-rounded triangular shape. For example, sawtooth of the first partition 1721, the second partition 1722, and the third partition 1723 may be disposed toward a sound generating device. For example, when the first partition 1721, the second partition 1722, and the third partition 1723 have a triangular shape, an end of a triangle may be disposed toward a sound generating device. For example, when the first partition 1721, the second partition 1722, and the third partition 1723 may have an end-rounded triangular shape, an end of an end-rounded triangle may be disposed toward a sound generating device. For example, with reference to FIG. 23D, when the first partition 1721 has an end-rounded triangular shape, an end of an end-rounded triangle may be provided toward one or more of the fourth, fifth, sixth, thirteenth, and thirteenth sound generating devices 1600HL, 1600HR, 1600HC, 1600HLC, and 1600HRC. For example, when the second partition 1722 has an end-rounded triangular shape, an end of an end-rounded triangle may be provided toward one or more of the first, second, third, tenth, and eleventh sound generating devices 1600L, 1600R, 1600C, 1600LC, and 1600RC. For example, when the third partition 1723 has an end-rounded triangular shape, an end of an end-rounded triangle may be provided toward one or more of the seventh, eighth, ninth, fourteenth, and fifteenth sound generating devices 1600BL, 1600BR, 1600BC, 1600BLC, and 1600BRC. Accordingly, since a shape of a partition is provided toward at least one sound generating device, a peak or a dip phenomenon caused by a standing wave of the sound generating device may be controlled, and a wave phenomenon of a display panel may be reduced. Also, by modifying a shape of a partition, sound interference such as diffused reflection of a sound generating device may be solved.

When a partition has a non-flat shape or does not have a linear shape, the partition may diffuse a standing wave. For example, when a partition is implemented in a saw-toothed shape, a triangular shape, and an end-rounded triangular shape, a standing wave may be diffused in various directions by the saw-toothed shape, the triangular shape, and the end-rounded triangular shape, thereby enhancing a sound output characteristic.

With reference to FIG. 23E, the first partition 1721 and the second partition 1722 may be provided as two partitions, but embodiments are not limited thereto, and one or more of the first partition 1721 and the second partition 1722 may be provided as two partitions. For example, the first partition 1721 may include a 1-1$^{st}$ partition 1721*a* and a 1-2$^{nd}$ partition 1721*b*, and may be configured in a triangular or an end-rounded triangular shape. An end of the triangular or end-rounded triangular shape of the 1-1$^{st}$ partition 1721*a* may be provided to face the fourth, fifth, sixth, twelfth, and thirteenth sound generating devices 1600HL, 1600HR, 1600HC, 1600HLC, and 1600HRC. An end of the triangular or end-rounded triangular shape of the 1-2$^{nd}$ partition 1721*b* may be provided to face or toward one or more of the first, second, third, tenth, and eleventh sound generating devices 1600L, 1600R, 1600C, 1600LC, and 1600RC. For example, the second partition 1722 may include a 2-1$^{st}$ partition 1722*a* and a 2-2$^{nd}$ partition 1722*b*, and may be configured in a triangular or an end-rounded triangular shape. An end of the triangular or end-rounded triangular shape of the 2-1$^{st}$ partition 1722*a* may be provided to face or toward one or more of the first, second, third, tenth, and eleventh sound generating devices 1600L, 1600R, 1600C, 1600LC, and 1600RC. An end of the triangular or end-rounded triangular shape of the 2-2$^{nd}$ partition 1722*b* may be provided to face the seventh, eighth, ninth, fourteenth, and fifteenth sound generating devices 1600BL, 1600BR, 1600BC, 1600BLC, and 1600BRC. An end of a triangular or end-rounded triangular shape of the third partition 1723 may be provided to face or toward one or more of the seventh, eighth, ninth, fourteenth, and fifteenth sound generating devices 1600BL, 1600BR, 1600BC, 1600BLC, and 1600BRC. Accordingly, a peak or a dip phenomenon caused by a standing wave of a sound generating device may be controlled, and a wave phenomenon of a display panel may be reduced.

With reference to FIG. 23F, a pad may be disposed on at least one side of a sixth partition 1711 to face the first, fourth, and seventh sound generating devices 1600L, 1600HL, and 1600BL. For example, a 1-3$^{rd}$ pad 713 may be disposed on at least one side of the sixth partition 1711 to face or toward the first sound generating device 1600L. A 1-1$^{st}$ pad 711 may be disposed on a side facing the 1-3$^{rd}$ pad 713. The 1-1$^{st}$ pad 711 and the 1-3$^{rd}$ pad 713 may be provided as one, but embodiments are not limited thereto, and one or more of the 1-Pt pad 711 and the 1-3$^{rd}$ pad 713 may be provided as two or more. For example, a 4-3$^{rd}$ pad 723 may be disposed on at least one side of the sixth partition 1711 to face or toward the fourth sound generating device 1600HL. A 4-1$^{st}$ pad 721 may be disposed on a side facing the 4-3$^{rd}$ pad 723. The 4-1$^{st}$ pad 721 and the 4-3$^{rd}$ pad 723 may be provided as one, but embodiments are not limited thereto, and one or more of the 4-1$^{st}$ pad 721 and the 4-3$^{rd}$ pad 723 may be provided as two or more. For example, a 7-3$^{rd}$ pad 733 may be disposed on at least one side of the sixth partition 1711 to face or toward the seventh sound generating device 1600BL. A 7-1$^{st}$ pad 731 may be disposed on a side facing the 7-3$^{rd}$ pad 733. The 7-1$^{st}$ pad 731 and the 7-3$^{rd}$ pad 733 each may be provided as one, but embodiments are not limited thereto, and one or more of the 7-1$^{st}$ pad 731 and the 7-3$^{rd}$ pad 733 may be provided as two or more.

A pad may be disposed on at least one other side of the sixth partition 1711 to face or toward the tenth sound generating device 1600LC. For example, a 10-1$^{st}$ pad 741 may be disposed on at least one other side of the sixth partition 1711 to face or toward the tenth sound generating device 1600LC. The 10-1$^{st}$ pad 741 may be provided as one, but embodiments are not limited thereto, and may be provided as two or more.

A pad may be disposed on at least one other side of the sixth partition 1711 to face or toward the twelfth sound generating device 1600HLC. For example, a 12-1$^{st}$ pad 751 may be disposed on at least one other side of the sixth partition 1711 to face or toward the twelfth sound generating device 1600HLC. The 12-1$^{st}$ pad 751 may be provided as one, but embodiments are not limited thereto, and may be provided as two or more.

A pad may be disposed on at least one other side of the sixth partition 1711 to face or toward the fourteenth sound generating device 1600BLC. For example, a 14-1$^{st}$ pad 761 may be disposed on at least one other side of the sixth partition 1711 to face or toward the fourteenth sound generating device 1600BLC. The 14-1$^{st}$ pad 761 may be provided as one, but embodiments are not limited thereto, and may be provided as two or more.

A pad may be disposed on at least one side of a seventh partition 1712 to face or toward one or more of the second, fifth, and eighth sound generating devices 1600R, 1600HR, and 1600BR. For example, a 2-1$^{st}$ pad 811 may be disposed on at least one side of the seventh partition 1712 to face or toward the second sound generating device 1600R. A 2-3$^{rd}$ pad 813 may be disposed on a side facing the 2-1$^{st}$ pad 811. The 2-1$^{st}$ pad 811 and the 2-3$^{rd}$ pad 813 may be provided as one, but embodiments are not limited thereto, and one or more of the 2-1$^{st}$ pad 811 and the 2-3$^{rd}$ pad 813 may be provided as two or more. For example, a 5-1$^{st}$ pad 821 may be disposed on at least one side of the seventh partition 1712 to face or toward the fifth sound generating device 1600HR. A 5-3$^{rd}$ pad 823 may be disposed on a side facing the 5-1$^{st}$ pad 821. The 5-1$^{st}$ pad 821 and the 5-3$^{rd}$ pad 823 may be provided as one, but embodiments are not limited thereto, and one or more of the 5-1$^{st}$ pad 821 and the 5-3$^{rd}$ pad 823 may be provided as two or more. For example, an 8-1$^{st}$ pad 831 may be disposed on at least one side of the seventh partition 1712 to face or toward the eighth sound generating device 1600BR. An 8-3$^{rd}$ pad 833 may be disposed on a side facing the 8-1$^{st}$ pad 831. The 8-1$^{st}$ pad 831 and the 8-3$^{rd}$ pad 833 may be provided as one, but embodiments are not limited thereto, and one or more of the 8-1$^{st}$ pad 831 and the 8-3$^{rd}$ pad 833 may be provided as two or more.

A pad may be disposed on at least one other side of the seventh partition 1712 to face or toward the eleventh sound generating device 1600RC. For example, an 11-3$^{rd}$ pad 843 may be disposed on at least one other side of the seventh partition 1712 to face or toward the eleventh sound generating device 1600RC. The 11-3$^{rd}$ pad 843 may be provided as one, but embodiments are not limited thereto, and may be provided as two or more. A pad may be disposed on at least one other side of the seventh partition 1712 to face or toward the thirteenth sound generating device 1600HRC. For example, a 13-3$^{rd}$ pad 853 may be disposed on at least one other side of the seventh partition 1712 to face or toward the thirteenth sound generating device 1600HRC. The 13-3$^{rd}$ pad 853 may be provided as one, but embodiments are not limited thereto, and may be provided as two or more. A pad may be disposed on at least one other side of the seventh partition 1712 to face or toward the fifteenth sound generating device 1600BRC. For example, a 15-3$^{rd}$ pad 863 may be disposed on at least one other side of the seventh partition 1712 to face or toward the fifteenth sound generating device 1600BRC. The 15-3$^{rd}$ pad 863 may be provided as one, but embodiments are not limited thereto, and may be provided as two or more.

A pad may be disposed on at least one side of a fourth partition 1713 and at least one side of the fifth partition 1714 to face or toward one or more of the third, sixth, and ninth sound generating devices 1600C, 1600HC, and 1600BC. For example, a 3-1$^{st}$ pad 911 may be disposed on at least one side of the fourth partition 1713 to face or toward the third sound generating device 1600C. For example, a 3-3$^{rd}$ pad 913 may be disposed on at least one side of the fifth partition 1714 to face or toward the third sound generating device 1600C. The 3-1$^{st}$ pad 911 may be disposed to face the 3-3$^{rd}$ pad 913. For example, the 3-3$^{rd}$ pad 913 may be disposed on a side of the fifth partition 1714 facing the 3-1$^{st}$ pad 911. The 3-1$^{st}$ pad 911 and the 3-3$^{rd}$ pad 913 may be provided as one, but embodiments are not limited thereto, and one or more of the 3-1$^{st}$ pad 911 and the 3-3$^{rd}$ pad 913 may be provided as two or more. For example, a 6-1$^{st}$ pad 921 may be disposed on at least one side of the fourth partition 1713 to face or toward the sixth sound generating device 1600HC. For example, a 6-3$^{rd}$ pad 923 may be disposed on at least one side of the fifth partition 1714 to face or toward the sixth sound generating device 1600HC. The 6-1$^{st}$ pad 921 may be disposed to face or toward the 6-3$^{rd}$ pad 923. The 6-3$^{rd}$ pad 923 may be disposed on a side of the fifth partition 1714 facing the 6-1$^{st}$ pad 921. The 6-1$^{st}$ pad 921 and the 6-3$^{rd}$ pad 923 may be provided as one, but embodiments are not limited thereto, and one or more of the 6-1$^{st}$ pad 921 and the 6-3$^{rd}$ pad 923 may be provided as two or more. For example, a 9-1$^{st}$ pad 931 may be disposed on at least one side of the fourth partition 1713 to face or toward the ninth sound generating device 1600BC. For example, a 9-3$^{rd}$ pad 933 may be disposed on at least one side of the fifth partition 1714 to face or toward the ninth sound generating device 1600BC. The 9-1$^{st}$ pad 931 may be disposed to face the 9-3$^{rd}$ pad 933. The 9-3$^{rd}$ pad 933 may be disposed on a side of the fifth partition 1714 facing the 9-1$^{st}$ pad 931. The 9-1$^{st}$ pad 931 and the 9-3$^{rd}$ pad 933 may be provided as one, but embodiments are not limited thereto, and one of the 9-1$^{st}$ pad 931 and the 9-3$^{rd}$ pad 933 may be provided as two or more. For example, a 10-3$^{rd}$ pad 743 may be disposed on at least one other side of the fourth partition 1713 to face or toward the tenth sound generating device 1600LC. For example, a 12-3$^{rd}$ pad 753 may be disposed on at least one other side of the fourth partition 1713 to face or toward the twelfth sound generating device 1600HLC. For example, a 14-3$^{rd}$ pad 763 may be disposed on at least one other side of the fourth partition 1713 to face or toward the fourteenth sound generating device 1600BLC. The 10-3$^{rd}$ pad 743, the 12-3$^{rd}$ pad 753, and the 14-3$^{rd}$ pad 763 may be provided as one, but embodiments are not limited thereto, and one or more of the 10-3$^{rd}$ pad 743, the 12-3$^{rd}$ pad 753, and the 14-3$^{rd}$ pad 763 may be provided as two or more.

For example, an 11-1$^{st}$ pad 841 may be disposed on at least one other side of the fifth partition 1714 to face or toward the eleventh sound generating device 1600RC. For example, a 13-1$^{st}$ pad 851 may be disposed on at least one other side of the fifth partition 1714 to face or toward the thirteenth sound generating device 1600HRC. For example, a 15-1$^{st}$ pad 861 may be disposed on at least one other side of the fifth partition 1714 to face or toward the fifteenth sound generating device 1600BRC. The 11-1$^{st}$ pad 841, the 13-1$^{st}$ pad 851, and the 15-1$^{st}$ pad 861 may be provided as one, but embodiments are not limited thereto, and one or more of the 11-1$^{st}$ pad 841, the 13-1$^{st}$ pad 851, and the 15-1$^{st}$ pad 861 may be provided as two or more.

For example, a pad may be disposed on at least one side of the first partition 1721 to face or toward one or more of the fourth, fifth, sixth, twelfth, and thirteenth sound generating devices 1600HL, 1600HR, 1600HC, 1600HLC, and 1600HRC. For example, a 4-6$^{th}$ pad 726 may be disposed on at least one side of the first partition 1721 to face or toward the fourth sound generating device 1600HL. A 4-5$^{th}$ pad 725 may be disposed on a side facing the 4-6$^{th}$ pad 726, and the 4-5$^{th}$ pad 725 may be disposed to face or toward the fourth sound generating device 1600HL. The 4-5$^{th}$ pad 725 and the 4-6$^{th}$ pad 726 may be provided as one, but embodiments are not limited thereto, and one or more of the 4-5$^{th}$ pad 725 and the 4-6$^{th}$ pad 726 may be provided as two or more.

For example, a 5-6$^{th}$ pad 826 may be disposed on at least one side of the first partition 1721 to face or toward the fifth sound generating device 1600HR. A 5-5$^{th}$ pad 825 may be disposed on a side facing the 5-6$^{th}$ pad 826, and the 5-5$^{th}$ pad 825 may be disposed to face or toward the fifth sound generating device 1600HR. The 5-5$^{th}$ pad 825 and the 5-6$^{th}$ pad 826 may be provided as one, but embodiments are not limited thereto, and one or more of the 5-5$^{th}$ pad 825 and the 5-6$^{th}$ pad 826 may be provided as two or more.

For example, a 6-6$^{th}$ pad 926 may be disposed on at least one side of the first partition 1721 to face or toward the sixth sound generating device 1600HC. A 6-5$^{th}$ pad 925 may be disposed on a side facing the 6-6$^{th}$ pad 926, and the 6-5$^{th}$ pad 925 may be disposed to face or toward the sixth sound generating device 1600HC. The 6-5$^{th}$ pad 925 and the 6-6$^{th}$ pad 926 may be provided as one, but embodiments are not limited thereto, and one or more of the 6-5$^{th}$ pad 925 and the 6-6$^{th}$ pad 926 may be provided as two or more.

For example, a 12-6$^{th}$ pad 756 may be disposed on at least one side of the first partition 1721 to face or toward the twelfth sound generating device 1600HLC. A 12-5$^{th}$ pad 755 may be disposed on a side facing the 12-6$^{th}$ pad 756, and the 12-5$^{th}$ pad 755 may be disposed to face or toward the twelfth sound generating device 1600HLC. The 12-5$^{th}$ pad 755 and the 12-6$^{th}$ pad 756 may be provided as one, but embodiments are not limited thereto, and one or more of the 12-5$^{th}$ pad 755 and the 12-6$^{th}$ pad 756 may be provided as two or more.

For example, a 13-6$^{th}$ pad 856 may be disposed on at least one side of the first partition 1721 to face the thirteenth sound generating device 1600HRC. A 13-5$^{th}$ pad 855 may be disposed on a side facing the 13-6$^{th}$ pad 856, and the 13-5$^{th}$ pad 855 may be disposed to face or toward the thirteenth sound generating device 1600HRC. The 13-5$^{th}$ pad 855 and the 13-6$^{th}$ pad 856 may be provided as one, but embodiments are not limited thereto, and one or more of the 13-5$^{th}$ pad 855 and the 13-6$^{th}$ pad 856 may be provided as two or more.

For example, a pad may be disposed on at least one other side of the first partition 1721 to face or toward one or more of the first, second, third, tenth, and eleventh sound generating devices 1600L, 1600R, 1600C, 1600LC, and 1600RC. For example, a 1-5$^{th}$ pad 715 may be disposed on at least one other side of the first partition 1721 to face or toward the first sound generating device 1600L. For example, a 2-5$^{th}$ pad 815 may be disposed on at least one other side of the first partition 1721 to face or toward the second sound generating device 1600R. For example, a 3-5$^{th}$ pad 915 may be disposed on at least one other side of the first partition 1721 to face or toward the third sound generating device 1600C. For example, a 10-5$^{th}$ pad 745 may be disposed on at least one other side of the first partition 1721 to face or toward the tenth sound generating device 1600LC. For example, an 11-5$^{th}$ pad 845 may be disposed on at least one other side of the first partition 1721 to face or toward the eleventh sound generating device 1600RC. The 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as one, but embodiments are not limited thereto, and one or more of the 1-5$^{th}$ pad 715, the 2-5$^{th}$ pad 815, the 3-5$^{th}$ pad 915, the 10-5$^{th}$ pad 745, and the 11-5$^{th}$ pad 845 may be provided as two or more.

For example, a pad may be disposed on at least one other side of the second partition 1722 to face or toward one or more of the first, second, third, tenth, and eleventh sound generating devices 1600L, 1600R, 1600C, 1600LC, and 1600RC. For example, a 1-6$^{th}$ pad 716 may be disposed on at least one side of the second partition 1722 to face or toward the first sound generating device 1600L. For example, a 2-6$^{th}$ pad 816 may be disposed on at least one side of the second partition 1722 to face or toward the second sound generating device 1600R. For example, a 3-6$^{th}$ pad 916 may be disposed on at least one side of the second partition 1722 to face or toward the third sound generating device 1600C. For example, a 10-6$^{th}$ pad 746 may be disposed on at least one side of the second partition 1722 to face or toward the tenth sound generating device 1600LC. For example, an 11-6$^{th}$ pad 846 may be disposed on at least one side of the second partition 1722 to face or toward the eleventh sound generating device 1600RC. The 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as one, but embodiments are not limited thereto, and one or more of the 1-6$^{th}$ pad 716, the 2-6$^{th}$ pad 816, the 3-6$^{th}$ pad 916, the 10-6$^{th}$ pad 746, and the 11-6$^{th}$ pad 846 may be provided as two or more.

The 1-5$^{th}$ pad 715 may be disposed to face the 1-6$^{th}$ pad 716. For example, the 1-6$^{th}$ pad 716 may be disposed on a side of the second partition 1722 facing the 1-5$^{th}$ pad 715. The 2-5$^{th}$ pad 815 may be disposed to face or toward the 2-6$^{th}$ pad 816. For example, the 2-6$^{th}$ pad 816 may be disposed on a side of the second partition 1722 facing the 2-5$^{th}$ pad 815. The 3-5$^{th}$ pad 915 may be disposed to face or toward the 3-6$^{th}$ pad 916. For example, the 3-6$^{th}$ pad 916 may be disposed on a side of the second partition 1722 facing the 3-5$^{th}$ pad 915. The 10-5$^{th}$ pad 745 may be disposed to face or toward the 10-6$^{th}$ pad 746. For example, the 10-6$^{th}$ pad 746 may be disposed on a side of the second partition 1722 facing the 10-5$^{th}$ pad 745. The 11-5$^{th}$ pad 845 may be disposed to face or toward the 11-6$^{th}$ pad 846. For example, the 11-6$^{th}$ pad 846 may be disposed on a side of the second partition 1722 facing the 11-5$^{th}$ pad 845.

For example, a pad may be disposed on at least one other side of the second partition 1722 to face or toward one or more of the seventh, eighth, ninth, fourteenth, and fifteenth sound generating devices 1600BL, 1600BR, 1600BC, 1600BLC, and 1600BRC. For example, a 7-5$^{th}$ pad 735 may be disposed on at least one other side of the second partition 1722 to face or toward the seventh sound generating device 1600BL. For example, an 8-5$^{th}$ pad 835 may be disposed on at least one other side of the second partition 1722 to face or toward the eighth sound generating device 1600BR. For example, a 9-5$^{th}$ pad 935 may be disposed on at least one other side of the second partition 1722 to face or toward the ninth sound generating device 1600BC. For example, a 14-5$^{th}$ pad 765 may be disposed on at least one other side of the second partition 1722 to face or toward the fourteenth sound generating device 1600BLC. For example, a 15-5$^{th}$ pad 865 may be disposed on at least one other side of the second partition 1722 to face or toward the fifteenth sound generating device 1600BRC. The 7-5$^{th}$ pad 735, the 8-5$^{th}$ pad 835, the 9-5$^{th}$ pad 935, the 14-5$^{th}$ pad 765, and the 15-5$^{th}$ pad 865 may be provided as one, but embodiments are not limited thereto, and one or more of the 7-5$^{th}$ pad 735, the 8-5$^{th}$ pad 835, the 9-5$^{th}$ pad 935, the 14-5$^{th}$ pad 765, and the 15-5$^{th}$ pad 865 may be provided as two or more.

For example, a pad may be disposed on at least one side of the third partition 1723 to face the seventh, eighth, ninth, fourteenth, and fifteenth sound generating devices 1600BL, 1600BR, 1600BC, 1600BLC, and 1600BRC. For example, a 7-6$^{th}$ pad 736 may be disposed on at least one side of the third partition 1723 to face or toward the seventh sound generating device 1600BL. For example, an 8-6$^{th}$ pad 836 may be disposed on at least one side of the third partition 1723 to face or toward the eighth sound generating device 1600BR. For example, a 9-6$^{th}$ pad 936 may be disposed on at least one side of the third partition 1723 to face or toward the ninth sound generating device 1600BC. For example, a 14-6$^{th}$ pad 766 may be disposed on at least one side of the third partition 1723 to face or toward the fourteenth sound generating device 1600BLC. For example, a 15-6$^{th}$ pad 866 may be disposed on at least one side of the third partition 1723 to face or toward the fifteenth sound generating device 1600BRC. The 7-6$^{th}$ pad 736, the 8-6$^{th}$ pad 836, the 9-6$^{th}$ pad 936, the 14-6$^{th}$ pad 766, and the 15-6$^{th}$ pad 866 may be provided as one, but embodiments are not limited thereto, and one or more of the 7-6$^{th}$ pad 736, the 8-6$^{th}$ pad 836, the 9-6$^{th}$ pad 936, the 14-6$^{th}$ pad 766, and the 15-6$^{th}$ pad 866 may be provided as two or more.

In embodiments, sizes of the 1-1$^{st}$ pad 711 and the and 1-3$^{th}$ 713 are illustrated to be greater than that of each of the 1-5$^{th}$ pad 715 and the 1-6$^{th}$ pad 716, but a size of pad does not limit descriptions of the present disclosure. For example, sizes of the 1-1$^{st}$ and 1-3$^{rd}$ pads 711 and 713 may be equal to or smaller than that of each of the 1-5$^{th}$ pad 715 and the 1-6$^{th}$ pad 716. This may be identically applied to the other pads. In FIG. 23F, a partition may not be disposed near the supporting member 300. The display panel 100 may be adhered to the periphery of the support member 300 by an adhesive member, described above with reference to FIG. 1B, and the adhesive member may be a partition.

With reference to FIG. 23G, a first partition 1721, a second partition 1722, a fourth partition 1713, a fifth partition 1714, a sixth partition 1711, a seventh partition 1712, and a partition 1750 may be provided. For example, one or more pads may be provided on a side of the partition 1750. A 4-5$^{th}$ pad 725 may be disposed on one side of the partition 1750 to face or toward the fourth sound generating device 1600HL, a 5-5$^{th}$ pad 825 may be disposed on the one side of the partition 1750 to face the fifth sound generating device 1600HR, and a 6-5$^{th}$ pad 925 may be disposed on the one side of the partition 1750 to face or toward the sixth sound generating device 1600HC. A 12-5$^{th}$ pad 755 may be disposed on the one side of the partition 1750 to face the twelfth sound generating device 1600HLC, and a 13-5$^{th}$ pad 855 may be disposed on the one side of the partition 1750 to face or toward the thirteenth sound generating device 1600HRC. A 7-6$^{th}$ pad 736 may be disposed on one other side of the partition 1750 to face the seventh sound generating device 1600BL, an 8-6$^{th}$ pad 836 may be disposed on the one other side of the partition 1750 to face or toward the eighth sound generating device 1600BR, and a 9-6$^{th}$ pad 936 may be disposed on the one other side of the partition 1750 to face or toward the ninth sound generating device 1600BC. A 14-6$^{th}$ pad 766 may be disposed on one other side of the partition 1750 to face or toward the fourteenth sound generating device 1600BLC, an 15-6$^{th}$ pad 866 may be disposed on the one other side of the partition 1750 to face or toward the fifteenth sound generating device 1600BRC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 23F, and thus, their detailed descriptions are omitted.

With reference to FIG. 23H, a first partition 1721 and a second partition 1722 may include a bent portion. The other elements are the same as or similar to FIG. 23F, and thus, their detailed descriptions are omitted. The first partition 1721 may include one or more bent portions. For example, the first partition 1721 may include a first bent portion 701 toward the first sound generating device 1600L and may include a seventh bent portion 707 toward the tenth sound generating device 1600LC. The first partition 1721 may include a second bent portion 702 toward the second sound generating device 1600R and may include an eighth bent portion 708 toward the eleventh sound generating device 1600RC. The first partition 1721 may include a third bent portion 703 toward the third sound generating device 1600C.

The second partition 1722 may include one or more bent portions. For example, the second partition 1722 may include a fourth bent portion 704 toward the first sound generating device 1600L and may include a ninth bent portion 709 toward the tenth sound generating device 1600LC. The second partition 1722 may include a fifth bent portion 705 toward the second sound generating device 1600R and may include a tenth bent portion 710 toward the eleventh sound generating device 1600RC. The second partition 1722 may include a sixth bent portion 706 toward the third sound generating device 1600C.

A third partition 1723 may include a bent portion, but is not limited thereto. The third partition 1723 may include a bent portion toward the seventh, eighth, ninth, fourteenth, and fifteenth sound generating devices 1600BL, 1600BR, 1600BC, 1600BLC, and 1600BRC.

The bent portion may have an open structure at a center portion of a sound generating device, but is not limited thereto, and may have a V-shaped closed structure. When the bent portion has the open structure at the center portion of the sound generating device, the material cost may be reduced compared to the closed structure. According to a sound characteristic experiment, in a case where the bent portion has the open structure at the center portion of the sound generating device and a case where the bent portion has the closed structure at the center portion of the sound generating device, the present inventors have confirmed that a sound characteristic difference is very small or there is no sound characteristic difference. Accordingly, since one of the first partition 1721, the second partition 1722, and the third partition 1723 includes one or more bent portions, a reduction in sound pressure caused by a standing wave of a sound generating device may be reduced.

Figure 24A:
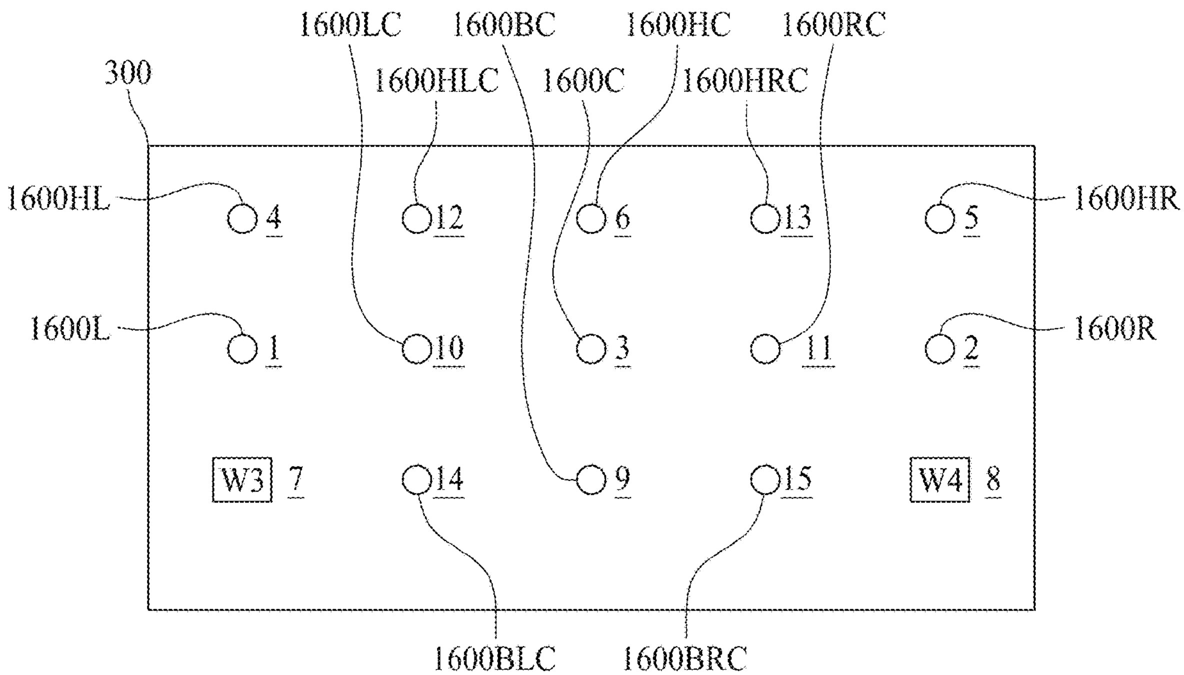
FIGS. 24A to 24I illustrate an embodiment of the sound generating device and a partition according to an embodiment of the present disclosure.
Figure 24B:
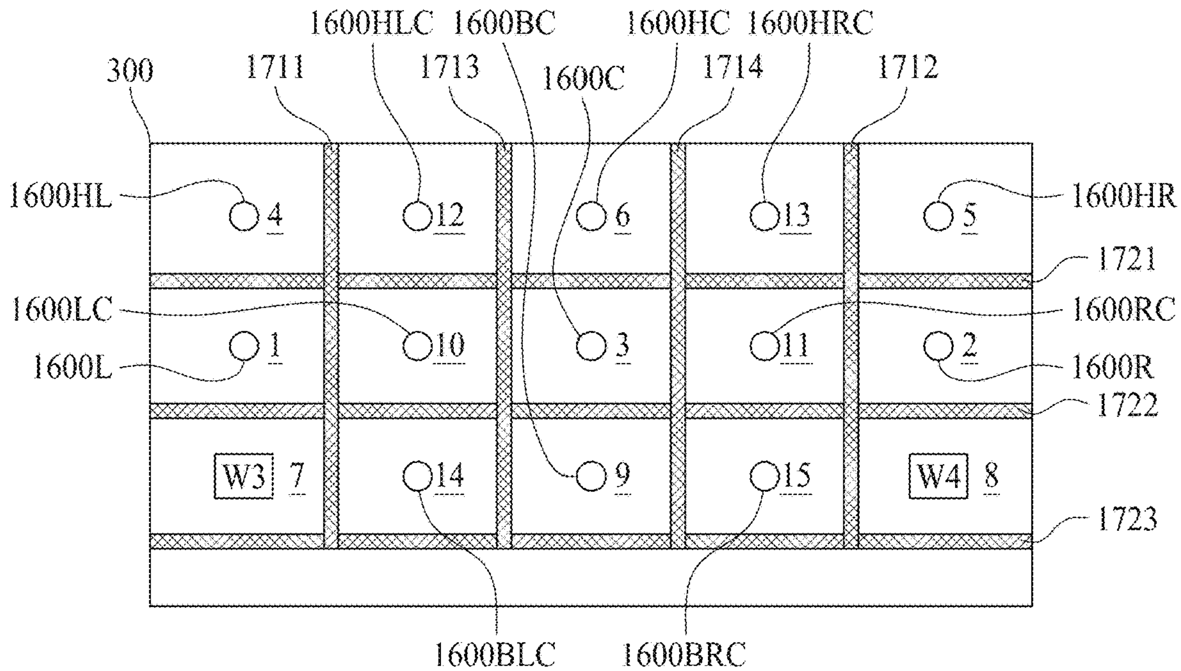
Figure 24C:
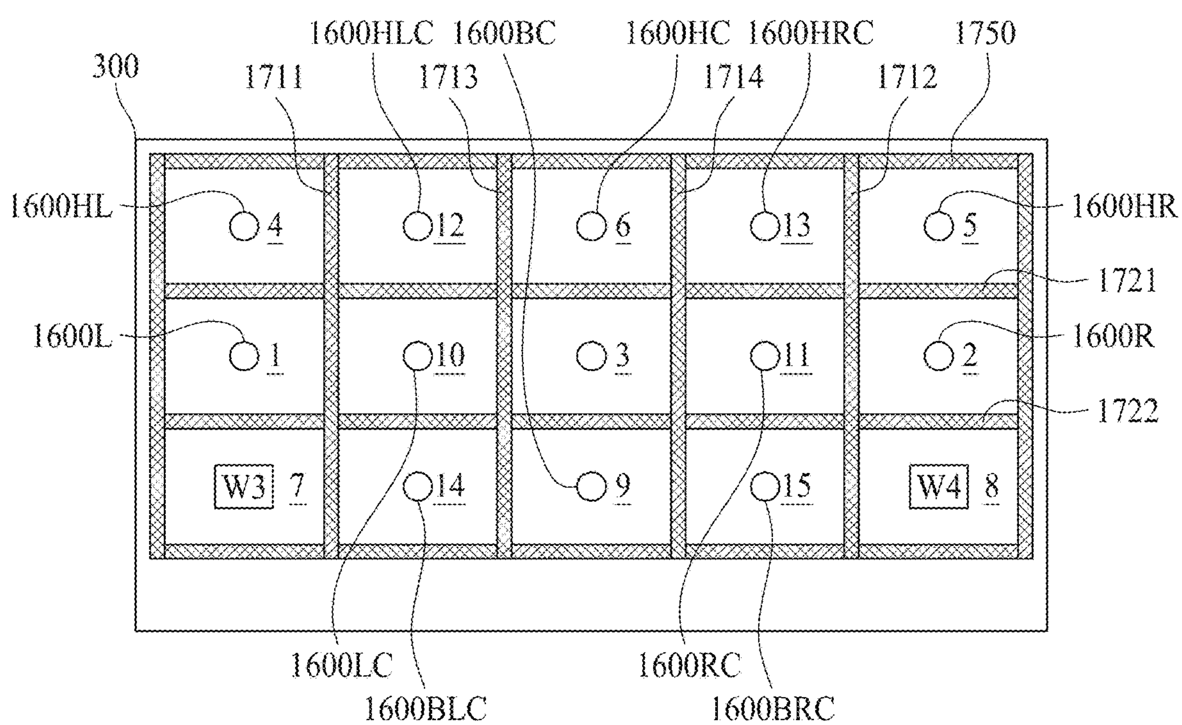
Figure 24D:
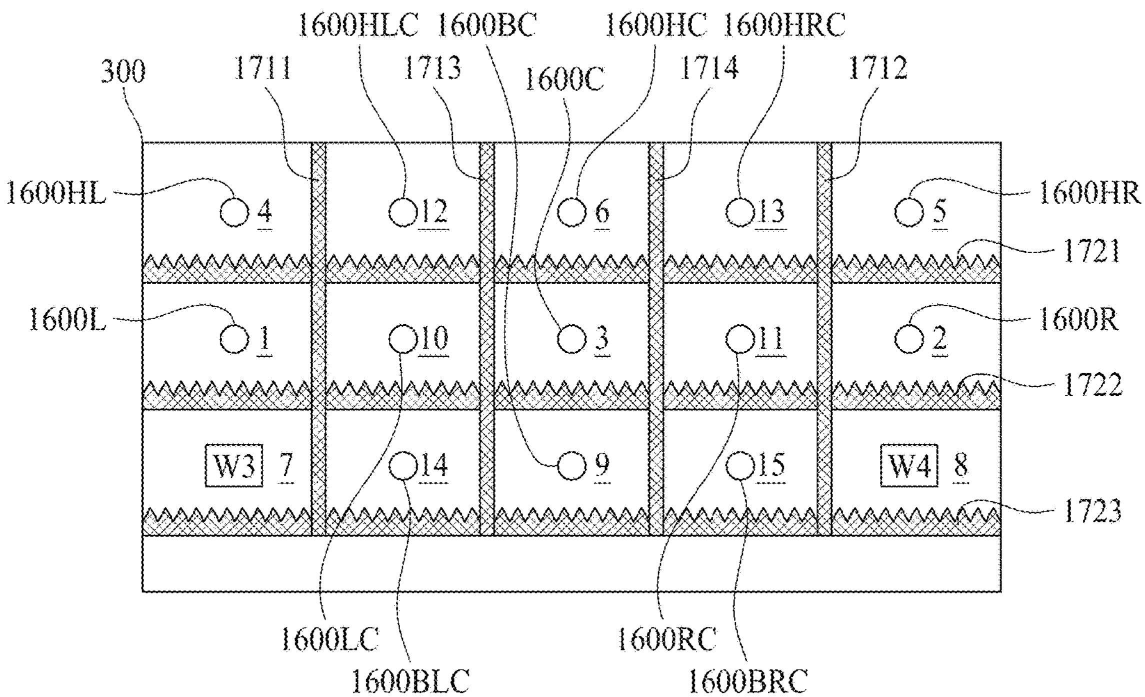
Figure 24E:
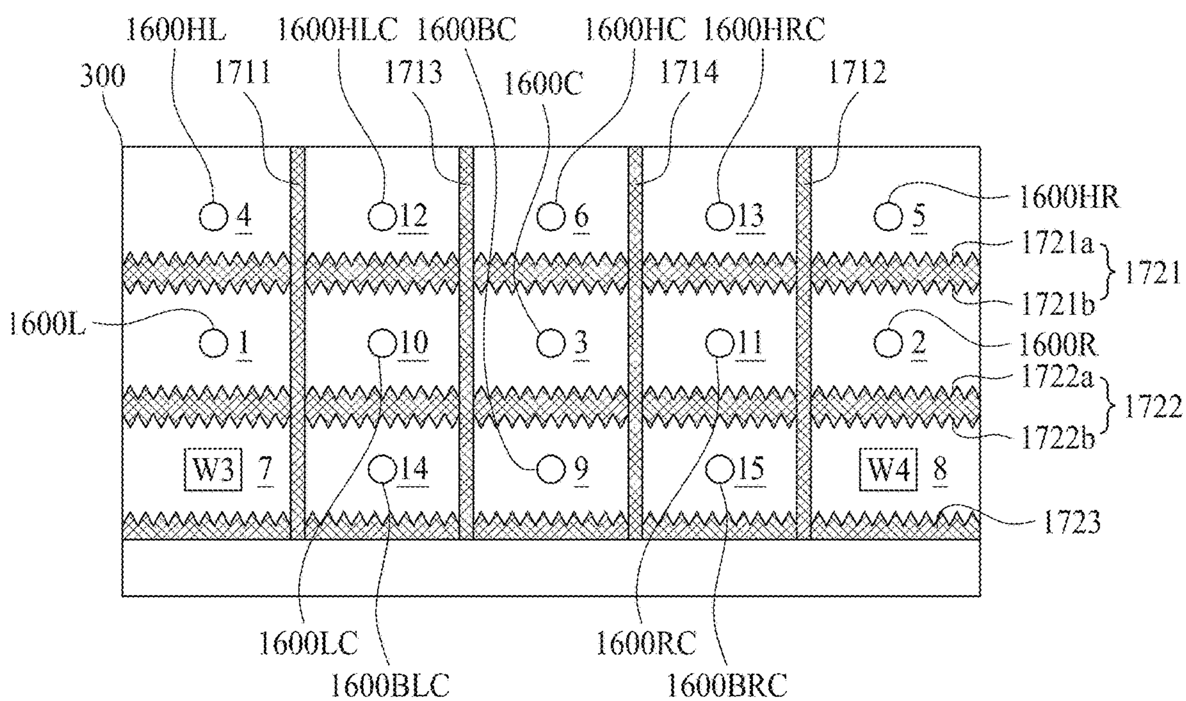
Figure 24F:
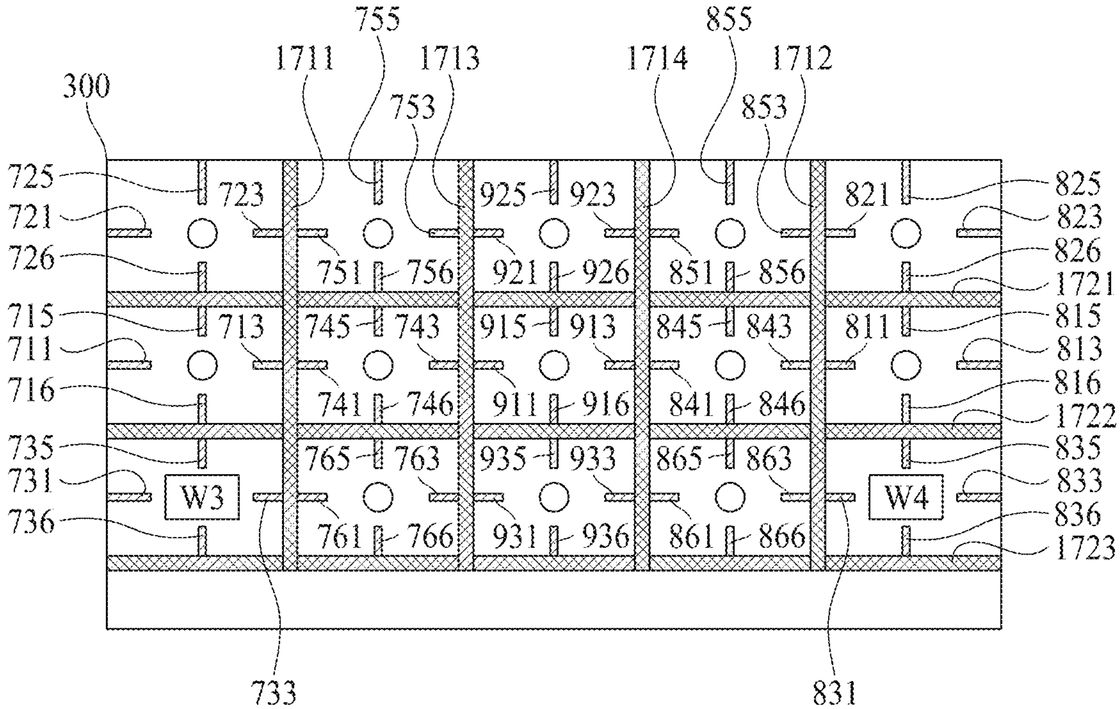
Figure 24G:
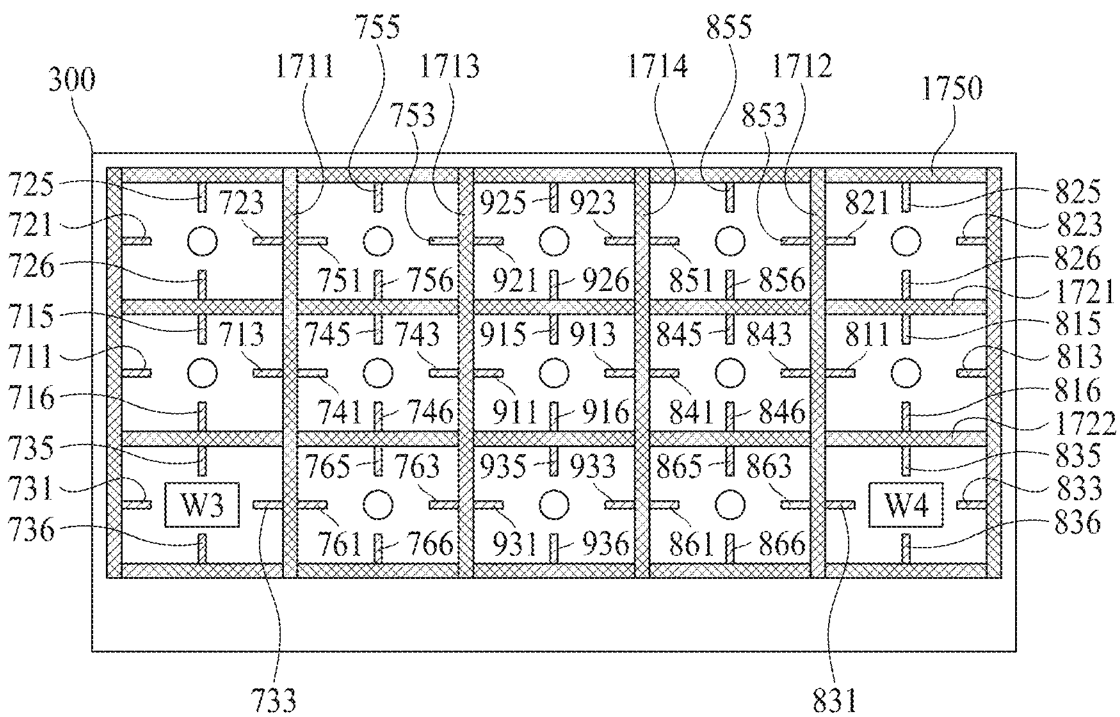
Figure 24H:
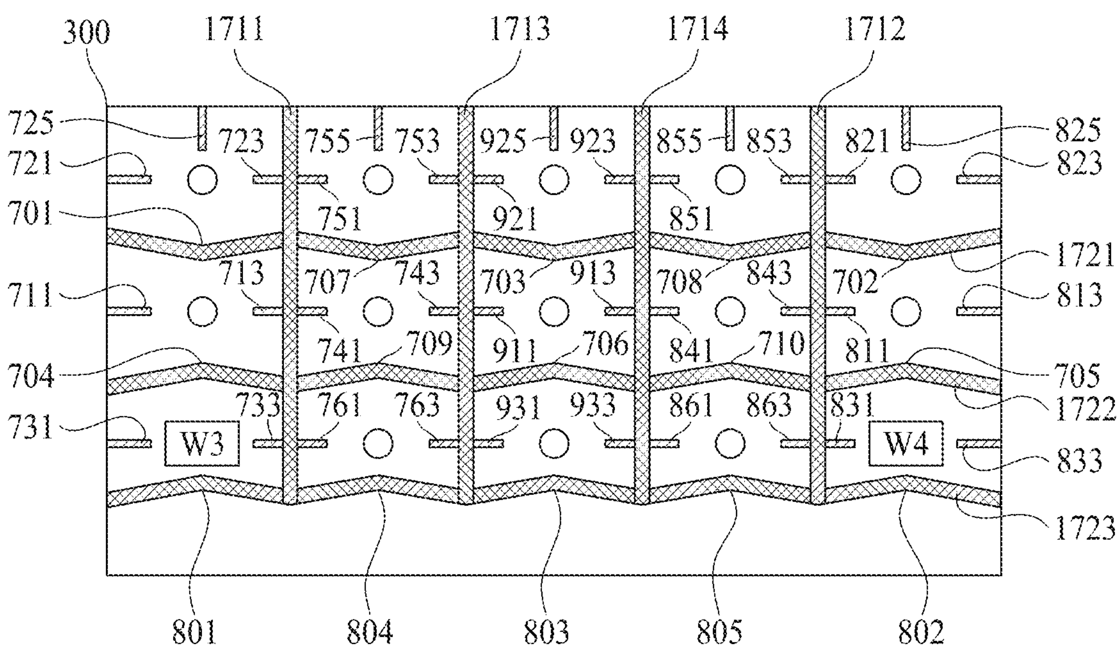
Figure 24I:
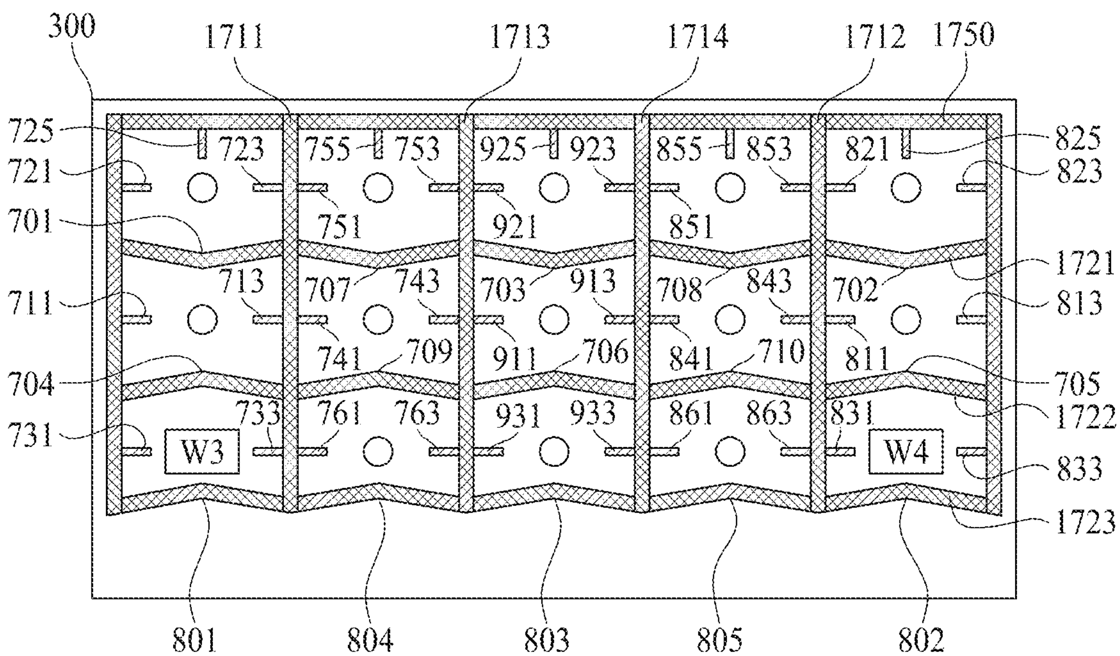

With reference to FIG. 23I, the first partition 1721 and the second partition 1722 may include one or more bent portions, and the partition 1750 may be disposed, but embodiments not limited thereto, and the first partition 1721, the second partition 1722, and the third partition 1723 includes one or more bent portions, and the partition 1750 may be disposed, for example as shown in FIG. 24I. Since the partition 1750 is provided, a fixing force of a sound generating device disposed on the rear surface of the display panel may be enhanced, and the leakage of a sound occurring in an edge or periphery of the display panel may be reduced, thereby enhancing a sound output characteristic. The other elements are the same as or similar to FIGS. 23G and 23H, and thus, their detailed descriptions are omitted.

FIGS. 24A to 24I illustrate a sound generating device and a partition according to an embodiment of the present disclosure.

With reference to FIGS. 24A to 24I, a first woofer-integrated sound generating device W3 may be disposed in a seventh region 7, and a second woofer-integrated sound generating device W4 may be disposed in an eighth region 8. Descriptions which are the same as or similar to descriptions of FIGS. 15A to 15I, 18A to 20I, and/or 23A to 23I will be briefly given or are omitted.

With reference to FIGS. 24A to 24I, the first woofer-integrated sound generating device W3 may be symmetrically disposed with one of the first sound generating device 1600L and the fourth sound generating device 1600HL. For example, the first woofer-integrated sound generating device W3 may be disposed on the same line as one of the first sound generating device 1600L and the fourth sound generating device 1600HL. The second woofer-integrated sound generating device W4 may be symmetrically disposed with one of the second sound generating device 1600R and the fifth sound generating device 1600HR. For example, the second woofer-integrated sound generating device W4 may be disposed on the same line as one of the second sound generating device 1600R and the fifth sound generating device 1600HR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 24F and 24G, the 7-5$^{th}$ pad 735 and the 7-6$^{th}$ pad 736 may be symmetrically disposed with one of the 1-5$^{th}$ pad 715, the 1-6$^{th}$ pad 716, the 4-5$^{th}$ pad 725, and the 4-6$^{th}$ pad 726. The 8-5$^{th}$ pad 835 and the 8-6$^{th}$ pad 836 may be symmetrically disposed with one of the 2-5$^{th}$ pad 815, the 2-6$^{th}$ pad 816, the 5-5$^{th}$ pad 825, and the 5-6$^{th}$ pad 826. With reference to FIGS. 24H and 24I, an eleventh bent portion 801 may be symmetrically disposed with one of the first bent portion 701 and the fourth bent portion 704, a twelfth bent portion 802 may be symmetrically disposed with one of the second bent portion 702 and the fifth bent portion 705.

As another example, the first woofer-integrated sound generating device W3 may be asymmetrically disposed with one of the first sound generating device 1600L and the fourth sound generating device 1600HL. The second woofer-integrated sound generating device W4 may be asymmetrically disposed with one of the second sound generating device 1600R and the fifth sound generating device 1600HR. For example, sound constructive interference or destructive interference caused by vibration interference between a vibration and a standing wave generated by the first woofer-integrated sound generating device W3 and a vibration and a standing wave generated by the first sound generating device 1600L or the fourth sound generating device 1600HL may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the first sound generating device 1600L and the fourth sound generating device 1600HL may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the second sound generating device 1600R or the fifth sound generating device 1600HR may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the second sound generating device 1600R and the fifth sound generating device 1600HR may prevent the undesired interference, thereby reproducing a natural sound similar to an original sound.

With reference to FIGS. 24F and 24G, the 7-5$^{th}$ pad 735 and the 7-6$^{th}$ pad 736 may be asymmetrically disposed with one of the 1-5$^{th}$ pad 715, the 1-6$^{th}$ pad 716, the 4-5$^{th}$ pad 725, and the 4-6$^{th}$ pad 726. The 8-5$^{th}$ pad 835 and the 8-6$^{th}$ pad 836 may be asymmetrically disposed with one of the 2-5$^{th}$ pad 815, the 2-6$^{th}$ pad 816, the 5-5$^{th}$ pad 825, and the 5-6$^{th}$ pad 826. With reference to FIGS. 24H and 24I, the eleventh bent portion 801 may be asymmetrically disposed with one of the first bent portion 701 and the fourth bent portion 704, the twelfth bent portion 802 may be asymmetrically disposed with one of the second bent portion 702 and the fifth bent portion 705. With reference to FIGS. 24F and 24I, the pads may be provided as one, but embodiments are not limited thereto, and at least one of the pads may be provided as two or more.

With reference to FIGS. 24A and 24I, the first woofer-integrated sound generating device W3 may be disposed to be symmetrical with one of the ninth, fourteenth, and fifteenth sound generating devices 1600BC, 1600BLC, and 1600BRC. For example, the first woofer-integrated sound generating device W3 may be disposed on the same line as one of the ninth, fourteenth, and fifteenth sound generating devices 1600BC, 1600BLC, and 1600BRC. The second woofer-integrated sound generating device W4 may be disposed to be symmetrical with one of the ninth, fourteenth, and fifteenth sound generating devices 1600BC, 1600BLC, and 1600BRC. For example, the second woofer-integrated sound generating device W4 may be disposed on the same line as one of the ninth, fourteenth, and fifteenth sound generating devices 1600BC, 1600BLC, and 1600BRC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 24F and 24G, the 7-1$^{st}$ pad 731 and the 7-3$^{rd}$ pad 733 may be symmetrically disposed with one of the 9-1$^{st}$ pad 931, the 9-3$^{rd}$ pad 933, the 14-1$^{st}$ pad 761, the 14-3$^{rd}$ pad 763, the 15-1$^{st}$ pad 861, and the 15-3$^{rd}$ pad 863. The 8-1$^{st}$ pad 831 and the 8-3$^{rd}$ pad 833 may be symmetrically disposed with one of the 9-1$^{st}$ pad 931, the 9-3$^{rd}$ pad 933, the 14-1$^{st}$ pad 761, the 14-3$^{rd}$ pad 763, the 15-1$^{st}$ pad 861, and the 15-3$^{rd}$ pad 863.

As another example, the first woofer-integrated sound generating device W3 may be asymmetrically disposed with one of the ninth, fourteenth, and fifteenth sound generating devices 1600BC, 1600BLC, and 1600BRC. The second woofer-integrated sound generating device W4 may be asymmetrically disposed with one of the ninth, fourteenth, and fifteenth sound generating devices 1600BC, 1600BLC, and 1600BRC. For example, sound constructive interference or destructive interference caused by vibration interference between a vibration and a standing wave generated by the first woofer-integrated sound generating device W3 and a vibration and a standing wave generated by the ninth sound generating device 1600BC, or the fourteenth sound generating device 1600BLC, or the fifteenth sound generating device 1600BRC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the ninth, fourteenth, and fifteenth sound generating devices 1600BC, 1600BLC, and 1600BRC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the ninth sound generating device 1600BC, or the fourteenth sound generating device 1600BLC, or the fifteenth sound generating device 1600BRC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the ninth, fourteenth, and fifteenth sound generating devices 1600BC, 1600BLC, and 1600BRC may prevent the undesired interference, thereby reproducing a natural sound similar to an original sound. With reference to FIGS. 24F and 24G, the 7-1$^{st}$ pad 731 and the 7-3$^{rd}$ pad 733 may be asymmetrically disposed with one of the 9-1$^{st}$ pad 931, the 9-3$^{rd}$ pad 933, the 14-1$^{st}$ pad 761, the 14-3$^{rd}$ pad 763, the 15-1$^{st}$ pad 861, and the 15-3$^{rd}$ pad 863. The 8-1$^{st}$ pad 831 and the 8-3$^{rd}$ pad 833 may be asymmetrically disposed with one of the 9-1$^{st}$ pad 931, the 9-3$^{rd}$ pad 933, the 14-1$^{st}$ pad 761, the 14-3$^{rd}$ pad 763, the 15-1$^{st}$ pad 861, and the 15-3$^{rd}$ pad 863.

The first, second, third, fourth, fifth, sixth, ninth, tenth, eleventh, twelfth, thirteenth, fourteenth, fifteenth, first woofer-integrated, and second woofer-integrated sound generating devices 1600L, 1600R, 1600C, 1600HL, 1600HR, 1600HC, 1600BC, 1600LC, 1600RC, 1600HLC, 1600HRC, 1600BLC, 1600BRC, W3, and W4 may output sounds of about 60 Hz to about 40 kHz or about 80 Hz to about 40 kHz. Accordingly, the display apparatus may output a 15.1-channel sound.

With reference to FIG. 24F, a pad may be disposed on at least one side of the first, second, third, fourth, fifth, sixth, and seventh partitions 1721, 1722, 1723, 1713, 1714, 1711, and 1712 to face or toward a sound generating device. For example, the 7-3$^{rd}$ pad 733 may be disposed on at least one side of the sixth partition 1711 to face or toward the first woofer-integrated sound generating device W3. The 7-1$^{st}$ pad 731 may be disposed on a side facing the 7-3$^{rd}$ pad 733. For example, the 7-5$^{th}$ pad 735 may be disposed on at least one side of the second partition 1722 to face or toward the first woofer-integrated sound generating device W3. For example, the 7-6$^{th}$ pad 736 may be disposed on at least one side of the third partition 1723 to face or toward the first woofer-integrated sound generating device W3. The 7-5$^{th}$ pad 735 may be disposed to face or toward the 7-6$^{th}$ pad 736. For example, the 7-6$^{th}$ pad 736 may be disposed on a side of the third partition 1723 facing the 7-5$^{th}$ pad 735.

For example, the 8-1$^{st}$ pad 831 may be disposed on at least one side of the seventh partition 1712 to face or toward the second woofer-integrated sound generating device W4. The 8-3$^{rd}$ pad 833 may be disposed on a side facing the 8-1$^{st}$ pad 831, and the 8-3rd pad 833 may be disposed to face the second woofer-integrated sound generating device W4. For example, the 8-5th pad 835 may be disposed on at least one side of the second partition 1722 to face or toward the second woofer-integrated sound generating device W4. For example, the 8-6th pad 836 may be disposed on at least one side of the third partition 1723 to face or toward the second woofer-integrated sound generating device W4. The 8-5th pad 835 may be disposed to face or toward the 8-6th pad 836. For example, the 8-6th pad 836 may be disposed on a side of the third partition 1723 facing the 8-5th pad 835.

With reference to FIG. 24G, a pad may be disposed on at least one side of the first partition 1721, the second partition 1722, the fourth partition 1713, the fifth partition 1714, the sixth partition 1711, the seventh partition 1712, and the partition 1750 to face or toward a sound generating device. One or more pads may be provided on a side of the partition 1750. A 4-5th pad 725 may be disposed on one side of the partition 1750 to face or toward the fourth sound generating device 1600HL, a 5-5th pad 825 may be disposed on the one side of the partition 1750 to face the fifth sound generating device 1600HR, and a 6-5th pad 925 may be disposed on the one side of the partition 1750 to face the sixth sound generating device 1600HC. A 12-5th pad 755 may be disposed on the one side of the partition 1750 to face or toward the twelfth sound generating device 1600HLC, and a 13-5th pad 855 may be disposed on the one side of the partition 1750 to face or toward the thirteenth sound generating device 1600HRC. A 7-6th pad 736 may be disposed on one other side of the partition 1750 to face or toward the seventh sound generating device 1600BL, an 8-6th pad 836 may be disposed on the one other side of the partition 1750 to face or toward the eighth sound generating device 1600BR, and a 9-6th pad 936 may be disposed on the one other side of the partition 1750 to face or toward the ninth sound generating device 1600BC. A 14-6th pad 766 may be disposed on one other side of the partition 1750 to face or toward the fourteenth sound generating device 1600BLC, an 15-6th pad 866 may be disposed on the one other side of the partition 1750 to face or toward the fifteenth sound generating device 1600BRC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 24F, and thus, their detailed descriptions are omitted.

With reference to FIGS. 24H and 24I, one of a first partition 1721, a second partition 1722, and a third partition 1723 may include one or more bent portions. The first partition 1721 may include one or more bent portions. For example, the first partition 1721 may include a first bent portion 701 toward the first sound generating device 1600L and may include a seventh bent portion 707 toward the tenth sound generating device 1600LC. The first partition 1721 may include a second bent portion 702 toward the second sound generating device 1600R and may include an eighth bent portion 708 toward the eleventh sound generating device 1600RC. The first partition 1721 may include a third bent portion 703 toward the third sound generating device 1600C.

The second partition 1722 may include one or more bent portions. For example, the second partition 1722 may include a fourth bent portion 704 toward the first sound generating device 1600L and may include a ninth bent portion 709 toward the tenth sound generating device 1600LC. The second partition 1722 may include a fifth bent portion 705 toward the second sound generating device 1600R and may include a tenth bent portion 710 toward the eleventh sound generating device 1600RC. The second partition 1722 may include a sixth bent portion 706 toward the third sound generating device 1600C.

The third partition 1723 may include one or more bent portions. For example, the third partition 1723 may include an eleventh bent portion 801 toward the first woofer-integrated sound generating device W3, and may include a twelfth bent portion 802 toward the second woofer-integrated sound generating device W4.

The third partition 1723 may include a fourteenth bent portion 804 toward the fourteenth sound generating device 1600BLC, and a fifteenth bent portion 805 toward the fifteenth sound generating device 1600BRC. The third partition 1723 may include a thirteenth bent portion 803 toward the ninth sound generating device 1600BC. The third partition 1723 may be configured in a non-bent shape, but embodiments are not limited thereto. For example, as illustrates in FIG. 23H, the third partition 1723 may be configured in a non-bent shape, but embodiments are not limited thereto.

With reference to FIG. 24I, one of a first partition 1721, a second partition 1722, and a third partition 1723 may include one or more bent portions, and the partition 1750 may be disposed. The third partition 1723 may be configured in a non-bent shape, but embodiments are not limited thereto. For example, as shown in FIG. 23I, the third partition 1723 may be configured in a non-bent shape, but embodiments are not limited thereto. The partition 1750 may be disposed at an edge or periphery of the supporting member 300. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIGS. 24G and 20H, and thus, their detailed descriptions are omitted.

FIGS. 25A to 25I illustrate a sound generating device and a partition according to an embodiment of the present disclosure.

With reference to FIGS. 25A to 25I, a first woofer-integrated sound generating device W3 may be disposed in a fourteenth region 14, and a second woofer-integrated sound generating device W4 may be disposed in a fifteenth region 15. Descriptions which are the same as or similar to descriptions of FIGS. 15A to 15I, 18A to 20I, and/or 23A to 24I will be briefly given or are omitted.

Figure 25A:
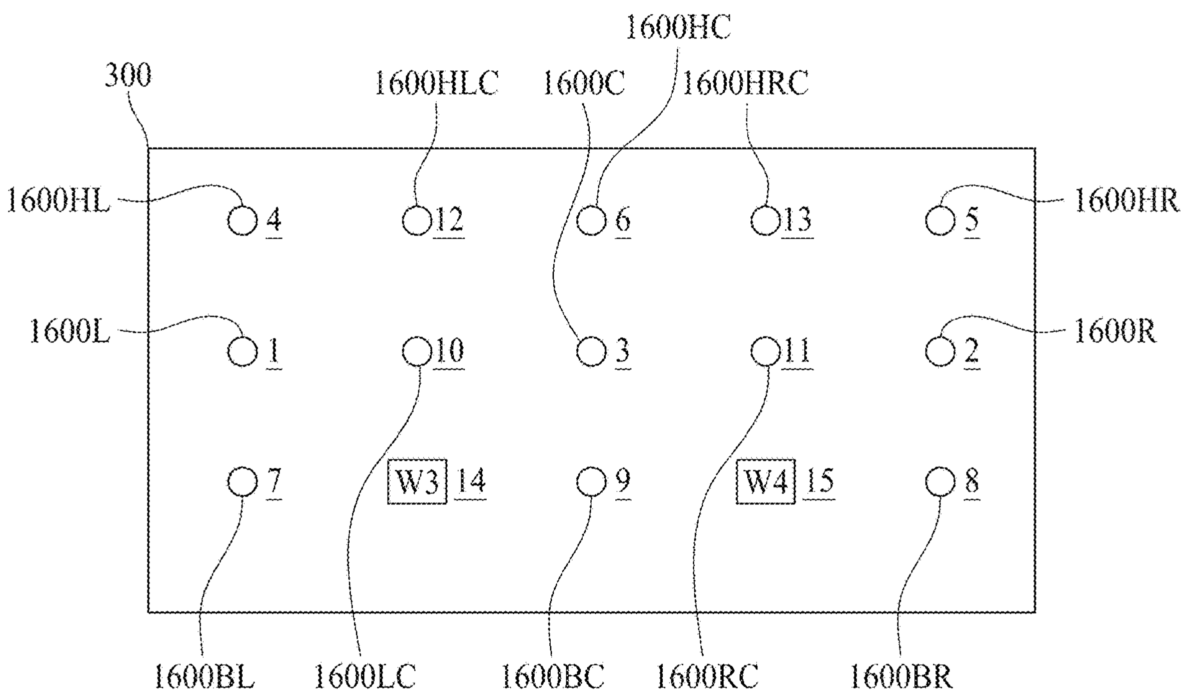
FIGS. 25A to 25I illustrate an embodiment of the sound generating device and a partition according to an embodiment of the present disclosure.
Figure 25B:
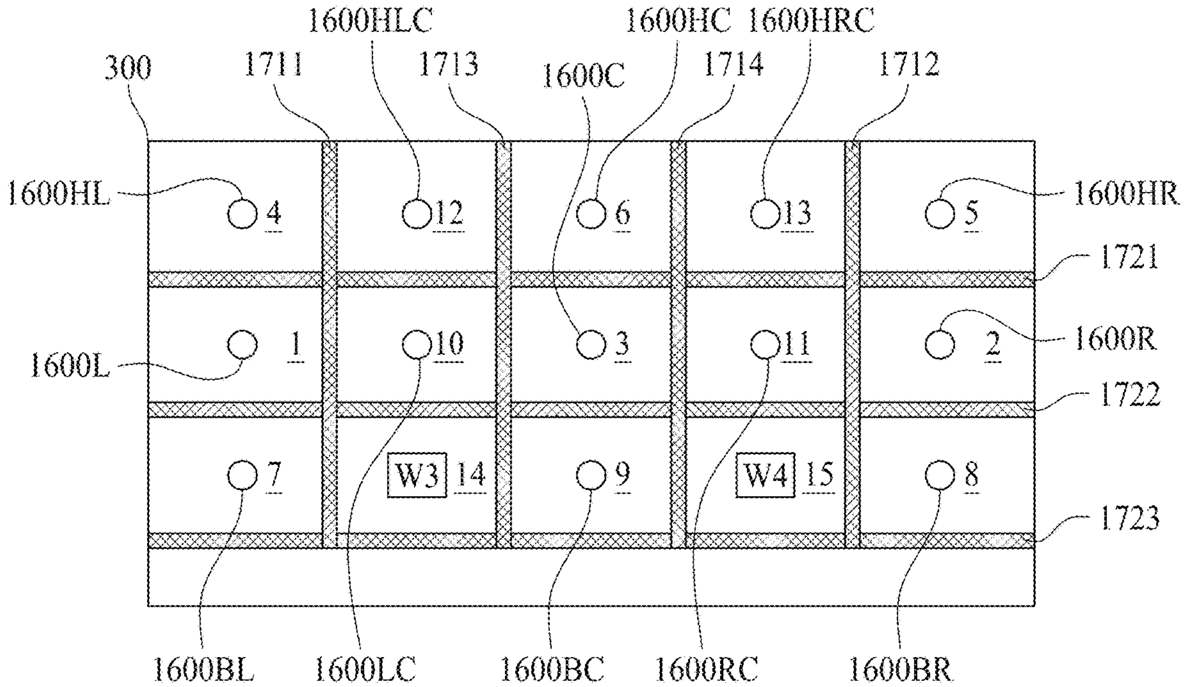
Figure 25C:
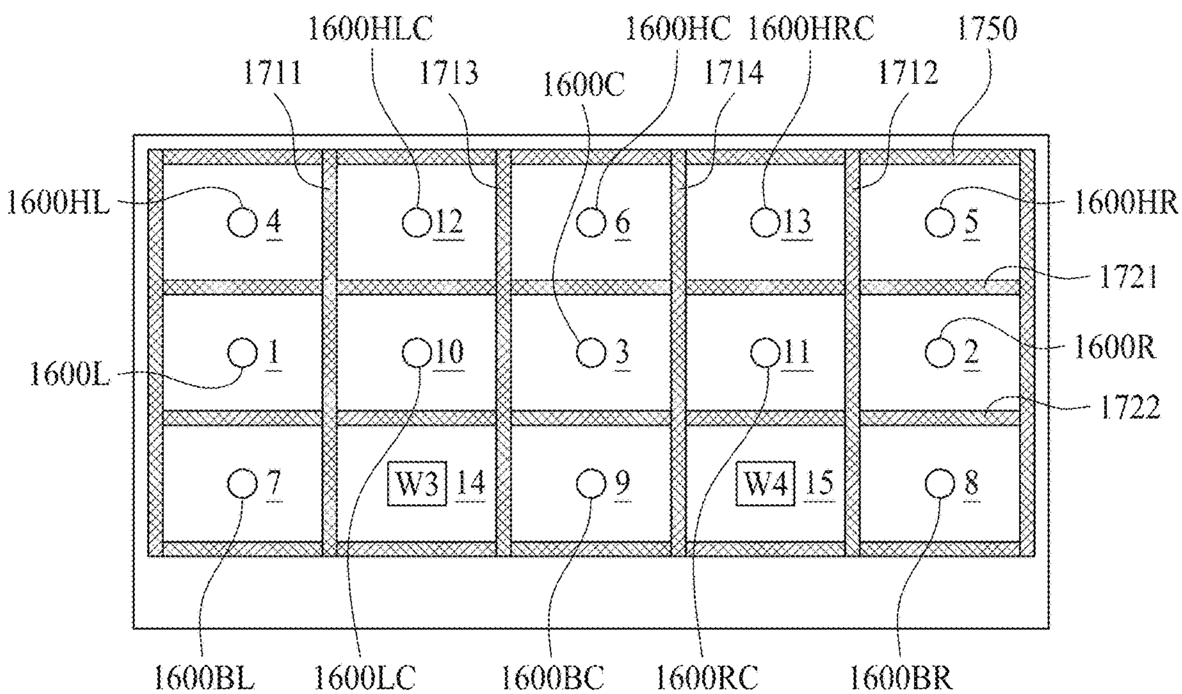
Figure 25D:
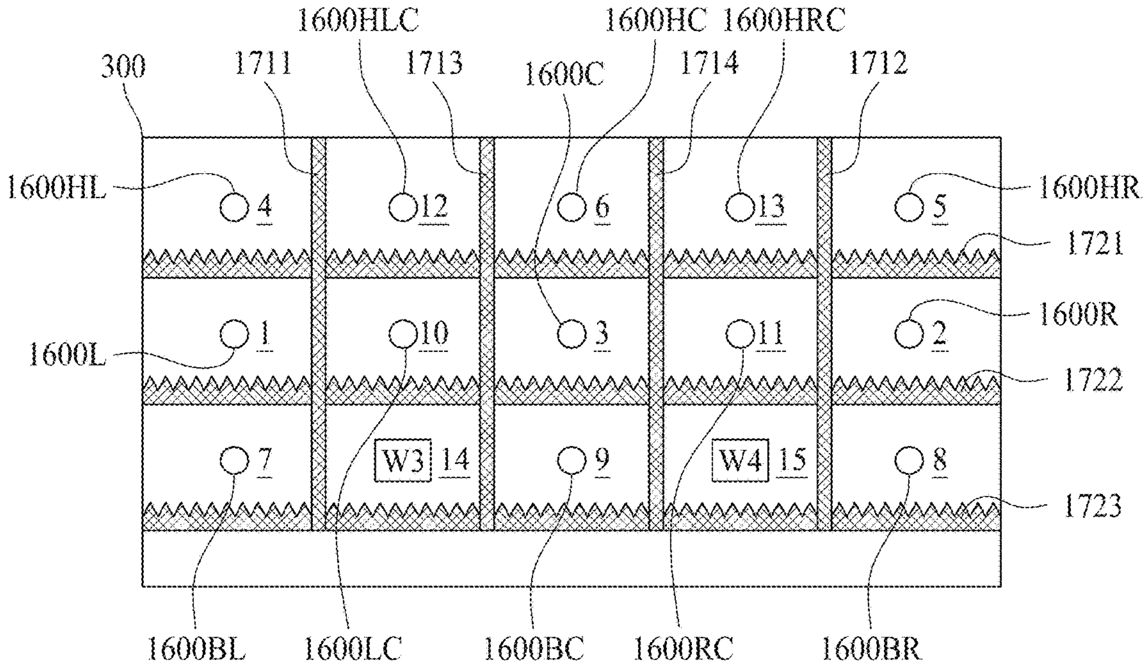
Figure 25E:
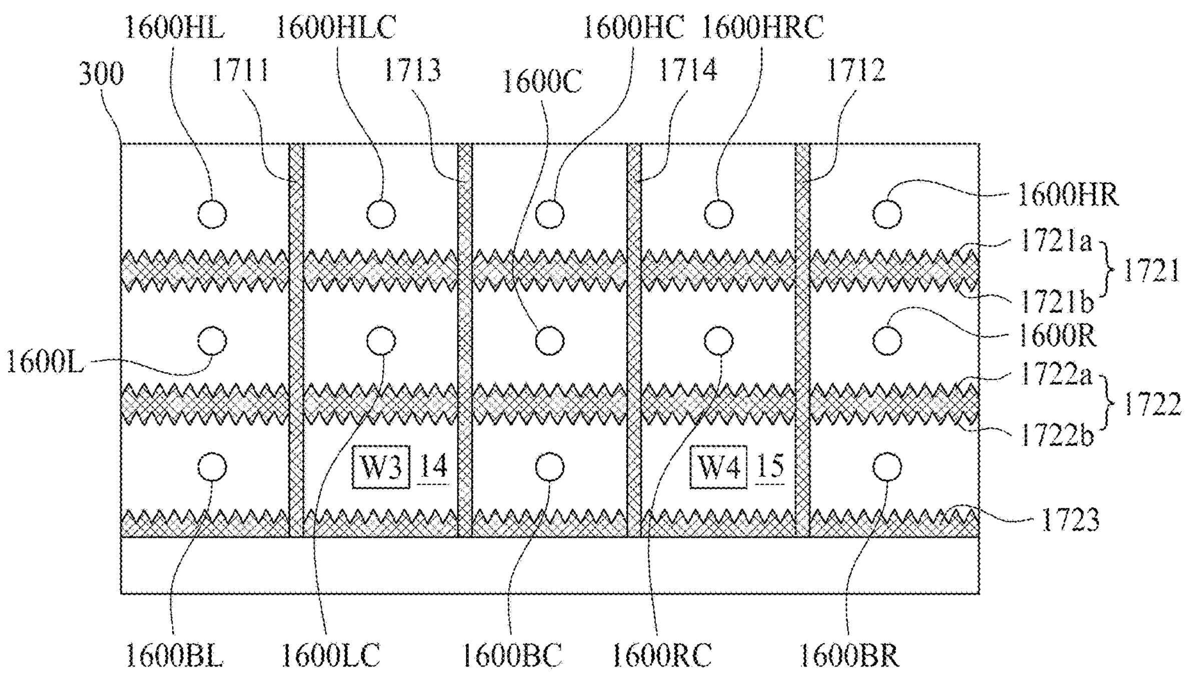
Figure 25F:
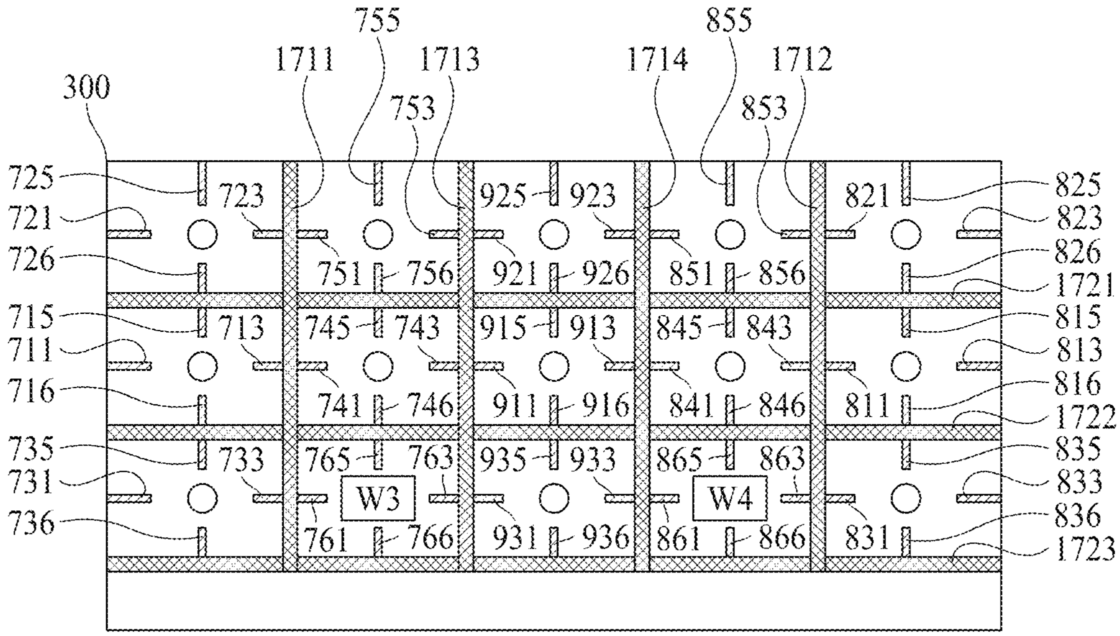
Figure 25G:
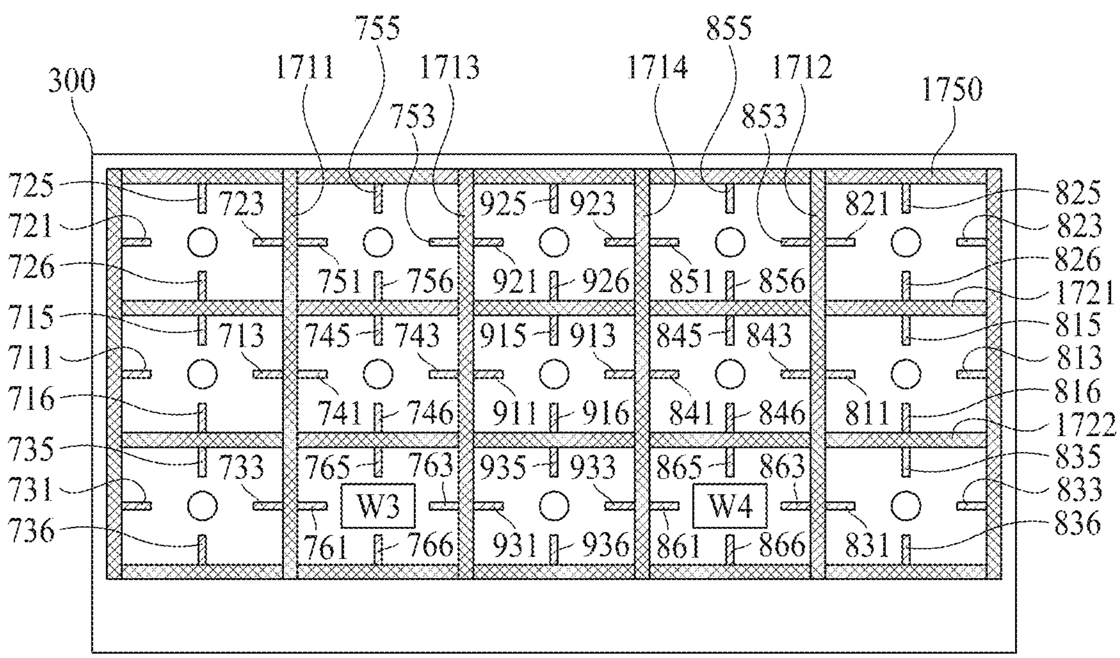
Figure 25H:
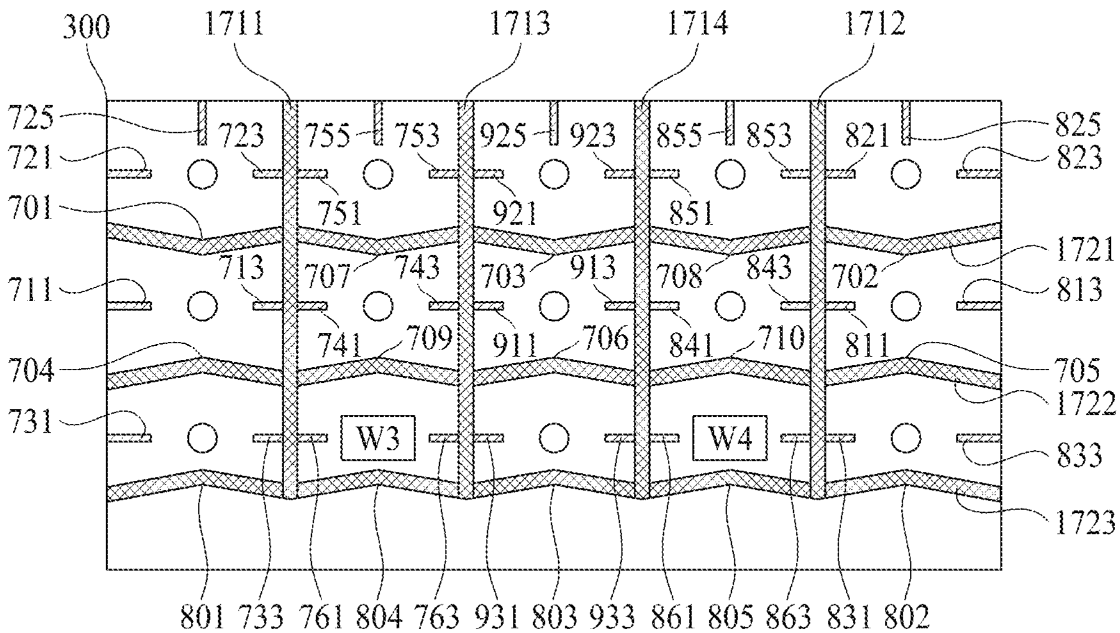
Figure 25I:
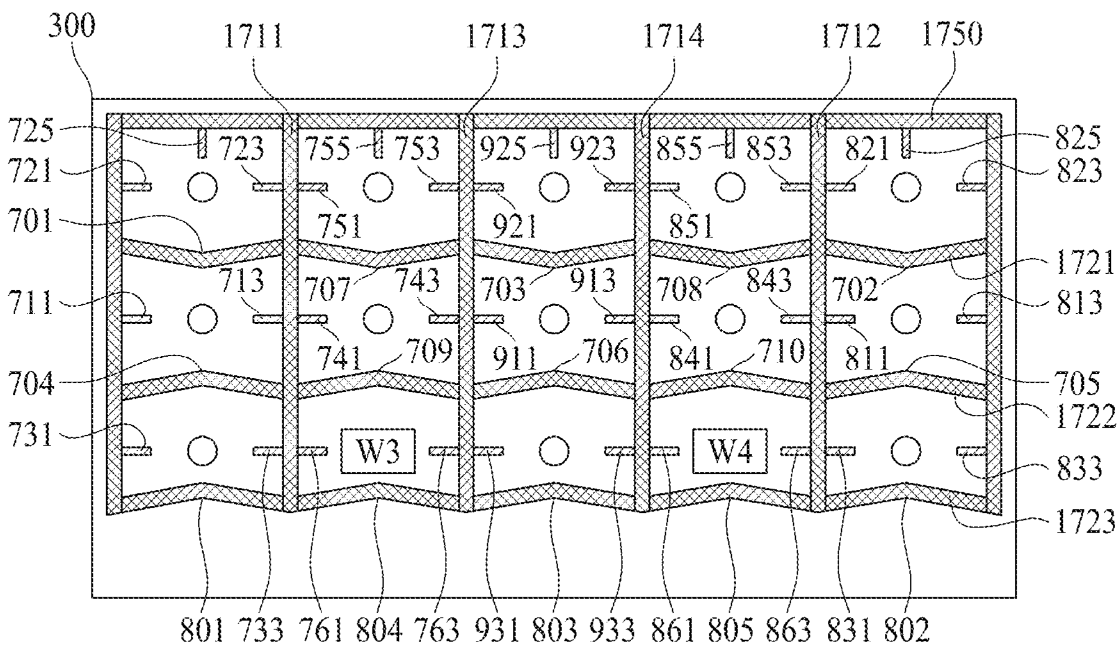

With reference to FIGS. 25A to 25I, the first woofer-integrated sound generating device W3 may be symmetrically disposed with one of the tenth sound generating device 1600LC, and the twelfth sound generating device 1600HLC. The first woofer-integrated sound generating device W3 may be disposed on the same line as one of the tenth sound generating device 1600LC, and the twelfth sound generating device 1600HLC. The second woofer-integrated sound generating device W4 may be symmetrically disposed with one of the eleventh sound generating device 1600RC and the thirteenth sound generating device 1600HRC. The second woofer-integrated sound generating device W4 may be disposed on the same line as one of the eleventh sound generating device 1600RC and the thirteenth sound generating device 1600HRC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 25F and 25G, the 14-5$^{th}$ pad 765 and the 14-6$^{th}$ pad 766 may be symmetrically disposed with one of the 10-5$^{th}$ pad 745, the 10-6$^{th}$ pad 746, the 12-5$^{th}$ pad 755, and the 12-6$^{th}$ pad 756. The 15-5$^{th}$ pad 865 and the 15-6$^{th}$ pad 866 may be symmetrically disposed with one of the 11-5$^{th}$ pad 845, the 11-6$^{th}$ pad 846, the 13-5$^{th}$ pad 855, and the 13-6$^{th}$ pad 856. With reference to FIGS. 25H and 25I, the fourteenth bent portion 804 may be symmetrically disposed with one of the seventh bent portion 707 and the ninth bent portion 709. The fifteenth bent portion 805 may be symmetrically disposed with one of the eighth bent portion 708 and the tenth bent portion 710.

As another example, the first woofer-integrated sound generating device W3 may be asymmetrically disposed with one of the tenth sound generating device 1600LC, and the twelfth sound generating device 1600HLC. The second woofer-integrated sound generating device W4 may be asymmetrically disposed with one of the eleventh sound generating device 1600RC and the thirteenth sound generating device 1600HRC. For example, sound constructive interference or destructive interference caused by vibration interference between a vibration and a standing wave generated by the first woofer-integrated sound generating device W3 and a vibration and a standing wave generated by the tenth sound generating device 1600LC or the twelfth sound generating device 1600HLC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the tenth sound generating device 1600LC and the twelfth sound generating device 1600HLC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the eleventh sound generating device 1600RC or the thirteenth sound generating device 1600HRC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the eleventh sound generating device 1600RC and the thirteenth sound generating device 1600HRC may prevent the undesired interference, thereby reproducing a natural sound similar to an original sound.

With reference to FIGS. 25F and 25G, the 14-5$^{th}$ pad 765 and the 14-6$^{th}$ pad 766 may be asymmetrically disposed with one of the 10-5$^{th}$ pad 745, the 10-6$^{th}$ pad 746, the 12-5$^{th}$ pad 755, and the 12-6$^{th}$ pad 756. The 15-5$^{th}$ pad 865 and the 15-6$^{th}$ pad 866 may be asymmetrically disposed with one of the 11-5$^{th}$ pad 845, the 11-6$^{th}$ pad 846, the 13-5$^{th}$ pad 855, and the 13-6$^{th}$ pad 856. With reference to FIGS. 25H and 25I, the fourteenth bent portion 804 may be asymmetrically disposed with one of the seventh bent portion 707 and the ninth bent portion 709. The fifteenth bent portion 805 may be asymmetrically disposed with one of the eighth bent portion 708 and the tenth bent portion 710. With reference to FIGS. 25F to 25I, each of the pads may be provided as one, but are not limited thereto, and at least one of the pads may be provided as two or more.

With reference to FIGS. 25A to 25I, the first woofer-integrated sound generating device W3 may be symmetrically disposed with one of the seventh sound generating device 1600BL, the eighth sound generating device 1600BR, and the ninth sound generating device 1600BC. The first woofer-integrated sound generating device W3 may be disposed on the same line as one of the seventh sound generating device 1600BL, the eighth sound generating device 1600BR, and the ninth sound generating device 1600BC. The second woofer-integrated sound generating device W4 may be symmetrically disposed with one of the seventh sound generating device 1600BL, the eighth sound generating device 1600BR, and the ninth sound generating device 1600BC. The second woofer-integrated sound generating device W4 may be disposed on the same line as one of the seventh sound generating device 1600BL, the eighth sound generating device 1600BR, and the ninth sound generating device 1600BC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 25F and 25G, the 14-1$^{st}$ pad 761 and the 14-3$^{rd}$ pad 763 may be symmetrically disposed with one of the 7-1$^{st}$ pad 731, the 7-3$^{rd}$ pad 733, the 8-1$^{st}$ pad 831, the 8-3$^{rd}$ pad 833, the 9-1$^{st}$ pad 931, and the 9-3$^{rd}$ pad 933. The 15-1$^{st}$ pad 861 and the 15-3$^{rd}$ pad 863 may be symmetrically disposed with one of the 7-1$^{st}$ pad 731, the 7-3$^{rd}$ pad 733, the 8-1$^{st}$ pad 831, the 8-3$^{rd}$ pad 833, the 9-1$^{st}$ pad 931, and the 9-3$^{rd}$ pad 933.

As another example, the first woofer-integrated sound generating device W3 may be asymmetrically disposed with one of the seventh sound generating device 1600BL, the eighth sound generating device 1600BR, and the ninth sound generating device 1600BC. The second woofer-integrated sound generating device W4 may be asymmetrically disposed with one of the seventh sound generating device 1600BL, the eighth sound generating device 1600BR, and the ninth sound generating device 1600BC. For example, sound constructive interference or destructive interference caused by vibration interference between a vibration and a standing wave generated by the first woofer-integrated sound generating device W3 and a vibration and a standing wave generated by the seventh sound generating device 1600BL, or the eighth sound generating device 1600BR, or and the ninth sound generating device 1600BC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the seventh sound generating device 1600BL, the eighth sound generating device 1600BR, and the ninth sound generating device 1600BC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the seventh sound generating device 1600BL, or the eighth sound generating device 1600BR, or and the ninth sound generating device 1600BC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the seventh sound generating device 1600BL, the eighth sound generating device 1600BR, and the ninth sound generating device 1600BC may prevent the undesired interference, thereby reproducing a natural sound similar to an original sound. With reference to FIGS. 25F and 25G, the 14-1$^{st}$ pad 761 and the 14-3$^{rd}$ pad 763 may be asymmetrically disposed with one of the 7-1$^{st}$ pad 731, the 7-3$^{rd}$ pad 733, the 8-1$^{st}$ pad 831, the 8-3$^{rd}$ pad 833, the 9-1$^{st}$ pad 931, and the 9-3$^{rd}$ pad 933. The 15-1$^{st}$ pad 861 and the 15-3$^{rd}$ pad 863 may be asymmetrically disposed with one of the 7-1$^{st}$ pad 731, the 7-3$^{rd}$ pad 733, the 8-1$^{st}$ pad 831, the 8-3$^{rd}$ pad 833, the 9-1$^{st}$ pad 931, and the 9-3$^{rd}$ pad 933.

The first, second, third, fourth, fifth, sixth, seventh, eighth, ninth, tenth, eleventh, twelfth, and thirteenth sound generating devices 1600L, 1600R, 1600C, 1600HL, 1600HR, 1600HC, 1600BL, 1600BR, 1600BC, 1600LC, 1600RC, 1600HLC, and 1600HRC may output sounds of about 80 Hz to about 40 kHz. The first woofer-integrated sound generating device W3 and the second woofer-integrated sound generating device W4 may output sounds of about 60 Hz to about 40 kHz. Accordingly, the display apparatus may output a 15.1-channel sound.

With reference to FIG. 25F, a pad may be disposed on at least one side of the first, second, third, fourth, fifth, sixth, and seventh partitions 1721, 1722, 1723, 1713, 1714, 1711, and 1712 to face or toward a sound generating device. For example, the 14-1$^{st}$ pad 761 may be disposed on at least one side of the sixth partition 1711 to face or toward the first woofer-integrated sound generating device W3. For example, the 14-3$^{rd}$ pad 763 may be disposed on at least one side of the fourth partition 1713 to face or toward the first woofer-integrated sound generating device W3. The 14-1$^{st}$ pad 761 may be disposed on a side facing the 14-3$^{rd}$ pad 763. For example, the 14-3$^{rd}$ pad 763 may be disposed on a side of the fourth partition 1713 facing the 14-1$^{st}$ pad 761.

For example, the 14-5$^{th}$ pad 765 may be disposed on at least one side of the second partition 1722 to face or toward the first woofer-integrated sound generating device W3. For example, the 14-6$^{th}$ pad 766 may be disposed on at least one side of the third partition 1723 to face or toward the first woofer-integrated sound generating device W3. The 14-5$^{th}$ pad 765 may be disposed on a side facing the 14-6$^{th}$ pad 766. For example, the 14-6$^{th}$ pad 766 may be disposed on a side of the third partition 1723 facing the 14-5$^{th}$ pad 765.

For example, the 15-1$^{st}$ pad 861 may be disposed on at least one side of the fifth partition 1714 to face or toward the second woofer-integrated sound generating device W4. The 15-3$^{rd}$ pad 863 may be disposed on a side facing the 15-1$^{st}$ pad 861, and the 15-3$^{rd}$ pad 863 may be disposed to face or toward the second woofer-integrated sound generating device W4. For example, the 15-5$^{th}$ pad 865 may be disposed on at least one side of the second partition 1722 to face or toward the second woofer-integrated sound generating device W4. For example, the 15-6$^{th}$ pad 866 may be disposed on at least one side of the third partition 1723 to face or toward the second woofer-integrated sound generating device W4. The 15-5$^{th}$ pad 865 may be disposed on a side facing the 15-6$^{th}$ pad 866. For example, the 15-6$^{th}$ pad 866 may be disposed on a side of the third partition 1723 facing the 15-5$^{th}$ pad 865.

With reference to FIG. 25G, a first partition 1721, a second partition 1722, a fourth partition 1713, a fifth partition 1714, a sixth partition 1711, a seventh partition 1712, and a partition 1750 may be provided. For example, one or more pads may be provided on a side of the partition 1750. A 4-5$^{th}$ pad 725 may be disposed on one side of the partition 1750 to face or toward the fourth sound generating device 1600HL, a 5-5$^{th}$ pad 825 may be disposed on the one side of the partition 1750 to face or toward the fifth sound generating device 1600HR, and a 6-5$^{th}$ pad 925 may be disposed on the one side of the partition 1750 to face or toward the sixth sound generating device 1600HC. A 12-5$^{th}$ pad 755 may be disposed on the one side of the partition 1750 to face or toward the twelfth sound generating device 1600HLC, and a 13-5$^{th}$ pad 855 may be disposed on the one side of the partition 1750 to face or toward the thirteenth sound generating device 1600HRC. A 7-6$^{th}$ pad 736 may be disposed on one other side of the partition 1750 to face or toward the seventh sound generating device 1600BL, an 8-6$^{th}$ pad 836 may be disposed on the one other side of the partition 1750 to face or toward the eighth sound generating device 1600BR, and a 9-6$^{th}$ pad 936 may be disposed on the one other side of the partition 1750 to face or toward the ninth sound generating device 1600BC. A 14-6$^{th}$ pad 766 may be disposed on one other side of the partition 1750 to face or toward the first woofer-integrated sound generating device W3, an 15-6$^{th}$ pad 866 may be disposed on the one other side of the partition 1750 to face or toward the second woofer-integrated sound generating device W4. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 25F, and thus, their detailed descriptions are omitted.

With reference to FIG. 25H, one of the first partition 1721, the second partition 1722, and the third partition 1723 may include one or more bent portions. The first partition 1721 may include one or more bent portions. For example, the first partition 1721 may include a first bent portion 701 toward the first sound generating device 1600L and may include a seventh bent portion 707 toward the tenth sound generating device 1600LC. The first partition 1721 may include a second bent portion 702 toward the second sound generating device 1600R and may include an eighth bent portion 708 toward the eleventh sound generating device 1600RC. The first partition 1721 may include a third bent portion 703 toward the third sound generating device 1600C.

The second partition 1722 may include one or more bent portions. For example, the second partition 1722 may include a fourth bent portion 704 toward the first sound generating device 1600L and may include a ninth bent portion 709 toward the tenth sound generating device 1600LC. The second partition 1722 may include a fifth bent portion 705 toward the second sound generating device 1600R and may include a tenth bent portion 710 toward the eleventh sound generating device 1600RC. The second partition 1722 may include a sixth bent portion 706 toward the third sound generating device 1600C.

The third partition 1723 may include one or more bent portions. For example, the third partition 1723 may include an eleventh bent portion 801 toward the seventh sound generating device 1600BL, and may include a fourteenth bent portion 804 toward the first woofer-integrated sound generating device W3. The third partition 1723 may include a twelfth bent portion 802 toward the eighth sound generating device 1600BR, and may include a fifteenth bent portion 805 toward the second woofer-integrated sound generating device W4. The third partition 1723 may include a thirteenth bent portion 803 toward the ninth sound generating device 1600BC.

The third partition 1723 may be configured in a non-bent shape, but embodiments are not limited thereto. The third partition 1723 may not include bent portion to face the seventh sound generating device 1600BL, the first woofer-integrated sound generating device W3, the second woofer-integrated sound generating device W4, the eighth sound generating device 1600BR, and the ninth sound generating device 1600BC. For example, as illustrates in FIG. 23H, the third partition 1723 may be configured in a non-bent shape, but embodiments are not limited thereto.

With reference to FIG. 25I, one of a first partition 1721, a second partition 1722, and a third partition 1723 may include one or more bent portions, and the partition 1750 may be disposed. The third partition 1723 may be configured in a non-bent shape, but embodiments are not limited thereto. For example, the third partition 1723 may not include bent portion to face the seventh sound generating device 1600BL, the first woofer-integrated sound generating device W3, the second woofer-integrated sound generating device W4, the eighth sound generating device 1600BR, and the ninth sound generating device 1600BC. For example, as illustrated in FIG. 23I, the third partition 1723 may be configured in a non-bent shape, but embodiments are not limited thereto. The partition 1750 may be disposed at an edge or periphery of the supporting member 300.

Figure 26A:
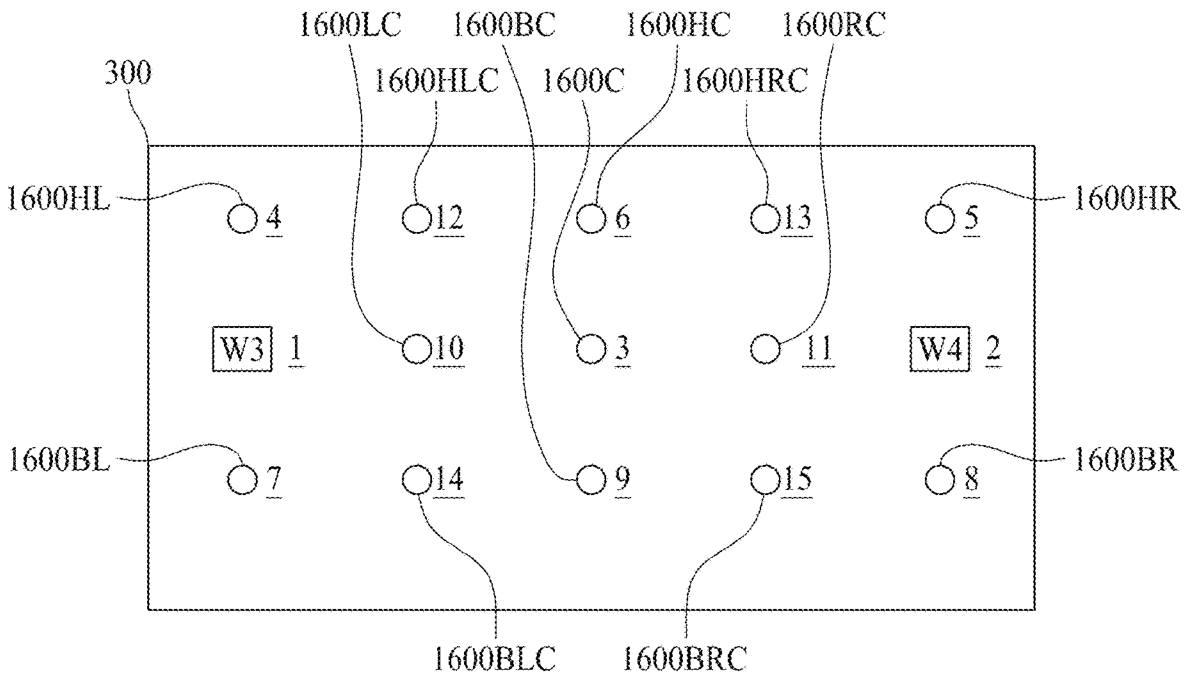
Figure 26B:
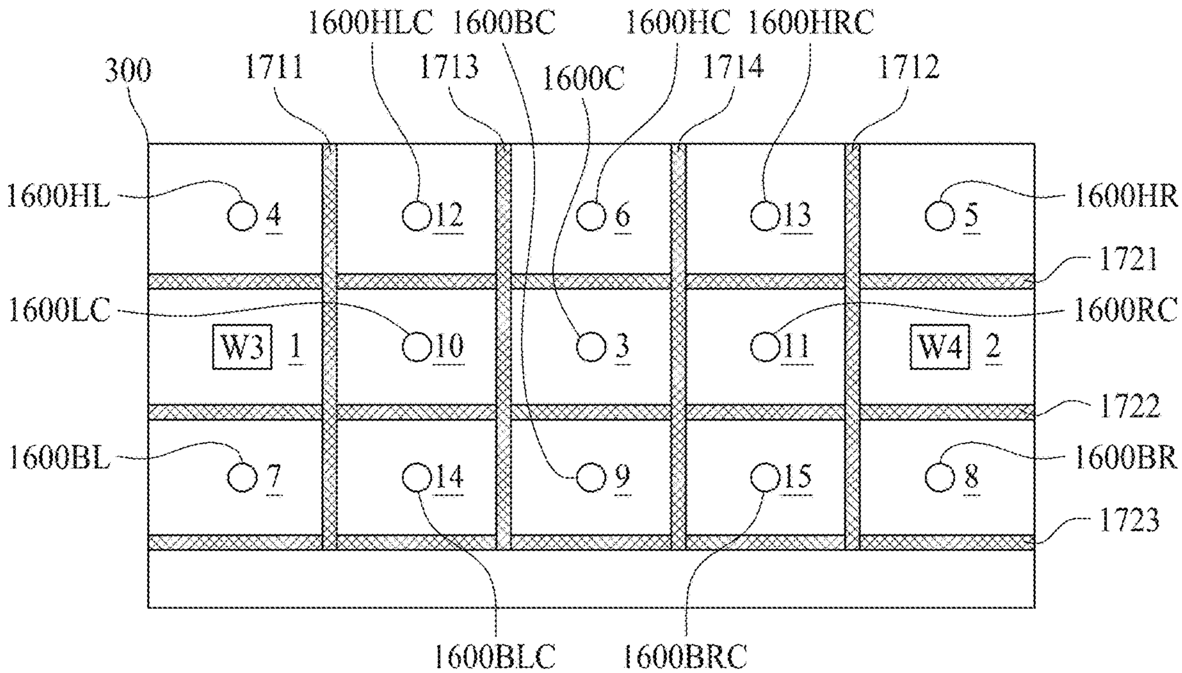
Figure 26C:
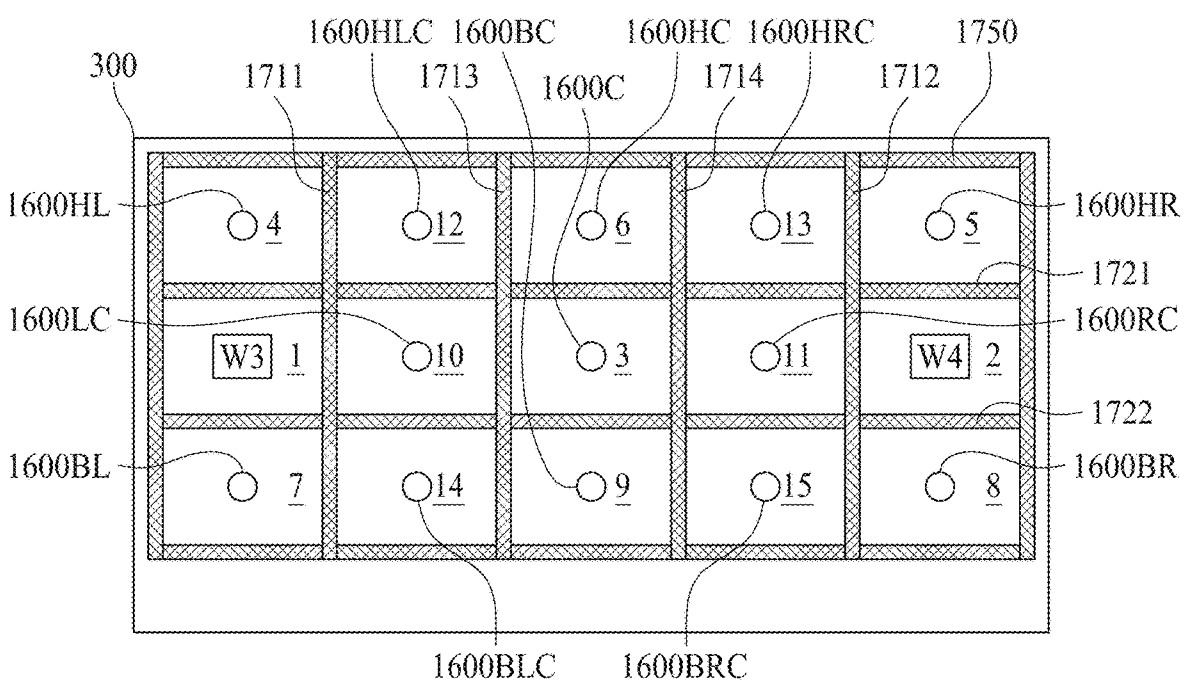
Figure 26D:
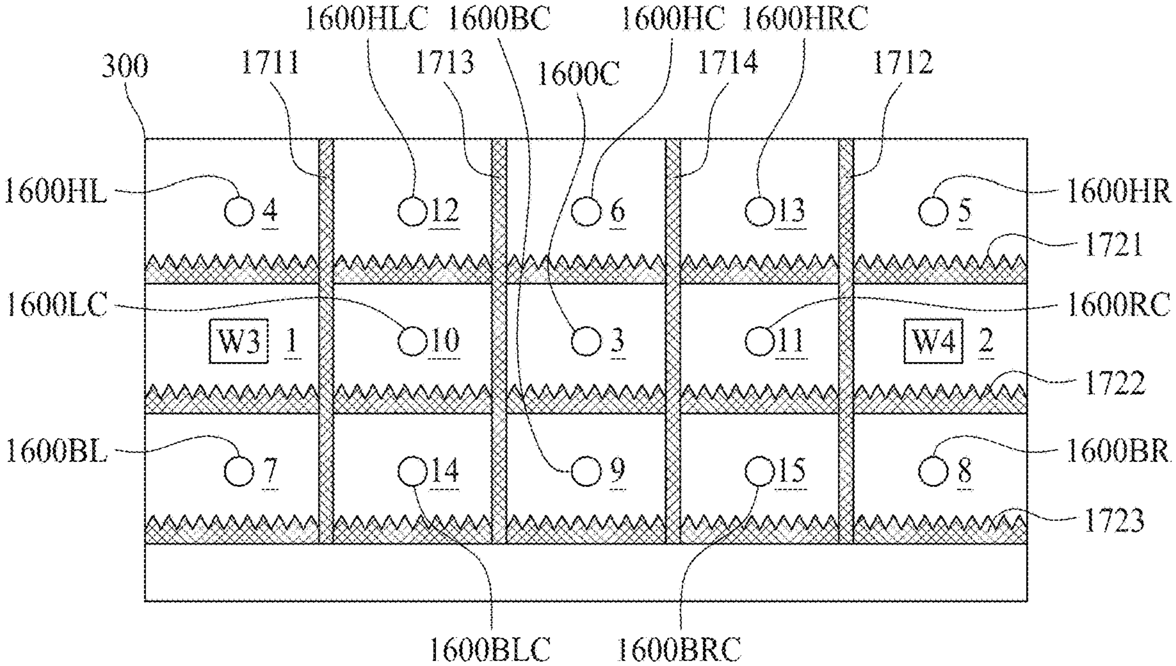
Figure 26E:
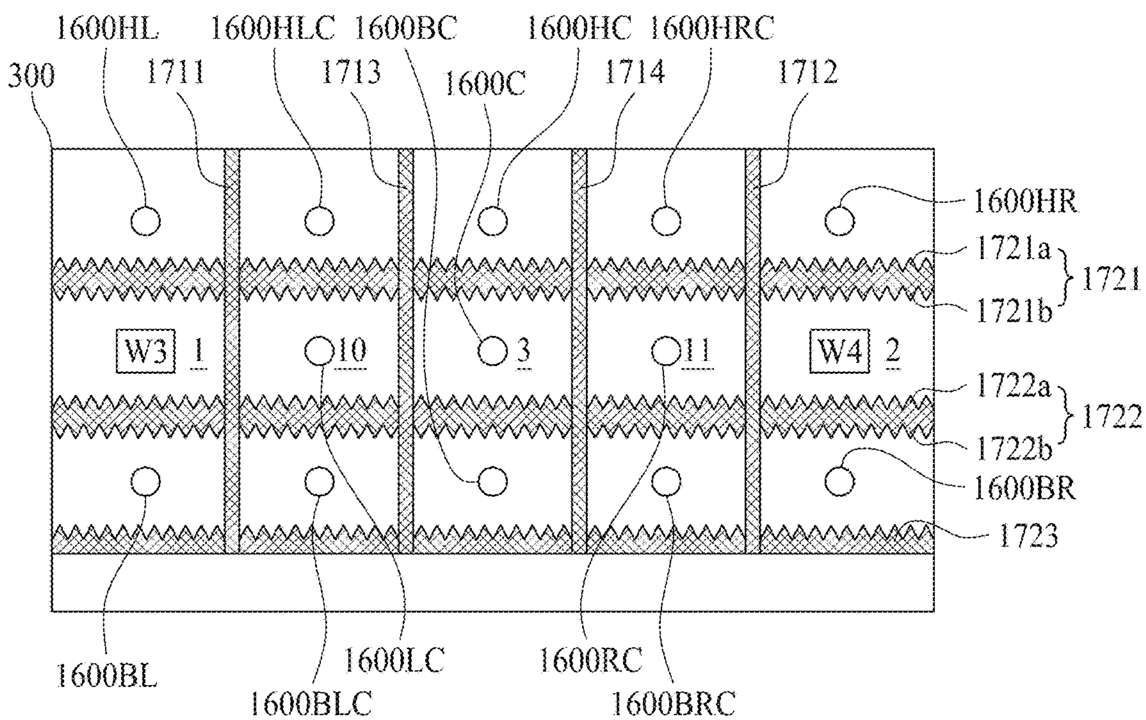

FIGS. 26A to 261 illustrate a sound generating device and a partition according to an embodiment of the present disclosure.

With reference to FIGS. 26A to 261, a first woofer-integrated sound generating device W3 may be disposed in a first region 1, and a second woofer-integrated sound generating device W4 may be disposed in a second region 2. Descriptions which are the same as or similar to descriptions of FIGS. 15A to 15I, 18A to 20I, and/or 23A to 25I will be briefly given or are omitted.

Figure 26F:
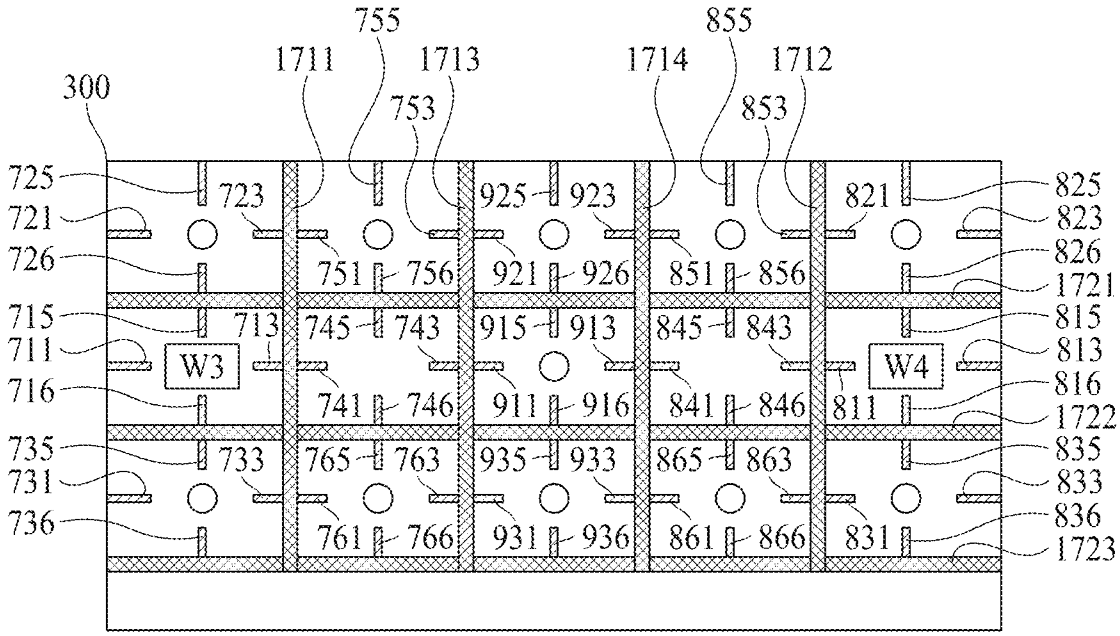
Figure 26G:
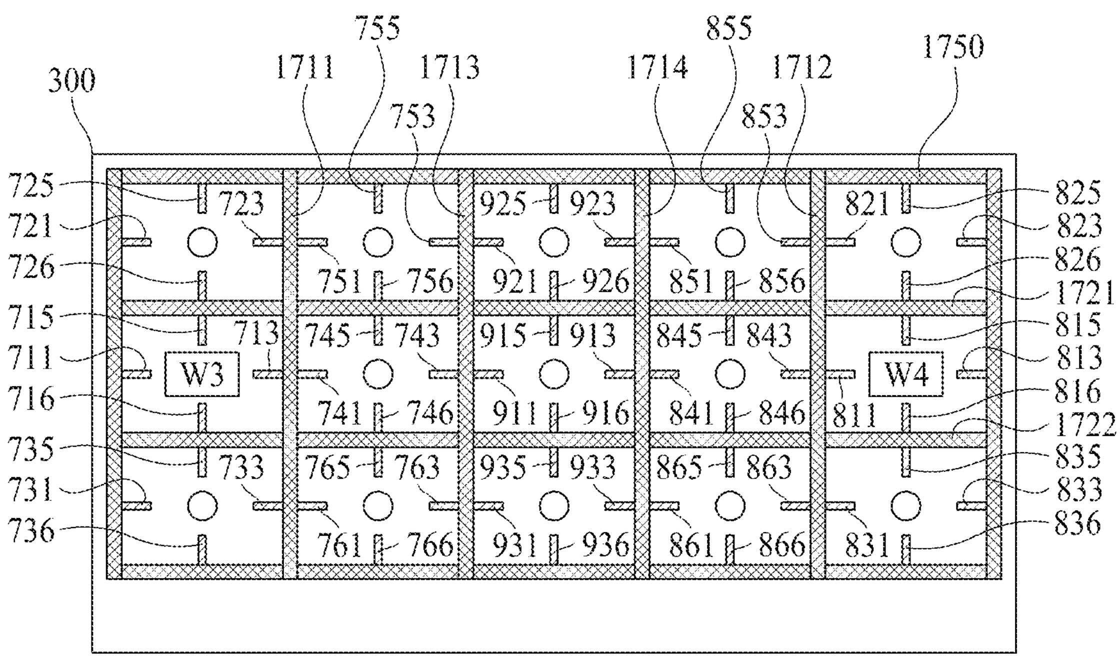
Figure 26H:
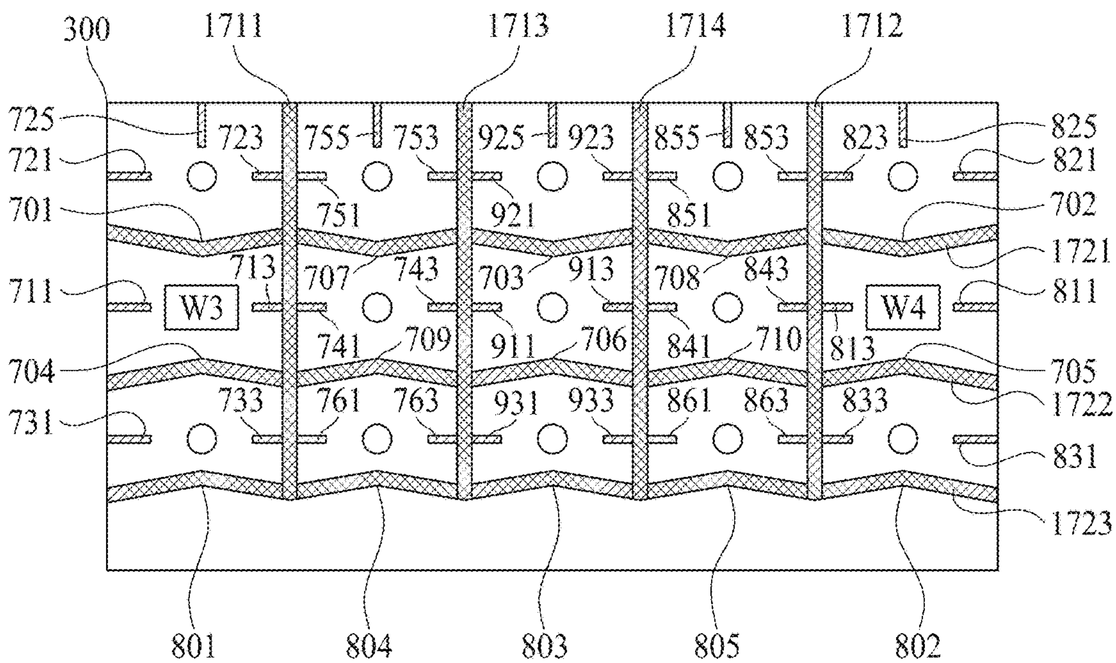
Figure 26I:
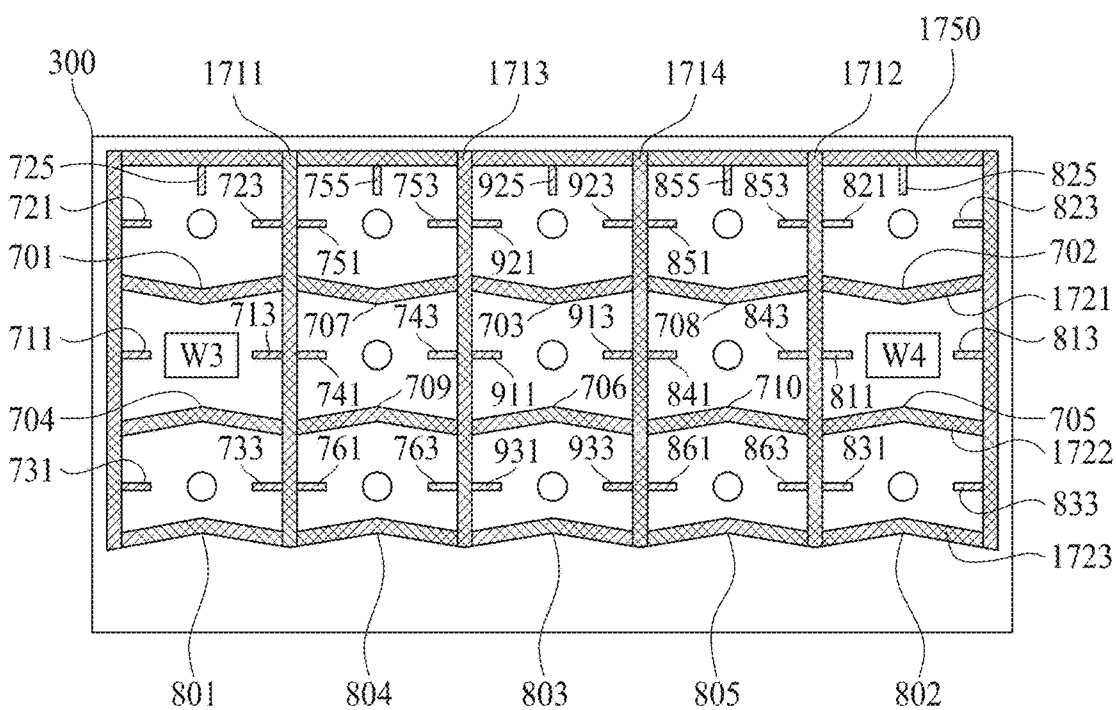

With reference to FIGS. 26A to 261, the first woofer-integrated sound generating device W3 may be symmetrically disposed with one of the fourth sound generating device 1600HL and the seventh sound generating device 1600BL. The first woofer-integrated sound generating device W3 may be disposed on the same line as one of the fourth sound generating device 1600HL and the seventh sound generating device 1600BL. The second woofer-integrated sound generating device W4 may be symmetrically disposed with one of the fifth sound generating device 1600HR and the eighth sound generating device 1600BR. The second woofer-integrated sound generating device W4 may be disposed on the same line as one of the fifth sound generating device 1600HR and the eighth sound generating device 1600BR. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 26F and 26G, the 1-5$^{th}$ pad 715 and the 1-6$^{th}$ pad 716 may be symmetrically disposed with one of the 4-5$^{th}$ pad 725, the 4-6$^{th}$ pad 726, the 7-5$^{th}$ pad 735 and the 7-6$^{th}$ pad 736. The 2-5$^{th}$ pad 815 and the 2-6$^{th}$ pad 816 may be symmetrically disposed with one of the 5-5$^{th}$ pad 825, the 5-6$^{th}$ pad 826, the 8-5$^{th}$ pad 835, and the 8-6$^{th}$ pad 836. With reference to FIGS. 26H and 261, the first bent portion 701 may be symmetrically disposed with one of the fourth bent portion 704 and the eleventh bent portion 801. The second bent portion 702 may be symmetrically disposed with one of the fifth bent portion 705 and the twelfth bent portion 802.

As another example, the first woofer-integrated sound generating device W3 may be asymmetrically disposed with one of the fourth sound generating device 1600HL and the seventh sound generating device 1600BL. The second woofer-integrated sound generating device W4 may be asymmetrically disposed with one of the fifth sound generating device 1600HR and the eighth sound generating device 1600BR. For example, sound constructive interference or destructive interference caused by vibration interference between a vibration and a standing wave generated by the first woofer-integrated sound generating device W3 and a vibration and a standing wave generated by the fourth sound generating device 1600HL or the seventh sound generating device 1600BL may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the fourth sound generating device 1600HL and the seventh sound generating device 1600BL may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the fifth sound generating device 1600HR or the eighth sound generating device 1600BR may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the fifth sound generating device 1600HR and the eighth sound generating device 1600BR may prevent the undesired interference, thereby reproducing a natural sound similar to an original sound. With reference to FIGS. 26F and 26G, the 1-5$^{th}$ pad 715 and the 1-6$^{th}$ pad 716 may be asymmetrically disposed with one of the 4-5$^{th}$ pad 725, the 4-6$^{th}$ pad 726, the 7-5$^{th}$ pad 735 and the 7-6$^{th}$ pad 736. The 2-5$^{th}$ pad 815 and the 2-6$^{th}$ pad 816 may be asymmetrically disposed with one of the 5-5$^{th}$ pad 825, the 5-6$^{th}$ pad 826, the 8-5$^{th}$ pad 835, and the 8-6$^{th}$ pad 836. With reference to FIGS. 26H and 261, the first bent portion 701 may be asymmetrically disposed with one of the fourth bent portion 704 and the eleventh bent portion 801. The second bent portion 702 may be asymmetrically disposed with one of the fifth bent portion 705 and the twelfth bent portion 802. With reference to FIGS. 26F and 261, each of the pads may be provided as one, but are not limited thereto, and at least one of the pads may be provided as two or more.

With reference to FIGS. 26A to 261, the first woofer-integrated sound generating device W3 may be disposed to be symmetrical with one of the third sound generating device 1600C, a tenth sound generating device 1600LC, and the eleventh sound generating device 1600RC. For example, the first woofer-integrated sound generating device W3 may be disposed on the same line as one of the third sound generating device 1600C, a tenth sound generating device 1600LC, and the eleventh sound generating device 1600RC. The second woofer-integrated sound generating device W4 may be disposed to be symmetrical with one of the third sound generating device 1600C, a tenth sound generating device 1600LC, and the eleventh sound generating device 1600RC. For example, the second woofer-integrated sound generating device W4 may be disposed on the same line as one of the third sound generating device 1600C, a tenth sound generating device 1600LC, and the eleventh sound generating device 1600RC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 26F and 26G, the 1-1$^{st}$ pad 711 and the 1-3$^{rd}$ pad 713 may be symmetrically disposed with one of the 3-1$^{st}$ pad 911, the 3-3$^{rd}$ pad 913, the 10-1$^{st}$ pad 741, the 10-3$^{rd}$ pad 743, the 11-1$^{st}$ pad 841, and the 11-3$^{rd}$ pad 843. The 2-1$^{st}$ pad 811 and the 2-3$^{rd}$ pad 813 may be symmetrically disposed with one of the 3-1$^{st}$ pad 911, the 3-3$^{rd}$ pad 913, the 10-1$^{st}$ pad 741, the 10-3$^{rd}$ pad 743, the 11-1$^{st}$ pad 841, and the 11-3$^{rd}$ pad 843.

As another example, the first woofer-integrated sound generating device W3 may be disposed to be asymmetrical with one of the third sound generating device 1600C, a tenth sound generating device 1600LC, and the eleventh sound generating device 1600RC. The second woofer-integrated sound generating device W4 may be disposed to be asymmetrical with one of the third sound generating device 1600C, a tenth sound generating device 1600LC, and the eleventh sound generating device 1600RC. For example, sound constructive interference or destructive interference caused by vibration interference between a vibration and a standing wave generated by the first woofer-integrated sound generating device W3 and a vibration and a standing wave generated by the third sound generating device 1600C, or a tenth sound generating device 1600LC, or the eleventh sound generating device 1600RC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the third sound generating device 1600C, a tenth sound generating device 1600LC, and the eleventh sound generating device 1600RC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the third sound generating device 1600C, or a tenth sound generating device 1600LC, or the eleventh sound generating device 1600RC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the third sound generating device 1600C, a tenth sound generating device 1600LC, and the eleventh sound generating device 1600RC may prevent the undesired interference, thereby reproducing a natural sound similar to an original sound. With reference to FIGS. 26F and 26G, the 1-1$^{st}$ pad 711 and the 1-3$^{rd}$ pad 713 may be asymmetrically disposed with one of the 3-1$^{st}$ pad 911, the 3-3$^{rd}$ pad 913, the 10-1$^{st}$ pad 741, the 10-3$^{rd}$ pad 743, the 11-1$^{st}$ pad 841, and the 11-3$^{rd}$ pad 843. The 2-1$^{st}$ pad 811 and the 2-3$^{rd}$ pad 813 may be asymmetrically disposed with one of the 3-1$^{st}$ pad 911, the 3-3$^{rd}$ pad 913, the 10-1$^{st}$ pad 741, the 10-3$^{rd}$ pad 743, the 11-1$^{st}$ pad 841, and the 11-3$^{rd}$ pad 843.

The third, fourth, fifth, sixth, seventh, eighth, ninth, tenth, eleventh, twelfth, thirteenth, fourteenth, fifteenth, first woofer-integrated, and second woofer-integrated sound generating devices 1600C, 1600HL, 1600HR, 1600HC, 1600BL, 1600BR, 1600BC, 1600LC, 1600RC, 1600HLC, 1600HRC, 1600BLC, 1600BRC, W3, and W4 may output sounds of about 60 Hz to about 40 kHz or about 80 Hz to about 40 kHz. Accordingly, the display apparatus may output a 15.1-channel sound.

With reference to FIG. 21F, a pad may be disposed on at least one side of the first, second, third, fourth, fifth, sixth, and seventh partitions 1721, 1722, 1723, 1713, 1714, 1711, and 1712 to face or toward a sound generating device. For example, the 1-3$^{rd}$ pad 713 may be disposed on at least one side of the sixth partition 1711 to face or toward the first woofer-integrated sound generating device W3. The 1-3$^{rd}$ pad 713 may be disposed on at least one side of the sixth partition 1711 facing the 1-1$^{st}$ pad 711, and may be disposed to face or toward the first woofer-integrated sound generating device W3. The 1-1$^{st}$ pad 711 may be disposed on a side facing the 1-3$^{rd}$ pad 713.

For example, the 1-5$^{th}$ pad 715 may be disposed on at least one side of the first partition 1721 to face or toward the first woofer-integrated sound generating device W3. For example, the 1-6$^{th}$ pad 716 may be disposed on at least one side of the second partition 1722 to face or toward the first woofer-integrated sound generating device W3. The 1-5$^{th}$ pad 715 may be disposed to face or toward the 1-6$^{th}$ pad 716. For example, the 1-6$^{th}$ pad 716 may be disposed on a side of the second partition 1722 facing the 1-5$^{th}$ pad 715.

For example, the 2-1$^{st}$ pad 811 may be disposed on at least one side of the seventh partition 1712 to face or toward the second woofer-integrated sound generating device W4. The 2-3$^{rd}$ pad 813 may be disposed on a side facing the 2-1$^{st}$ pad 811, and the 2-3$^{rd}$ pad 813 may be disposed to face or toward the second woofer-integrated sound generating device W4. For example, the 2-5$^{th}$ pad 815 may be disposed on at least one side of the first partition 1721 to face or toward the second woofer-integrated sound generating device W4. For example, the 2-6$^{th}$ pad 816 may be disposed on at least one side of the second partition 1722 to face or toward the second woofer-integrated sound generating device W4. The 2-5$^{th}$ pad 815 may be disposed to face or toward the 2-6$^{th}$ pad 816. For example, the 2-6$^{th}$ pad 816 may be disposed on a side of the second partition 1722 facing the 2-5$^{th}$ pad 815.

With reference to FIG. 26G, a first partition 1721, a second partition 1722, a fourth partition 1713, a fifth partition 1714, a sixth partition 1711, a seventh partition 1712, and a partition 1750 may be provided. For example, one or more pads may be provided on a side of the partition 1750. A 4-5$^{th}$ pad 725 may be disposed on one side of the partition 1750 to face or toward the fourth sound generating device 1600HL, a 5-5$^{th}$ pad 825 may be disposed on the one side of the partition 1750 to face or toward the fifth sound generating device 1600HR, and a 6-5$^{th}$ pad 925 may be disposed on the one side of the partition 1750 to face or toward the sixth sound generating device 1600HC. A 12-5$^{th}$ pad 755 may be disposed on the one side of the partition 1750 to face or toward the twelfth sound generating device 1600HLC, and a 13-5$^{th}$ pad 855 may be disposed on the one side of the partition 1750 to face or toward the thirteenth sound generating device 1600HRC. A 7-6$^{th}$ pad 736 may be disposed on one other side of the partition 1750 to face or toward the seventh sound generating device 1600BL, an 8-6$^{th}$ pad 836 may be disposed on the one other side of the partition 1750 to face or toward the eighth sound generating device 1600BR, and a 9-6$^{th}$ pad 936 may be disposed on the one other side of the partition 1750 to face or toward the ninth sound generating device 1600BC. A 14-6$^{th}$ pad 766 may be disposed on one other side of the partition 1750 to face or toward the fourteenth sound generating device 1600BLC, an 15-6$^{th}$ pad 866 may be disposed on the one other side of the partition 1750 to face or toward the fifteenth sound generating device 1600BRC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 26F, and thus, their detailed descriptions are omitted.

With reference to FIGS. 26H and 261, one of the first partition 1721, the second partition 1722, and the third partition 1723 may include one or more bent portions. The first partition 1721 may include one or more bent portions. For example, the first partition 1721 may include a first bent portion 701 toward the first woofer-integrated sound generating device W3 and may include a seventh bent portion 707 toward the tenth sound generating device 1600LC. The first partition 1721 may include a second bent portion 702 toward the second woofer-integrated sound generating device W4 and may include an eighth bent portion 708 toward the eleventh sound generating device 1600RC. The first partition 1721 may include a third bent portion 703 toward the third sound generating device 1600C.

The second partition 1722 may include one or more bent portions. For example, the second partition 1722 may include a fourth bent portion 704 toward the first woofer-integrated sound generating device W3 and may include a ninth bent portion 709 toward the tenth sound generating device 1600LC. The second partition 1722 may include a fifth bent portion 705 toward the second woofer-integrated sound generating device W4 and may include a tenth bent portion 710 toward the eleventh sound generating device 1600RC. The second partition 1722 may include a sixth bent portion 706 toward the third sound generating device 1600C.

The third partition 1723 may include one or more bent portions. For example, the third partition 1723 may include an eleventh bent portion 801 toward the seventh sound generating device 1600BL, and may include a fourteenth bent portion 804 toward the fourteenth sound generating device 1600BLC. The third partition 1723 may include a twelfth bent portion 802 toward the eighth sound generating device 1600BR, and may include a thirteenth bent portion 803 toward the ninth sound generating device 1600BC.

The third partition 1723 may be configured in a non-bent shape, but embodiments are not limited thereto. For example, the third partition 1723 may not include bent portion to face the seventh, eighth, ninth, fourteenth, and fifteenth sound generating devices 1600BL, 1600BR, 1600BC, 1600BLC, and 1600BRC. For example, as shown in FIG. 23H, the third partition 1723 may be configured in a non-bent shape, but embodiments are not limited thereto.

With reference to FIG. 261, one of a first partition 1721, a second partition 1722, and a third partition 1723 may include one or more bent portions, and the partition 1750 may be disposed. The third partition 1723 may be configured in a non-bent shape, but embodiments are not limited thereto. For example, the third partition 1723 may not include bent portion to face or toward one or more of the seventh, eighth, ninth, fourteenth, and fifteenth sound generating devices 1600BL, 1600BR, 1600BC, 1600BLC, and 1600BRC. For example, as illustrated in FIG. 23I, the third partition 1723 may be configured in a non-bent shape, but embodiments are not limited thereto. The partition 1750 may be disposed at an edge or periphery of the supporting member 300.

FIGS. 27A to 27I illustrate a sound generating device and a partition according to an embodiment of the present disclosure.

With reference to FIGS. 27A to 27I, a first woofer-integrated sound generating device W3 may be disposed in a tenth region 10, and a second woofer-integrated sound generating device W4 may be disposed in an eleventh region 11. Descriptions which are the same as or similar to descriptions of FIGS. 15A to 15I, 18A to 20I, and/or 23A to 261 will be briefly given or are omitted.

Figure 27A:
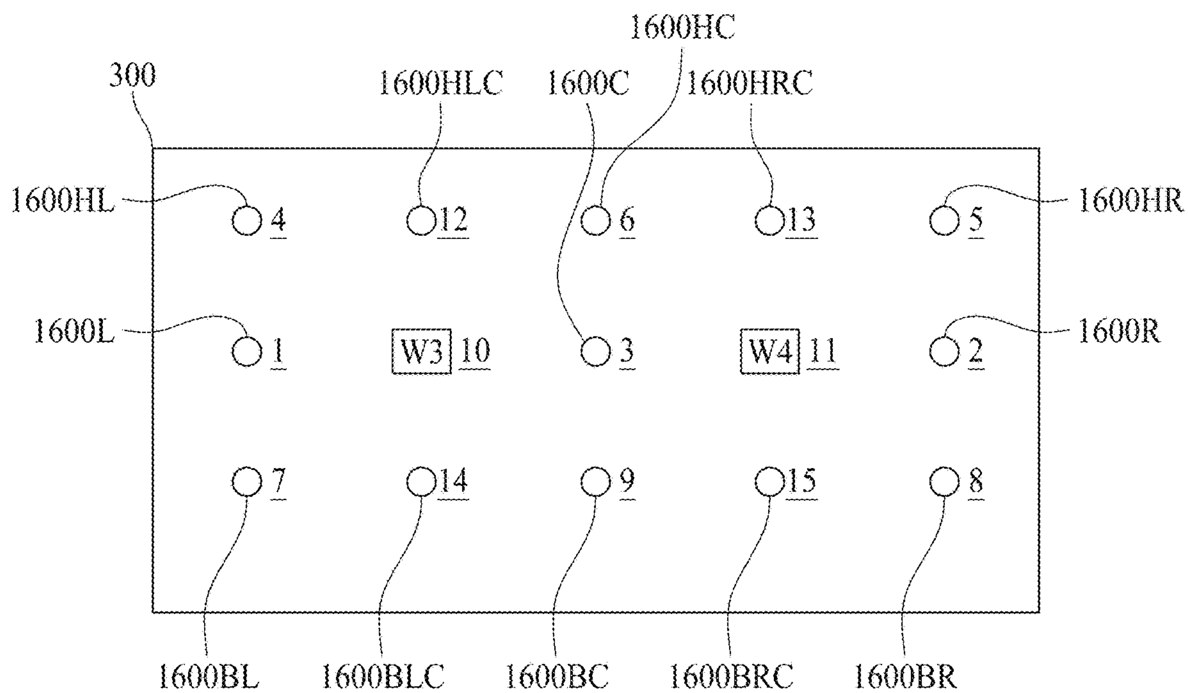
FIGS. 27A to 27I illustrate an embodiment of the sound generating device and a partition according to an embodiment of the present disclosure.
Figure 27B:
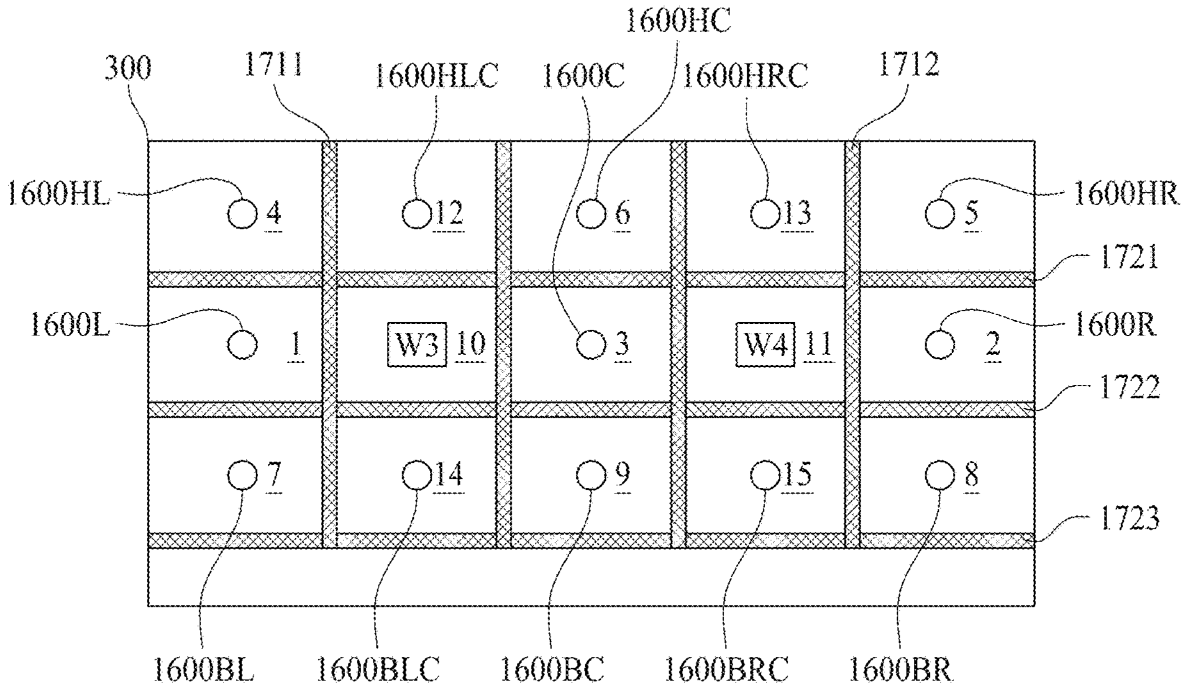
Figure 27C:
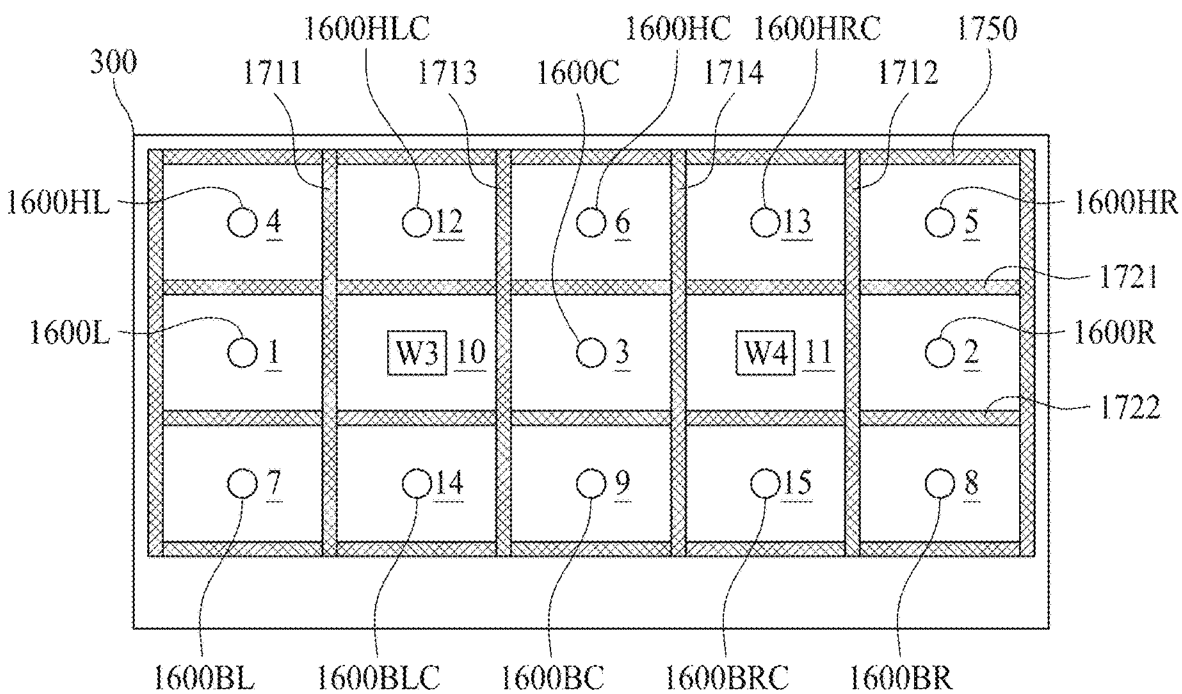
Figure 27D:
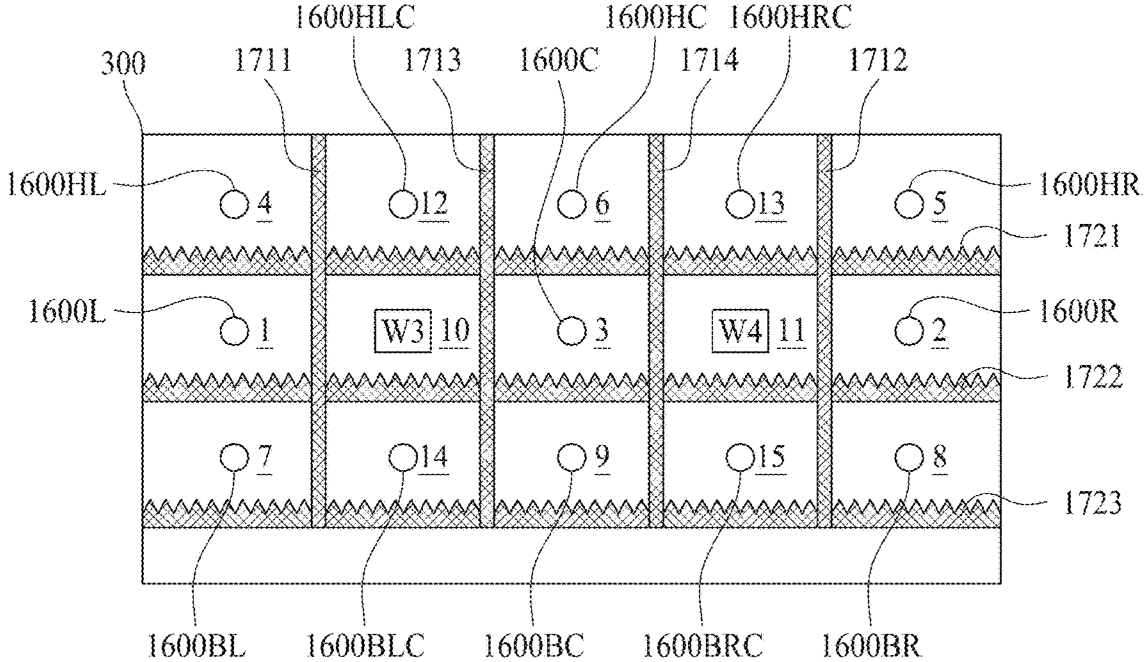
Figure 27E:
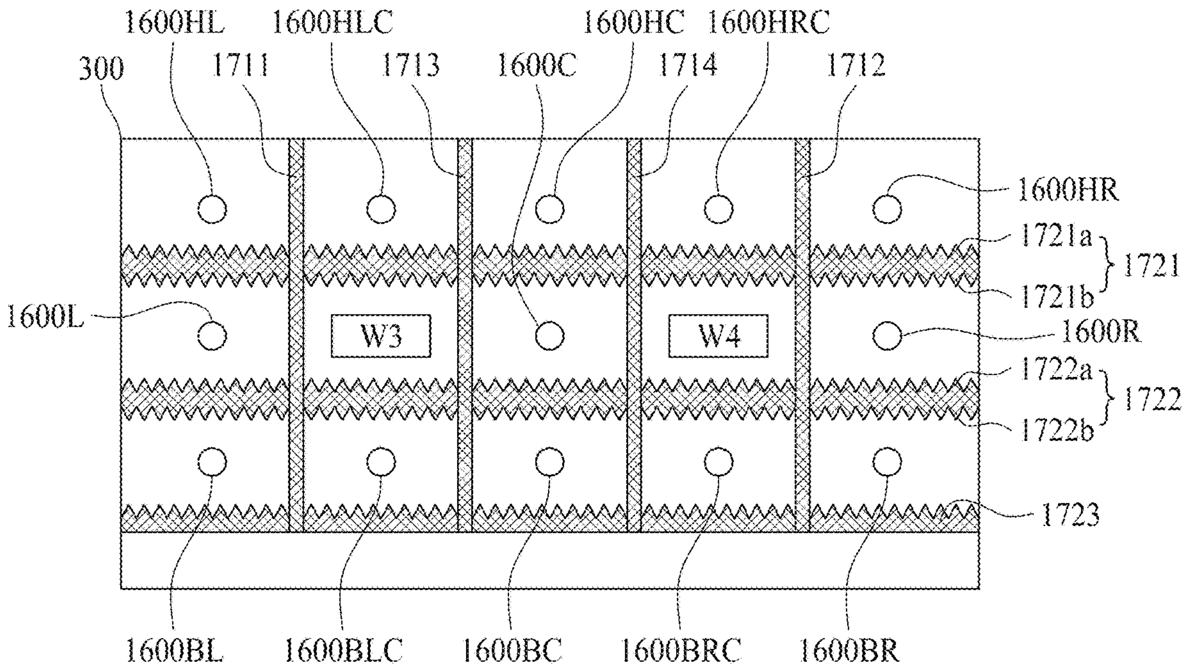
Figure 27F:
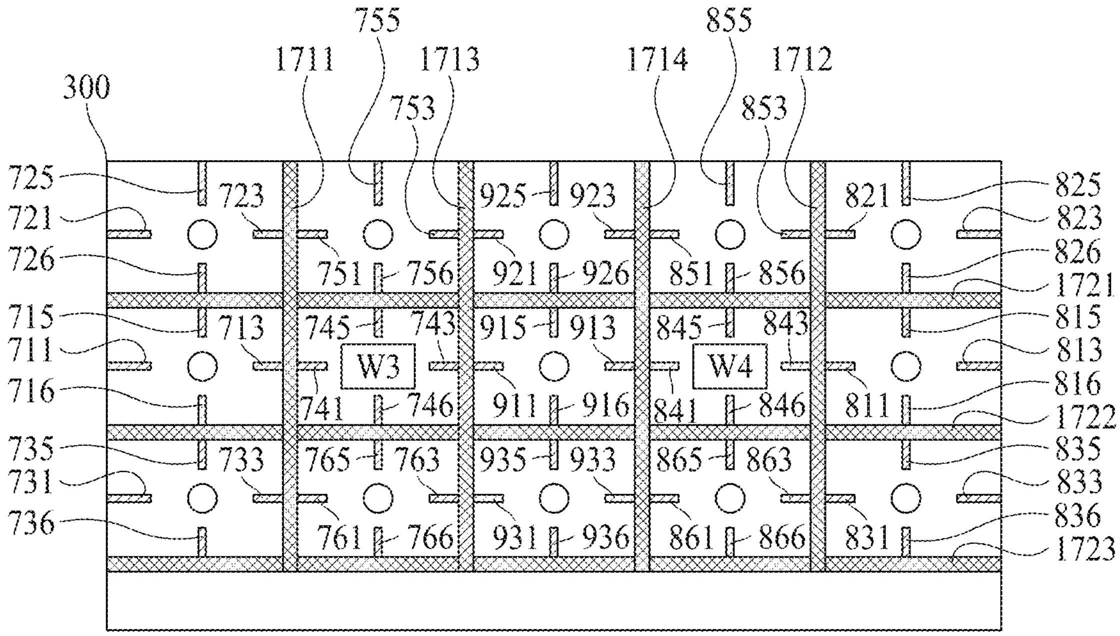
Figure 27G:
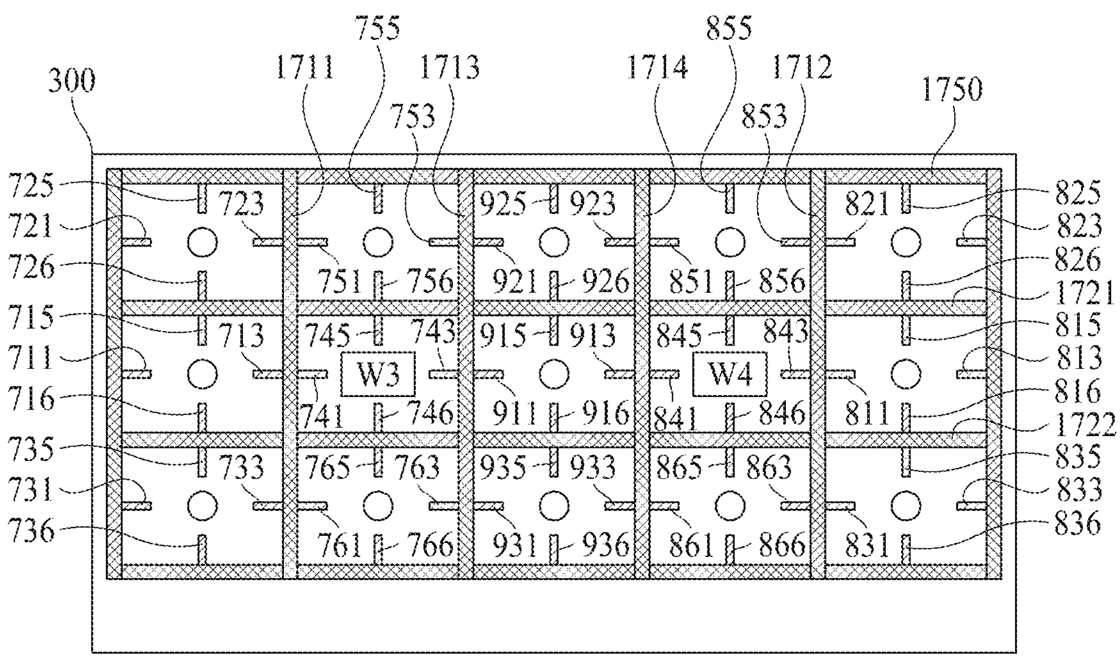
Figure 27H:
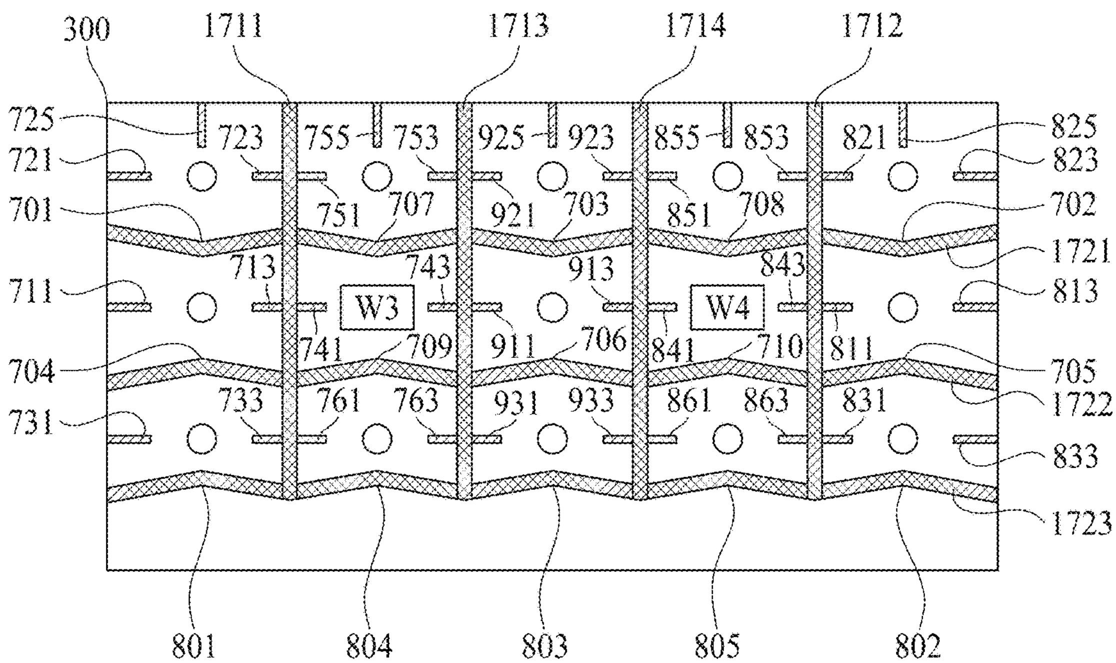
Figure 27I:
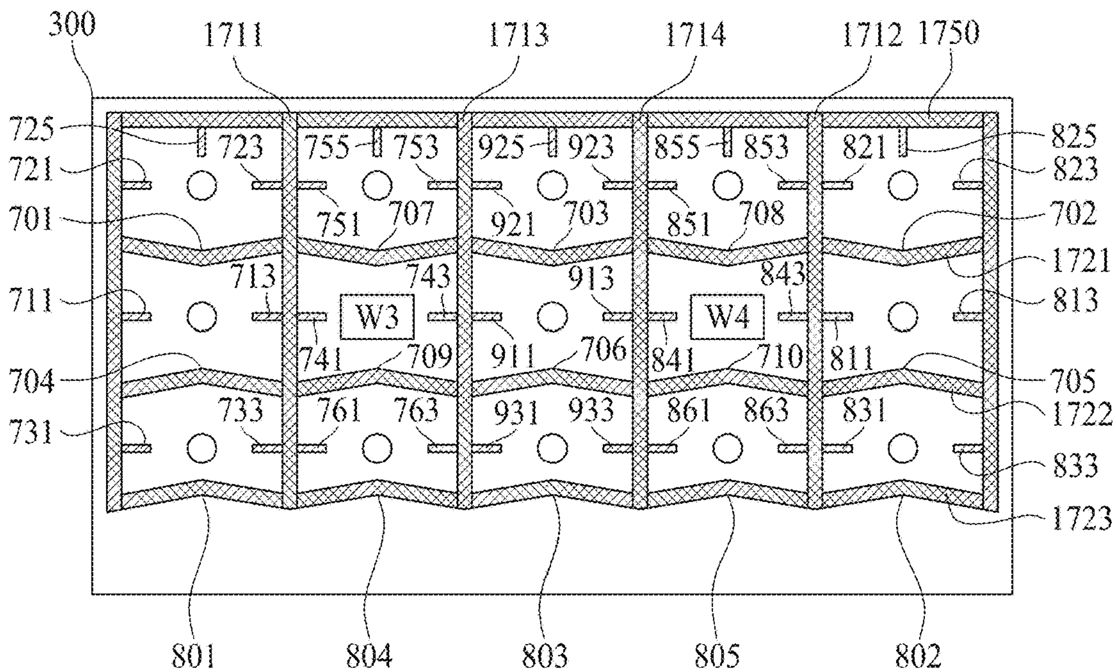

With reference to FIGS. 27A to 27I, the first woofer-integrated sound generating device W3 may be symmetrically disposed with one of the twelfth sound generating device 1600HLC and the fourteenth sound generating device 1600BLC. The first woofer-integrated sound generating device W3 may be disposed on the same line as one of the twelfth sound generating device 1600HLC and the fourteenth sound generating device 1600BLC. The second woofer-integrated sound generating device W4 may be symmetrically disposed with one of the thirteenth sound generating device 1600HRC and the fifteenth sound generating device 1600BRC. The second woofer-integrated sound generating device W4 may be disposed on the same line as one of the thirteenth sound generating device 1600HRC and the fifteenth sound generating device 1600BRC. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 27F and 27G, the 10-5$^{th}$ pad 745 and the 10-6$^{th}$ pad 746 may be symmetrically disposed with one of the 12-5$^{th}$ pad 755, the 12-6$^{th}$ pad 756, the 14-5$^{th}$ pad 765 and the 14-6$^{th}$ pad 766. The 11-5$^{th}$ pad 845 and the 11-6$^{th}$ pad 846 may be symmetrically disposed with one of the 13-5$^{th}$ pad 855, the 13-6$^{th}$ pad 856, the 15-5$^{th}$ pad 865, and the 15-6$^{th}$ pad 866. With reference to FIGS. 27H and 27I, the seventh bent portion 707 may be symmetrically disposed with one of the ninth bent portion 709 and the fourteenth bent portion 804. The eighth bent portion 708 may be symmetrically disposed with one of the tenth bent portion 710 and the fifteenth bent portion 805.

As another example, the first woofer-integrated sound generating device W3 may be asymmetrically disposed with one of the twelfth sound generating device 1600HLC and the fourteenth sound generating device 1600BLC. The second woofer-integrated sound generating device W4 may be asymmetrically disposed with one of the thirteenth sound generating device 1600HRC and the fifteenth sound generating device 1600BRC. For example, sound constructive interference or destructive interference caused by vibration interference between a vibration and a standing wave generated by the first woofer-integrated sound generating device W3 and a vibration and a standing wave generated by the twelfth sound generating device 1600HLC or the fourteenth sound generating device 1600BLC may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the twelfth sound generating device 1600HLC and the fourteenth sound generating device 1600BLC may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the thirteenth sound generating device 1600HRC or the fifteenth sound generating device 1600BRC may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the thirteenth sound generating device 1600HRC and the fifteenth sound generating device 1600BRC may prevent the undesired interference, thereby reproducing a natural sound similar to an original sound. With reference to FIGS. 27F and 27G, the 10-5$^{th}$ pad 745 and the 10-6$^{th}$ pad 746 may be asymmetrically disposed with one of the 12-5$^{th}$ pad 755, the 12-6$^{th}$ pad 756, the 14-5$^{th}$ pad 765 and the 14-6$^{th}$ pad 766. The 11-5$^{th}$ pad 845 and the 11-6$^{th}$ pad 846 may be asymmetrically disposed with one of the 13-5$^{th}$ pad 855, the 13-6$^{th}$ pad 856, the 15-5$^{th}$ pad 865, and the 15-6$^{th}$ pad 866. With reference to FIGS. 27H and 27I, the seventh bent portion 707 may be asymmetrically disposed with one of the ninth bent portion 709 and the fourteenth bent portion 804. The eighth bent portion 708 may be asymmetrically disposed with one of the tenth bent portion 710 and the fifteenth bent portion 805. With reference to FIGS. 27F and 27I, the pads may be provided as one, but embodiments are not limited thereto, and at least one of the pads may be provided as two or more.

With reference to FIGS. 27A to 27I, the first woofer-integrated sound generating device W3 may be symmetrically disposed with one of the first sound generating device 1600L, the second sound generating device 1600R, and the third sound generating device 1600C. For example, the first woofer-integrated sound generating device W3 may be disposed on the same line as one of the first sound generating device 1600L, the second sound generating device 1600R, and the third sound generating device 1600C. The second woofer-integrated sound generating device W4 may be symmetrically disposed with one of the first sound generating device 1600L, the second sound generating device 1600R, and the third sound generating device 1600C. For example, the second woofer-integrated sound generating device W4 may be disposed on the same line as one of the first sound generating device 1600L, the second sound generating device 1600R, and the third sound generating device 1600C. For example, sound reproduction positions may be aligned on the same line, and thus, an effect such as sounds being reproduced at the same position may be realized compared to an asymmetrical structure. Accordingly, a sense of recognition of a sound position may be enhanced, thereby enhancing localization of a sound. With reference to FIGS. 27F and 27G, the 10-1$^{st}$ pad 741 and the 10-3$^{rd}$ pad 743 may be symmetrically disposed with one of the 1-1$^{st}$ pad 711, the 1-3$^{rd}$ pad 713, the 2-1$^{st}$ pad 811, the 2-3$^{rd}$ pad 813, the 3-1$^{st}$ pad 911, and the 3-3$^{rd}$ pad 913. The 11-1$^{st}$ pad 841 and the 11-3$^{rd}$ pad 843 may be symmetrically disposed with one of the 1-1$^{st}$ pad 711, the 1-3$^{rd}$ pad 713, the 2-1$^{st}$ pad 811, the 2-3$^{rd}$ pad 813, the 3-1$^{st}$ pad 911, and the 3-3$^{rd}$ pad 913.

As another example, the first woofer-integrated sound generating device W3 may be asymmetrically disposed with one of the first sound generating device 1600L, the second sound generating device 1600R, and the third sound generating device 1600C. The second woofer-integrated sound generating device W4 may be asymmetrically disposed with one of the first sound generating device 1600L, the second sound generating device 1600R, and the third sound generating device 1600C. For example, sound constructive interference or destructive interference caused by vibration interference between a vibration and a standing wave generated by the first woofer-integrated sound generating device W3 and a vibration and a standing wave generated by the first sound generating device 1600L, or the second sound generating device 1600R, or the third sound generating device 1600C may be reduced. Undesired sound constructive or destructive interference caused by external interference except for a vibration based on a reproduced sound source may cause distortion of a sound to degrade sound quality, and an asymmetrical structure between the first woofer-integrated sound generating device W3 and one of the first sound generating device 1600L, the second sound generating device 1600R, and the third sound generating device 1600C may prevent the undesired interference, thereby reproducing a natural sound similar to an original sound. Sound constructive interference or destructive interference caused by vibration interference between a vibration and a standing wave generated by the second woofer-integrated sound generating device W4 and a vibration and a standing wave generated by the first sound generating device 1600L, or the second sound generating device 1600R, or the third sound generating device 1600C may be reduced. Undesired sound constructive or destructive interference caused by external interference except for a vibration based on a reproduced sound source may cause distortion of a sound to degrade sound quality, and an asymmetrical structure between the second woofer-integrated sound generating device W4 and one of the first sound generating device 1600L, the second sound generating device 1600R, and the third sound generating device 1600C may prevent the undesired interference, thereby reproducing a natural sound similar to an original sound. With reference to FIGS. 27F and 27G, the 1-5$^{th}$ pad 715 and the 1-6$^{th}$ pad 716 may be asymmetrically disposed with one of the 4-5$^{th}$ pad 725, the 4-6$^{th}$ pad 726, the 7-5$^{th}$ pad 735, and the 7-6$^{th}$ pad 736. The 2-5$^{th}$ pad 815 and the 2-6$^{th}$ pad 816 may be asymmetrically disposed with one of the 5-5$^{th}$ pad 825, the 5-6$^{th}$ pad 826, the 8-5$^{th}$ pad 835, and the 8-6$^{th}$ pad 836.

The first, second, third, fourth, fifth, sixth, seventh, eighth, ninth, twelfth, thirteenth, fourteenth, fifteenth, first woofer-integrated, and second woofer-integrated sound generating devices 1600L, 1600R, 1600C, 1600HL, 1600HR, 1600HC, 1600BL, 1600BR, 1600BC, 1600HLC, 1600HRC, 1600BLC, 1600BRC, W3, and W4 may output sounds of about 60 Hz to about 40 kHz or about 80 Hz to about 40 kHz. Accordingly, the display apparatus may output a 15.1-channel sound.

With reference to FIG. 27F, a pad may be disposed on at least one side of the first, second, third, fourth, fifth, sixth, and seventh partitions 1721, 1722, 1723, 1713, 1714, 1711, and 1712 to face or toward a sound generating device. For example, the 10-1$^{st}$ pad 741 may be disposed on at least one side of the sixth partition 1711 to face or toward the first woofer-integrated sound generating device W3. For example, the 10-3$^{rd}$ pad 743 may be disposed on at least one side of the fourth partition 1713 to face or toward the first woofer-integrated sound generating device W3. The 10-1$^{st}$ pad 741 may be disposed on a side facing the 10-3$^{rd}$ pad 743. For example, the 10-3$^{rd}$ pad 743 may be disposed on a side of the fourth partition 1713 facing the 10-1$^{st}$ pad 741.

For example, the 10-5$^{th}$ pad 745 may be disposed on at least one side of the first partition 1721 to face or toward the first woofer-integrated sound generating device W3. For example, the 10-6$^{th}$ pad 746 may be disposed on at least one side of the second partition 1722 to face or toward the first woofer-integrated sound generating device W3. The 10-5$^{th}$ pad 745 may be disposed on a side facing the 10-6$^{th}$ pad 746. For example, the 10-6$^{th}$ pad 746 may be disposed on a side of the second partition 1722 facing the 10-5$^{th}$ pad 745.

For example, the 11-1$^{st}$ pad 841 may be disposed on at least one side of the fifth partition 1714 to face or toward the second woofer-integrated sound generating device W4. For example, the 11-3$^{rd}$ pad 843 may be disposed on at least one side of the seventh partition 1712 to face or toward the second woofer-integrated sound generating device W4. The 11-1$^{st}$ pad 841 may be disposed on a side facing the 11-3$^{rd}$ pad 843. For example, the 11-3$^{rd}$ pad 843 may be disposed on a side of the seventh partition 1712 facing the 11-1$^{st}$ pad 841.

For example, the 11-5$^{th}$ pad 845 may be disposed on at least one side of the first partition 1721 to face or toward the second woofer-integrated sound generating device W4. For example, the 11-6$^{th}$ pad 846 may be disposed on at least one side of the second partition 1722 to face or toward the second woofer-integrated sound generating device W4. The 11-5$^{th}$ pad 845 may be disposed on a side facing the 11-6$^{th}$ pad 846. For example, the 11-6$^{th}$ pad 846 may be disposed on a side of the second partition 1722 facing the 11-5$^{th}$ pad 845.

With reference to FIG. 27G, a first partition 1721, a second partition 1722, a fourth partition 1713, a fifth partition 1714, a sixth partition 1711, a seventh partition 1712, and a partition 1750 may be provided. For example, one or more pads may be provided on a side of the partition 1750. A 4-5$^{th}$ pad 725 may be disposed on one side of the partition 1750 to face or toward the fourth sound generating device 1600HL, a 5-5$^{th}$ pad 825 may be disposed on the one side of the partition 1750 to face or toward the fifth sound generating device 1600HR, and a 6-5$^{th}$ pad 925 may be disposed on the one side of the partition 1750 to face or toward the sixth sound generating device 1600HC. A 12-5$^{th}$ pad 755 may be disposed on the one side of the partition 1750 to face or toward the twelfth sound generating device 1600HLC, and a 13-5$^{th}$ pad 855 may be disposed on the one side of the partition 1750 to face or toward the thirteenth sound generating device 1600HRC. A 7-6$^{th}$ pad 736 may be disposed on one other side of the partition 1750 to face or toward the seventh sound generating device 1600BL, an 8-6$^{th}$ pad 836 may be disposed on the one other side of the partition 1750 to face or toward the eighth sound generating device 1600BR, and a 9-6$^{th}$ pad 936 may be disposed on the one other side of the partition 1750 to face or toward the ninth sound generating device 1600BC. A 14-6$^{th}$ pad 766 may be disposed on one other side of the partition 1750 to face or toward the fourteenth sound generating device 1600BLC, an 15-6$^{th}$ pad 866 may be disposed on the one other side of the partition 1750 to face or toward the fifteenth sound generating device 1600BRC. Since the partition 1750 is provided, a fixing force of a sound generating device disposed on the rear surface of the display panel may be enhanced, and the leakage of a sound occurring in the edge or periphery of the display panel may be reduced, thereby enhancing a sound output characteristic. The other elements are the same as or similar to FIG. 27F, and thus, their detailed descriptions are omitted.

With reference to FIGS. 27H and 27I, one of a first partition 1721, a second partition 1722, and a third partition 1723 may include one or more bent portions. The first partition 1721 may include one or more bent portions. For example, the first partition 1721 may include a seventh bent portion 707 toward the first woofer-integrated sound generating device W3 and may include a first bent portion 701 toward the first sound generating device 1600L. The first partition 1721 may include an eighth bent portion 708 toward the second woofer-integrated sound generating device W4 and may include a second bent portion 702 toward the second sound generating device 1600R. The first partition 1721 may include a third bent portion 703 toward the third sound generating device 1600C.

The second partition 1722 may include one or more bent portions. For example, the second partition 1722 may include a ninth bent portion 709 toward the first woofer-integrated sound generating device W3 and may include a fourth bent portion 704 toward the first sound generating device 1600L. The second partition 1722 may include a tenth bent portion 710 toward the second woofer-integrated sound generating device W4 and may include a fifth bent portion 705 toward the second sound generating device 1600R. The second partition 1722 may include a sixth bent portion 706 toward the third sound generating device 1600C.

The third partition 1723 may include one or more bent portions. For example, the third partition 1723 may include an eleventh bent portion 801 toward the seventh sound generating device 1600BL, and may include a fourteenth bent portion 804 toward the fourteenth sound generating device 1600BLC. The third partition 1723 may include a twelfth bent portion 802 toward the eighth sound generating device 1600BR, and may include a fifteenth bent portion 805 toward the fifteenth sound generating device 1600BRC. The third partition 1723 may include a thirteenth bent portion 803 toward the ninth sound generating device 1600BC. The third partition 1723 may be configured in a non-bent shape, but embodiments are not limited thereto. For example, the third partition 1723 may not include bent portion to face or toward one or more of the seventh, eighth, ninth, fourteenth, and fifteenth sound generating devices 1600BL, 1600BR, 1600BC, 1600BLC, and 1600BRC. For example, as illustrated in FIG. 23H, the third partition 1723 may be configured in a non-bent shape, but embodiments are not limited thereto.

With reference to FIG. 27I, one of a first partition 1721, a second partition 1722, and a third partition 1723 may include one or more bent portions, and the partition 1750 may be disposed. For example, the partition 1750 may not include bent portion to face or toward one or more of the seventh, eighth, ninth, fourteenth, and fifteenth sound generating devices 1600BL, 1600BR, 1600BC, 1600BLC, and 1600BRC. For example, as illustrated in FIG. 23I, the third partition 1723 may be configured in a non-bent shape, but embodiments are not limited thereto. The partition 1750 may be disposed at an edge or periphery of the supporting member 300.

Figure 28:
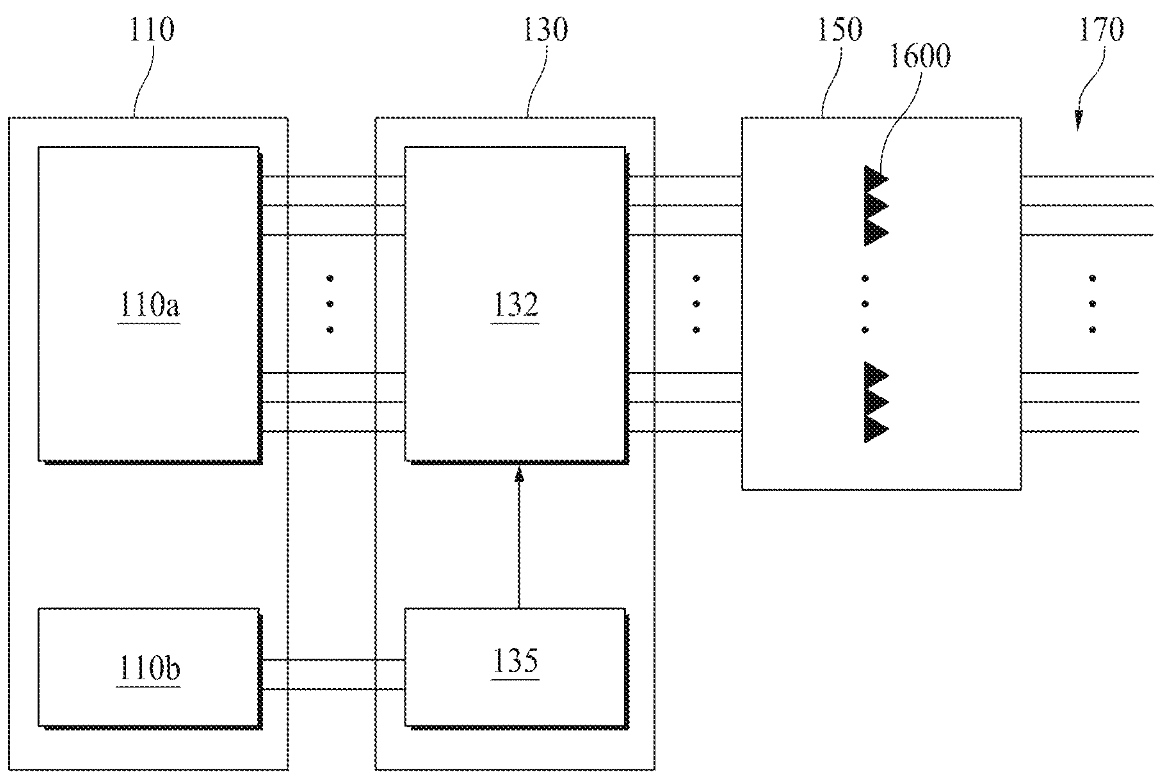
FIG. 28 illustrates a sound output system of a sound generating device according to an embodiment of the present disclosure.

FIG. 28 illustrates a sound output system of a sound generating device according to an embodiment of the present disclosure.

With reference to FIG. 28, the sound output system may include an input unit 110, a processor 130, an amplifier 150, and an output unit 170.

The input unit 110 may include a multichannel input unit 110*a* and a stereo input unit 110*b*. A sound source or an audio signal output through the multichannel input unit 110*a* may be transferred to the amplifier 150 through the processor 130, and may be output as sound by the output unit 170. For example, the sound source output from the multichannel input unit 110*a* may be converted into a multichannel signal 132 by the processor 130, and the multichannel signal 132 may be transferred to the amplifier 150. A stereo sound source output through the stereo input unit 110*b* may be converted into a multichannel signal 132 by a multichannel algorithm 135 in the processor 130. For example, the stereo input unit 110*b* may include two channels, and is not limited thereto. The amplifier 150 may amplify a sound output from the processor 130 and may be provided to be equal to the number of sound generating devices 1600. For example, the amplifier 150 may be disposed to correspond to the sound generating device 1600.

The processor 130 may include one or more of a digital signal processor (DSP)), a central processing unit (CPU), a controller, an application processor (AP), a communication processor (CP), and an ARM processor. The digital signal processor may add various functions such as a digital filter, an effect, and a sense of sound field and may apply oversampling technology for preventing sound quality from being degraded in a process of converting an analog signal into a digital signal by using a sample rate converter (SRC). The processor 130 may use a head-related transfer function (HRTF), an interpolation method of a head-related transfer function (HRTF), head-related impulse responses (HRIR), binaural room impulse responses (BRIR), and decoding, but is not limited thereto. The HRTF may be applied for emphasizing a three-dimensional effect or a sense of realism. The HRTF may generate the same sounds in all directions, measure a frequency based on each direction, and process the measured frequency on the basis of a function. The HRTF and the interpolation method of the HRTF may enhance the immersion of a user corresponding to a sound and an image, which move in real time in virtual reality, movie, game, and etc. Accordingly, when audio information about a position of each image displayed by a display apparatus is input along with an image signal, an audio signal may be separated from the audio information through decoding, and each signal may be amplified by an amplifier and may be transferred to a sound generating device. Therefore, an independent sound generating device for each channel may output a sound at a position of each image, thereby providing a display apparatus for outputting a real stereo sound or a surround sound including left and right sounds and upper and lower sounds.

The sound generating device according to an embodiment of the present disclosure may be applied as a sound generating device provided in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating device of the present disclosure is applied to a lighting apparatus, the sound generating device may act as lighting and a speaker. Also, when the sound generating device of the present disclosure is applied to a mobile apparatus, the sound generating device may act as a speaker or a receiver, but is not limited thereto.

A display apparatus according to an embodiment of the present disclosure will be described below. All directions provided in context with the display apparatus refer to directions in an operational orientation of the display apparatus. In particular, a rear surface of the display panel may refer to a surface opposite to a (front) surface of the display panel including a display area, i.e. opposite to a (front) surface of the display for displaying an image. Accordingly, a forward direction may refer to a direction perpendicular to the front surface pointing towards a user positioned in front of the display panel, i.e. a direction pointing from the front surface in a direction away from the display panel. A direction toward an upper (or lower) portion of the display panel may refer a direction being parallel to the front or rear surface of the display panel and pointing against (or in) the direction of gravity. A vertical center line of the display panel may refer to a line crossing the center of the display panel in direction of gravity.

A display apparatus according to an embodiment of the present disclosure includes a display panel configured to display an image and including a first region, a second region, a third region, a fourth region, and a fifth region, at least one first sound generating device and at least one fourth sound generating device in a left region of a rear surface of the display panel and in the first region and the fourth region, at least one second sound generating device and at least one fifth sound generating device in a right region of the rear surface of the display panel and in the second region and the fifth region, and at least one third sound generating device in a center region of the rear surface of the display panel and in the third region, the at least one first sound generating device, the at least one second sound generating device, and the at least one third sound generating device is configured to vibrate the display panel to generate sound, and the at least one fourth sound generating device and the at least one fifth sound generating device is configured to vibrate the display panel to generate sound in a direction toward an upper portion of the display panel or from an upper portion of the display panel or in a direction upwards from the display panel. The upper portion may be adjacent to an upper end of the display panel. The right region may be referred to as a region adjacent to a first lateral end of the display panel and the left region may be referred to as a region adjacent to a second lateral end of the display panel, the second lateral end being opposite and/or parallel to the first lateral end.

According to some embodiments of the present disclosure, the at least one first sound generating device and the at least one fourth sound generating device may be disposed to be symmetrical with the at least one second sound generating device and the at least one fifth sound generating device with respect to a center region of the display panel. The at least one first sound generating device and the at least one fourth sound generating device may be disposed along a vertical line of the display panel. Likewise, the at least one second sound generating device and the at least one fifth sound generating device may be disposed along a vertical line of the display panel. The at least one first sound generating device and the at least one second sound generating device may be disposed along a horizontal line of the display panel. The at least one fourth sound generating device and the at least one fifth sound generating device may be disposed along a horizontal line. The at least one fourth sound generating device and the at least one fifth sound generating device may be disposed symmetrical to each other with respect to a vertical center line of the display panel. The at least one third sound generating device may be disposed on a vertical center line of the display panel.

According to some embodiments of the present disclosure, the at least one first sound generating device and the at least one second sound generating device may be disposed to be asymmetrical with the at least one third sound generating device. The at least one first sound generating device and the at least one second sound generating device may be disposed on a different line with the at least one third sound generating device. The at least one first sound generating device and the at least one second sound generating device may be disposed symmetrical to each other with respect to a vertical center line of the display panel.

According to some embodiments of the present disclosure, the display apparatus further includes at least one woofer disposed at a lower portion of one or more of the at least one first sound generating device and the at least one second sound generating device.

According to some embodiments of the present disclosure, one or more of the at least one first sound generating device and the at least one second sound generating device may include a sound generating device having a woofer.

According to some embodiments of the present disclosure, the at least one first sound generating device and the at least one second sound generating device may be disposed to be asymmetrical with the at least one third sound generating device. The at least one first sound generating device and the at least one second sound generating device may be disposed on a different line with the at least one third sound generating device. The at least one first sound generating device and the at least one second sound generating device may be disposed symmetrical to each other with respect to a vertical center line of the display panel.

According to some embodiments of the present disclosure, the display apparatus may further include an encapsulation substrate on the rear surface of the display panel and a heat dissipation member on a rear surface of the encapsulation substrate.

According to some embodiments of the present disclosure, the display apparatus may further include at least one sixth sound generating device in a sixth region between the fourth region and the fifth region, at least one seventh sound generating device in a seventh region at a lower portion of the first region, at least one eighth sound generating device in an eighth region at a lower portion of the second region, at least one ninth sound generating device in a ninth region between the seventh region and the eighth region, at least one tenth sound generating device in a tenth region between the first region and the third region, and at least one eleventh sound generating device in an eleventh region between the second region and the third region.

According to some embodiments of the present disclosure, the at least one sixth sound generating device may be configured to vibrate the display panel to generate sound in a direction toward an upper portion of the display panel or from the upper portion of the display panel or in the direction upwards from the display panel, and the at least one seventh sound generating device, the at least one eighth sound generating device, and the at least one ninth sound generating device may be configured to vibrate the display panel to generate sound in a direction toward a lower portion of the display panel or from a lower portion of the display panel or in the direction downwards from the display panel.

According to some embodiments of the present disclosure, the display apparatus may further includes at least one woofer disposed at a lower portion of one or more of the at least one seventh sound generating device and the at least one eighth sound generating device.

According to some embodiments of the present disclosure, one or more of the at least one seventh sound generating device and the at least one eighth sound generating device may include a sound generating device having a woofer.

According to some embodiments of the present disclosure, one or more of the at least one first sound generating device and the at least one second sound generating device may include a sound generating device having a woofer.

According to some embodiments of the present disclosure, one or more of the at least one tenth sound generating device and the at least one eleventh sound generating device may include a sound generating device having a woofer.

According to some embodiments of the present disclosure, the display apparatus may further include at least one twelfth sound generating device in a twelfth region between the fourth region and the sixth region, at least one thirteenth sound generating device in a thirteenth region between the fifth region and the sixth region, at least one fourteenth sound generating device in a fourteenth region between the seventh region and the ninth region, and at least one fifteenth sound generating device in a fifteenth region between the eighth region and the ninth region.

According to some embodiments of the present disclosure, the at least one twelfth sound generating device and the at least one thirteenth sound generating device may be configured to vibrate the display panel to generate sound in a direction toward an upper portion of the display panel or from the upper portion of the display panel or in the direction upwards from the display panel, and the at least one fourteenth sound generating device and the at least one fifteenth sound generating device may be configured to vibrate the display panel to generate sound in a direction toward a lower portion of the display panel or from a lower portion of the display panel or in the direction downwards from the display panel. The at least one twelfth sound generating device and the at least one thirteenth sound generating device may be disposed at the upper end of the display panel. The at least one fourteenth sound generating device and the at least one fifteenth sound generating device may be disposed at the lower end of the display panel.

According to some embodiments of the present disclosure, the display apparatus may further include at least one woofer disposed at a lower portion of one or more of the at least one seventh sound generating device and the at least one eighth sound generating device.

According to some embodiments of the present disclosure, one or more of the at least one seventh sound generating device and the at least one eighth sound generating device may include a sound generating device having a woofer.

According to some embodiments of the present disclosure, one or more of the at least one fourteenth sound generating device and the at least one fifteenth sound generating device may include a sound generating device having a woofer.

According to some embodiments of the present disclosure, one or more of the at least one first sound generating device and the at least one second sound generating device may include a sound generating device having a woofer.

According to some embodiments of the present disclosure, one or more of the at least one tenth sound generating device and the at least one eleventh sound generating device may include a sound generating device having a woofer.

According to some embodiments of the present disclosure, one or more of the at least one first sound generating device to the at least one fifteenth sound generating device may include a magnet on a yoke, a bobbin adjacent to the magnet, a coil around the bobbin, a frame at an outer portion of the yoke, and a damper between the frame and the bobbin. The damper may be between the bobbin and the yoke or between the bobbin and a frame at an outer portion of the yoke.

According to some embodiments of the present disclosure, the damper may be a line for applying a sound signal to one or more of the at least one first sound generating device to the at least one fifteenth sound generating device.

According to some embodiments of the present disclosure, the one or more of the at least one first sound generating device to the at least one fifteenth sound generating device may further include a connection member at an extension portion of the yoke, the one or more of the at least one first sound generating device to the at least one fifteenth sound generating device may be disposed in the display panel by the connection member.

According to some embodiments of the present disclosure, the one or more of the at least one first sound generating device to the at least one fifteenth sound generating device may further include a connection member at an extension portion of the frame, the one or more of the at least one first sound generating device to the at least one fifteenth sound generating device may be disposed in the display panel by the connection member.

According to some embodiments of the present disclosure, the one or more of the at least one first sound generating device to the at least one fifteenth sound generating device may further include a connection part connected to the frame or the yoke. The connection part may support the yoke while providing elasticity to the yoke.

According to some embodiments of the present disclosure, one or more of the at least one first sound generating device to the at least one fifteenth sound generating device may include a magnet on a yoke, a bobbin adjacent to the magnet, and a coil and a damper around the bobbin.

According to some embodiments of the present disclosure, the one or more of the at least one first sound generating device to the at least one fifteenth sound generating device may include one among a pair of sound generating devices, an oval sound generating device, a circular sound generating device, a single-type sound generating device, and a two or more-array sound generating device.

According to some embodiments of the present disclosure, the one or more of the at least one first sound generating device to the at least one fifteenth sound generating device may include a film-type sound generating device, and the film-type sound generating device includes a first portion having a piezoelectric characteristic and a second portion between the first portions and having flexibility.

A display apparatus according to another embodiment of the present disclosure includes a display panel configured to display an image and including a first region, a second region, a third region, a fourth region, and a fifth region, at least one first sound generating device and at least one fourth sound generating device in a left region of a rear surface of the display panel and in the first region and the fourth region, at least one second sound generating device and at least one fifth sound generating device in a right region of the rear surface of the display panel and in the second region and the fifth region, at least one third sound generating device in a center region of the rear surface of the display panel and in the third region, and a first partition separating sounds of the at least one first sound generating device, the at least one second sound generating device, and the at least one third sound generating device from sounds of the at least one fourth sound generating device and the at least one fifth sound generating device.

According to some embodiments of the present disclosure, the display apparatus may further include a plurality of partitions separating adjacent regions from each other, the partitions including partitions extending from the first end to the second end of the display panel and the partitions extending from the upper end of the display panel downwards in a straight line.

According to some embodiments of the present disclosure, the display apparatus may further include at least one partition including at least one of a first partition extending from the first lateral end to the second lateral end of the display panel for separating sounds of the at least one first sound generating device, the at least one second sound generating device, and the at least one third sound generating device from sounds of the at least one fourth sound generating device and the at least one fifth sound generating device, a second partition extending from the first lateral end to the second lateral end of the display panel below the first, second and third regions, a fourth partition extending from the upper end downwards in a straight line passing along a first side of the third region, the first side of the third region being a side of the third region closest and parallel to the first lateral end of the display panel, and a fifth partition extending from the upper end downwards in a straight line passing along a second side of the third region, the second side of the third region being a side of the third region closest and parallel to the second lateral end of the display panel.

According to some embodiments of the present disclosure, the display apparatus may further include at least one partition including at least one of a third partition extending from the first lateral end to the second lateral end of the display panel below the seventh, eighth and ninth regions, a sixth partition extending from the upper end downwards in a straight line passing along sides of the fourth, first and seventh regions, the sides being opposite and parallel to the first lateral end of the display panel, and a seventh partition extending from the upper end downwards in a straight line passing along sides of the fifth, second and eighth regions, the sides being opposite and parallel to the second lateral end of the display panel.

According to some embodiments of the present disclosure, the at least one sixth sound generating device may be configured to generate sound in the direction upwards from the display panel, and/or the at least one seventh sound generating device, the at least one eighth sound generating device, and the at least one ninth sound generating device may be configured to generate sound in a direction downwards from the display panel, and/or the at least one twelfth sound generating device and the at least one thirteenth sound generating device may be configured to generate sound in the direction upwards from the display panel, and/or the at least one fourteenth sound generating device and the at least one fifteenth sound generating device are configured to generate sound in a direction downwards from the display panel.

According to some embodiments of the present disclosure, the display apparatus may further include at least one woofer disposed at a lower portion of the at least one first sound generating device and/or of the at least one second sound generating device and/or of the at least one seventh sound generating device and/or of the at least one eighth sound generating device; and/or the at least one first sound generating device and/or the at least one second sound generating device and/or the at least one seventh sound generating device and/or the at least one eighth sound generating device and/or the at least one tenth sound generating device and/or the at least one eleventh sound generating device and/or the at least one fourteenth sound generating device and/or the at least one fifteenth sound generating device may include a sound generating device having a woofer.

According to some embodiments of the present disclosure, at least one of the regions may include at least one pad extending toward one or more of the sound generating device arranged within the region, and at least one bent portion formed on at least one side of a partition passing along the region, the bent portion being bent toward one or more of the sound generating device arranged within the region.

According to some embodiments of the present disclosure, the display apparatus may further include one of at least one pad and at least one bent portion on at least one side of the first partition toward one or more of the at least one first sound generating device, the at least one second sound generating device, the at least one third sound generating device, the at least one fourth sound generating device, and the at least one fifth sound generating device.

According to some embodiments of the present disclosure, the display apparatus may further include a second partition at a lower portion of the at least one first sound generating device, the at least one second sound generating device, and the at least one third sound generating device and one of at least one pad and at least one bent portion on at least one side of the second partition toward one or more of the at least one first sound generating device, the at least one second sound generating device, and the at least one third sound generating device.

According to some embodiments of the present disclosure, the display apparatus may further include a supporting member on the rear surface of the display panel, a partition between the supporting member and the display panel, and one of at least one pad and at least one bent portion on at least one side of the partition toward one or more of the at least one first sound generating device, the at least one second sound generating device, the at least one third sound generating device, the at least one fourth sound generating device, and the at least one fifth sound generating device.

According to some embodiments of the present disclosure, the display apparatus may further include a fourth partition between the first and fourth regions and the third region, a fifth partition between the second and fifth regions and the third region, and at least one pad on at least one side of one or more of the fourth partition and the fifth partition toward one or more of the at least one first sound generating device, the at least one second sound generating device, the at least one third sound generating device, the at least one fourth sound generating device, and the at least one fifth sound generating device.

According to some embodiments of the present disclosure, the display apparatus may further include at least one sixth sound generating device in a sixth region between the fourth region and the fifth region, at least one seventh sound generating device in a seventh region under the first region, at least one eighth sound generating device in an eighth region under the second region, at least one ninth sound generating device in a ninth region between the seventh region and the eighth region, at least one tenth sound generating device in a tenth region between the first region and the third region, at least one eleventh sound generating device in an eleventh region between the second region and the third region, and a second partition separating sounds of the at least one first sound generating device, the at least one second sound generating device, the at least one third sound generating device, the at least one tenth sound generating device, and the at least one eleventh sound generating device from sounds of the at least one seventh sound generating device, the at least one eighth sound generating device, and the at least one ninth sound generating device.

According to some embodiments of the present disclosure, the display apparatus may further include one or more of at least one pad and at least one bent portion on at least one side of the second partition toward one or more of the at least one first sound generating device, the at least one second sound generating device, the at least one third sound generating device, the at least one seventh sound generating device, the at least one eighth sound generating device, the at least one ninth sound generating device, the at least one tenth sound generating device, and the at least one eleventh sound generating device.

According to some embodiments of the present disclosure, the display apparatus may further include a third partition at a lower portion of the at least one seventh sound generating device, the at least one eighth sound generating device, and the at least one ninth sound generating device and one or more of at least one pad and at least one bent portion on at least one side of the third partition toward one or more of the at least one seventh sound generating device, the at least one eighth sound generating device, and the at least one ninth sound generating device.

According to some embodiments of the present disclosure, the display apparatus may further include a supporting member on the rear surface of the display panel, a partition between the supporting member and the display panel, and one of at least one pad and at least one bent portion on at least one side of the partition toward one or more of the at least one fourth sound generating device, the at least one fifth sound generating device, the at least one sixth sound generating device, the at least one seventh sound generating device, the at least one eighth sound generating device, and the at least one ninth sound generating device.

According to some embodiments of the present disclosure, the display apparatus may further include a fourth partition between the third, sixth, and ninth regions and the tenth region, a fifth partition between the third, sixth, and ninth regions and the eleventh region, a sixth partition between the first, fourth, and seventh regions and the tenth region, a seventh partition between the second, fifth, and eighth regions and the eleventh region, and at least one pad on at least one side of one or more of the fourth to seventh partitions toward one or more of the at least one first sound generating device to the at least one eleventh sound generating device.

According to some embodiments of the present disclosure, the display apparatus may further include at least one twelfth sound generating device in a twelfth region between the fourth region and the sixth region, at least one thirteenth sound generating device in a thirteenth region between the fifth region and the sixth region, at least one fourteenth sound generating device in a fourteenth region between the seventh region and the ninth region, and at least one fifteenth sound generating device in a fifteenth region between the eighth region and the ninth region, the second partition may be configured to separate sounds of the at least one first sound generating device, the at least one second sound generating device, the at least one third sound generating device, the at least one tenth sound generating device, and the at least one eleventh sound generating device from sounds of the at least one seventh sound generating device, the at least one eighth sound generating device, the at least one ninth sound generating device, the at least one fourteenth sound generating device, and the at least one fifteenth sound generating device.

According to some embodiments of the present disclosure, the display apparatus may further include one of at least one pad and at least one bent portion on at least one side of the second partition toward one or more of the at least one first sound generating device, the at least one second sound generating device, the at least one third sound generating device, the at least one seventh sound generating device, the at least one eighth sound generating device, the at least one ninth sound generating device, the at least one tenth sound generating device, the at least one eleventh sound generating device, the at least one fourteenth sound generating device, and the at least one fifteenth sound generating device.

According to some embodiments of the present disclosure, the display apparatus may further include a third partition at a lower portion of the at least one seventh sound generating device, the at least one eighth sound generating device, the at least one ninth sound generating device, the at least one fourteenth sound generating device, and the at least one fifteenth sound generating device and one or more of at least one pad and at least one bent portion on at least one side of the third partition toward one or more of the at least one seventh sound generating device, the at least one eighth sound generating device, the at least one ninth sound generating device, the at least one fourteenth sound generating device, and the at least one fifteenth sound generating device.

According to some embodiments of the present disclosure, the display apparatus may further include a supporting member on the rear surface of the display panel, a partition between the supporting member and the display panel, and one or more of at least one pad and at least one bent portion on at least one side of the partition toward one or more of the at least one fourth sound generating device, the at least one fifth sound generating device, the at least one sixth sound generating device, the at least one seventh sound generating device, the at least one eighth sound generating device, the at least one ninth sound generating device, the at least one twelfth sound generating device, the at least one thirteenth sound generating device, the at least one fourteenth sound generating device, and the at least one fifteenth sound generating device According to some embodiments of the present disclosure, the display apparatus may further include a fourth partition between the third, sixth, and ninth regions and the tenth, twelfth, and fourteenth regions, a fifth partition between the third, sixth, and ninth regions and the eleventh, thirteenth, and fifteenth regions, a sixth partition between the first, fourth, and seventh regions and the tenth, twelfth, and fourteenth regions, a seventh partition between the second, fifth, and eighth regions and the eleventh, thirteenth, and fifteenth regions, and at least one pad on at least one side of one or more of the fourth to seventh partitions toward one or more of the at least one first sound generating device to the at least one fifteenth sound generating device.

According to some embodiments of the present disclosure, the at least one first sound generating device to the at least one fifteenth sound generating device may output sounds of about 80 Hz to about 40 kHz.

According to some embodiments of the present disclosure, one or more of the at least one first sound generating device to the at least one fifteenth sound generating device may include a sound generating device having a woofer.

According to some embodiments of the present disclosure, one or more of the sound generating device including the woofer may output a sound of about 60 Hz to about 40 kHz.

According to some embodiments of the present disclosure, the display apparatus may further include a woofer at a lower portion of one or more of the at least one seventh sound generating device, the at least one eighth sound generating device, the at least one ninth sound generating device, the at least one fourteenth sound generating device, and the at least one fifteenth sound generating device.

According to some embodiments of the present disclosure, the woofer may output a sound of about 80 Hz or less.

Since the display apparatus according to embodiments of the present disclosure includes the sound generating device that vibrates the display panel to generate sound, the display apparatus may output sound to a forward region in front of the display panel, thereby enhancing an immersion experience of a viewer watching an image displayed by the display apparatus.

In the display apparatus according to embodiments of the present disclosure, a sound generating device may be provided in a display panel, thereby implementing a sound generating device that is slimmed and enhances the quality of a sound.

Moreover, according to embodiments of the present disclosure, a plurality of sound generating devices may be provided in a display apparatus, thereby implementing a display apparatus that outputs a stereo sound in left, right, upward, and downward directions.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:

a display panel configured to display an image and including a first region, a second region, a third region, a fourth region, and a fifth region;

at least one first sound generating device and at least one fourth sound generating device in a left region of a rear surface of the display panel and in the first region and the fourth region;

at least one second sound generating device and at least one fifth sound generating device in a right region of the rear surface of the display panel and in the second region and the fifth region;

at least one third sound generating device in a center region of the rear surface of the display panel and in the third region;

at least one sixth sound generating device in a sixth region between the fourth region and the fifth region;

at least one seventh sound generating device in a seventh region under the first region;

at least one eighth sound generating device in an eighth region under the second region;

at least one ninth sound generating device in a ninth region between the seventh region and the eighth region;

at least one tenth sound generating device in a tenth region between the first region and the third region;

at least one eleventh sound generating device in an eleventh region between the second region and the third region;

a first partition for separating sounds of the at least one first sound generating device, the at least one second sound generating device, and the at least one third sound generating device from sounds of the at least one fourth sound generating device and the at least one fifth sound generating device; and a second partition for separating sounds of the at least one first sound generating device, the at least one second sound generating device, the at least one third sound generating device, the at least one tenth sound generating device, and the at least one eleventh sound generating device from sounds of the at least one seventh sound generating device, the at least one eighth sound generating device, and the at least one ninth sound generating device.

2. The display apparatus of claim 1, further comprising one of at least one pad and at least one bent portion on at least one side of the first partition toward one or more of the at least one first sound generating device, the at least one second sound generating device, the at least one third sound generating device, the at least one fourth sound generating device, and the at least one fifth sound generating device.

3. The display apparatus of claim 1, wherein the second partition is provided at a lower portion of the at least one first sound generating device, the at least one second sound generating device, and the at least one third sound generating device, and wherein the display apparatus further comprises: one of at least one pad and at least one bent portion on at least one side of the second partition toward one or more of the at least one first sound generating device, the at least one second sound generating device, and the at least one third sound generating device.

4. The display apparatus of claim 1, further comprising:

a supporting member on the rear surface of the display panel;

a partition between the supporting member and the display panel; and one of at least one pad and at least one bent portion on at least one side of the partition toward one or more of the at least one first sound generating device, the at least one second sound generating device, the at least one third sound generating device, the at least one fourth sound generating device, and the at least one fifth sound generating device.

5. The display apparatus of claim 1, further comprising:

a fourth partition between the first and fourth regions and the third region;

a fifth partition between the second and fifth regions and the third region; and at least one pad on at least one side of one or more of the fourth partition and the fifth partition toward one or more of the at least one first sound generating device, the at least one second sound generating device, the at least one third sound generating device, the at least one fourth sound generating device, and the at least one fifth sound generating device.

6. The display apparatus of claim 1, further comprising one or more of at least one pad and at least one bent portion on at least one side of the second partition toward one or more of the at least one first sound generating device, the at least one second sound generating device, the at least one third sound generating device, the at least one seventh sound generating device, the at least one eighth sound generating device, the at least one ninth sound generating device, the at least one tenth sound generating device, and the at least one eleventh sound generating device.

7. The display apparatus of claim 1, further comprising:

a third partition at a lower portion of the at least one seventh sound generating device, the at least one eighth sound generating device, and the at least one ninth sound generating device; and one of at least one pad and at least one bent portion on at least one side of the third partition toward one or more of the at least one seventh sound generating device, the at least one eighth sound generating device, and the at least one ninth sound generating device.

8. The display apparatus of claim 1, further comprising:

a supporting member on the rear surface of the display panel;

a partition between the supporting member and the display panel; and one or more of at least one pad and at least one bent portion on at least one side of the partition toward one or more of the at least one fourth sound generating device, the at least one fifth sound generating device, the at least one sixth sound generating device, the at least one seventh sound generating device, the at least one eighth sound generating device, and the at least one ninth sound generating device.

9. The display apparatus of claim 1, further comprising:

a fourth partition between the third, sixth, and ninth regions and the tenth region;

a fifth partition between the third, sixth, and ninth regions and the eleventh region;

a sixth partition between the first, fourth, and seventh regions and the tenth region;

a seventh partition between the second, fifth, and eighth regions and the eleventh region; and at least one pad on at least one side of one or more of the fourth to seventh partitions toward one or more of the at least one first sound generating device to the at least one eleventh sound generating device.

10. The display apparatus of claim 1, further comprising:

at least one twelfth sound generating device in a twelfth region between the fourth region and the sixth region;

at least one thirteenth sound generating device in a thirteenth region between the fifth region and the sixth region;

at least one fourteenth sound generating device in a fourteenth region between the seventh region and the ninth region; and at least one fifteenth sound generating device in a fifteenth region between the eighth region and the ninth region, wherein the second partition is configured to separate sounds of the at least one first sound generating device, the at least one second sound generating device, the at least one third sound generating device, the at least one tenth sound generating device, and the at least one eleventh sound generating device from sounds of the at least one seventh sound generating device, the at least one eighth sound generating device, the at least one ninth sound generating device, the at least one fourteenth sound generating device, and the at least one fifteenth sound generating device.

11. The display apparatus of claim 10, further comprising one or more of at least one pad and at least one bent portion on at least one side of the second partition toward one or more of the at least one first sound generating device, the at least one second sound generating device, the at least one third sound generating device, the at least one seventh sound generating device, the at least one eighth sound generating device, the at least one ninth sound generating device, the at least one tenth sound generating device, the at least one eleventh sound generating device, the at least one fourteenth sound generating device, and the at least one fifteenth sound generating device.

12. The display apparatus of claim 10, further comprising:

a third partition at a lower portion of the at least one seventh sound generating device, the at least one eighth sound generating device, the at least one ninth sound generating device, the at least one fourteenth sound generating device, and the at least one fifteenth sound generating device; and one or more of at least one pad and at least one bent portion on at least one side of the third partition toward one or more of the at least one seventh sound generating device, the at least one eighth sound generating device, the at least one ninth sound generating device, the at least one fourteenth sound generating device, and the at least one fifteenth sound generating device.

13. The display apparatus of claim 10, further comprising:

a supporting member on the rear surface of the display panel;

a partition between the supporting member and the display panel; and one or more of at least one pad and at least one bent portion on at least one side of the partition toward one or more of the at least one fourth sound generating device, the at least one fifth sound generating device, the at least one sixth sound generating device, the at least one seventh sound generating device, the at least one eighth sound generating device, the at least one ninth sound generating device, the at least one twelfth sound generating device, the at least one thirteenth sound generating device, the at least one fourteenth sound generating device, and the at least one fifteenth sound generating device.

14. The display apparatus of claim 10, further comprising:

a fourth partition between the third, sixth, and ninth regions and the tenth, twelfth, and fourteenth regions;

a fifth partition between the third, sixth, and ninth regions and the eleventh, thirteenth, and fifteenth regions;

a sixth partition between the first, fourth, and seventh regions and the tenth, twelfth, and fourteenth regions;

a seventh partition between the second, fifth, and eighth regions and the eleventh, thirteenth, and fifteenth regions; and at least one pad on at least one side of one or more of the fourth to seventh partitions toward one or more of the at least one first sound generating device to the at least one fifteenth sound generating device.

15. The display apparatus of claim 10, wherein the at least one first sound generating device to the at least one fifteenth sound generating device outputs sounds of about 80 Hz to about 40 kHz.

16. The display apparatus of claim 10, wherein one or more of the at least one first sound generating device to the at least one fifteenth sound generating device comprises a sound generating device having a woofer.

17. The display apparatus of claim 16, wherein one or more of the sound generating device including the woofer outputs a sound of about 60 Hz to about 40 kHz.

18. The display apparatus of claim 10, further comprising a woofer at a lower portion of one or more of the at least one seventh sound generating device, the at least one eighth sound generating device, the at least one ninth sound generating device, the at least one fourteenth sound generating device, the at least one fifteenth sound generating device.

19. The display apparatus of claim 18, wherein the woofer outputs a sound of about 80 Hz or less.

* * * * *